T. CAHILL.
ART OF AND APPARATUS FOR GENERATING AND DISTRIBUTING MUSIC ELECTRICALLY.
APPLICATION FILED JUNE 26, 1915. RENEWED MAY 8, 1918.
1,295,691.
Patented Feb. 25, 1919.
53 SHEETS—SHEET 2.
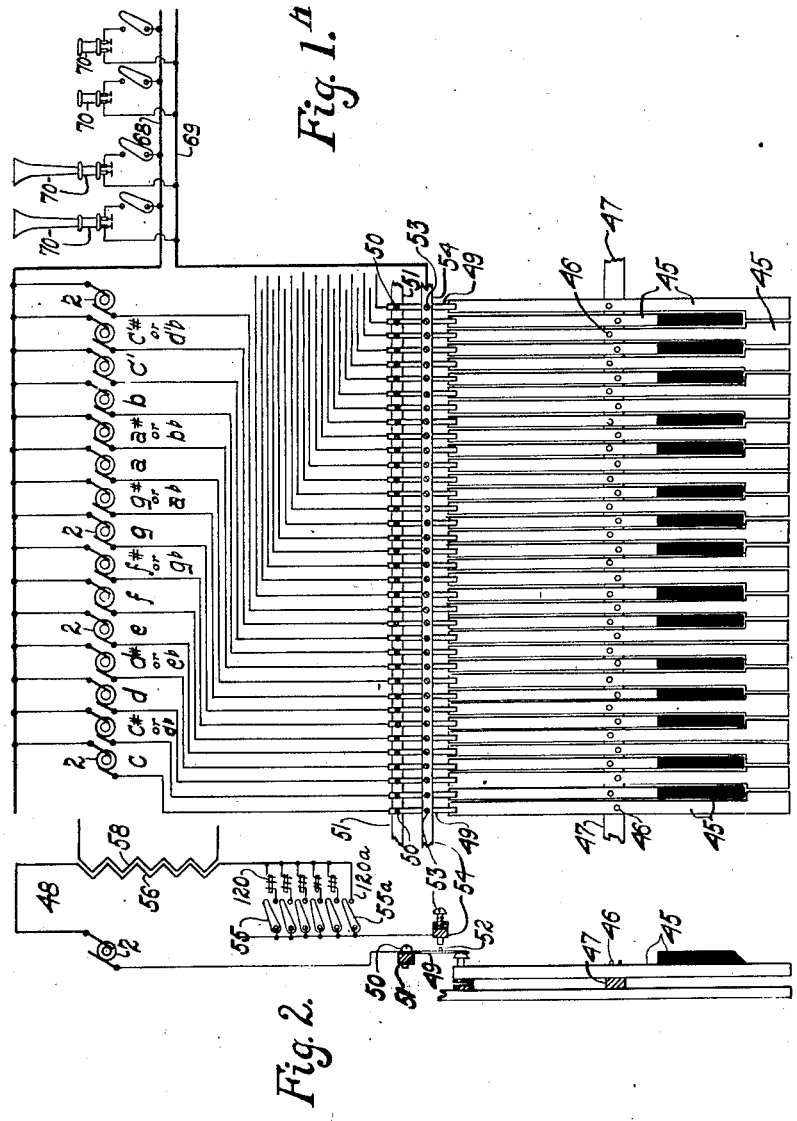
WITNESSES:
INVENTOR.

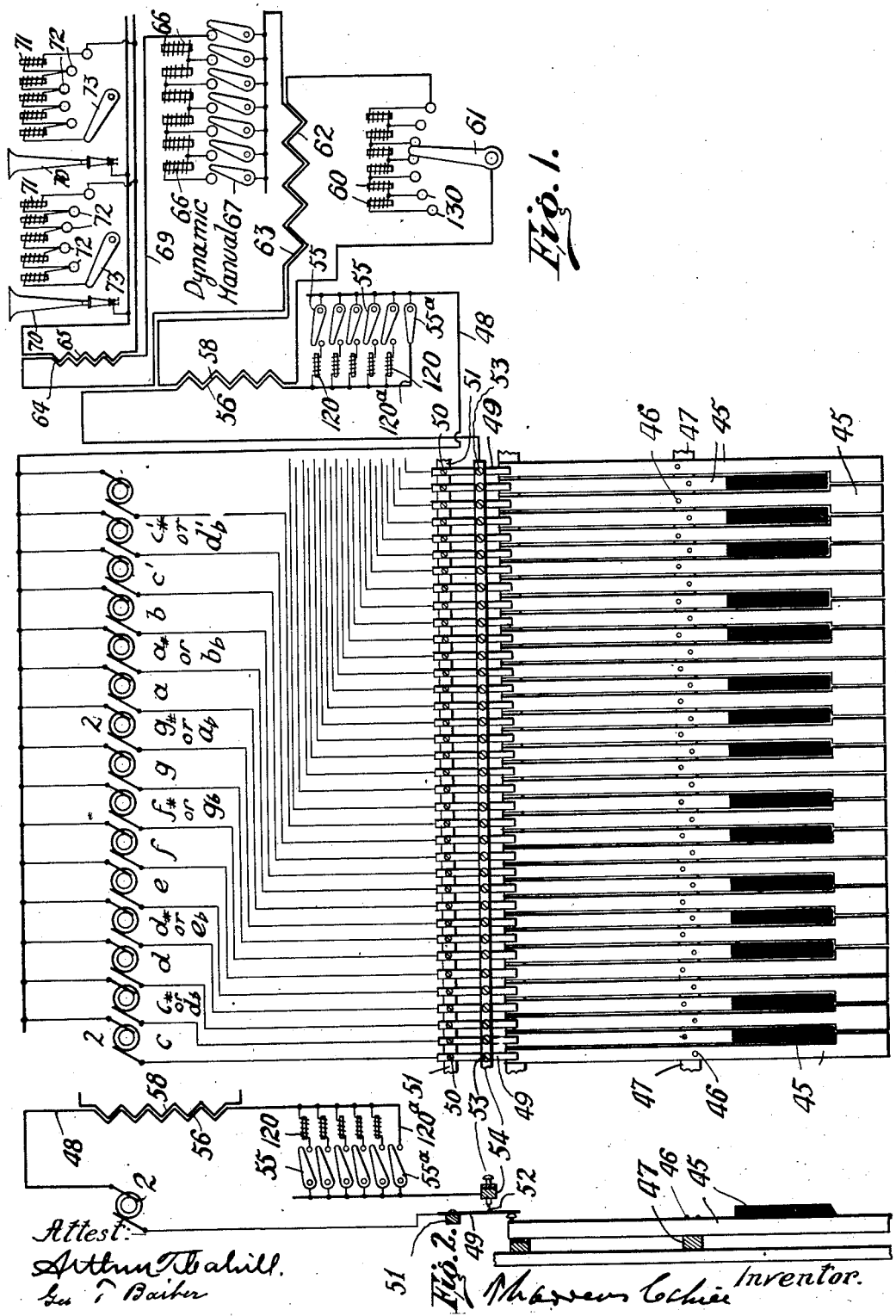

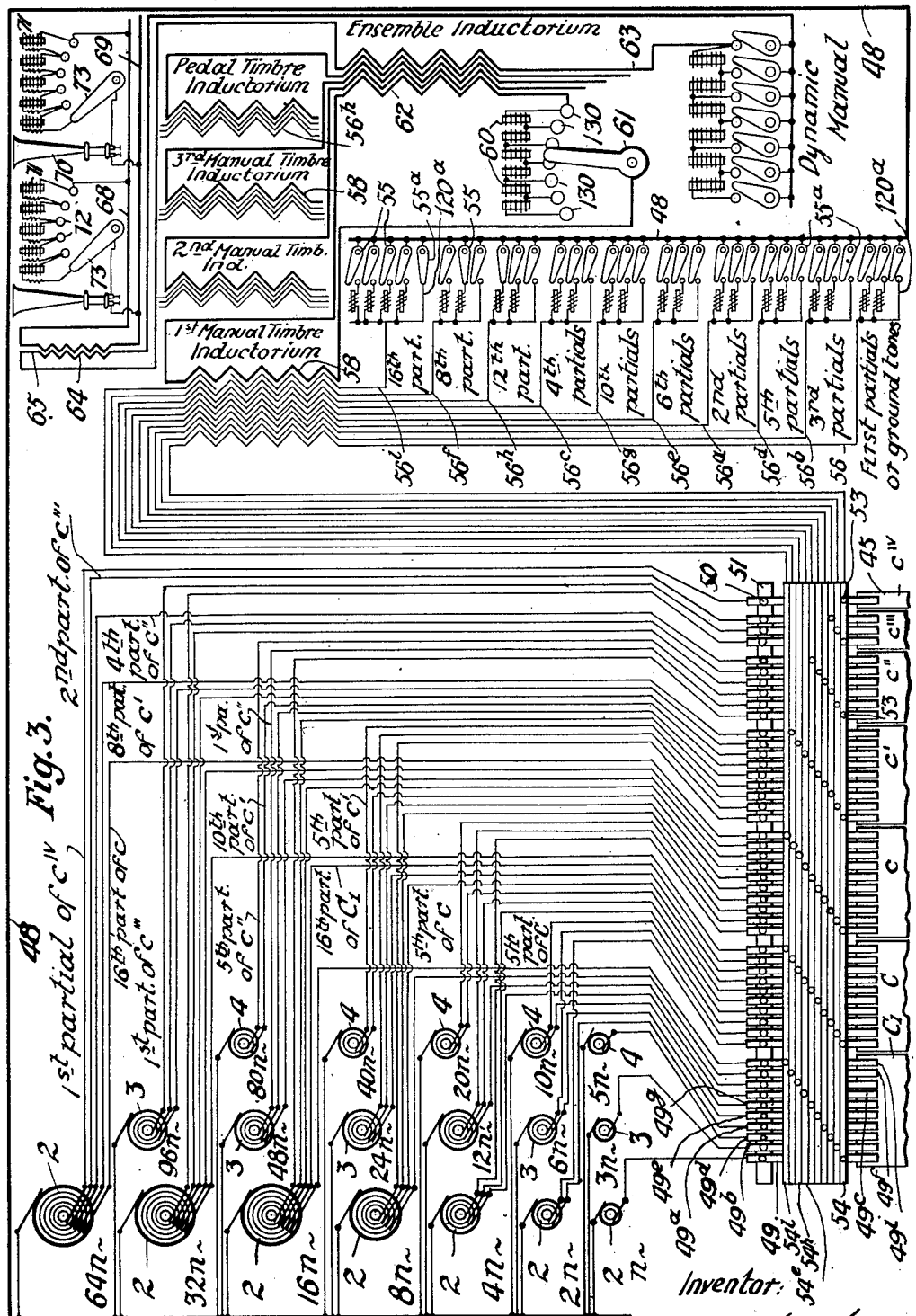

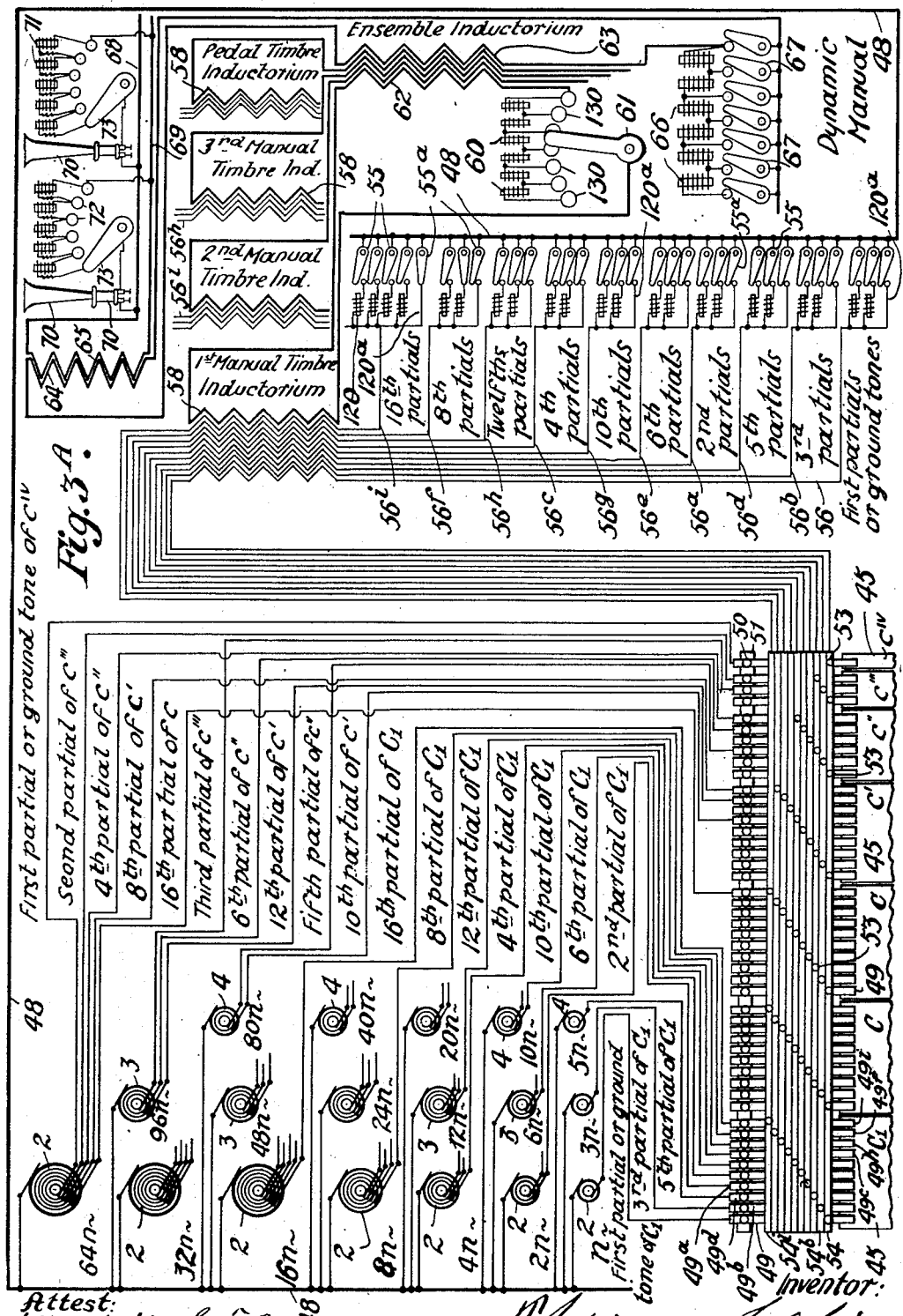

T. CAHILL.
ART OF AND APPARATUS FOR GENERATING AND DISTRIBUTING MUSIC ELECTRICALLY.
APPLICATION FILED JUNE 26, 1915. RENEWED MAY 8, 1918.
1,295,691.  Patented Feb. 25, 1919.
53 SHEETS—SHEET 5.
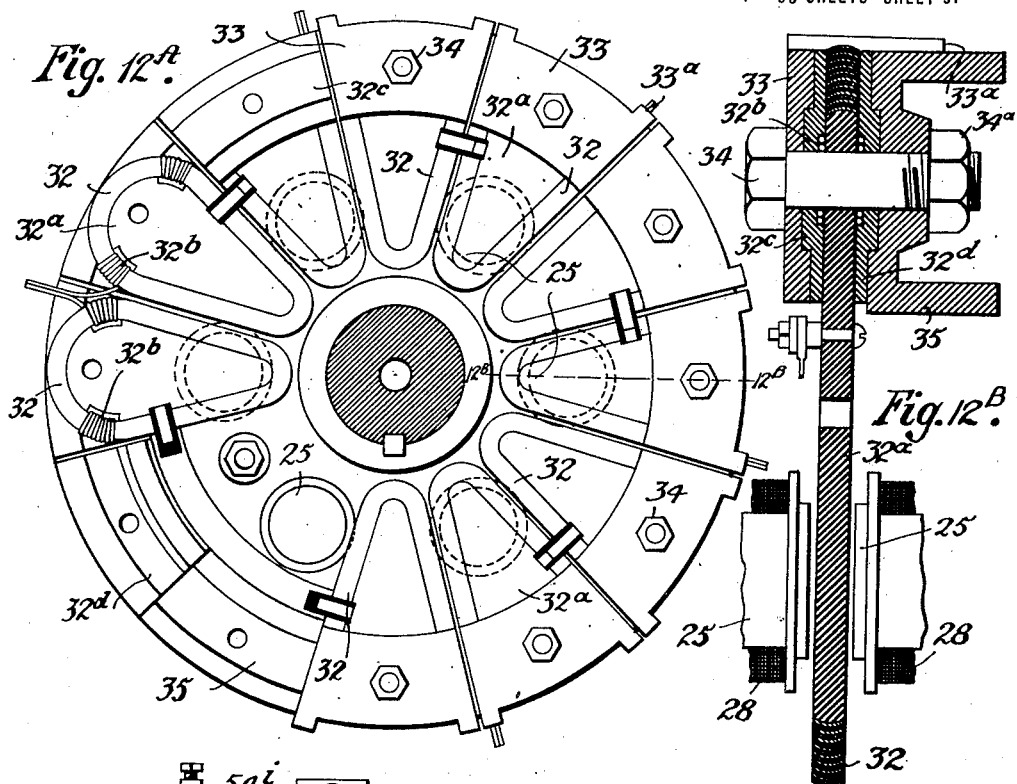
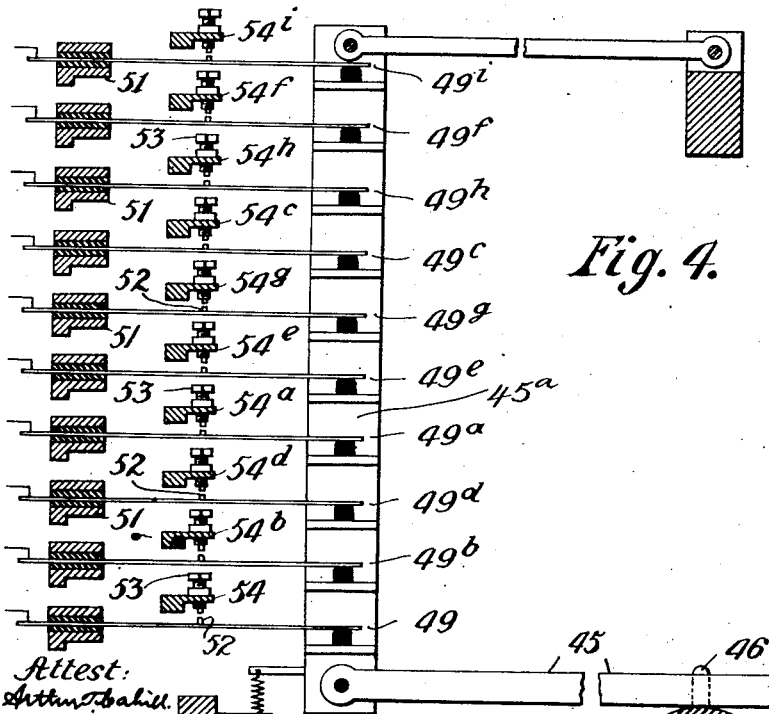

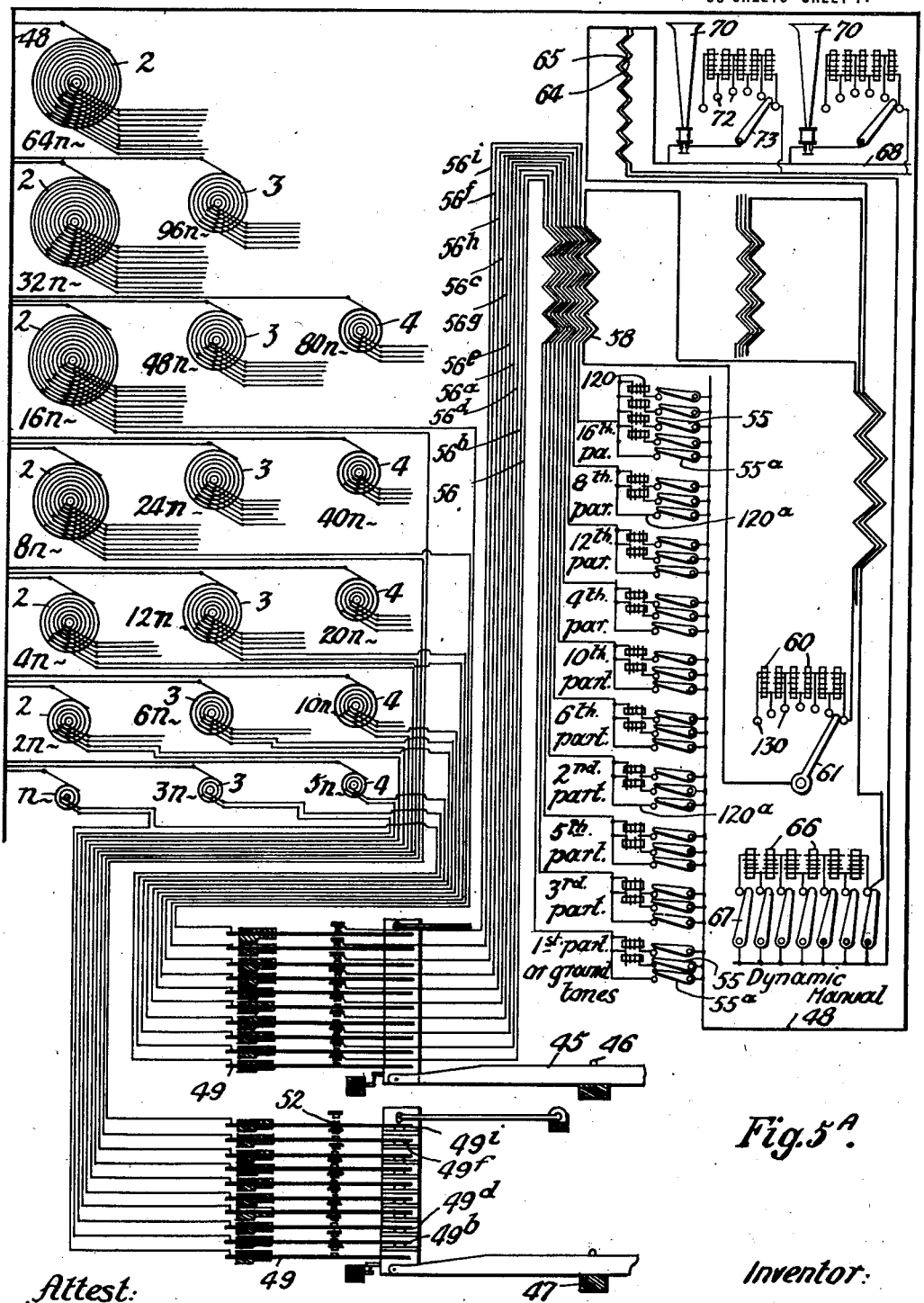

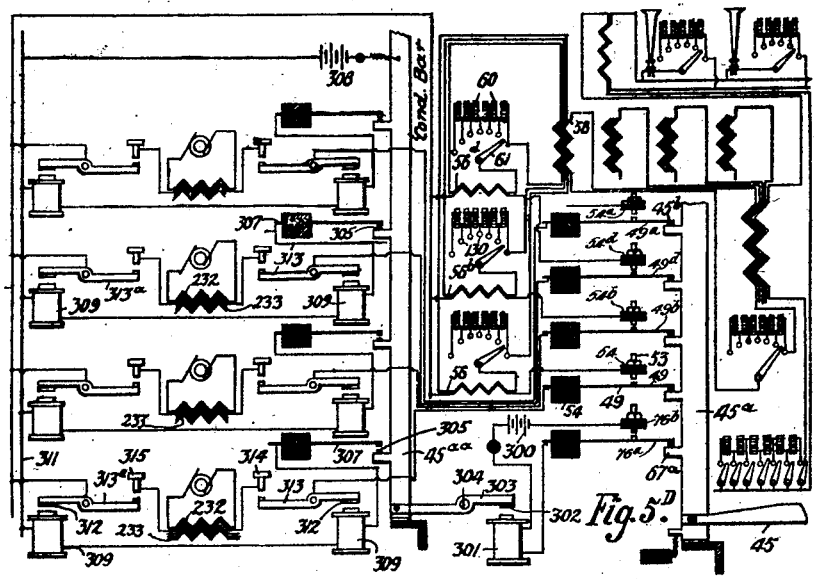
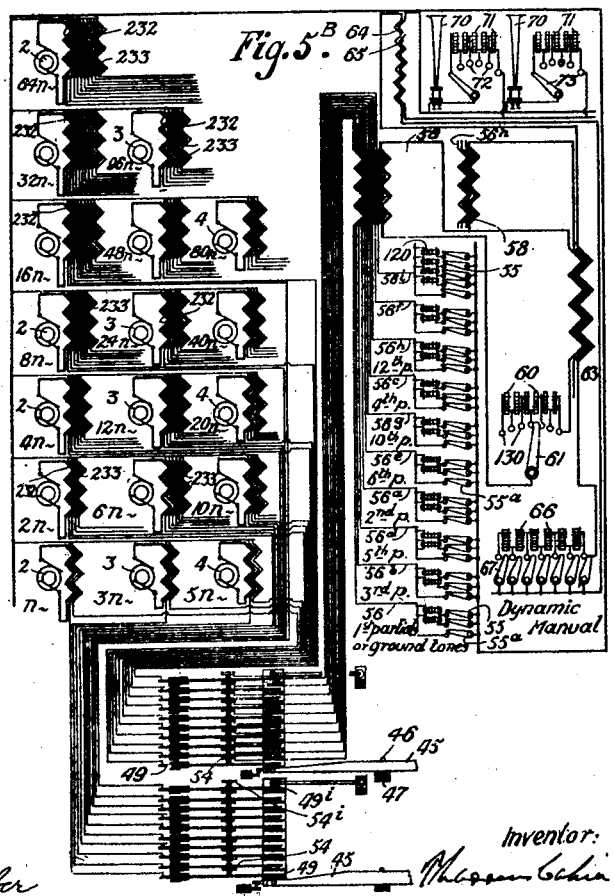

T. CAHILL.
ART OF AND APPARATUS FOR GENERATING AND DISTRIBUTING MUSIC ELECTRICALLY.
APPLICATION FILED JUNE 26, 1915. RENEWED MAY 8, 1918.
1,295,691.
Patented Feb. 25, 1919.
53 SHEETS—SHEET 9.
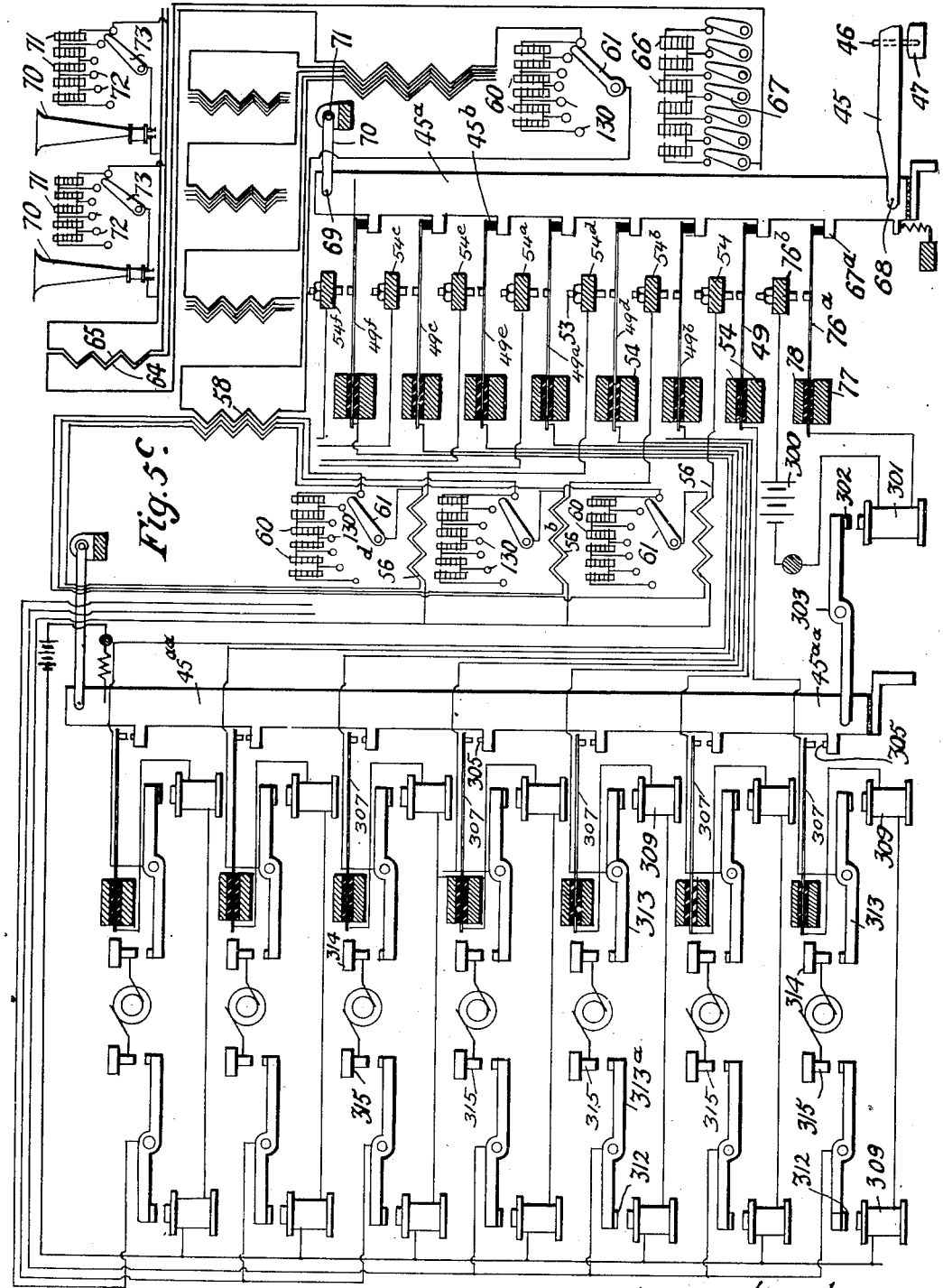

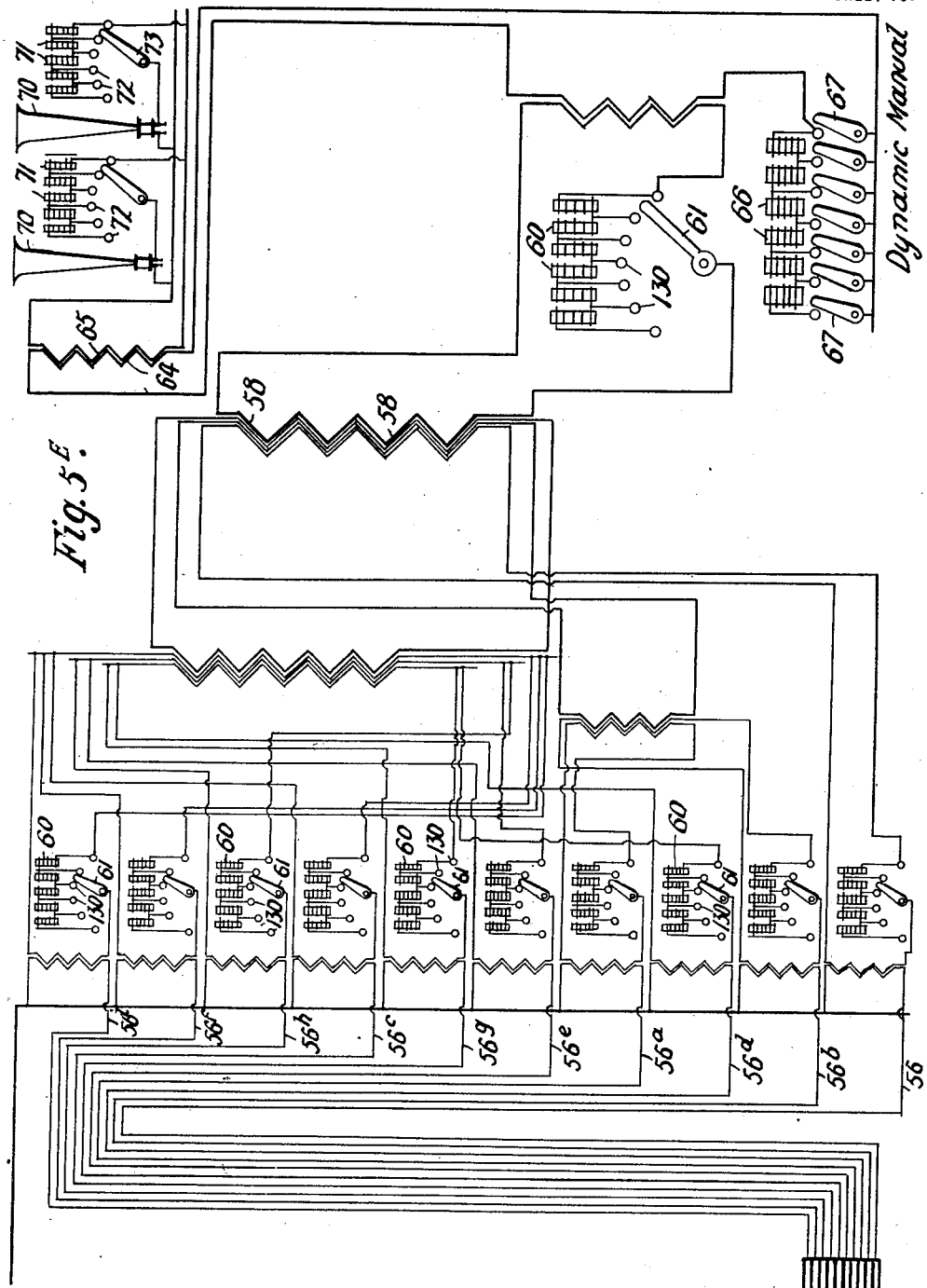

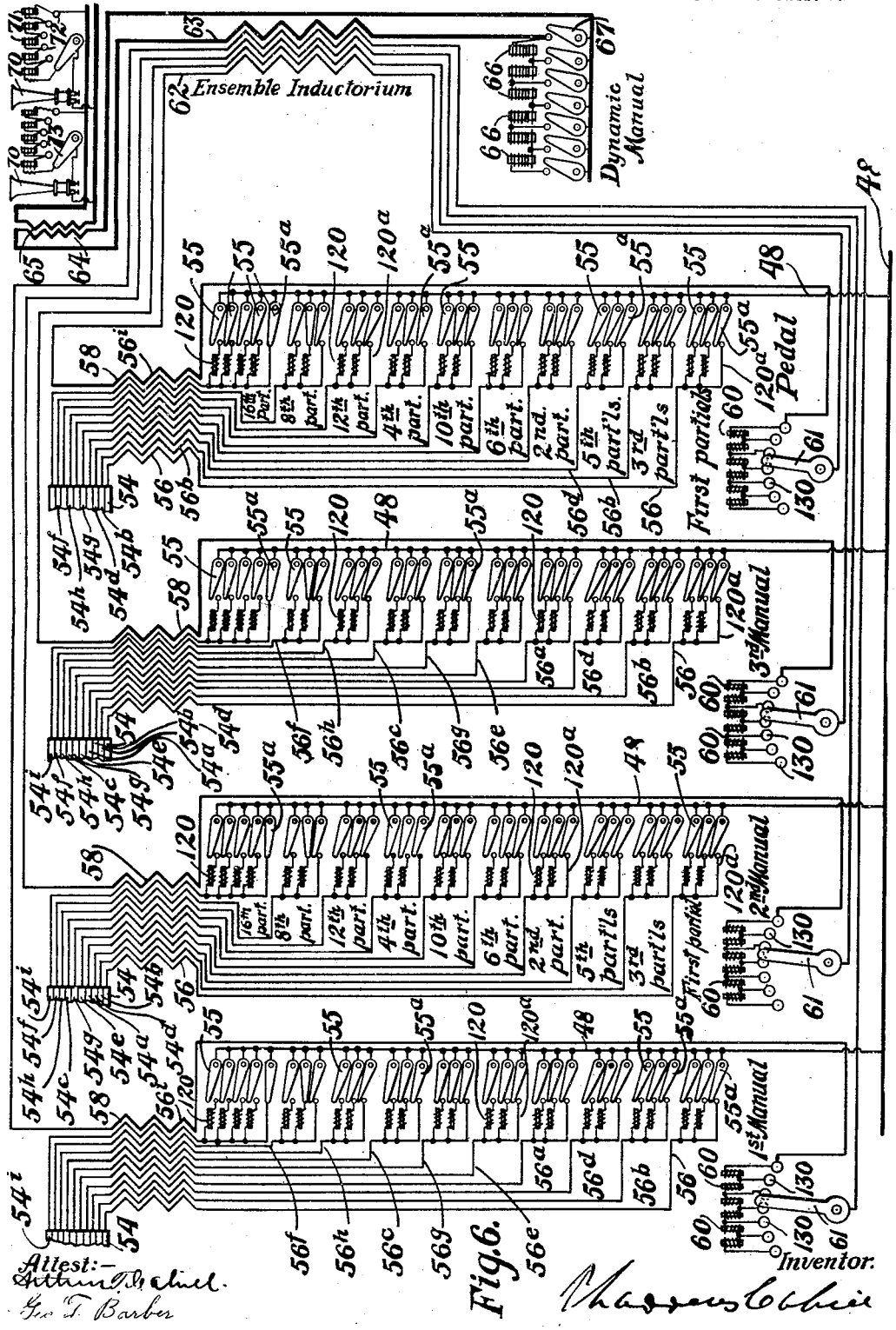

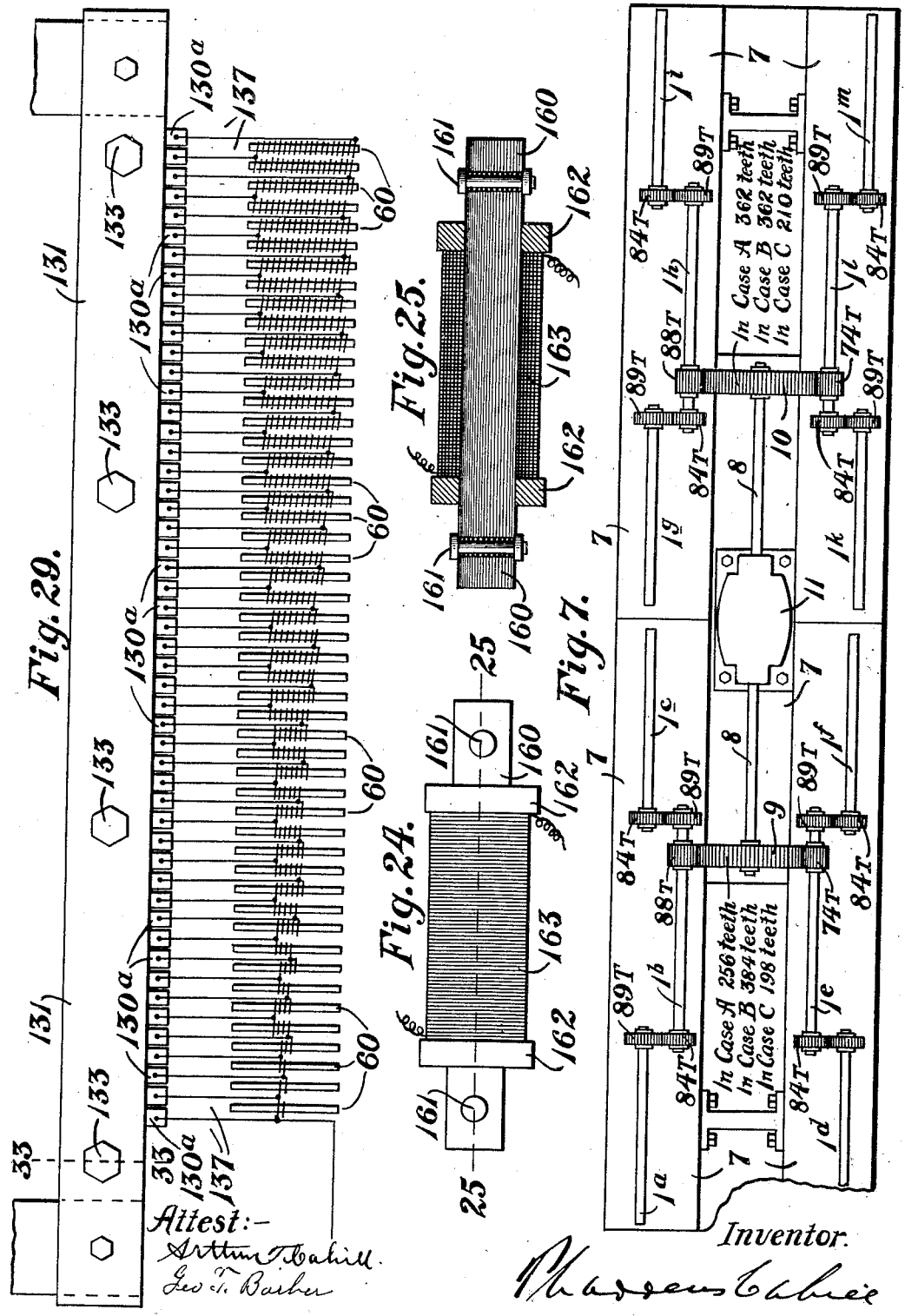

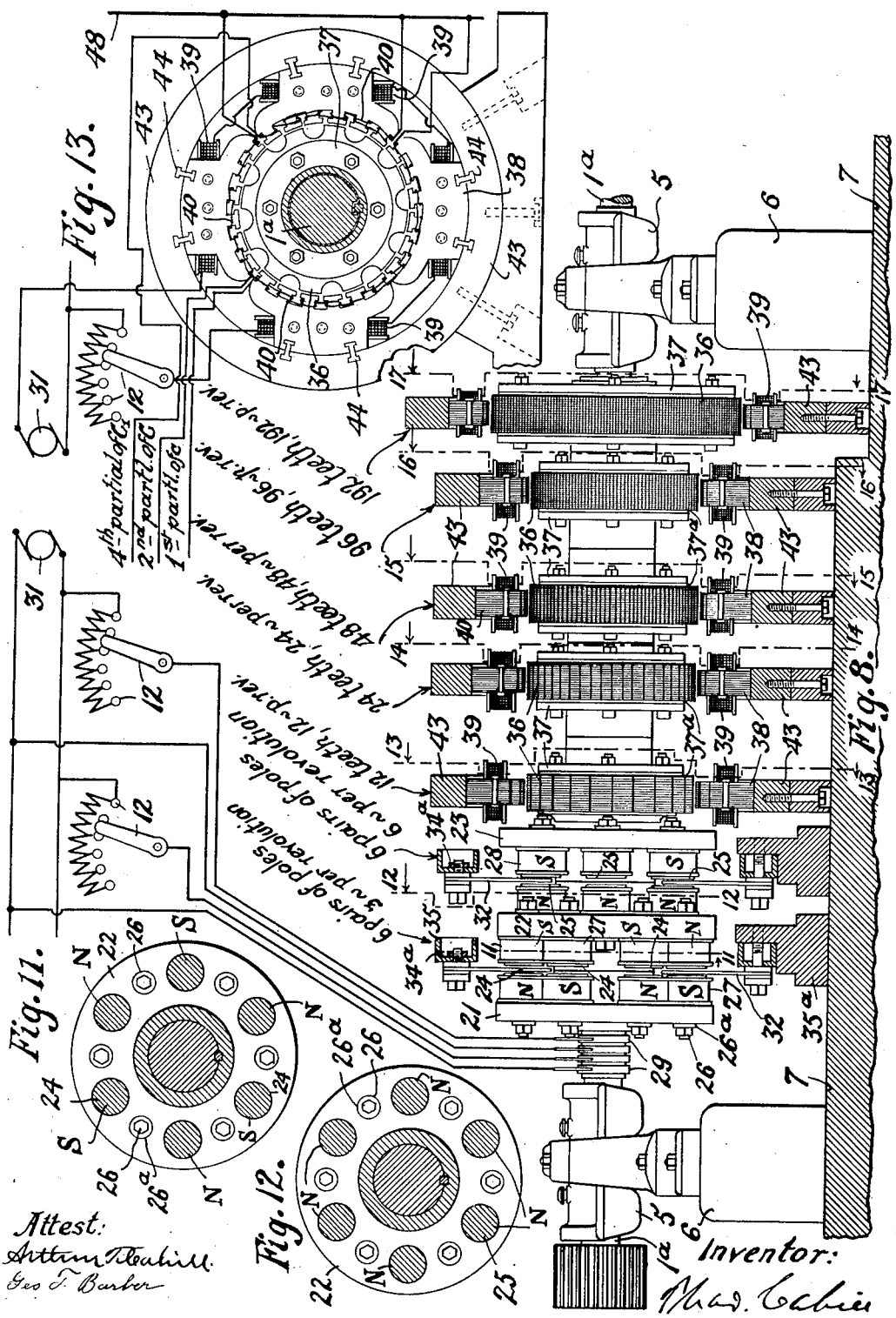

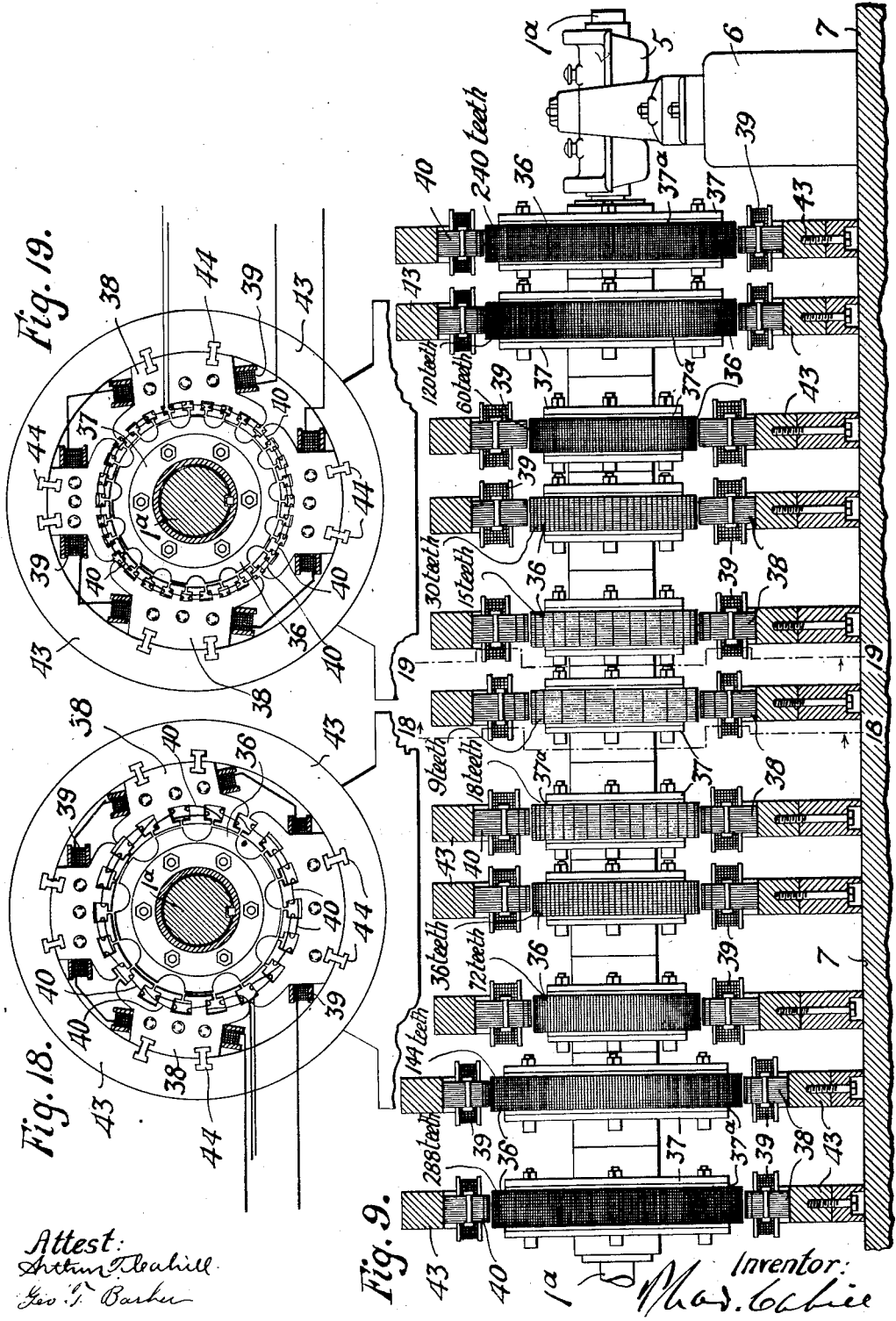

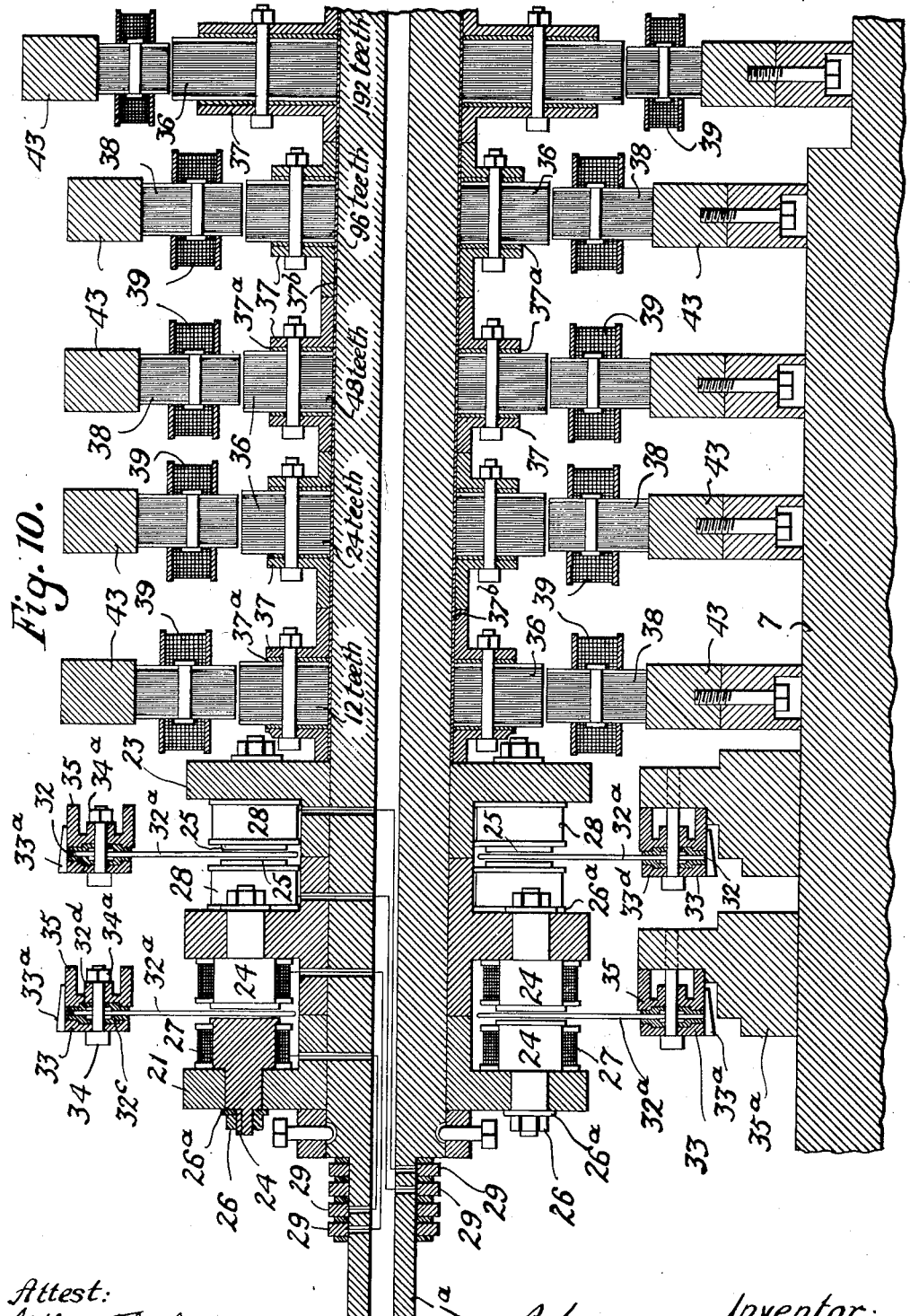

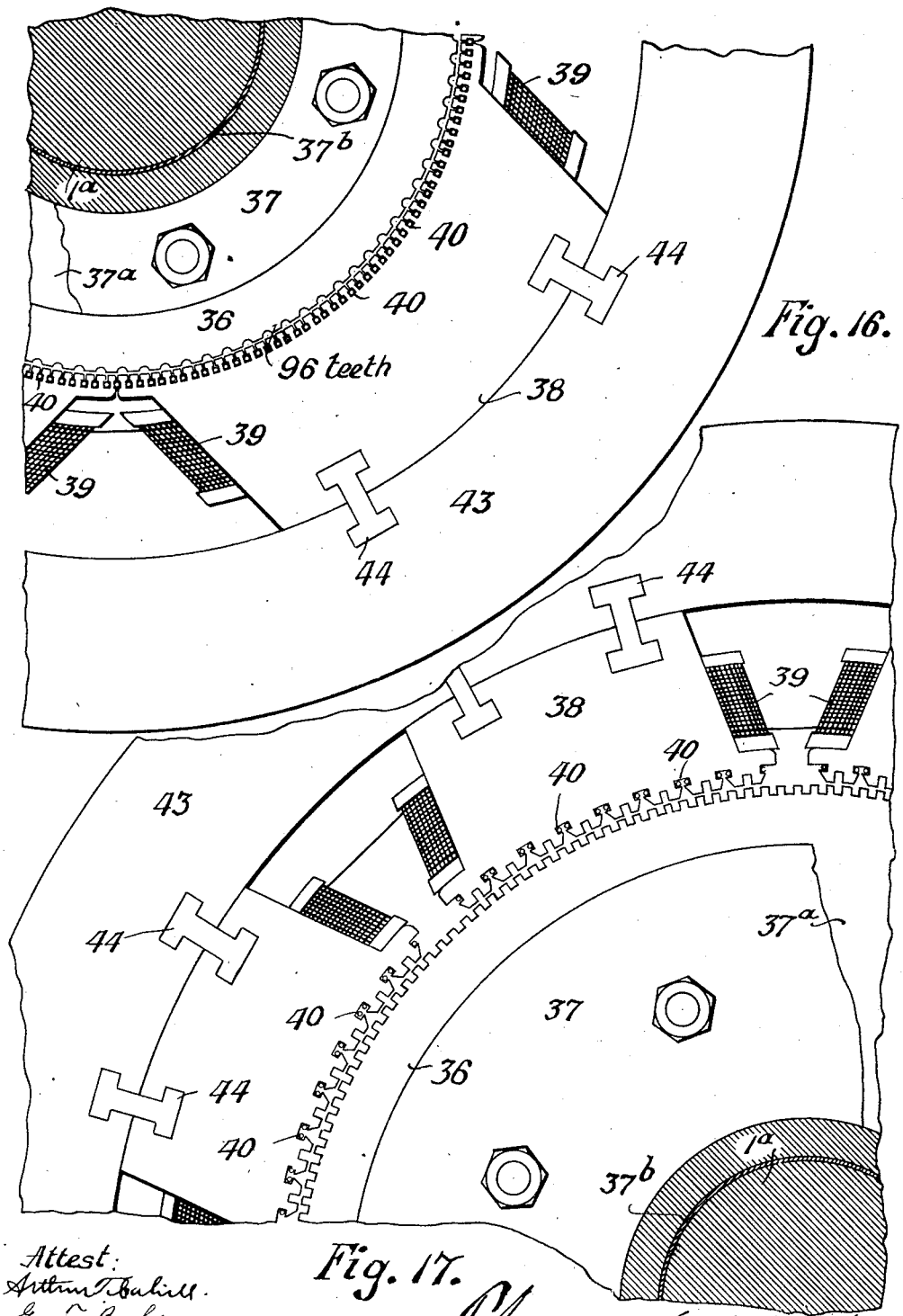

T. CAHILL.
ART OF AND APPARATUS FOR GENERATING AND DISTRIBUTING MUSIC ELECTRICALLY.
APPLICATION FILED JUNE 26, 1915. RENEWED MAY 8, 1918.
1,295,691.
Patented Feb. 25, 1919.
53 SHEETS—SHEET 18.
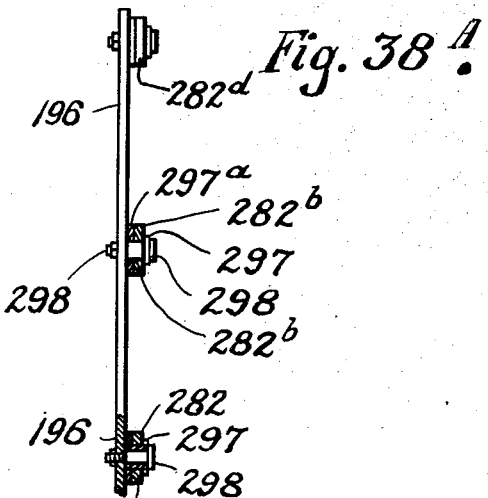
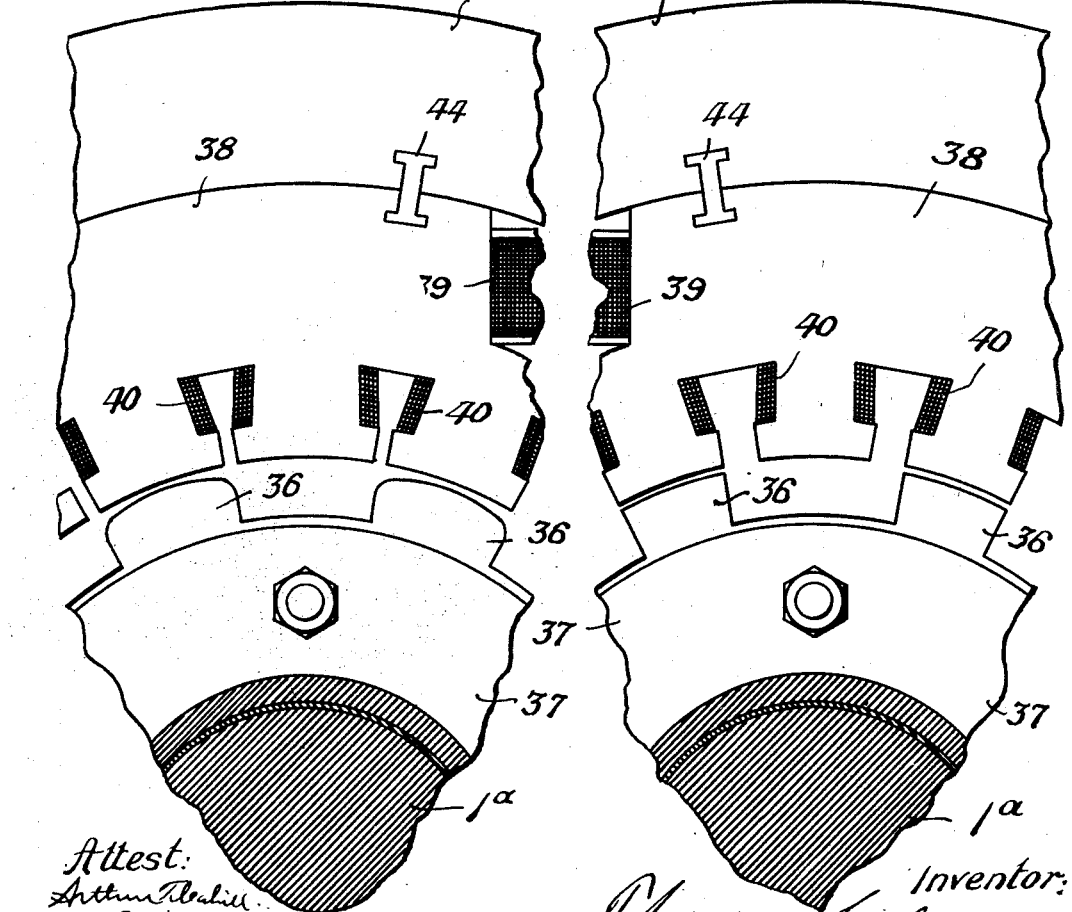

T. CAHILL.
ART OF AND APPARATUS FOR GENERATING AND DISTRIBUTING MUSIC ELECTRICALLY.
APPLICATION FILED JUNE 26, 1915. RENEWED MAY 8, 1918.
1,295,691.
Patented Feb. 25, 1919.
53 SHEETS—SHEET 19.
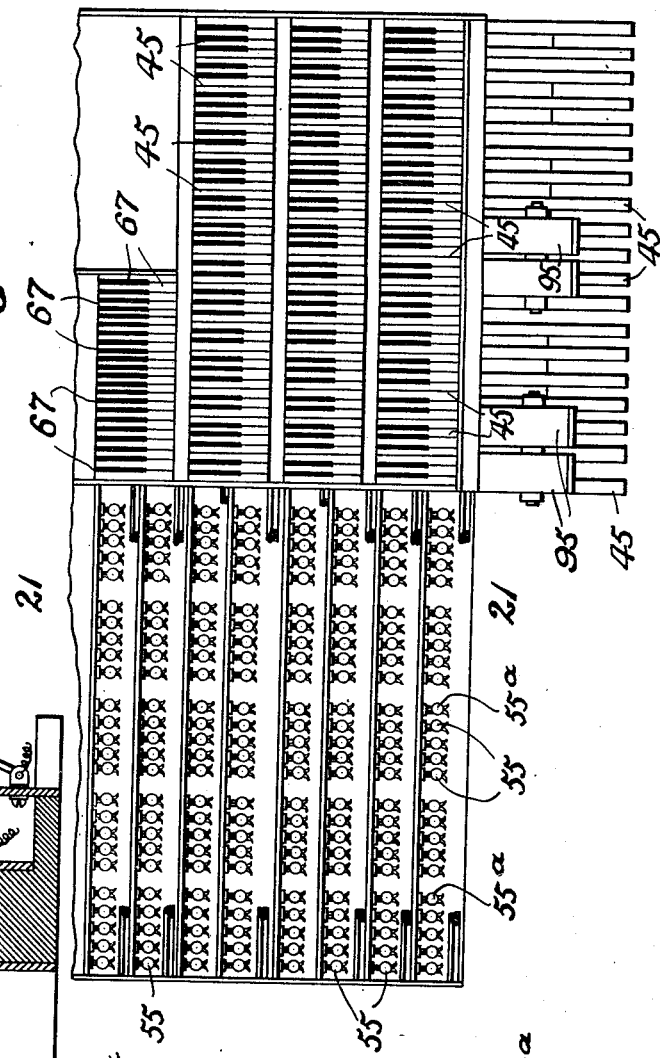
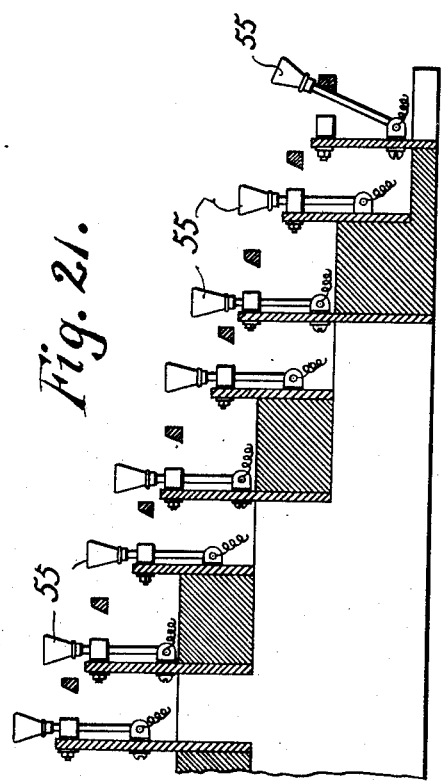
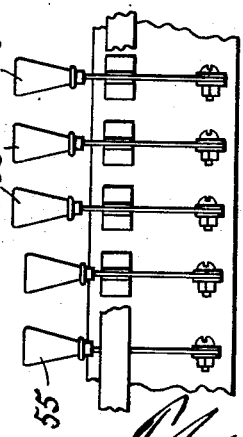
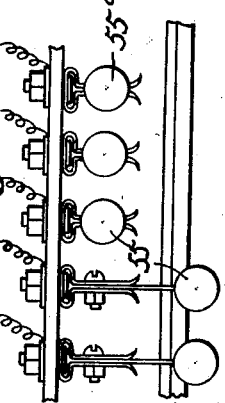

T. CAHILL.
ART OF AND APPARATUS FOR GENERATING AND DISTRIBUTING MUSIC ELECTRICALLY.
APPLICATION FILED JUNE 26, 1915. RENEWED MAY 8, 1918.

1,295,691. Patented Feb. 25, 1919.
53 SHEETS—SHEET 20.

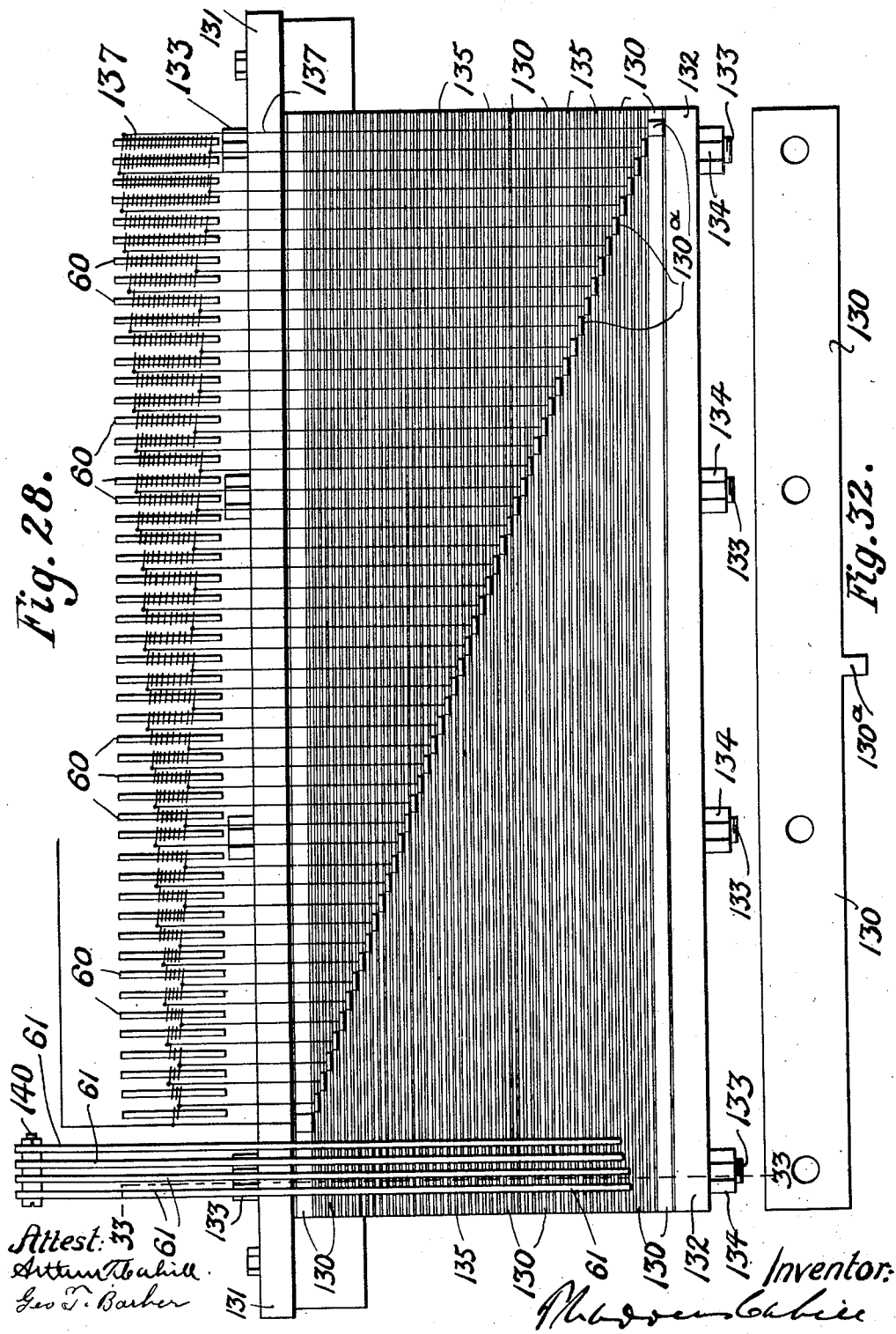

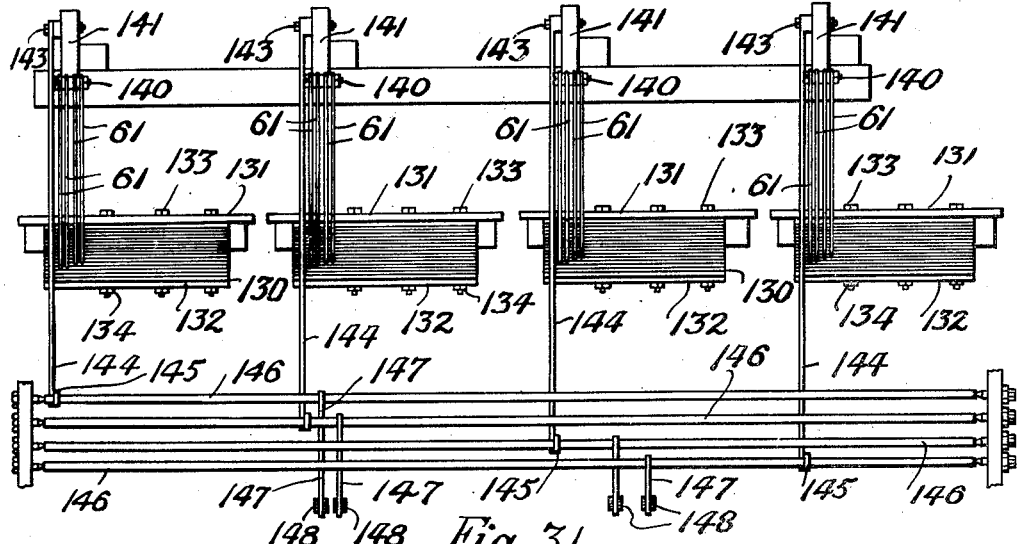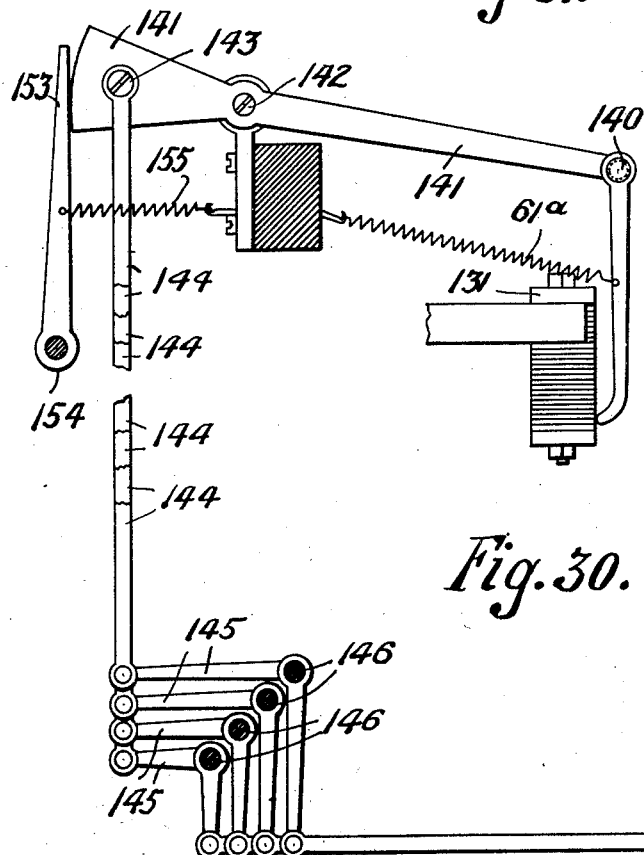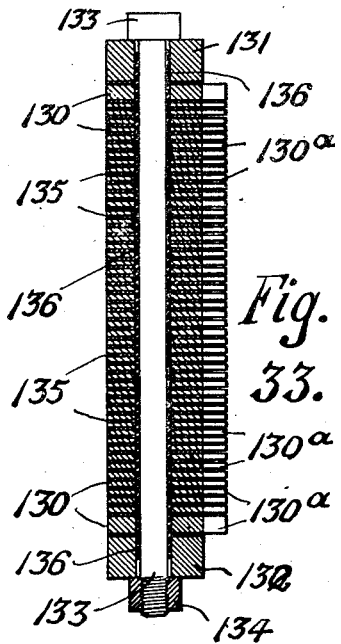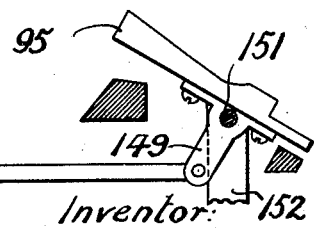

T. CAHILL.
ART OF AND APPARATUS FOR GENERATING AND DISTRIBUTING MUSIC ELECTRICALLY.
APPLICATION FILED JUNE 26, 1915. RENEWED MAY 8, 1918.
1,295,691.
Patented Feb. 25, 1919.
53 SHEETS—SHEET 23.
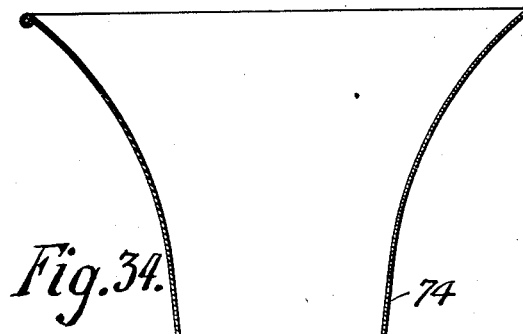
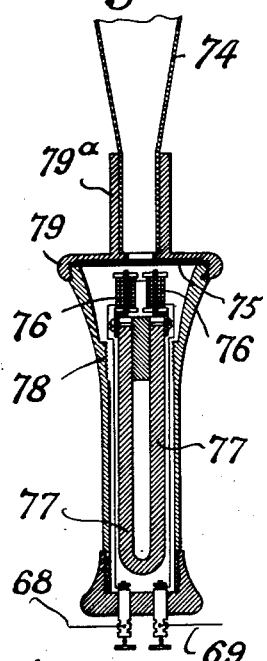
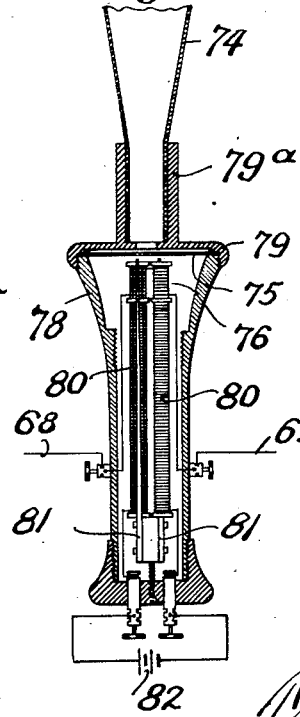
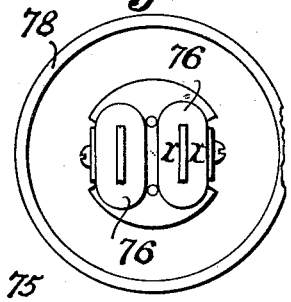

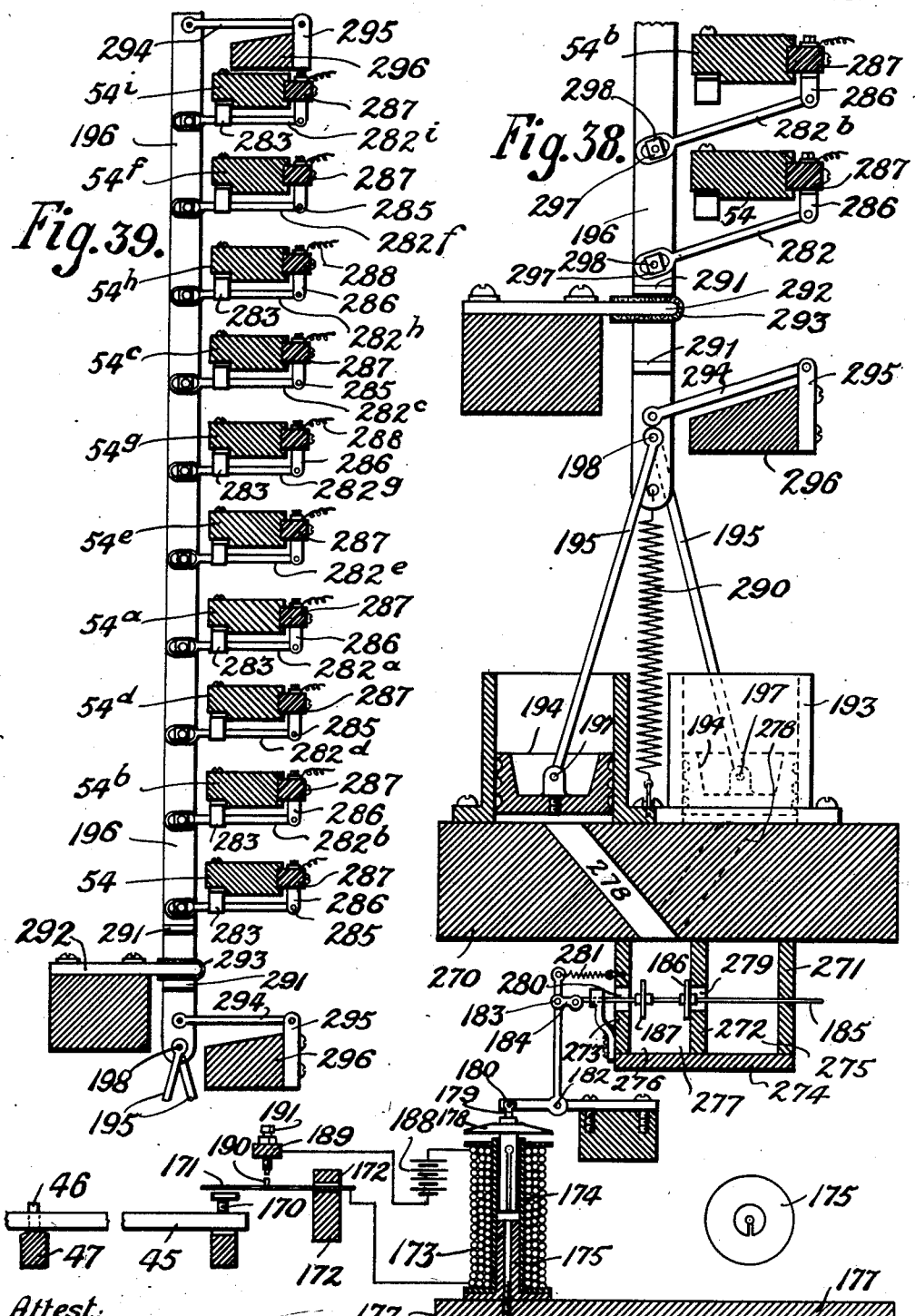

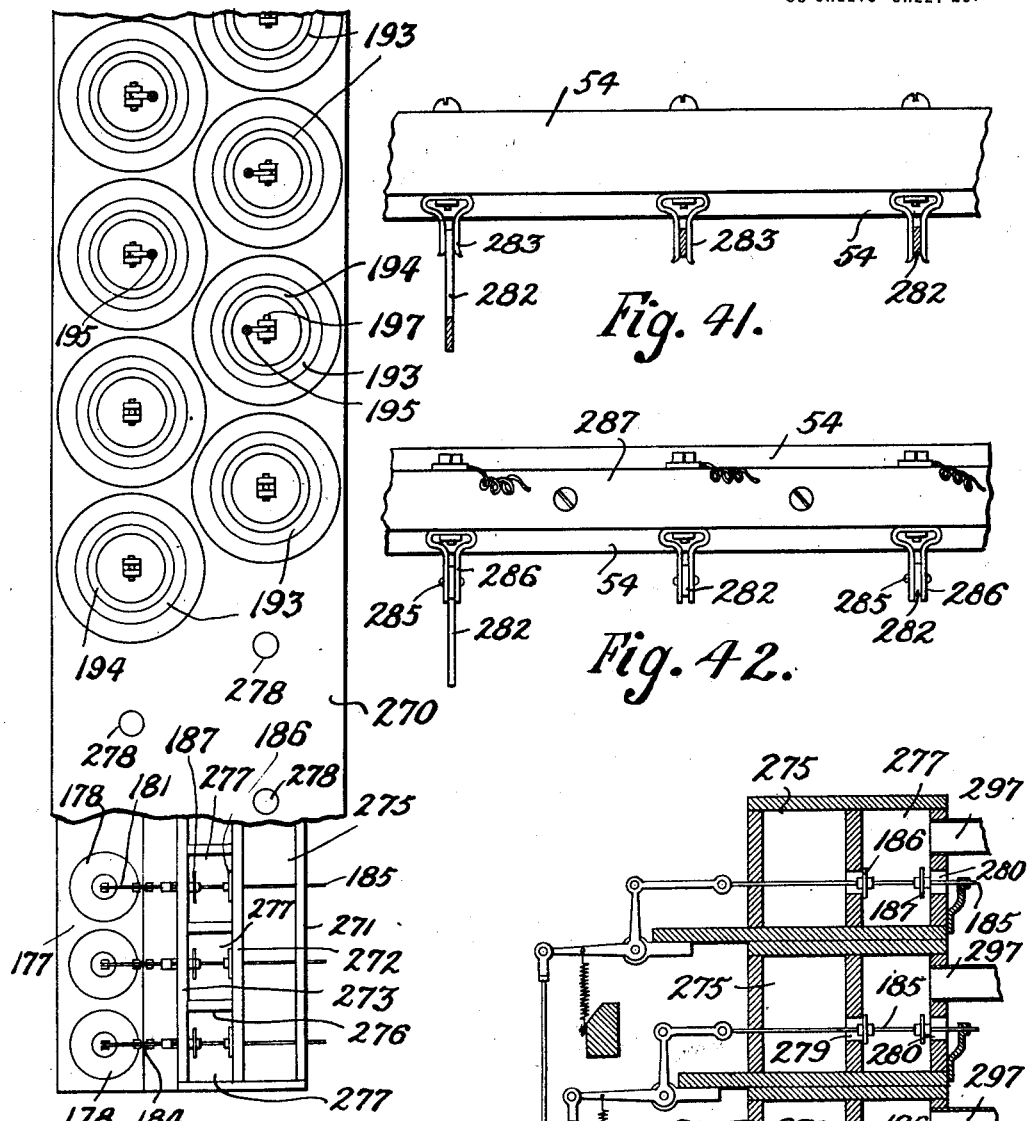

T. CAHILL.
ART OF AND APPARATUS FOR GENERATING AND DISTRIBUTING MUSIC ELECTRICALLY.
APPLICATION FILED JUNE 26, 1915. RENEWED MAY 8, 1918.

1,295,691.

Patented Feb. 25, 1919.
53 SHEETS—SHEET 26.

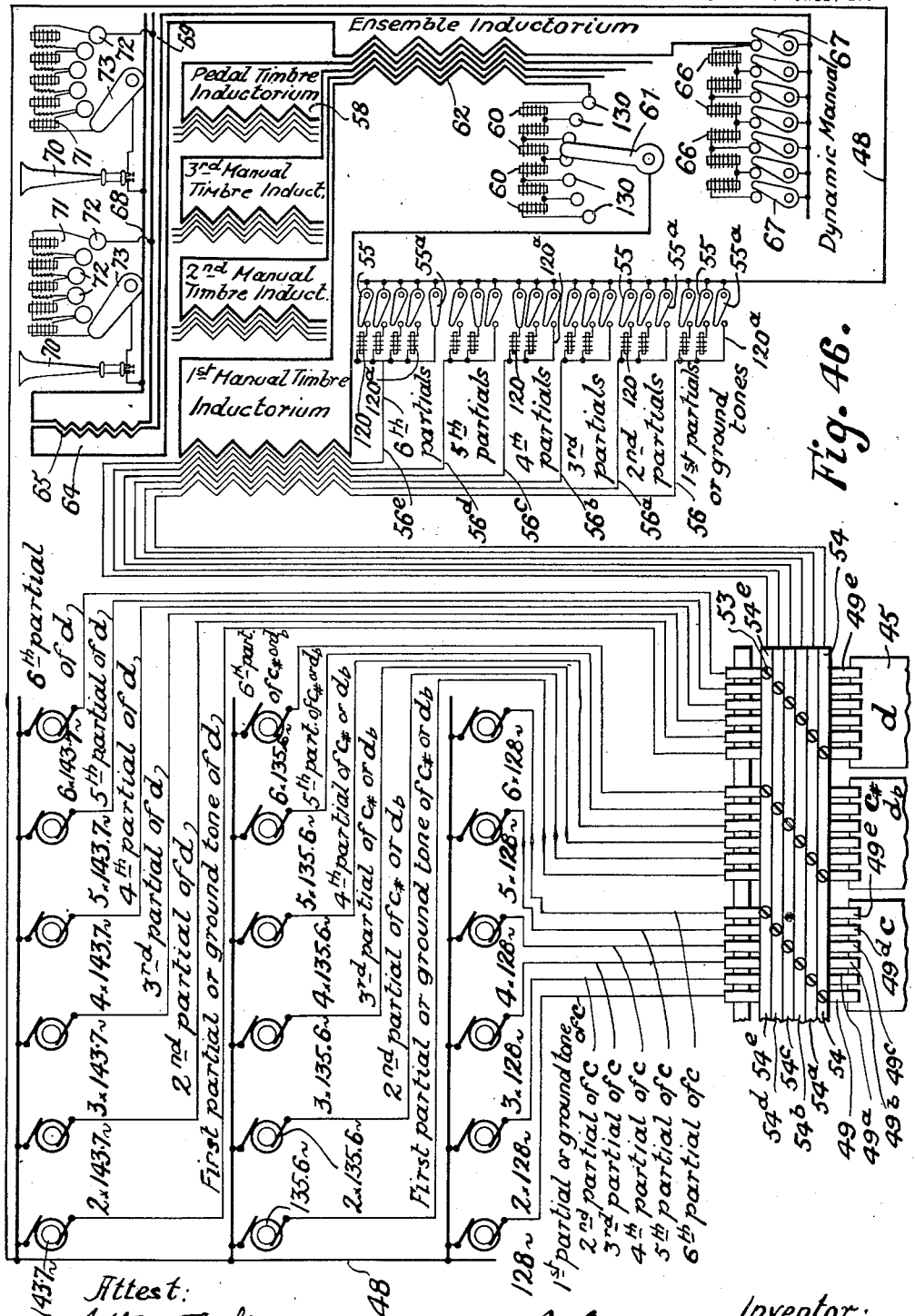

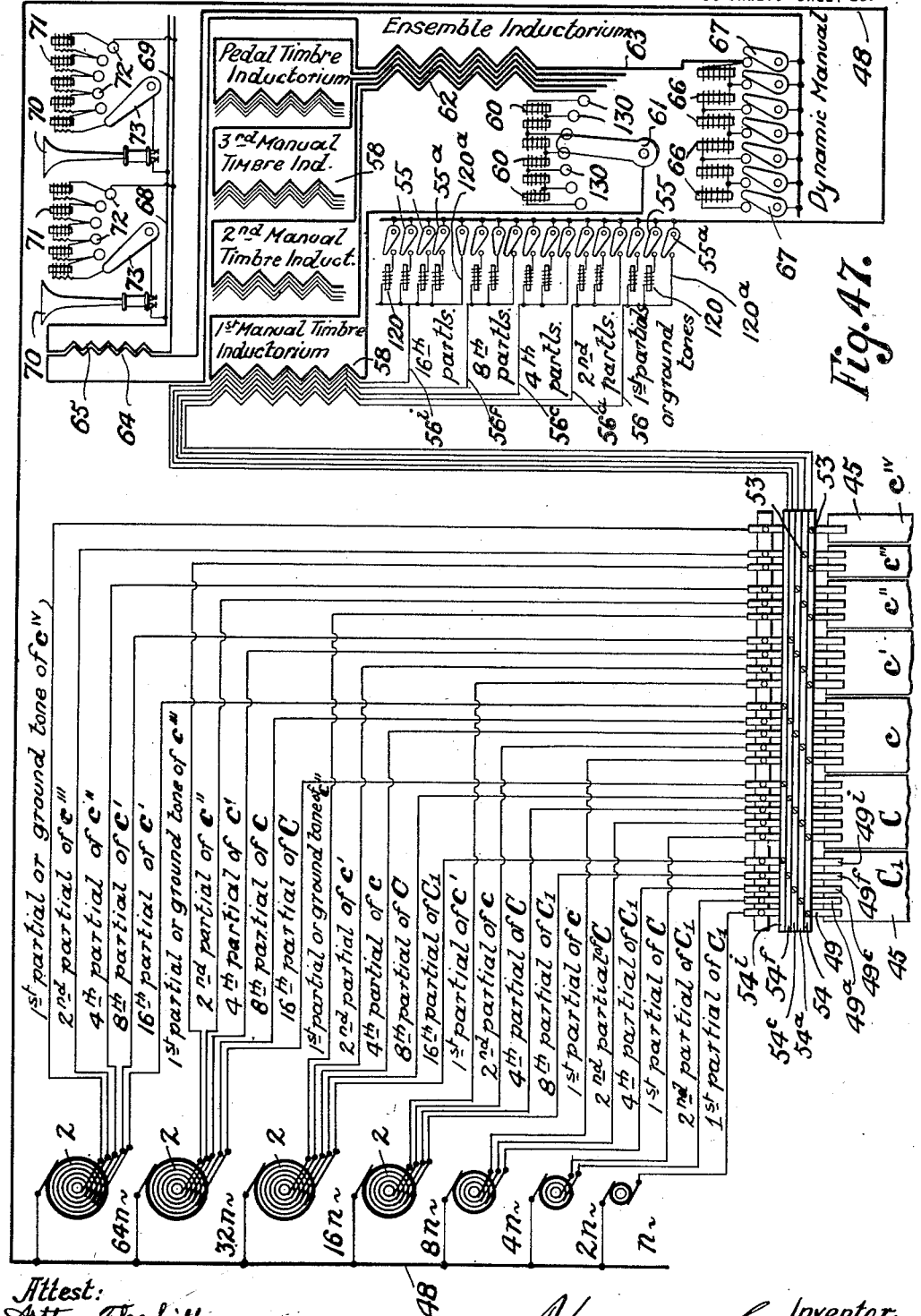

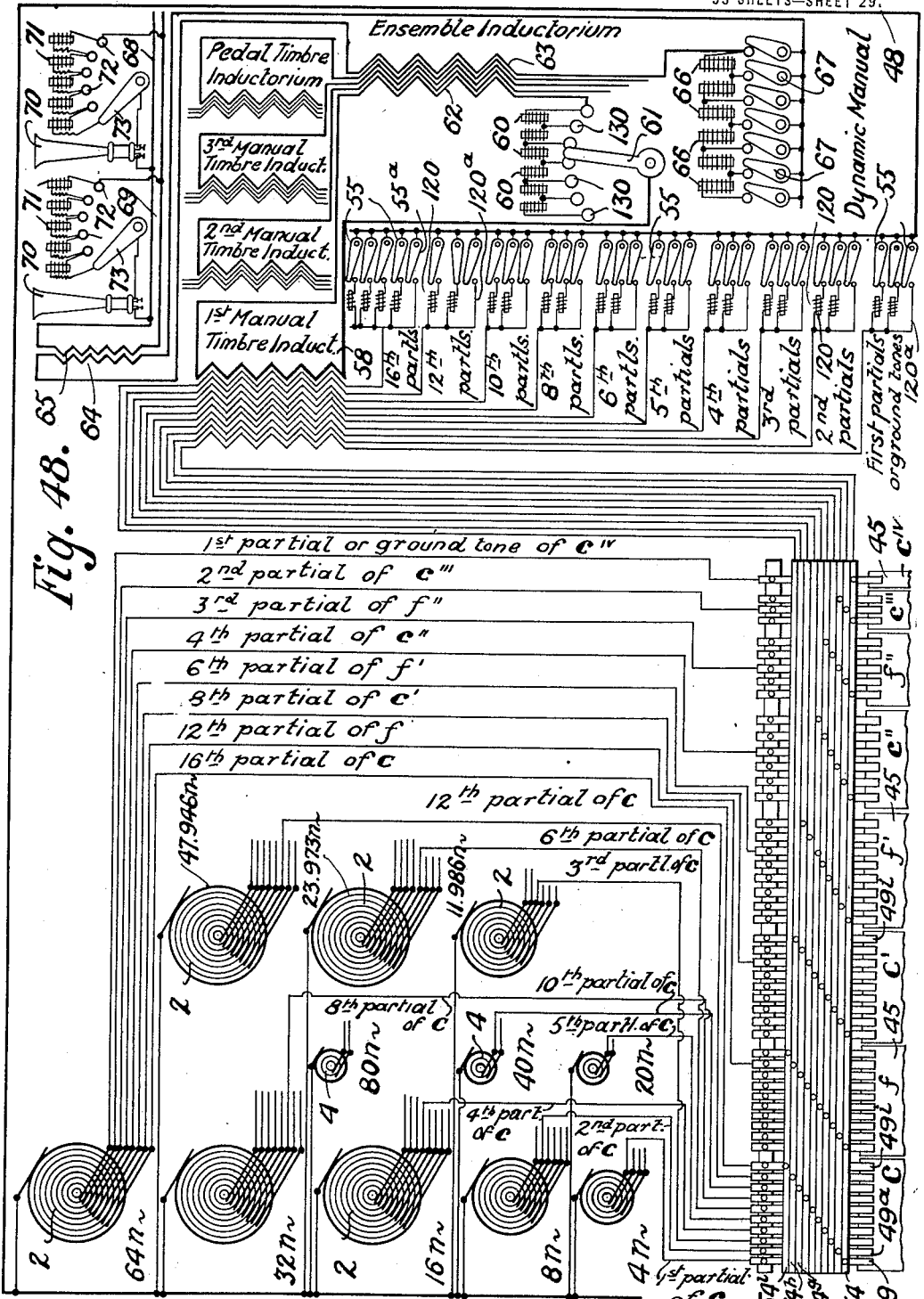

T. CAHILL.
ART OF AND APPARATUS FOR GENERATING AND DISTRIBUTING MUSIC ELECTRICALLY.
APPLICATION FILED JUNE 26, 1915. RENEWED MAY 8, 1918.

1,295,691.

Patented Feb. 25, 1919.
53 SHEETS—SHEET 30.

Fig. 49.

T. CAHILL.
ART OF AND APPARATUS FOR GENERATING AND DISTRIBUTING MUSIC ELECTRICALLY.
APPLICATION FILED JUNE 26, 1915. RENEWED MAY 8, 1918.
1,295,691.
Patented Feb. 25, 1919.
53 SHEETS—SHEET 32.
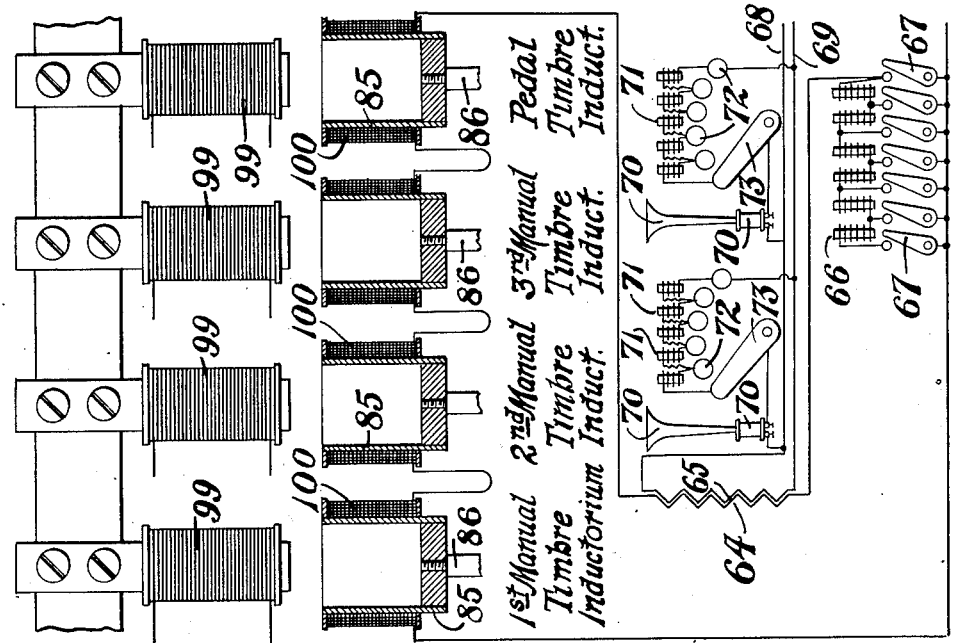
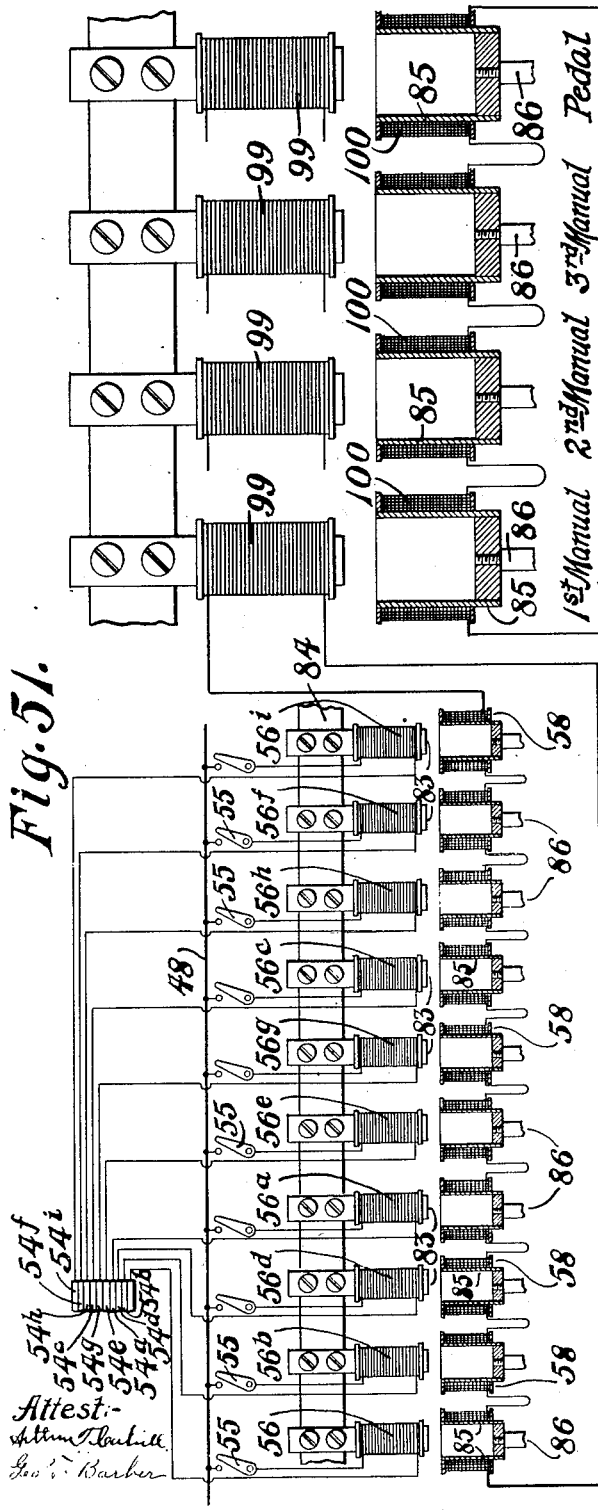
Fig. 51.
Attest:-
Arthur T. Cahill
Geo. T. Barber
Inventor,
Thaddeus Cahill T. CAHILL.
ART OF AND APPARATUS FOR GENERATING AND DISTRIBUTING MUSIC ELECTRICALLY.
APPLICATION FILED JUNE 26, 1915. RENEWED MAY 8, 1918.

1,295,691.

Patented Feb. 25, 1919.
53 SHEETS—SHEET 33.

Attest,
Arthur T. Cahill
Geo. F. Barber

Inventor.
Thaddeus Cahill

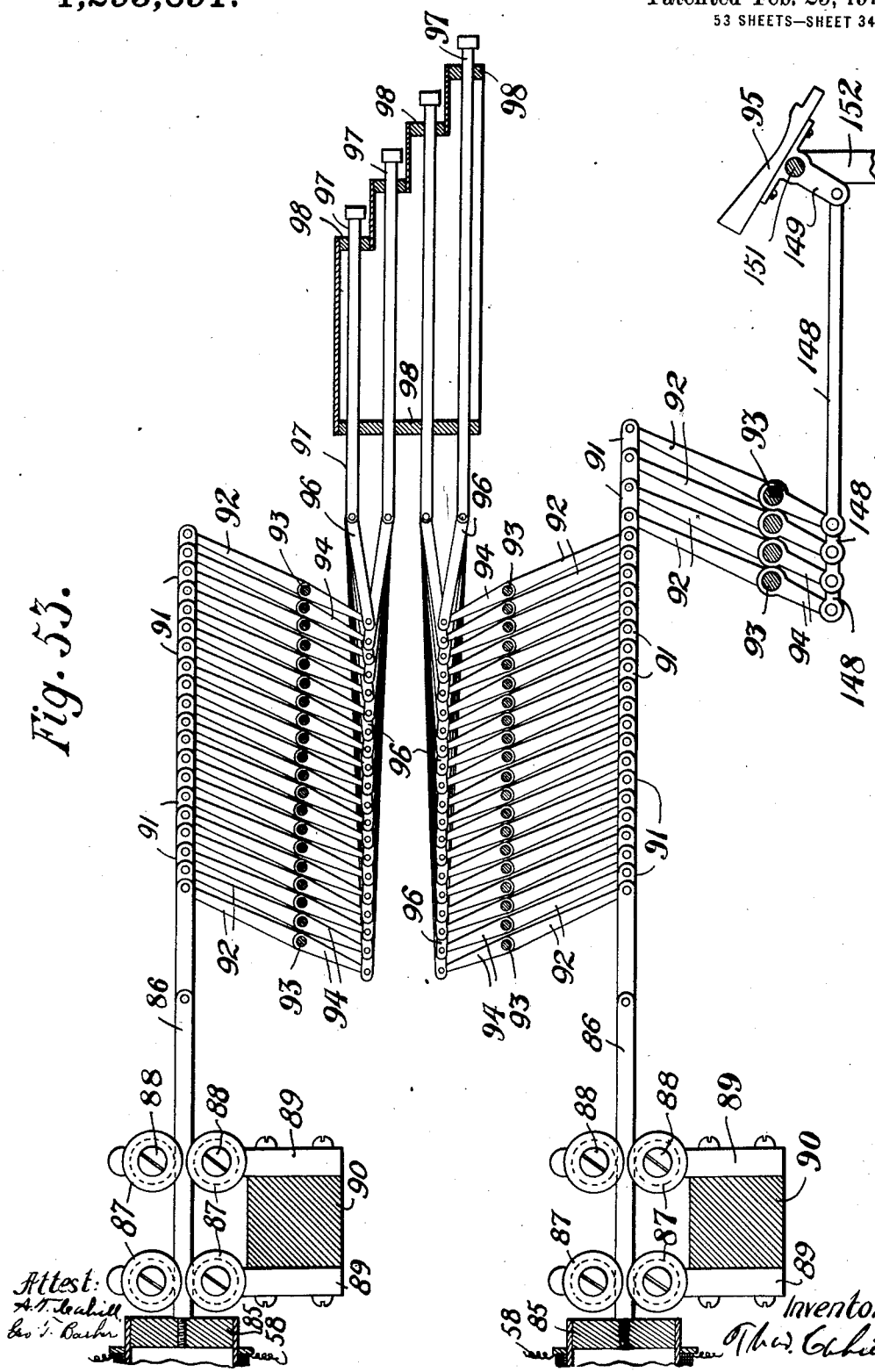

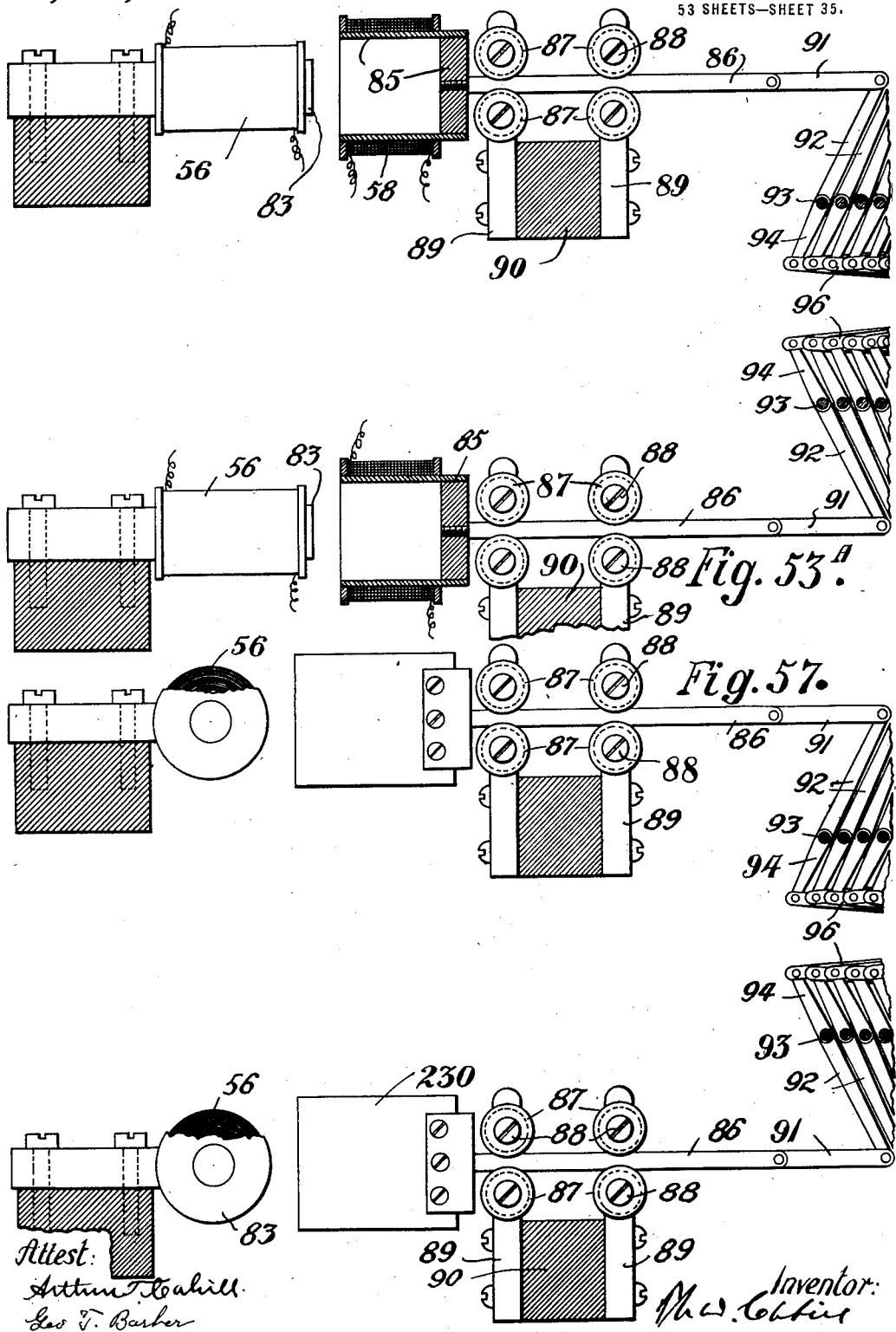

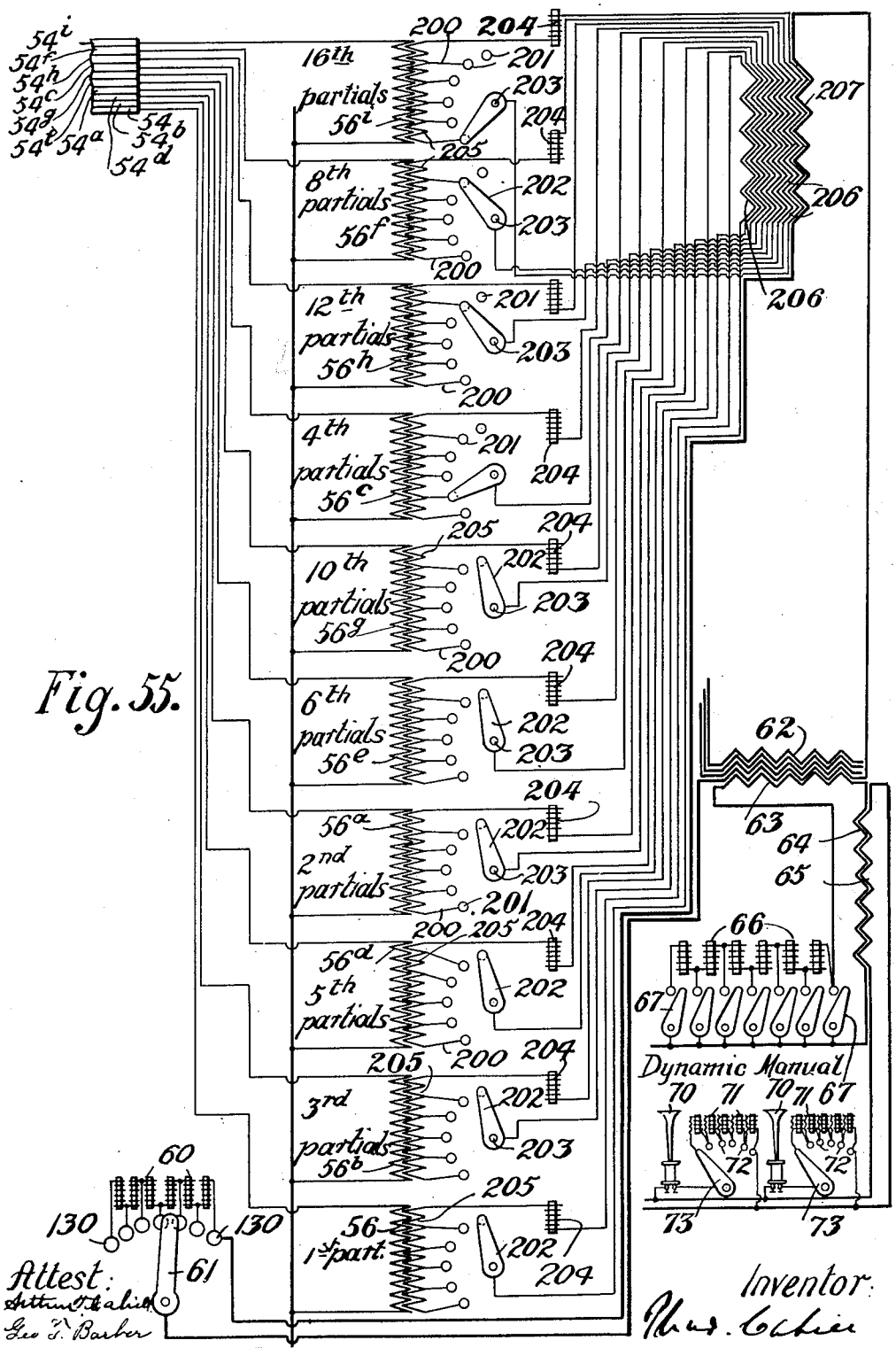

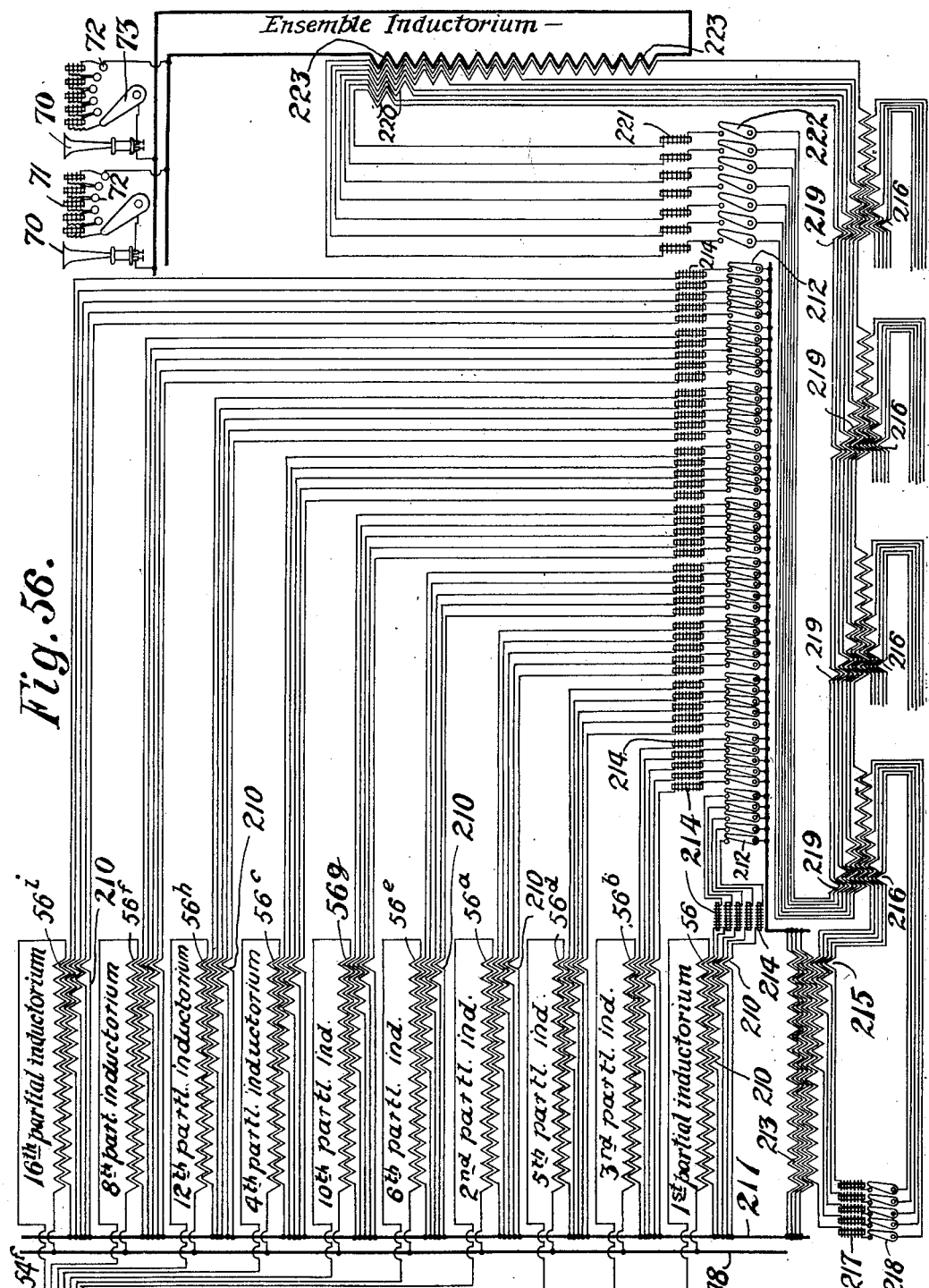

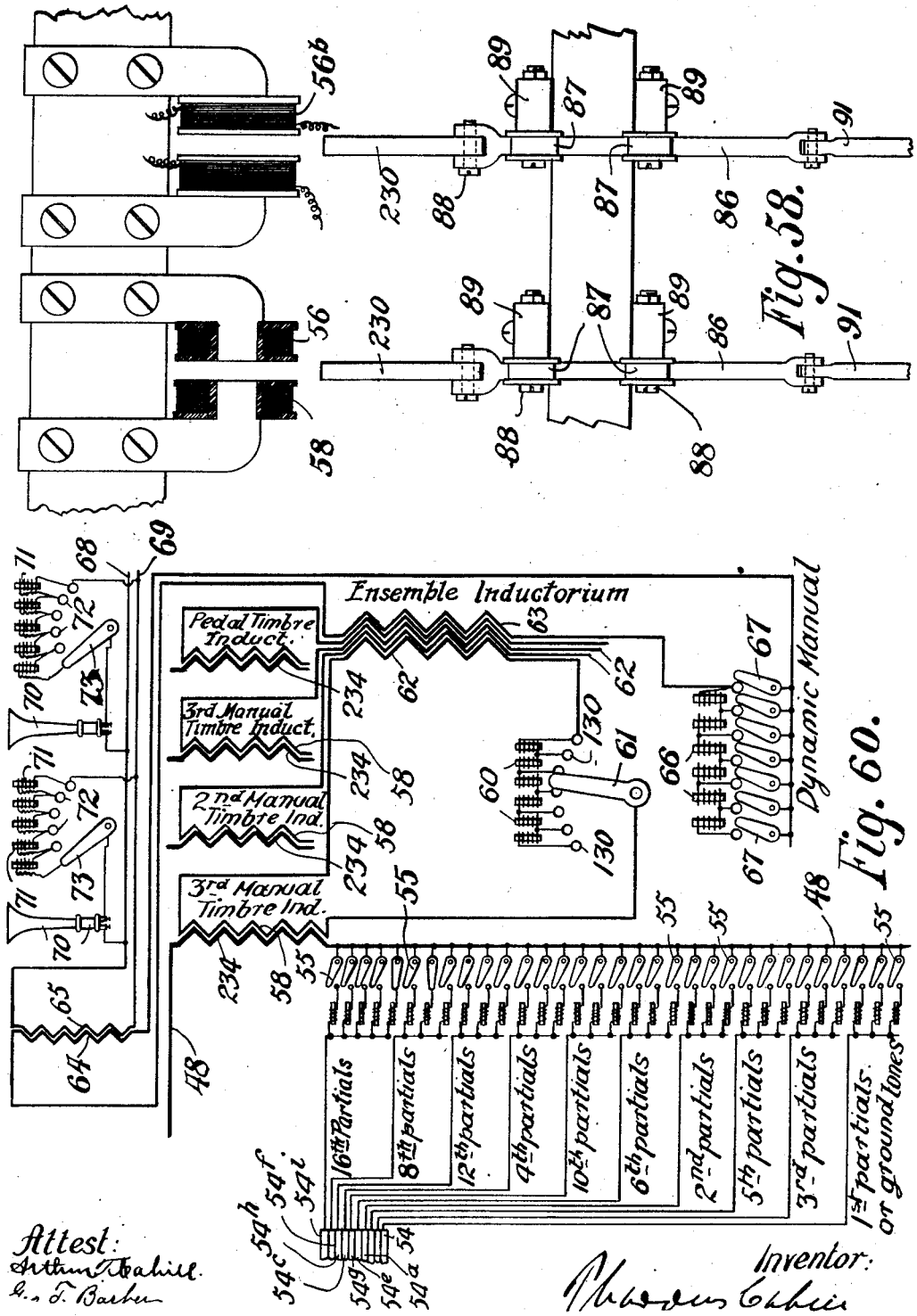

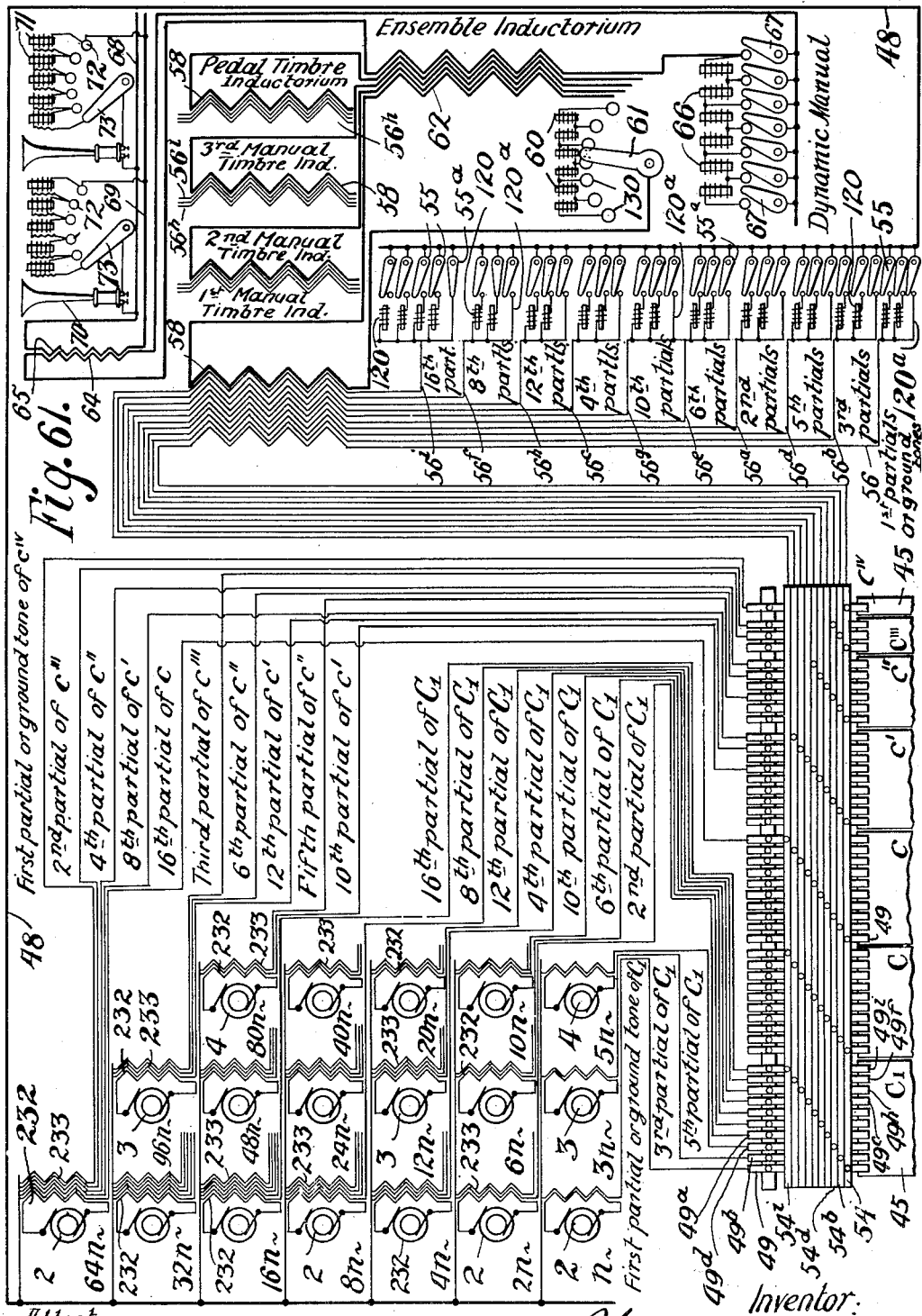

T. CAHILL.
ART OF AND APPARATUS FOR GENERATING AND DISTRIBUTING MUSIC ELECTRICALLY.
APPLICATION FILED JUNE 26, 1915. RENEWED MAY 8, 1918.

1,295,691. Patented Feb. 25, 1919.
53 SHEETS—SHEET 41.

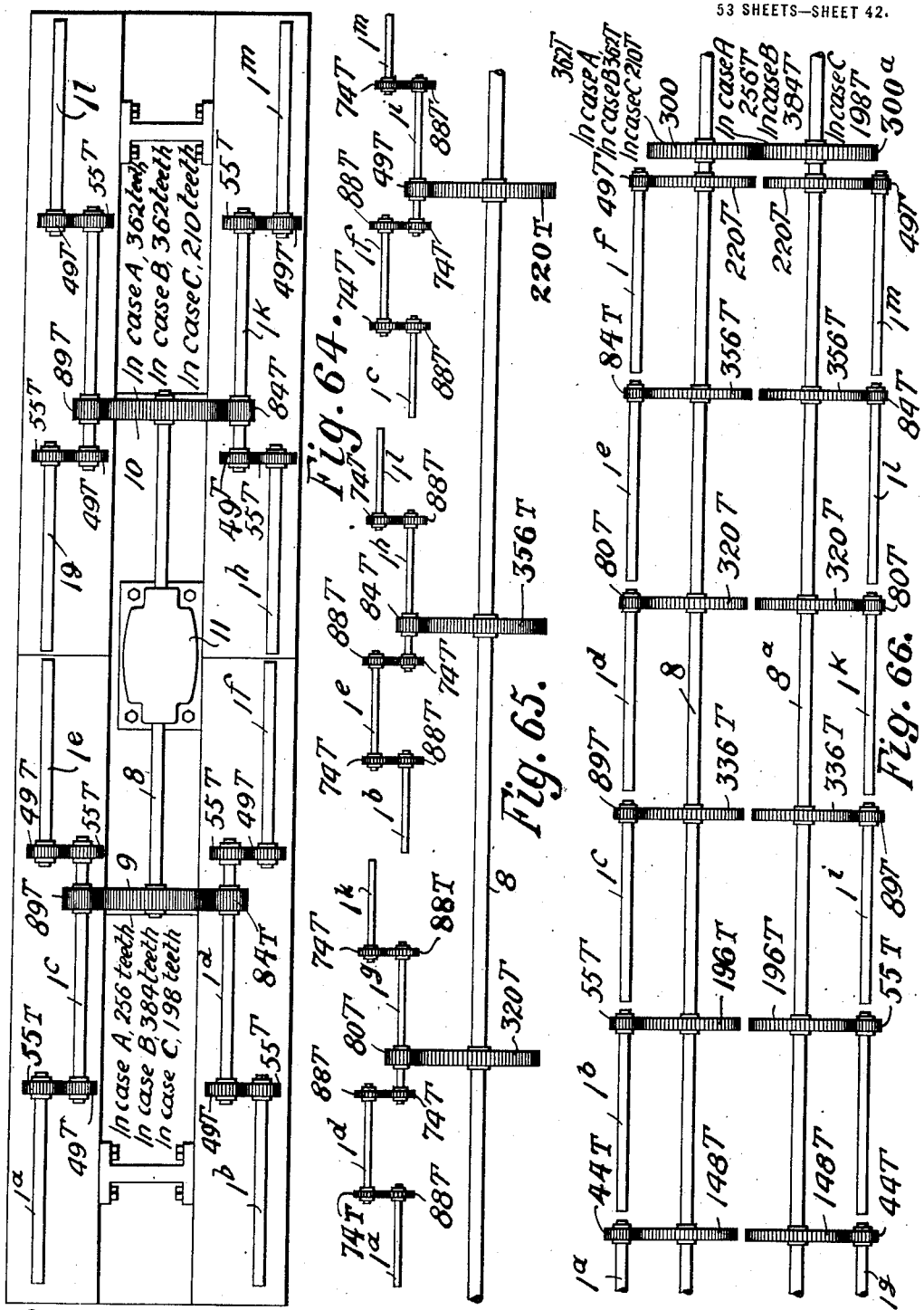

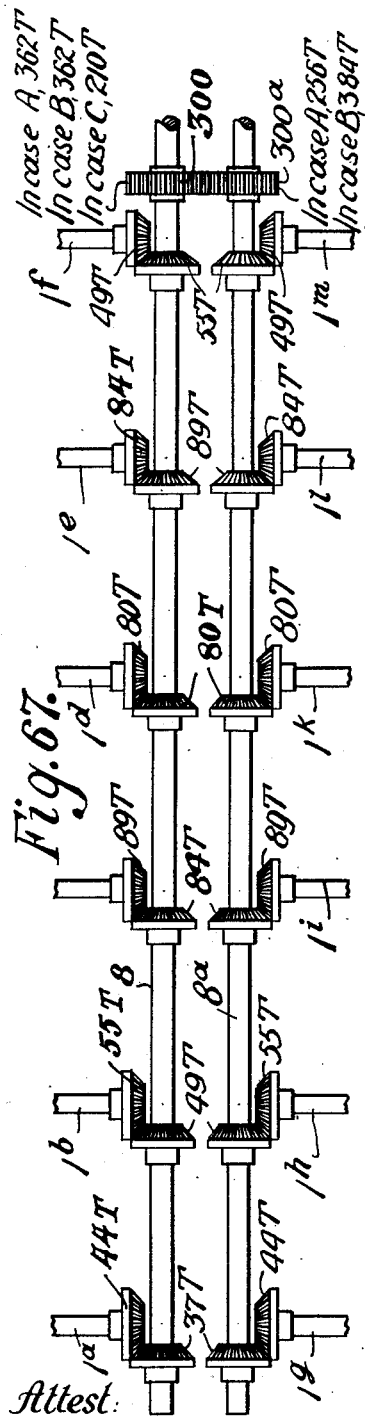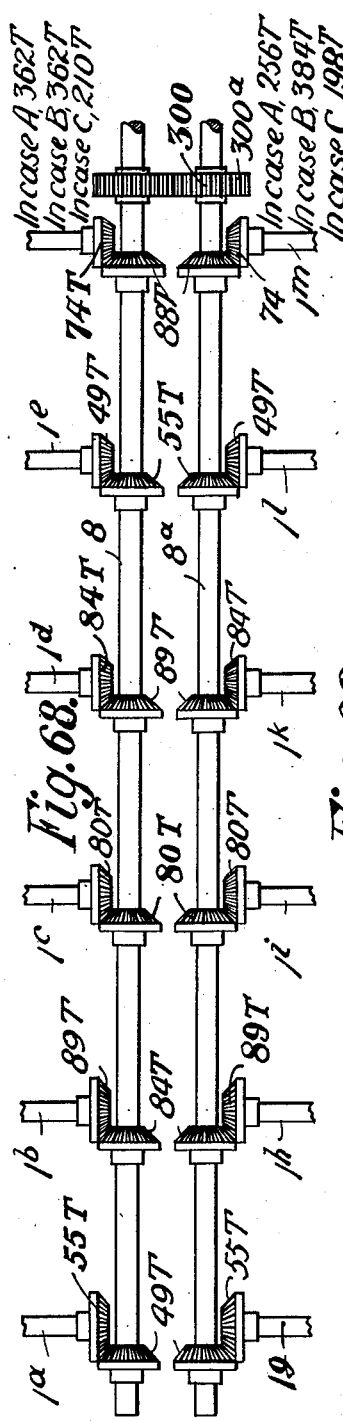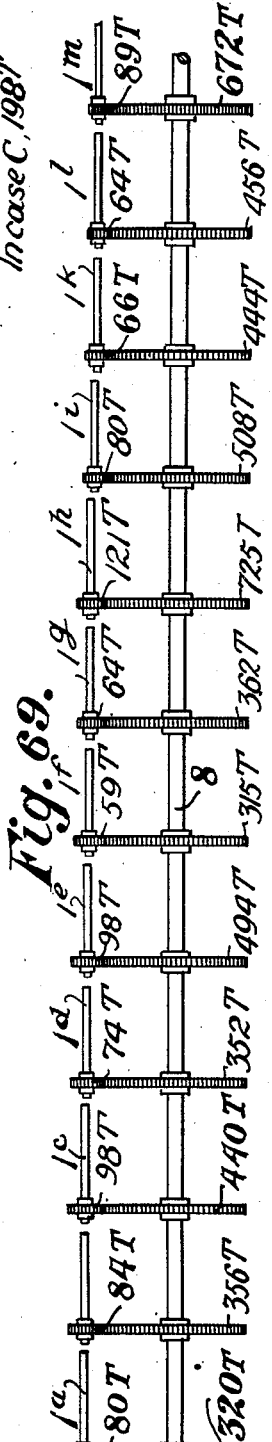

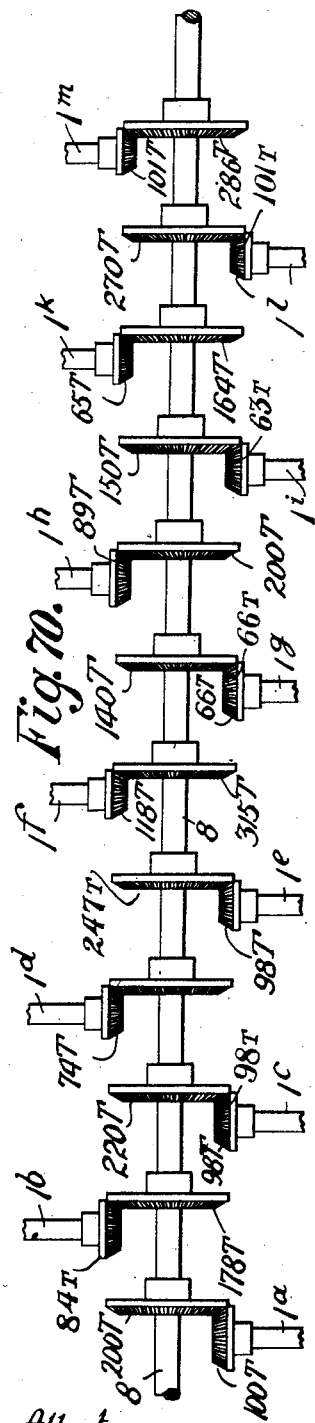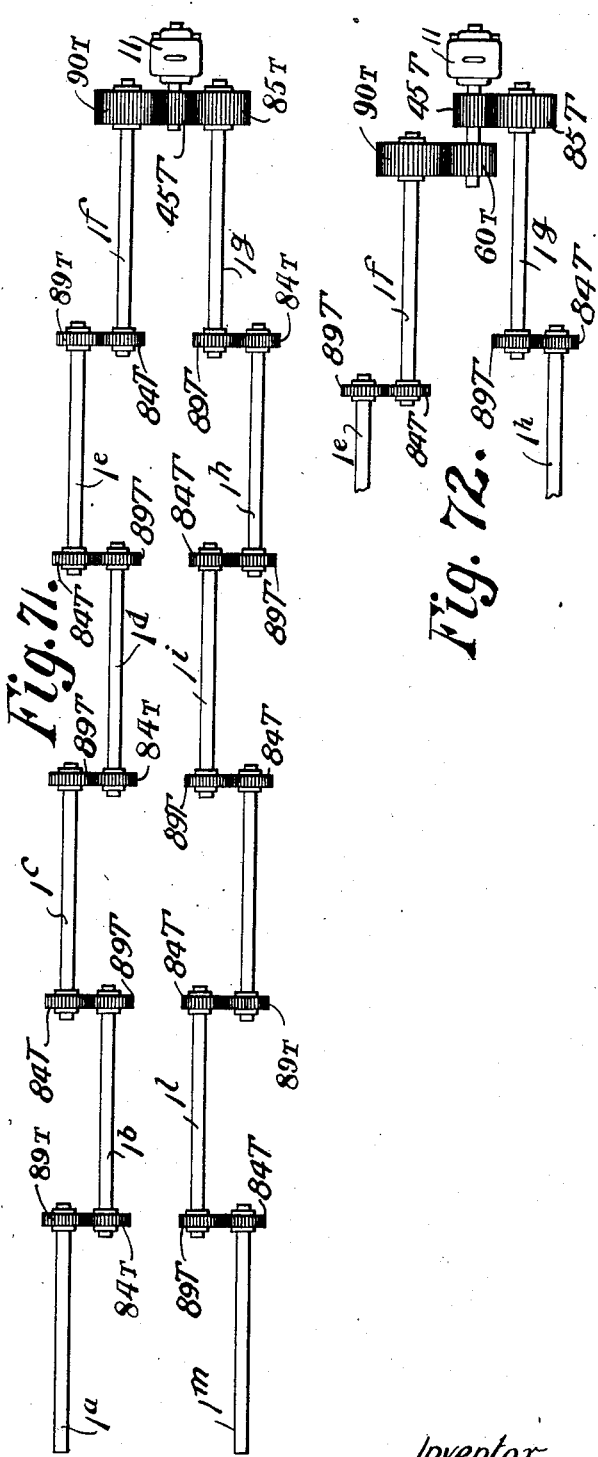

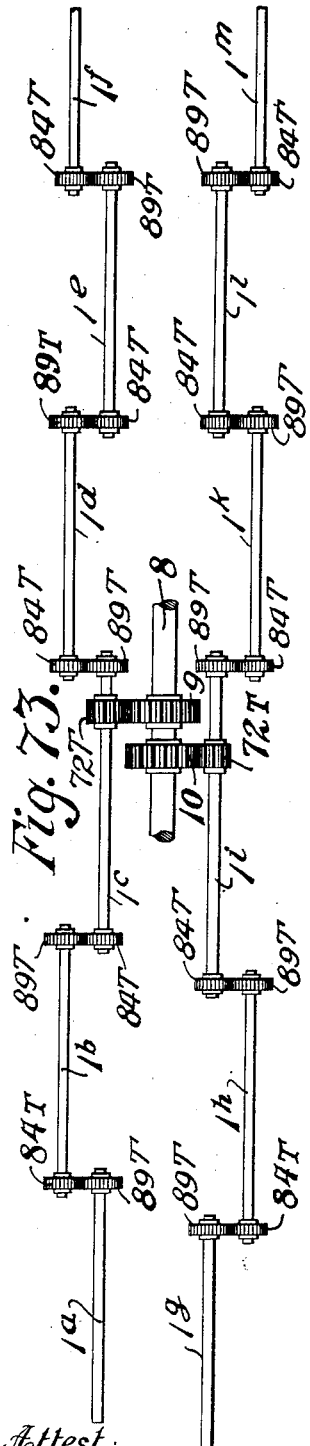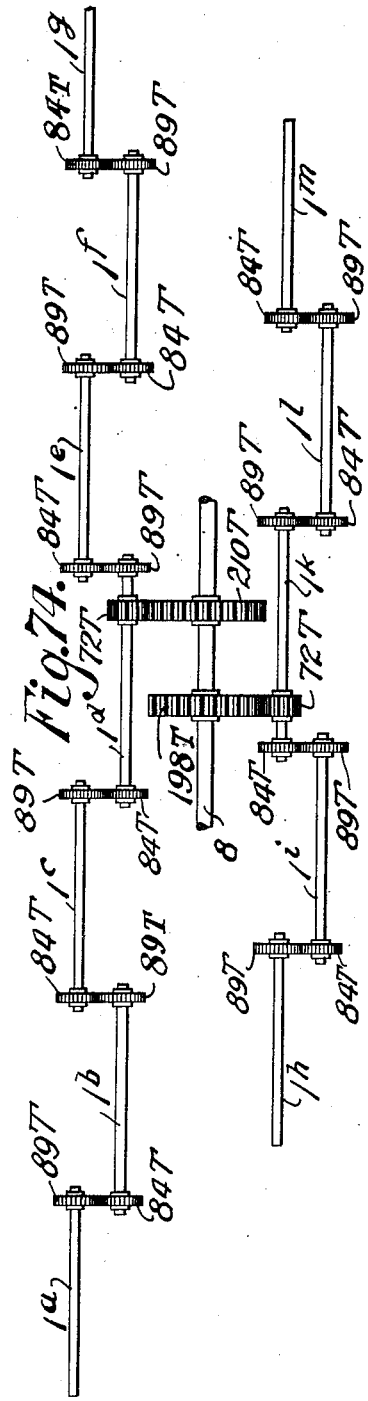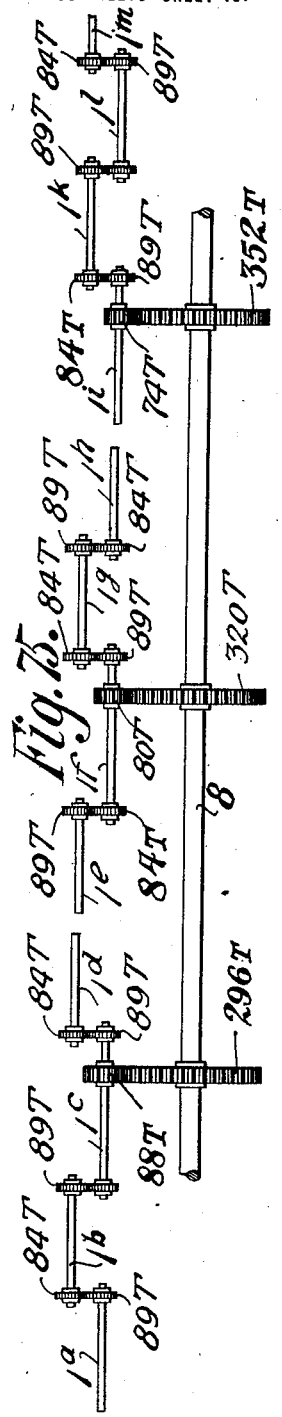

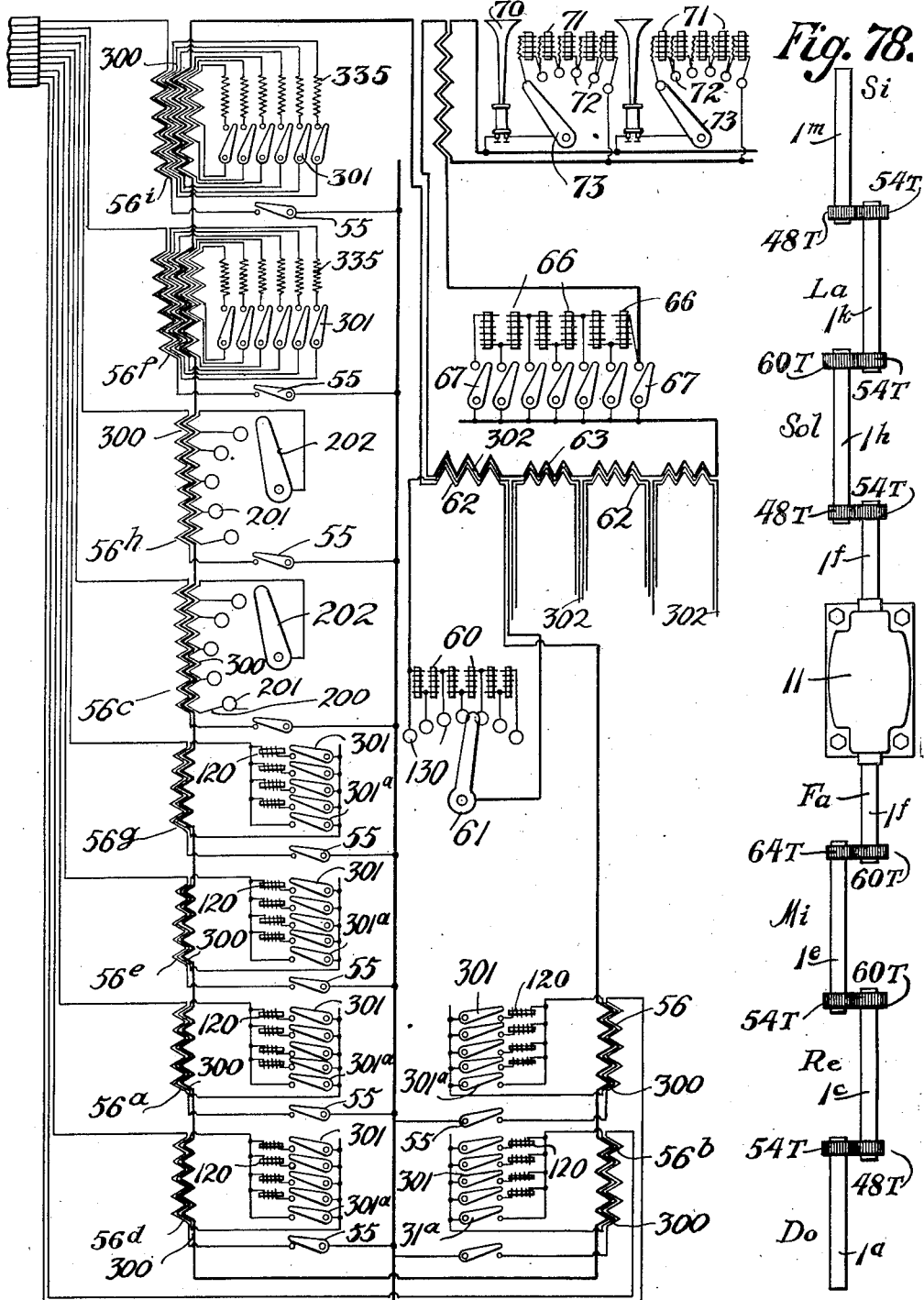

T. CAHILL.
ART OF AND APPARATUS FOR GENERATING AND DISTRIBUTING MUSIC ELECTRICALLY.
APPLICATION FILED JUNE 26, 1915. RENEWED MAY 8, 1918.
1,295,691.
Patented Feb. 25, 1919.
53 SHEETS—SHEET 48.
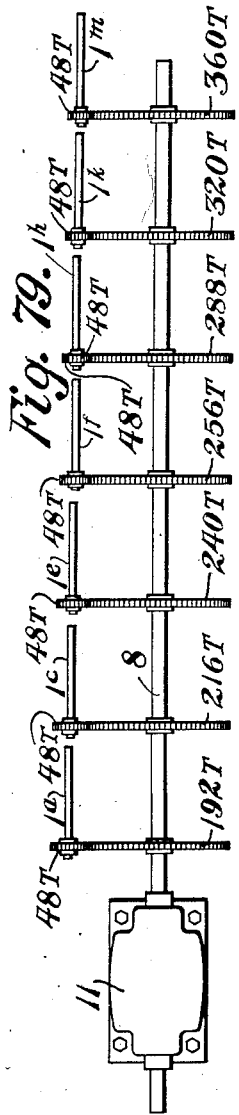

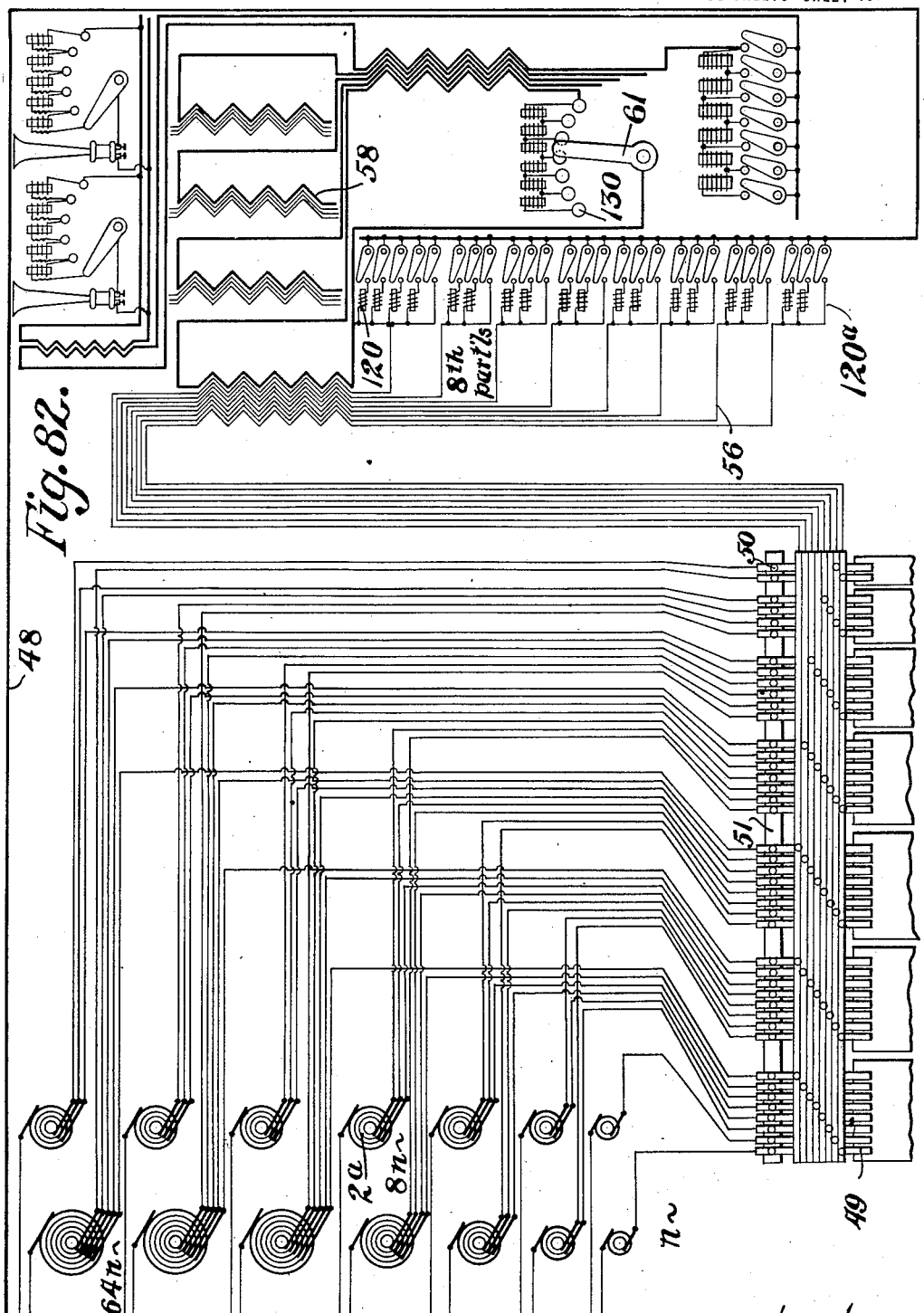

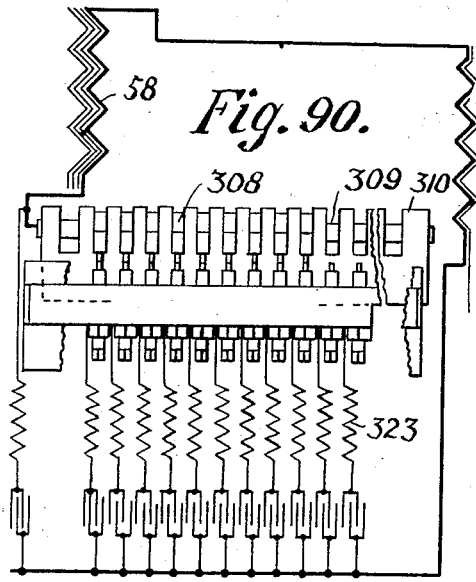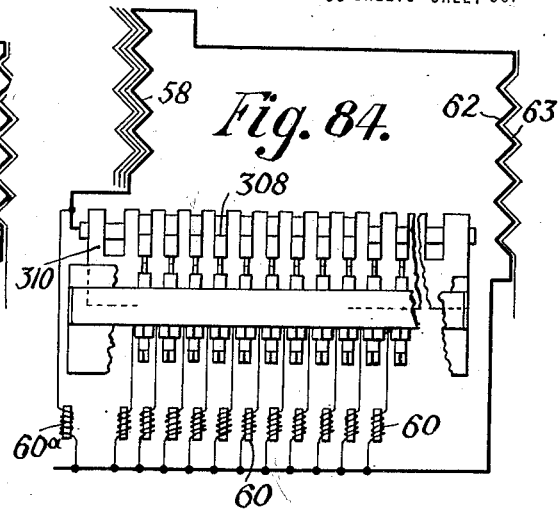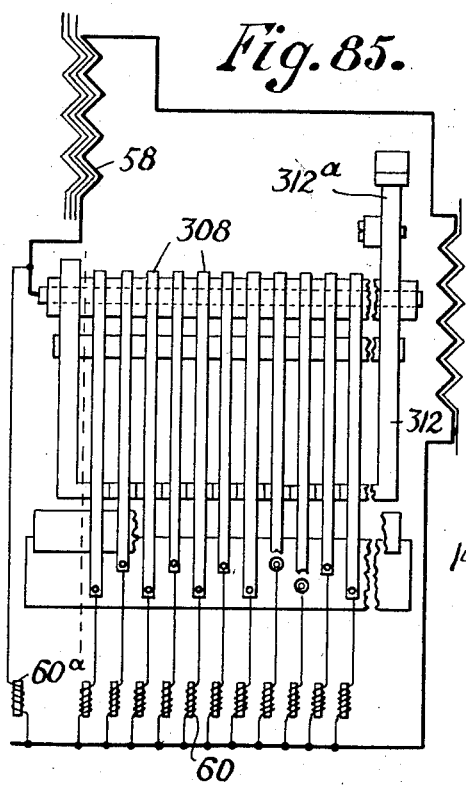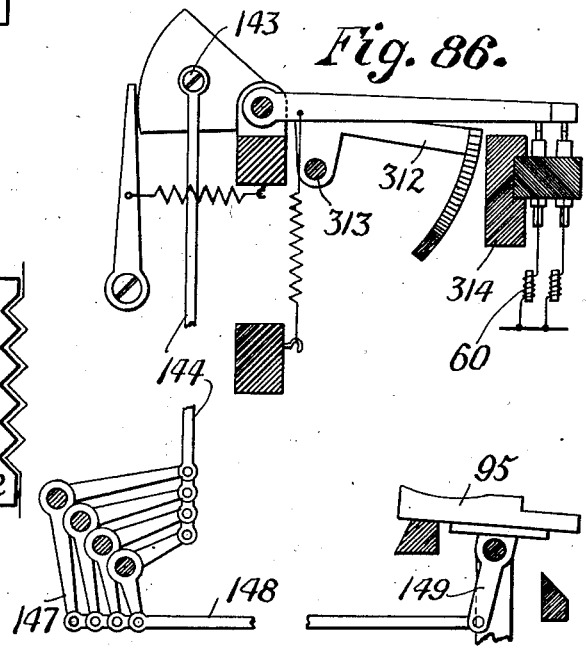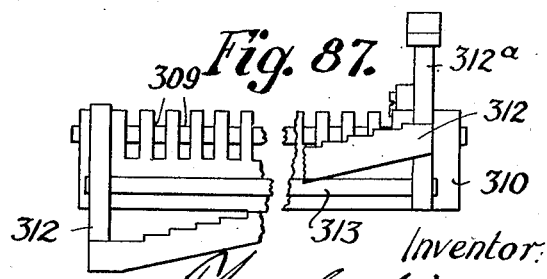

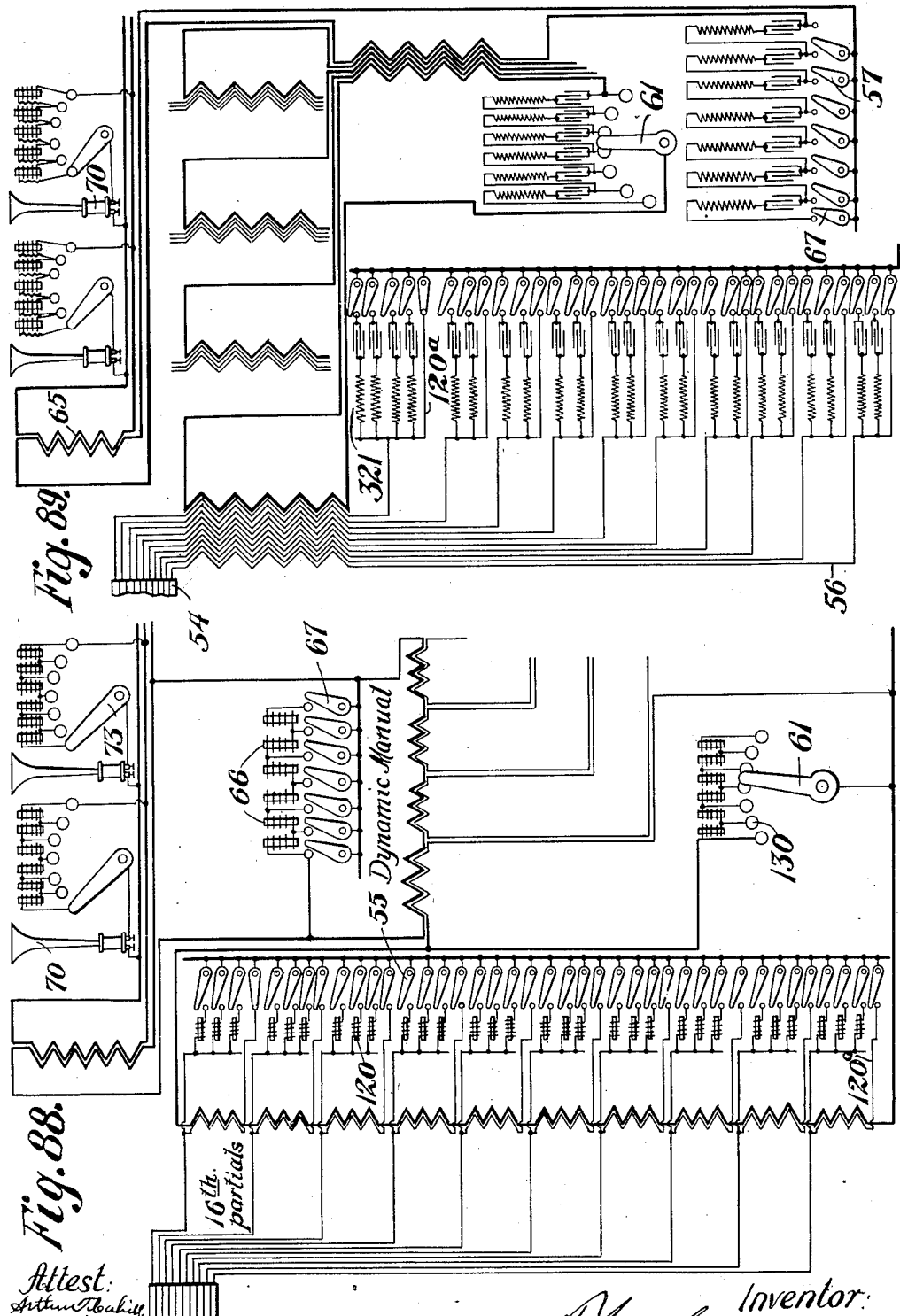

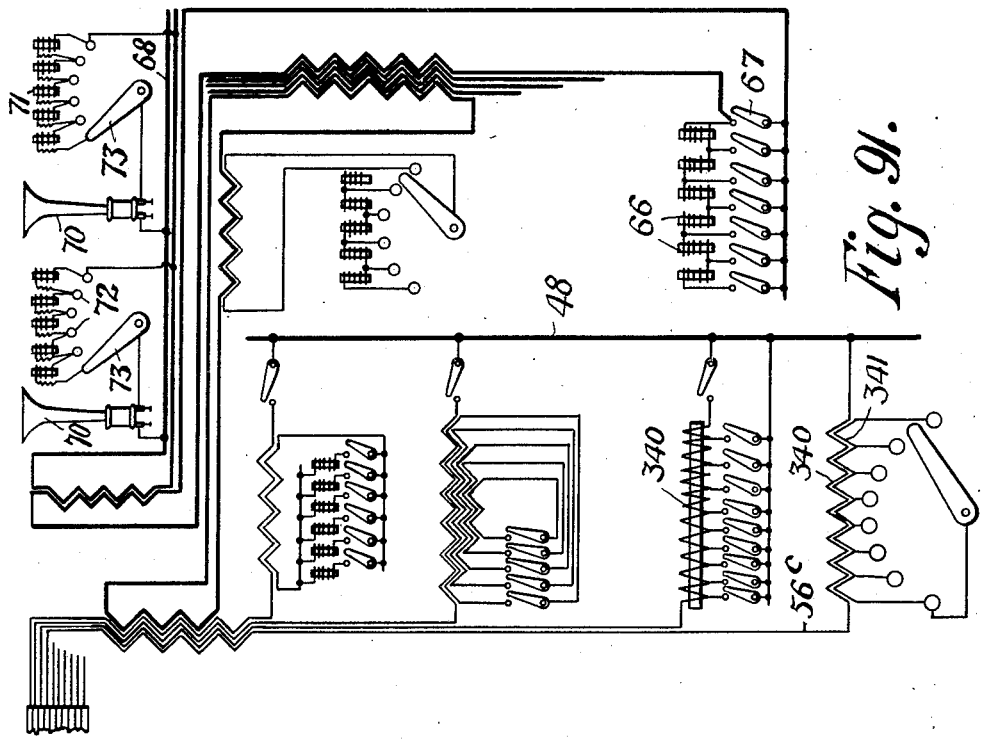

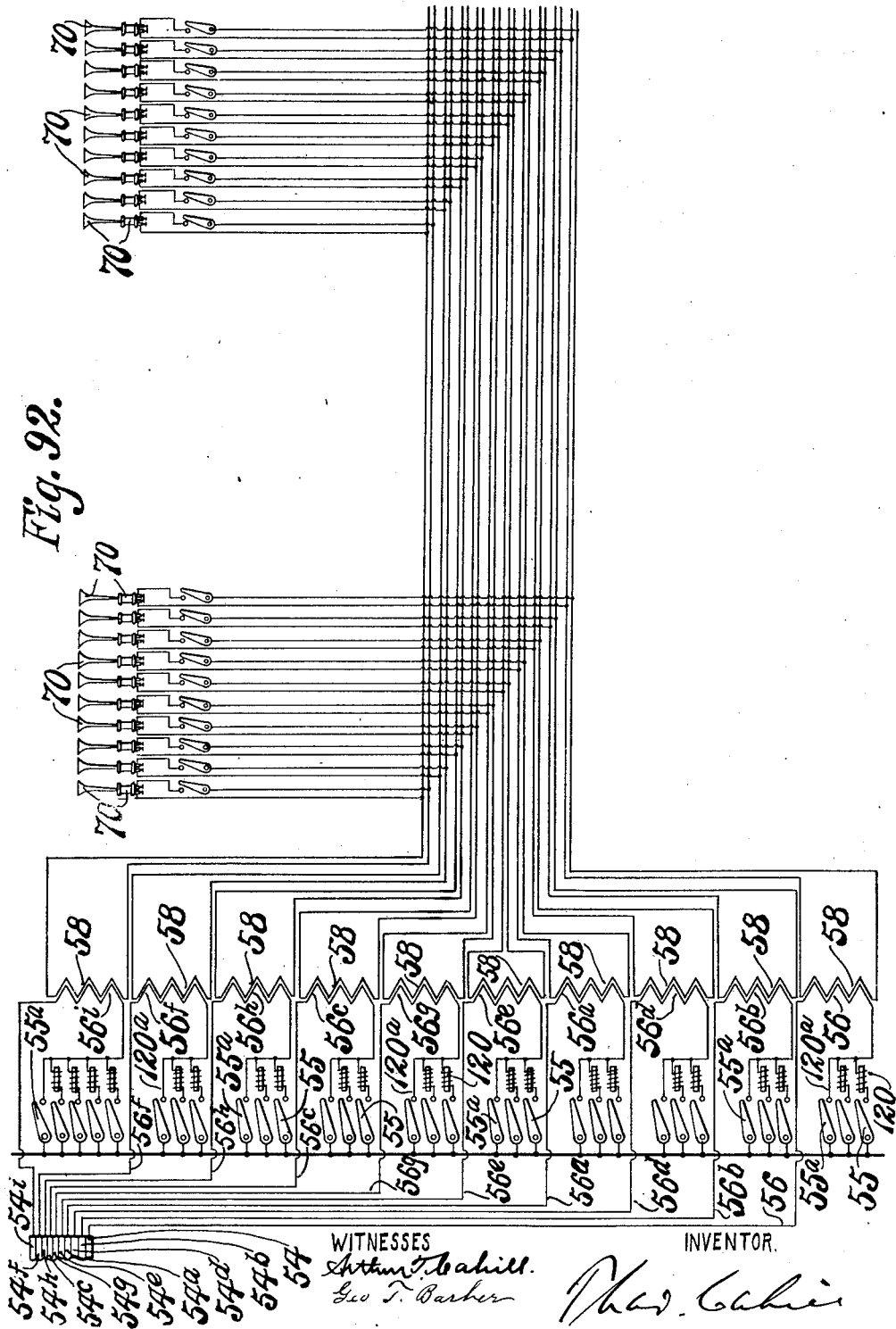

UNITED STATES PATENT OFFICE.

THADDEUS CAHILL, OF NEW YORK, N. Y.

ART OF AND APPARATUS FOR GENERATING AND DISTRIBUTING MUSIC ELECTRICALLY.

1,295,691.  Specification of Letters Patent.  Patented Feb. 25, 1919.

Continuation of applications Serial Nos. 194,114 and 194,116, filed February 17, 1904, which were continuations in part of applications Serial No. 43,944, filed January 19, 1901, and Serial No. 145,197, filed February 26, 1903. This application filed June 26, 1915, Serial No. 36,420. Renewed May 8, 1918. Serial No. 233,369.

*To all whom it may concern:*

Be it known that I, THADDEUS CAHILL, a citizen of the United States, residing at New York city, New York, have invented certain new and useful Improvements in the Art of and Apparatus for Generating and Distributing Music Electrically, of which the following is a specification.

This application is a continuation of my prior application, No. 194,114, filed February 17, 1904; also, in like manner, it is a continuation of my other prior application, No. 194,116, also filed Feb. 17, 1904; both these applications were divisions of my earlier application No. 145,197, filed February 26, 1903. All of the accompanying drawings, except Figures 5$^A$ to 5$^E$, are copies of similarly numbered drawings that were filed in each of the three cases aforesaid, Nos. 145,197, 194,114, and 194,116. All that part of this specification preceding "Part two", excepting this paragraph and the brief descriptions of and references to Figs. 5$^A$ to 5$^E$, is a copy (with occasional corrections, amendments and additions, intended to make the matter clearer) of pages 1 to 62 of the specifications of the two original applications aforesaid, Nos. 194,114 and 194,116, the descriptive portions of which (as distinguished from the claims) were for the most part in duplicate; and the great bulk of the same is also in substance a copy of similar descriptive matter contained in the original application before mentioned, No. 145,197, filed February 26, 1903. The majority of the claims filed herein are copies (either exact copies or copies in substance) of claims which were submitted in the prior applications aforesaid, Nos. 194,114 and 194,116; and all the claims inserted herein might consistently with the law and the practice of the Patent Office have been asserted in any one of the three applications aforesaid, Nos. 145,197, 194,114 or 194,116, when the same were filed; and this continuation application is filed (and the supplemental description contained in Parts two and three hereof and in Figs. 5$^A$ to 5$^E$ is added) for the purpose of describing the invention (and the manner of using it most advantageously) more fully, clearly and perfectly in certain particulars than is done in the specifications of the prior applications aforesaid, No. 145,197, No. 194,114 and No. 194,116.

The application No. 194,114, filed February 17, 1904, (of which this is a continuation) we have already seen was filed as a division of original application No. 145,197, filed February 26, 1903. Further, it was stated in said application, No. 194,114, as follows:

The principal part of the subject matter of the present application was also clearly disclosed in a prior allowable application of mine, No. 43,944, filed January 19, 1901; and most of the claims asserted herein, if not all of them, were either asserted in the same words or in substance in said original application, No. 43,944, or might, under the law and practice of the Patent Office, have been so asserted in said original application. In so far as the subject-matter of the present application is identical with the subject-matter of said original application, No. 43,944, filed January 19, 1901, this application is a continuation of said original application, No. 43,944.

A large part, then, of the subject matter of the present application, it is to be understood, is identical, not only with the subject-matter illustrated and described in the applications aforesaid, No. 194,114, filed February 17, 1904, and No. 145,197, filed February 26, 1903, but also it is identical with the subject-matter described and claimed in my other pending application aforesaid, No. 43,944, filed January 19, 1901; and in so far as the subject-matter described and claimed in the present application is identical with the subject-matter disclosed in said original application, No. 43,944, the present application is a continuation also of said application, No. 43,944.

In Letters Patent of the United States to me No. 580,035, dated April 6, 1897, is described an art of and apparatus for generating and distributing music electrically. My present invention consists in certain improvements in that art and in the apparatus for practising the same, which are hereinafter described, by means of which improvements certain new and useful effects are produced, which have never, so far as I am aware, been produced before.

More particularly, the objects of my invention are to improve the character or quality of music that is produced electrically; to increase the facilities for expression, afforded to the performers; to increase the number of subscribers' instruments that can be supplied with musical electrical vibrations from a single central-station instrument and to enable the individual subscribers to regulate the power of the musical sounds produced upon their premises by the electrical vibrations transmitted from the central station, each subscriber independently of the others. And, without attempting in this introductory portion of the specification any definition of the invention or any formal statement of claim, I would say, briefly and informally and by way of introductory explanation, that my present apparatus, hereinafter described, differs from the apparatus illustrated and described in the specification and drawings accompanying the Letters Patent aforesaid, in the following, among other particulars, namely:

First. In the apparatus illustrated in the drawings accompanying the specification of the Letters Patent aforesaid, a set of pitch-shafts is employed, corresponding respectively to the notes of a musical scale within the compass of an octave (twelve for the chromatic scale of equal temperament), each of said shafts giving movement to rotary vibration-generating devices for producing electrical vibrations corresponding to the successive octaves of that note of the scale to which such shaft corresponds, each of these shafts being connected by a belt of its own with a common driving-shaft from which they all receive movement. With this arrangement, the several octaves of a note were necessarily in tune with each other, for the rotary devices by which the electrical vibrations corresponding to them were produced were carried by the same shaft; but the vibration-generating devices corresponding to notes that were not octaves of each other were carried by different shafts and were liable on account of variations in the amounts of slip of the belts driving those shafts to get out of tune, from time to time, more or less, thereby necessitating care and attention. In the specification aforesaid, the possibility of using toothed gearing for the pitch-shafts, thereby to avoid slip, was referred to. But no toothed gearing was illustrated in the drawings or described in the specification, for none suitable for the purpose had been contrived at that time. But in the accompanying drawings a toothed gearing is clearly illustrated and which is hereinafter fully described by means of which all the pitch-shafts are connected together in such a manner that it is impossible for the notes to get out of tune with one another; and everything is contrived in such a manner that the most perfect and unchangeable tuning of the notes with relation to one another is produced. Variations of the whole set from concert pitch are, of course, possible, but such variations do not affect the tuning of the notes with relation to one another nor the goodness of the chords, the tuning for which is more perfect and unchangeable than has ever been attained before in any musical instrument so far as I am aware.

Second. With the apparatus described in the specification before mentioned there was, in general, for each note, at least in the middle and lower part of the compass, a group of vibration-generating devices serving only for that note and one serving to produce the ground tone, another the second partial, another the third partial, another the fourth partial, another the fifth partial and another the sixth partial. In other words, to produce the first six partials of the several notes, six sets, in effect, of vibration-generating devices were employed. But with the apparatus hereinafter described, there are used, preferably, a principal or ground-tone set of generators, a supplemental or third partial set of generators and another supplemental or fifth partial set of generators; and things are arranged in such a manner that from the principal or ground-tone set of generators the first, second, fourth and eighth partials and, if desired, the sixteenth partials, are derived; from the third partial set, the third and sixth and, if desired the twelfth partials are derived; and from the fifth partial set the fifth partials and, if desired, the tenth partials are derived. Thus, from a small number of vibration-generating devices, a large number of sets of partials are produced, and the whole apparatus is simplified and cheapened. And, further, a simplified form of machine is also illustrated and described, from which some very fair musical effects may be produced with a single set of vibration-generating devices.

Third. In the system described in the specification accompanying the Letters Patent before mentioned, the electrical waves, as produced in the first instance by the vibration-generating devices, varied more or less widely from the sine-form and were then assimilated, in a greater or less degree, to the sine-form by successive inductive transfers, tone-purifying devices being used for that purpose. By my present invention, I preferably generate electrical waves in the first instance as nearly sinusoidal as conveniently may be and am thus enabled to dispense, in whole or in great part, with all devices that serve merely for tone-purifying, thus further simplifying and cheapening the apparatus. And by my present invention the whole apparatus is, or at least may be, so organized, as hereinafter more fully described, that a more or less considerable effect of tone purifying may be produced by successive inductive transfers of the vibrations, in the vibration-combining devices and the expression devices, without employing any devices that serve merely or solely for tone purifying and without complicating the apparatus or greatly increasing its cost.

Fourth. In the specification accompanying the Letters Patent aforesaid, a form of vibration-translating device is described, having a wooden sound-board, set in vibration by a plurality of small electro-magnets, receiving vibratory electrical currents from vibration-generating devices. By my present invention, I use, preferably, as a vibration-translating device, in combination with the other parts of the apparatus, an electrically-vibrated diaphragm, preferably of soft iron or soft steel (in effect, a receiving telephone) in combination with a horn or other suitable reinforcing air-chamber. This form of vibration-translating device, particularly if the diaphragm be made (as I have been making them) of soft iron or steel, is quite free from alteration by the weather and produces sounds of a good quality and of great power, through a wide range of pitch, and with less electrical energy than is required by the kind of vibration-translating device illustrated and described in the specification accompanying the Letters Patent hereinbefore enumerated; and seems also more satisfactory in other particulars.

Fifth. In the system of generating and distributing music electrically, described in the specification accompanying the Letters Patent before mentioned, the subscriber or hearer had no power to regulate the loudness of the sounds produced upon his premises. That was controlled from the central station only. By my present invention, I not only provide numerous devices to enable the performers or operators at the central station to control the loudness and timbre of the sounds, but I also provide means on the premises of the subscriber, by which he can himself alter and regulate the loudness of the sounds produced on his own premises at will, and without interfering with the like control, by other subscribers, of the loudness of the sounds produced on their premises.

Sixth. In the apparatus described in the specification before mentioned and illustrated in the drawings accompanying and forming part of the same, a single circuit-closing switch was used, common to all the circuits in which electrical vibrations corresponding to different partials of the same composite tone were produced. But in the apparatus hereinafter described, a group of switches is preferably used for each such group of circuits, a switch for each circuit. Thus I make it possible to easily control the several partials or components of a tone independently one of another, and, also by dividing the current controlled between a number of switches, increase the total amount of current that can be controlled.

Seventh. In the apparatus described in the specification before mentioned and illustrated in the drawings accompanying and forming part of the same, the switches or circuit-closing devices were connected directly with the finger-keys and operated by the muscular power of the operator's fingers. But in the apparatus hereinafter described, or at least in the preferred from of that apparatus, the switches are operated by pneumatic power-devices that are controlled by the finger-keys. By this means, I make it possible for the performer to control with a light and easy touch, vastly greater amounts of electrical energy and to supply from a single central station instrument, powerful musical tones to a large number of persons, each in his own house.

Eighth. In the apparatus described in the specification before mentioned and illustrated in the drawings accompanying and forming part of the same, the exciting windings for a group of alternators were connected together in series and no means provided for altering the intensity of excitation. But in the apparatus hereinafter described, I provide, preferably, independent or parallel circuits for the exciting windings of the several alternators, and also provide means for altering the intensity of excitation of the several alternators, each independently of the others. Thereby I make it possible to easily voice the instrument so as to transmit over the mains the several series of vibrations, each with the power required; and make it possible also to compensate, in a measure, the tendency of the lines to transmit and of the diaphragms to produce some tones less strongly than others.

Ninth. The improvements above enumerated are of a general character, which would seem to be, in general, applicable, whatever the nature of the expression mechanism used may be. But my present invention differs widely from the apparatus described in the specification before mentioned and illustrated in the drawings accompanying and forming part of the same, in respect of the expression mechanism, by means of which new effects are produced, which have never, so far as I am aware, been produced before. The expression mechanism described in the specification accompanying the Letters Patent before mentioned, while very different in structure and in its physical mode of operation from a common pianoforte, resembles the pianoforte in respect that the loudness of each note is designed to be controlled independently of the other notes, merely by the touch of the performer upon the key. My present apparatus, while differing widely in its structure and in its physical mode of operation, and even in its musical capacities from a pipe organ, yet resembles an organ in respect of some of its musical powers and functions more nearly than a pianoforte. And important parts of my invention relate to a variety of expression devices, whereby divers musical effects are produced, which could not be produced with the expression mechanism illustrated in the drawings accompanying and forming part of the specification before mentioned. Thus—

(a) By my present invention I employ a plurality of keyboards and preferably contrive things in such a manner, as hereinafter more fully described, that all these keyboards are supplied with the requisite electrical vibrations from a single set of vibration-generating devices. Some important musical effects that are impossible with a single keyboard are thus made possible, and with but little increase in the cost of the apparatus.

(b) I contrive things in such a manner, as hereinafter more fully described, that the performer can easily alter at will and within certain limits the timbre, tone-color or quality of the notes of a keyboard.

(c) I also provide devices common to a plurality of the notes of a keyboard (or preferably common to all the notes of a keyboard) for governing the loudness of any of said notes, and by these means make it possible for the performer to produce a variety of effects that are not possible with the apparatus described in the specifications accompanying the Letters Patent hereinbefore mentioned, in which the expression device for each key is entirely independent of every other key.

(d) I provide, as before said, a plurality of keyboards; and preferably I arrange the apparatus as hereinafter more fully described, so as to enable the performer to regulate and alter at will the timbre of the notes of each keyboard, independently of the other keyboards, so as to produce tones of different timbres upon or by means of the different keyboards, and also to vary the loudness of the notes of the several keyboards, independently of one another.

(e) I provide an electrical swell device, or preferably a plurality of independently acting-electrical swell devices, by means of which the loudness of the notes produced may be increased or decreased, rapidly or slowly, to any extent from the softest to the loudest.

(f) I provide a dynamic manual, that is, a keyboard each of whose keys corresponds to a different degree of loudness of tone, by means of which the performer can govern the loudness of the sounds produced by degrees or steps of a scale of loudness, and can change the loudness with absolute instantaneousness from one degree to another, thereby producing some musical effects, which, so far as I am aware, have never been produced before.

By properly manipulating these various expression devices, a composition can be produced with different kinds of timbre and expression; notes of different timbres can be produced simultaneously; the melody can be made prominent while the accompaniment is subdued; any note of a chord, played upon one keyboard, can be increased or diminished in loudness independently of the other notes of that chord, played upon other keyboards; and a great variety of effects produced, some of which have never, so far as I am aware, been produced heretofore. And these effects, produced by one or more performers at a central station, may be heard by a large number of subscribers, each at his own house; and each of these subscribers can regulate and alter instantly at will, the loudness of the sounds produced on his premises according to his own sense of what is agreeable to him.

In brief, then, my improved apparatus, it will be seen, embodies, first, certain improvements, such as the first, second, third, fourth, fifth, sixth, seventh and eighth points hereinbefore set forth, that seem to be, in general, applicable to an electrical music-generating apparatus, whether expression mechanism of one kind or of another be employed, and by means of which the tuning is rendered perfect and unchangeable, and the apparatus simplified and cheapened, and rendered in various ways more powerful, more perfect and more satisfactory; and, second, it embodies certain novel forms of expression mechanism, by which new and important musical effects may be produced electrically, which have never, so far as I am aware, been produced electrically before, and some of which have never, so far as I am aware, been produced before in any manner whatever.

While I consider it convenient to use in the same apparatus all the improvements above referred to, I wish it to be clearly understood at the outset that one or more of those improvements may be used and the others not used or a portion of them may be used in one form of apparatus and another portion used in another and different form of apparatus.

For greater convenience, I shall first describe, with reference to the accompanying drawings, one form of apparatus for embodying my invention and by means of which it may be practised. After that one form has been made clear, I shall describe some of the more important of the many alterations and modifications that may be made.

In the accompanying drawings, Figs. 1 to 45 illustrate the form of apparatus that I shall first describe; while Figs. 46 to 92 illustrate some of the many possible modifications or alternative constructions.

Fig. 1 is a schematic view, illustrating the electrical connections for one keyboard and one set or register of tones only.

Fig. 1^A is a schematic view, similar to Fig. 1, but illustrating a simpler form of apparatus, from which the expression devices are omitted.

Fig. 2 is a schematic view, partly in section, partly in elevation, showing a key of a keyboard and a circuit-closing device controlled by that key and serving, when that key is depressed, to throw the vibrations of the corresponding alternator upon the line.

Fig. 3 is also a schematic view, intended to illustrate, as far as possible in a single view, the leading features of the electrical connections, and in particular illustrating the facts ($a$) that in general each alternator supplies electrical vibrations of the same frequency to different keys, supplying a partial tone of one order to one key, and partial tones of other orders to other keys; and ($b$) that in general each key controls a plurality of sets of vibrations, corresponding respectively to different orders of partial tones, as for example, first-partial or ground-tone vibrations whose frequency we may indicate by $n$, and second-partial, third-partial, fourth-partial, fifth-partial, sixth-partial, eighth-partial, tenth-partial, twelfth-partial, and sixteenth-partial vibrations whose frequencies we may indicate by $2n$, $3n$, $4n$, $5n$, $6n$, $8n$, $10n$, $12n$, and $16n$ respectively. And in Fig. 3, it is to be understood, the keys, generators and connections are shown for the successive octaves of one note of the scale only, for example, the successive octaves of C. For each of the other notes of the scale, there are similar alternators, keys and connections. But the common-return bars 54, 54$^a$, 54$^b$, 54$^c$, 54$^d$, etc., the primary coils 56, 56$^a$, 56$^b$, 56$^c$, etc., the several inductoriums and expression devices illustrated, serve in common not only for the keys 45, 45, illustrated in Fig. 3, and corresponding, as before said, to successive octaves of a single note, but also for the keys corresponding to the other notes, and which are necessarily omitted from Fig. 3. Thus it will be seen, Fig. 1 illustrates the electrical connections of all the keys of a keyboard, for more than an octave, for one order or register of tones only, say the ground-tones; while Fig. 3 illustrates the electrical connections, for the various orders of partial tones, for the keys corresponding to the successive octaves of one note of the scale only. To make the apparatus of Fig. 3 complete, we must add the keyboard-keys 45, 45, the alternators, contact-springs and connections for the other notes of the scale, in their various octaves, which, if not practically impossible with the size of sheet allowed by the rules of the Patent Office, would involve such a large number of intersecting lines as to interfere with the clearness and simplicity of the figure.

Fig. 3$^A$ is a view in general similar to Fig. 3, but illustrating more clearly a portion of the circuits illustrated in Fig. 3.

Fig. 4 is a detail view partly in section, partly in elevation, illustrating the actual arrangement of the several contact springs 49, 49$^a$, 49$^b$, 49$^c$, 49$^d$, 49$^e$, 49$^f$, 49$^g$, 49$^h$ and 49$^i$, with the bars 54, 54$^a$, 54$^b$, 54$^c$, etc., which are shown schematically in Figs. 3, 3$^A$, 5, and other figures.

Fig. 5 is a schematic view, showing, in part, the electrical connections of one key in each keyboard, to illustrate the fact that the same vibration-generators that supply the requisite electrical vibrations for one keyboard, supply, or at least may supply, the electrical vibrations for the other keyboards also.

Fig. 5$^A$ is a diagrammatic view, similar to Fig. 5; but it differs from Fig. 5 in that while the former represents a construction in which the ground-tones and the harmonics of the same identical frequencies, in a plurality of keyboards or switchboards, are fed with the vibratory electrical currents required, from the same armature windings, Fig. 5$^A$ illustrates a construction in which distinct armature windings are provided for the different keyboards or switchboards; one set of windings for one switchboard and keyboard, and another set of windings for another switchboard and keyboard; and so on.

Fig. 5$^B$ is also a diagrammatic view, in general similar to Fig. 5, but differing from that figure in that a transformer is used for each alternator, the primary of such transformer being fed by such alternator, and said transformer is provided with a plurality of secondary windings, corresponding respectively to the ground-tones and harmonics that are fed from that generator to the different switchboards, one winding for each, as clearly seen in the drawings; that is, each ground-tone and each harmonic in each switchboard that is fed from a given generator has a secondary winding of its own, in the transformer whose primary is connected in series with such generator.

Figs. 5$^C$, 5$^D$ and 5$^E$ are also diagrammatic views, illustrating features of the invention which are described more in detail hereinafter.

Fig. 6 is a schematic view illustrating one arrangement of apparatus and of circuits for combining the electrical vibrations, corresponding to partials of different orders, into composite electrical vibrations corresponding to notes (or chords) of composite tones; and for varying the timbre of said composite tones, for each keyboard independently of the other keyboards; and for combining the electrical vibrations controlled by a plurality of keyboards, into a single series of more highly composite vibrations; for varying the loudness of the notes of the different keyboards, one keyboard independently of another; and also illustrating means for varying the loudness of the ensemble of tones suddenly by a dynamic keyboard; and also illustrating means connected with each vibration-translating device, by which the subscriber can vary, at will, the loudness of the tones produced upon his premises.

Fig. 7 is a plan view, largely schematic, illustrating one of the arrangements of gearing that I have contrived for driving the twelve pitch-shafts, that correspond respectively to the twelve notes of the chromatic scale, each with the angular velocity required.

Figs. 8 and 9 are sectional views in elevation, illustrating one of the twelve pitch-shafts, shown in Fig. 7, with the alternators to which it gives movement; Fig. 8 illustrates the lower portion of said shaft with the alternators of the ground-tone set (marked 2, 2, in the schematic views) that are carried by it; while Fig. 9 illustrates the upper portion of said shaft, with the supplemental alternators of the third and fifth partial sets (marked 3, 3, and 4, 4, in the schematic views) that are carried by it.

Fig. 10 is a view similar to Fig. 8, but on a larger scale, and with the rotating parts in section.

Figs. 11, 12, 13, 14, 15, 16 and 17 are detail sectional views, partly in elevation, on the lines 11, 11; 12, 12; 13, 13; 14, 14; 15, 15; 16, 16 and 17, 17, respectively, Fig. 8, illustrating the characteristic differences of the seven alternators respectively of the ground-tone set that are carried by a pitch-shaft, corresponding respectively to the successive octaves of that note of the scale to which such shaft corresponds, and constructed to produce respectively 3, 6, 12, 24, 48, 96 and 192 cycles or complete electrical vibrations for each revolution of the pitch-shaft carrying them. In Figs. 11 and 12, the armatures and the exciting windings of the field-magnets 24, 24, and 25, 25, are omitted; and in Figs. 15, 16 and 17 much of each alternator is broken away.

Fig. 12ᴬ is a detail view in sectional elevation and somewhat similar to Fig. 12, but illustrating the armature coils and their supporting devices, which are omitted from Fig. 12. In Fig. 12ᴬ some of the parts are removed to expose others to view. Fig. 12ᴮ is a detail section on the line 12ᴮ, 12ᴮ, Fig. 12ᴬ.

Figs. 18 and 19 are sectional views, partly in elevation, on the lines 18, 18, and 19, 19, Fig. 9.

Figs. 18ᴬ and 18ᴮ are detail sectional views in elevation, on a larger scale than Fig. 18, illustrating two different shapes of inductor teeth.

Fig. 20 is a plan view, partly schematic, illustrating one form of keyboard arrangement with the various accessories, namely, (a) the four pitch-keyboards; (b) the dynamic manual; (c) the groups of keys or switches, corresponding to the different orders of partial tones for the four pitch-keyboards by manipulating which the strengths of the different elements of the tone are adjusted at will from nothing to the maximum and (d) the four pedals 95, 95, corresponding respectively to the four pitch-keyboards and which are connected to control the electrical swell devices corresponding respectively to the four keyboards.

Figs. 21, 22 and 23 are detail views illustrating one arrangement of the tone-partial switches, by the manipulating of which the timbre of the notes of a keyboard may be controlled. Fig. 21 is a sectional view in elevation on the line 21, 21, Fig. 20; Fig. 22 a front elevation, illustrating one group of the tone-partial controlling switches; and Fig. 23 a top view of the same.

Figs. 24 and 25 are detail views illustrating one form of impedance coil. Fig. 24 is an elevation, and Fig. 25 a sectional elevation, on the line 25, 25, Fig. 24.

Figs. 28, 29, 30, 31, 32 and 33 are detail views, illustrating one form of my electrical swell device. Fig. 28 is a front elevation of a single electrical swell; Fig. 29 is a top view of the same; Fig. 30, an end view of the same, showing in sectional elevation the connections with a foot pedal, by which the electrical swell is operated; Fig. 31 is a view partly in section, partly in elevation, and largely schematic, illustrating the four swell devices, corresponding respectively to the four pitch keyboards and operated respectively by the four pedals, 95, 95, Figs. 20 and 30; Fig. 32 is a top view of one of the conducting plates, 130, belonging to the electrical swell devices, and Fig. 33 is a detail cross-section, partly in elevation, on the line 33, 33, Figs. 28 and 29.

Fig. 34 is a sectional view in elevation, illustrating one of my vibration translating devices.

Fig. 35 is a detail view similar to Fig. 34, but on a larger scale; the most of the reinforcing horn being broken away.

Fig. 36 is a detail, a plan view, on a larger scale than Fig. 35; the reinforcing horn, mouth-piece and diaphragm being removed.

Fig. 37 is a view in general similar to Fig. 35, but illustrating a construction in which an electro-magnet, excited by a local battery, is used in place of the permanent magnet, illustrated in Fig. 35.

Figure 43:
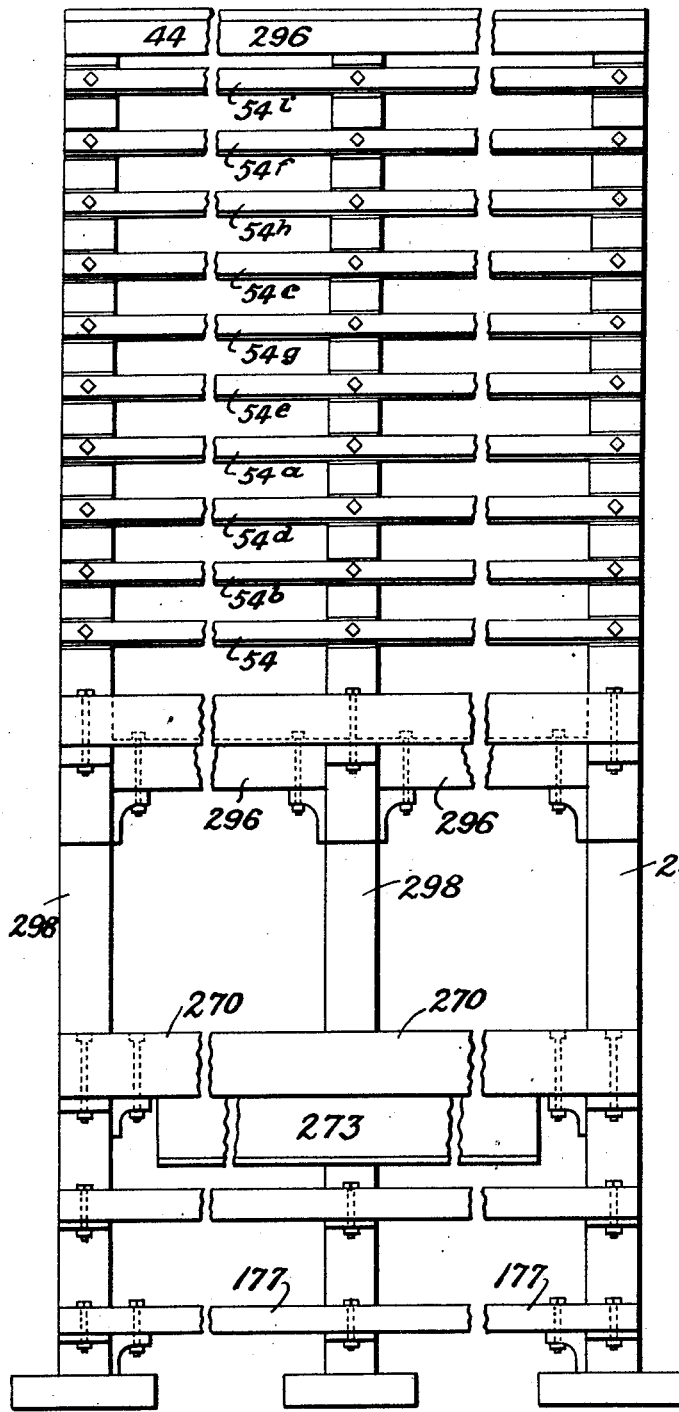
Figure 44:
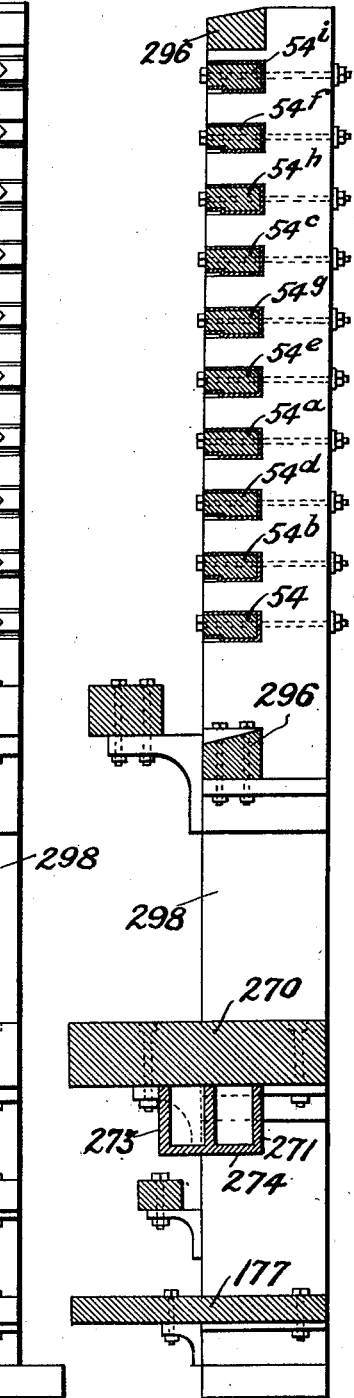

Figs. 38, 39, 38^A, 40, 41, 42, 43, 44, and 45, illustrate a key-controlled power-action, for operating the switches, by which the alternators, corresponding to different partials of a tone, are made to act upon the line. Fig. 38 is the principal view, partly in section, partly in elevation, and partly schematic, illustrating the power connections between one of the keys of one of the keyboards and its switches; a part of the switch-operating bar being broken away and the most of the switches omitted; Fig. 39, which is a detail sectional view in elevation, on a scale smaller than that of Fig. 38, shows the switch-operating bar, corresponding to a key 45, complete; Fig. 38^A is a detail view, partly in section, partly in elevation, illustrating the details of the insulated mechanical connections between the switch-operating bar and the switch-blades moved by it; Fig. 40 is a plan view, on a scale smaller than that of Fig. 38, illustrating a portion of the cylinder-table, wind-chest and valve mechanism; the cylinder table being in part broken away to expose the wind-chest and valve mechanism to view; Fig. 41 is a detail plan view, on a larger scale than Fig. 38, illustrating a portion of one of the bars 54 or 54^a or 54^b, etc., forming part of the circuit for all the partial-tones of one order in one keyboard, showing a number of switch-jaws attached to said bar; Fig. 42 is a detail, a rear elevation (also on a larger scale than Fig. 38) of one of the bars as 54, 54^a, etc., with the insulating bar 287 attached to it and the hinges or hangers of a plurality of switches attached to said insulating bar; Fig. 43, which is a front elevation, illustrates portions of the frame by which the bars 54, 54^a, 54^b, etc., and various other parts of the apparatus are supported; and in this view the principal portions of the various horizontally-extending parts have been broken away; Fig. 44 is a detail, a sectional view in elevation on the line 44, 44, Fig. 43; and Fig. 45 is a sectional view in elevation, illustrating a modification of Fig. 38, in which the valve-mechanism is actuated directly by the keys, and the electro-magnets used for this purpose in the device of Fig. 38 are dispensed with.

Figs. 46, 47, 48 and 49 are schematic views, somewhat similar in character to Figs. 3 and 3^A, but illustrating modified or alternative arrangements of the alternators for producing complex electrical vibrations corresponding to the composite tones required. Of these—

Fig. 46 illustrates a modification, in which a group of alternators is used for each note, all the alternators of a group serving for that note only to which such group corresponds, as in the apparatus described in the specification of the Letters Patent before mentioned, dated April 6, 1897, but combined with means corresponding to each order of partial tones represented in a group of alternators, for preventing such order of partials from sounding or for causing it to sound, with greater or less force as required;

Fig. 47 illustrates a construction in which the principal or ground-tone set of alternators only is used and sets of electrical vibrations, whether sinusoidal or complex, corresponding in frequency to the first, second, fourth, eighth and sixteenth partials are derived from this one set of alternators and independently controlled;

Fig. 48 illustrates a construction in which the principal or ground-tone set of alternators 2, 2, is used with the fifth-partial supplemental set 4, 4; the third-partial supplemental set being omitted and things arranged in such a manner that the principal or ground-tone set of alternators not only supplies the first, second, fourth, eighth and sixteenth partials with perfect truth of tuning, but also supplies approximate but slightly imperfect third, sixth and twelfth partials; and Fig. 49 illustrates still another arrangement, in which the principal or ground-tone set of alternators supplies not only the first, second, fourth, eighth and sixteenth partials with perfect truth, and the slightly imperfect third, sixth and twelfth partials, but also supplies imperfect or approximate fifth and tenth partials.

Figs. 50, 51, 52, 53 and 53^A illustrate a modified construction, in which the loudnesses of the several orders of partial tones of each keyboard are controlled, each independently of the other, and the loudness of the notes of the several keyboards controlled, each keyboard independently of the other, by varying the mutual induction subsisting between vibration-transferring and vibration-receiving circuits. The several figures are described more in detail hereinafter.

Figure 54:
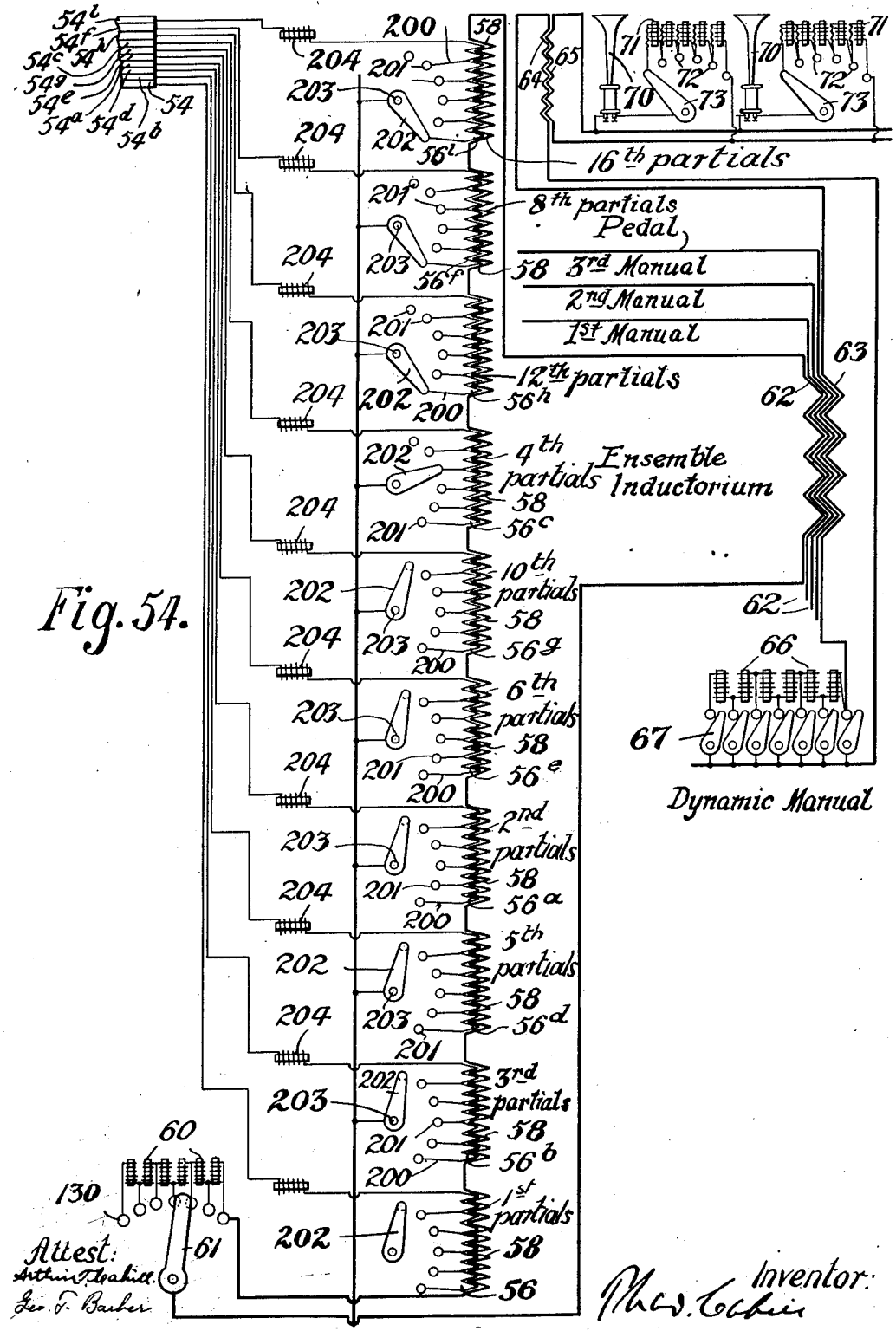

Figs. 54 and 55 are schematic views, illustrating a form of expression-mechanism, in which the loudnesses of the several orders of partial tones are governed, each independently of the other, by varying the number of active turns in coils corresponding to such orders of partial tones.

Fig. 56 is a schematic view, illustrating a form of apparatus in which the loudness of the tones is governed by acting upon a plurality of vibration-transferring circuits.

Fig. 57, which is a detail side elevation, and Fig. 58, which is a detail view partly in plan, partly in section, illustrate an expression device in which the loudness of the tone is governed by screening a secondary coil, more or less, from the corresponding primary.

Figure 63:
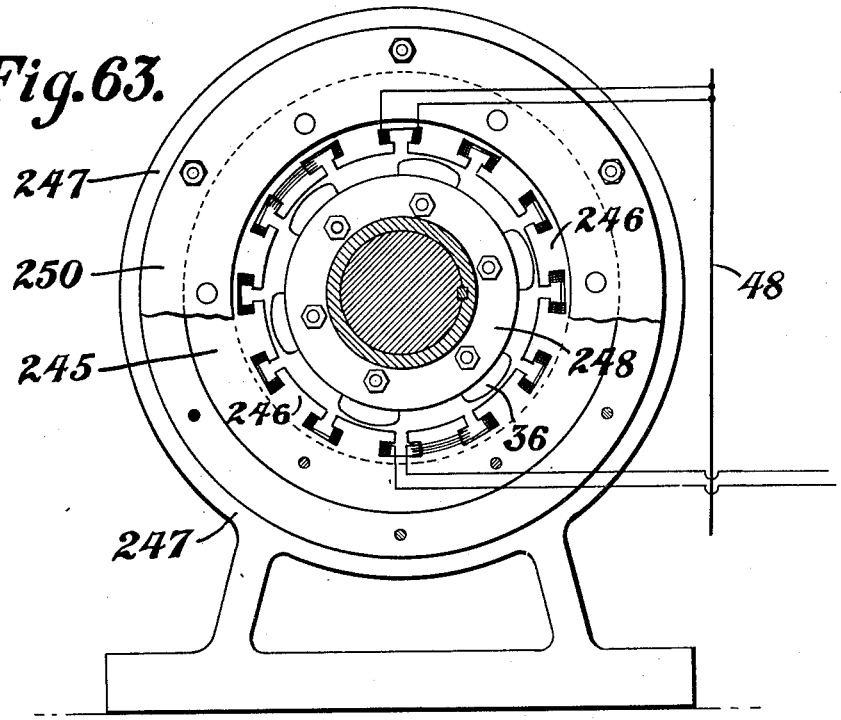
Figure 62:
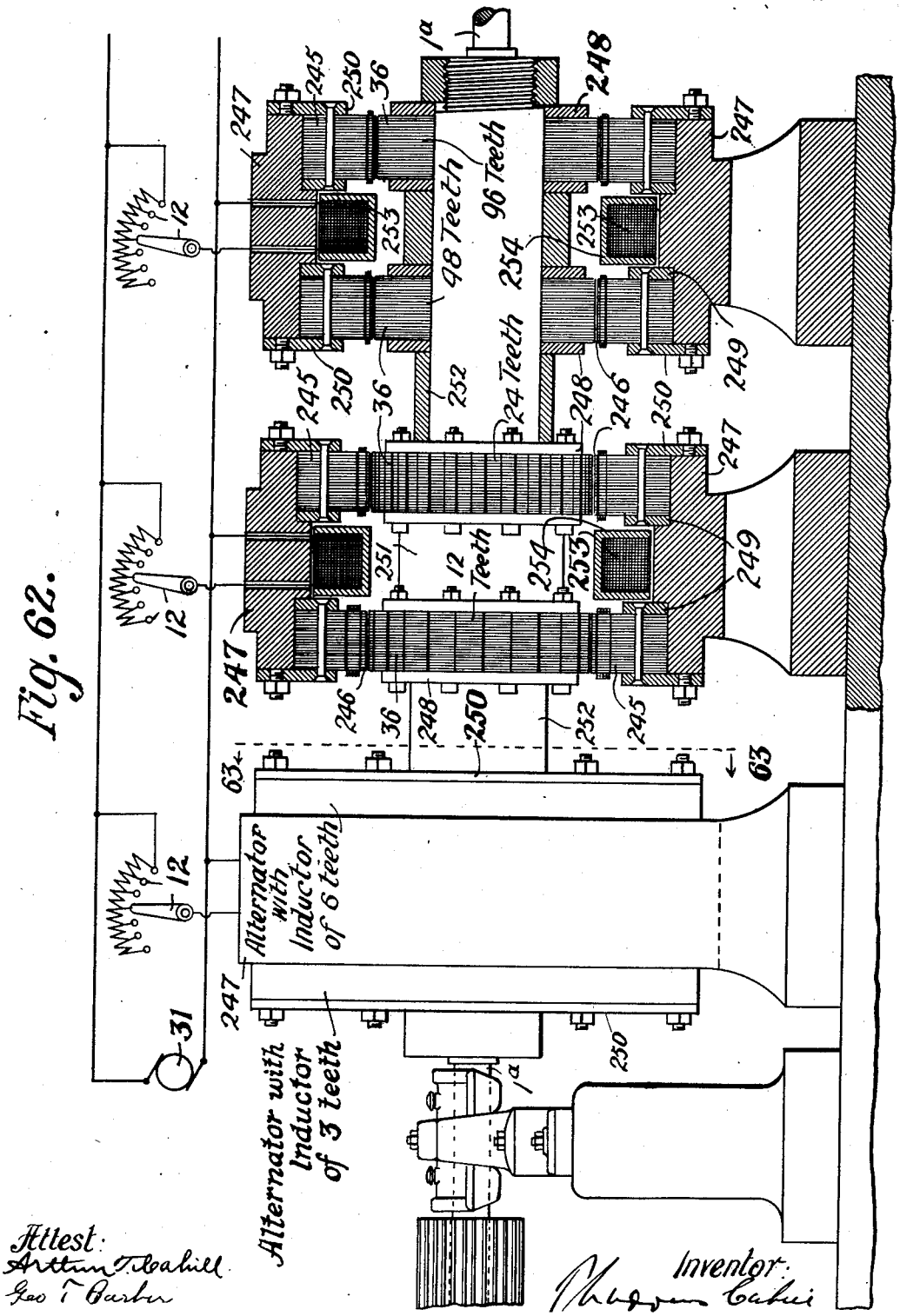
Figure 76:
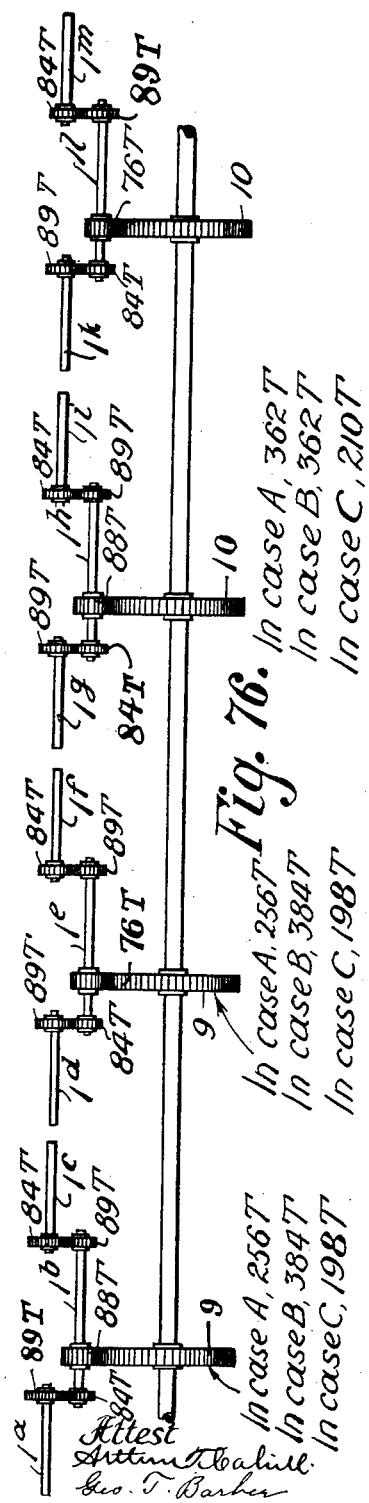

Figs. 59, 60 and 61 are schematic views, illustrating modified arrangements of the circuits, which are hereinafter described;

Figs. 62 and 63 illustrate a modified arrangement of the alternators.

Figs. 64 to 77, inclusive, are schematic views, illustrating modified or alternative arrangements of the gearing, for the alternators, adapted to the chromatic scale of equal temperament. Figs. 78, 79, 80 and 81 illustrate different arrangements of the gearing for the alternators, adapted to the diatonic scale of the natural or just temperament.

Fig. 82 illustrates a construction in which a plurality of sets of ground-tone alternators are used.

And Figs. 83 to 92 illustrate modified arrangements of the expression devices, which are hereinafter more fully described.

I have spoken of several of the figures above described as schematic views or as in part schematic. By a schematic view I mean a view illustrating certain essential features of a device, apparatus or arrangement of parts, in which, in order to illustrate the essential features more clearly, no effort is made to show the true sizes, proportions, relative distances and positions of the parts, or, indeed, in many cases, their form. Such views are especially necessary in illustrating electrical circuits and apparatus. In most of the schematic views, if not in all, a few things of a kind are in some cases shown in illustration of all the things of that kind; for an attempt to illustrate all those things in one view would be impracticable, if not impossible, and would tend to obscure the clearness of the drawing. In many of the views, whether schematic or geometric, a greater or less portion of the apparatus is broken away, as the break-lines indicate, or in some cases is omitted. Further, I have not endeavored to illustrate or describe all the minute details of construction of things old and well known, such, for example, as alternators, inductoriums, switches and keyboard mechanisms, etc., but I have clearly illustrated and fully described those features of construction that are new with me and essential to the carrying out of the invention. The schematic drawings, as before said, are of course not made to scale, and in the drawings that are made to scale different scales are of necessity used for different figures; but all that is new with me and essential to the invention is so clearly illustrated and so fully described that persons skilled in that part of the electrical art which relates to alternating currents and alternating current machinery and apparatus, can make a working machine from the information contained in this specification and in the accompanying drawings.

Similar reference numerals refer to similar parts in all the figures.

In many cases, one or more parts only of a group of similar parts is marked, and in others, only one part or a few parts of one group, out of several similar groups, are marked; and in some cases a series of parts is not completely marked in each figure in which such series of parts appears, but has some of its parts marked in one figure and some in another, as the lines of the figures permit. This is particularly true of the sets of springs 49, $49^a$, $49^b$, $49^c$, $49^d$, $49^e$, $49^f$, $49^g$, $49^h$ and $49^i$; of the series of bars 54, $54^a$, $54^b$, $54^c$, $54^d$, $54^e$, $54^f$, $54^g$, $54^h$ and $54^i$; and of the series of coils 56, $56^a$, $56^b$, $56^c$, $56^d$, $56^e$, $56^f$, $56^g$, $56^h$ and $56^i$; and in several figures in which it is not possible to apply the reference numerals, as 56, $56^a$, etc., directly to the coils to which they refer, said reference numerals have been applied to the terminals of said coils. Also in several of the figures (see Figs. 6, 50 and 54), the legends, First manual, Second manual, Third manual, and Pedal have been used not with reference to those four keyboards themselves, but with reference to parts or groups of parts appertaining to or controlled by those four keyboards, respectively.

I shall first describe the apparatus illustrated in Figs. 1 to 45, after which it will be easily understood that numerous modifications of that apparatus may be made without at all departing from the essential principles, processes and combinations belonging to my invention, or at least without substantially departing from certain of the essential principles, processes or combinations belonging to my invention.

A rich musical tone consists, as physicists have proved, of a plurality of component tones, which are sometimes called partial tones, tone-partials, or, more shortly, partials, and which usually bear certain simple mathematical relations to each other. Of these component tones, the lowest is called the ground-tone or first partial. The others are called upper partials, over-tones, or harmonics, all which terms I use herein synonymously. Also, I use the words partial tones, tone-partials or partials, when no limiting words are used, in a sense broad enough to refer alike to a ground-tone or to an over-tone.

Representing the number of vibrations in unit time of the first partial or ground-tone of a note by $n$, then $2n$, $3n$, $4n$, $5n$, $6n$, $7n$, $8n$, $10n$, $12n$, $16n$ and so on, are the numbers of vibrations in unit time of the second, third, fourth, fifth, sixth, seventh, eighth, tenth, twelfth and sixteenth partials, respectively, of that note. The quality or timbre of a musical note depends upon (a) what upper partials or overtones enter into it, (b) the strength of those partials with relation each other and to the ground-tone, and (c) probably also, to a less extent, upon the phase relations of the different partials. As we shall see hereinafter, electrical waves may be produced from a single alternator which shall produce a musical note; but richer and more satisfactory notes than can be produced as far as I am aware, from a single alternator—notes very much more suitable for producing striking musical effects—can be produced by building up a note of the timbre or quality of tone desired, by using a plurality of alternators, having vibration-frequencies corresponding to different partials of the note required, and each contributing its proper component to that note.

The most simple and natural arrangement for this purpose would be to employ a distinct group of alternators for each note of the scale, as many groups of alternators as there are notes, each group of alternators serving for its own note only, and each group containing one alternator for producing the ground-tone of the note for which such group serves; the other alternators of such group serving each to give a different overtone. Such an arrangement is described in the specification of the Letters Patent before mentioned, dated April 6, 1897; and such an arrangement of alternators may be used with the various expression devices hereinafter described, and with certain of the other novel features of my present invention, as illustrated, for example, in Fig. 46. But to reduce the expense involved in a system requiring so many alternators, I have contrived several arrangements or combinations of parts, which will be hereinafter described, and by means of which the number of alternators required is greatly reduced. In the system illustrated in Figs. 1 to 45, which I shall first describe, there are, First, a principal set of alternators, having vibration-frequencies corresponding respectively to the vibration-frequencies of the notes of a musical scale, through a sufficient range. Seven octaves, lacking one half-tone, are illustrated in the drawings, though, of course, a greater or less compass may be used, if desired. From this one principal set of alternators, the ground-tones and also the second, fourth, eighth and sixteenth partials (whose frequencies are respectively two, four, eight and sixteen times that of their ground tone) are derived in the manner hereinafter described.

Second, a supplemental set of alternators, each of which has a vibration-frequency three times that of the corresponding alternator in the principal or ground-tone set; and from this supplemental set of alternators, the third partials, the sixth partials and the twelfth partials are derived, in the manner hereinafter described.

Third, another supplemental set of alternators, each of which has a vibration-frequency five times that of the corresponding alternator in the ground-tone set; and from this second supplemental set of alternators the fifth partials and the tenth partials are derived, in the manner hereinafter described.

In most of the drawings, I have illustrated this electrical system as adapted to the chromatic scale of equal temperament, which is now used almost universally throughout christendom; but it is to be understood that my invention is applicable also to other scales and temperaments. For the chromatic scale of equal temperament, then, we have, or at least may have as illustrated in the drawings, 12 shafts, $1^a$, $1^b$, $1^c$, $1^d$, $1^e$, $1^f$, $1^g$, $1^h$, $1^i$, $1^k$, $1^l$ and $1^m$, corresponding respectively to the twelve consecutive notes of the chromatic scale (as C, C-sharp or D-flat, D, D-sharp or E-flat, E, F, F-sharp or G-flat, G, G-sharp or A-flat, A, A-sharp or B-flat, and B,) and each carrying or giving movement to the alternators that serve to produce the successive octaves of the note to which such shaft corresponds and for which it serves. For convenience, we may term these shafts $1^a$, $1^b$, etc., pitch-shafts. With the exact arrangement of parts illustrated in the drawings, and which, it is to be understood, may be varied from, more or less as required, each pitch-shaft gives movement (a) to seven ground-tone alternators, 2, 2, having vibration-frequencies corresponding respectively to the vibration-frequencies of successive octaves of the note for which the pitch-shaft carrying them stands; (b) to six third-partial alternators, 3, 3, and (c) to five fifth-partial alternators, 4, 4. If the lowest in pitch of the ground-tone alternators have a frequency of $n$ cycles per second, the other ground-tone alternators, in the ascending scale, must have frequencies of $2n$, $4n$, $8n$, $16n$, $32n$, and $64n$ respectively; if the lowest of these ground-tone alternators, 2, 2, produces, for example, 3 cycles or complete to-and-fro electrical vibrations per revolution, as illustrated in the drawings, the other ground-tone alternators, carried by the same pitch-shaft, will produce, respectively, 6, 12, 24, 48, 96, and 192 cycles or complete to-and-fro electrical vibrations for each revolution of such shaft. From this ground-tone set of alternators, as before said, we derive, in a manner hereinafter described, not only the ground-tones, or first partials, but also the second, fourth, eighth and sixteenth partials. Very fair music can be produced, as we shall see later, from the ground-tone set of alternators alone, especially when things are arranged as hereinafter described, so that we derive from the ground-tone set, second, fourth, eighth and sixteenth partials, as well as ground-tones. But it is for many purposes desirable to add, as illustrated in the drawings Figs. 3, 3^A, 5, etc., the two supplemental sets of alternators before mentioned. Representing, as before, the vibration-frequencies of the alternators 2, 2, of the ground-tone set, carried by a given pitch-shaft, by $n$, $2n$, $4n$, $8n$, $16n$, $32n$, $64n$ and $128n$ respectively, the vibration-frequencies of the corresponding alternators of the third-partial set will be $3n$, $6n$, $12n$, $24n$, $48n$, and $96n$, and so on, if the series be carried higher, each third-partial alternator having a vibration-frequency exactly three times that of the corresponding ground-tone alternator; while the vibration-frequencies of the alternators 4, 4, of the fifth partial set will be $5n$, $10n$, $20n$, $40n$, and $80n$, and so on, if the series be carried higher, each fifth-partial alternator having a vibration-frequency exactly five times that of the corresponding ground-tone alternator. By the vibration-frequency of an alternator, I mean the number of vibrations that it produces in unit time. And with the alternators of the ground-tone set, carried by a given pitch-shaft producing for each revolution of such shaft, respectively, 3, 6, 12, 24, 48, 96 and 192 complete, or to-and-fro electrical vibrations per revolution, the alternators 3, 3, of the third partial set produce, respectively, 9, 18, 36, 72, 144 and 288 (and so on, if the series be carried higher), complete electrical vibrations per revolution; while the alternators 4, 4, of the fifth-partial set produce, respectively, 15, 30, 60, 120 and 240 (and so on, if the series be carried higher), complete electrical vibrations per revolution of the same shaft. And as the ground-tone alternators 2, 2, the third-partial alternators 3, 3, and the fifth-partial alternators 4, 4, corresponding to any given note are all alike carried by the same pitch-shaft, and all have their rotary members attached fast to said shaft, any variation in their relative pitch is impossible, and if accurately made, they remain perfectly and unchangeably in tune with each other.

The twelve pitch-shafts, $1^a$, $1^b$, $1^c$, $1^d$, $1^e$, $1^f$, $1^g$, $1^h$, $1^i$, $1^k$, $1^l$ and $1^m$, with the sets of alternators carried by them, may be made to be exactly alike; that is, the alternators carried by any one of the twelve pitch-shafts may be in every respect exactly like the corresponding alternators carried by the other pitch-shafts; and for the sake of convenience of explanation (and for that reason only), we shall first assume this exact similarity; in which case, to make the twelve pitch-shafts correspond respectively to the twelve notes of the chromatic scale, we drive those shafts with angular velocities corresponding respectively to the vibration-frequencies of the twelve notes of the chromatic scale. And when thus driven, the alternators carried by one of the twelve pitch-shafts will give the note C in its successive octaves; the alternators carried by another pitch-shaft will give the note C-sharp or D-flat of equal temperament in its successive octaves, while the other ten shafts will give each the successive octaves of the note of the chromatic scale to which such shaft corresponds.

*Of the gearing for the pitch-shafts.*

One form of gearing that I have contrived for this purpose, is illustrated schematically in Fig. 7; in which $1^a$, $1^b$, $1^c$, $1^d$, $1^e$, $1^f$, $1^g$, $1^h$, $1^i$, $1^k$, $1^l$, and $1^m$, are, as before said, the twelve pitch-shafts, corresponding respectively to the twelve consecutive notes of the chromatic scale and each giving movement to the alternators that serve to produce the successive octaves of that note of the chromatic scale to which such pitch-shaft corresponds. Each of these pitch-shafts is mounted in suitable bearings, (preferably self-alining bearings, with ring oilers) 5, 5, supported by the pedestals 6, 6, that rise from the bed-plate 7, 7. This bed-plate, at least in the case of large machines, is preferably made of a plurality of sections, as 7, 7, supported on masonry and firmly bolted together. The bed-plate 7, 7, the bearings 5, 5, and the pedestals 6, 6, form no part of my invention and are not illustrated in detail in the drawings. They appear to some extent in Figs. 8, 9, and 10, but the bearings and pedestals are entirely omitted from Fig. 7 and the other figures, 64 to 81, which illustrate different arrangements of the gearing; and the bed-plate is omitted from most of these figures; and in all these figures the alternators carried by a pitch-shaft and which are clearly shown, so far as is essential to my invention, in Figs. 8 to 19, inclusive, are omitted. The twelve pitch-shafts, it will be seen, with the arrangement of gearing illustrated in Fig. 7, are arranged in four groups of three shafts each; and the three shafts of each group correspond to three consecutive notes of the chromatic scale. As the shafts are geared together in Fig. 7, movement applied to any one will move all. But the shaft 8, having at its opposite ends the toothed wheels 9 and 10, connects the four groups of pitch-shafts before mentioned; so that it is convenient to drive said shaft 8; for which purpose the electrical motor, 11, may be used, with its armature mounted on and keyed to said shaft; or any other motor or driving mechanism whatever that is suitable for the purpose may be used. In Fig. 7, as also in all the other figures that illustrate modifications of the gearing, a reference numeral consisting of figures followed by the letter T, indicates a gear-wheel having as many teeth as the number indicated by such figures: Thus $89^T$, applied as a reference numeral to a part, indicates that it is a gear-wheel having eighty-nine teeth; $84^T$, a gear-wheel with 84 teeth; $37^T$ and $44^T$, respectively, gear-wheels of 37 teeth and 44 teeth, respectively, and so on.

The twelve pitch-shafts $1^a$, $1^b$, etc., are arranged as before said, in four groups of three shafts each; the three shafts of each group corresponding to three consecutive notes of the chromatic scale. The first group consists of the shafts $1^a$, $1^b$, and $1^c$; the second, of the shafts $1^b$, $1^e$, and $1^f$; the third, of the shafts $1^g$, $1^h$, and $1^i$; and the fourth group, of the shafts $1^k$, $1^l$, and $1^m$. And in each of these groups, the lowest shaft (in pitch) of the group (the shaft $1^a$, in the first group; $1^d$, in the second; $1^g$, in the third; and $1^k$, in the fourth group) is connected with the middle shaft of its group, ($1^b$, in the first group, $1^e$, in the second; $1^h$, in the third; and $1^l$, in the fourth group) by a gear $89^T$, having 89 teeth, keyed fast to said lowest shaft and meshing with a gear $84^T$, having 84 teeth keyed fast to the middle shaft of the same group; and the middle shaft of each group ($1^b$, $1^e$, $1^h$ or $1^l$ as aforesaid) is connected with the highest shaft (in pitch) of its group, (the shaft $1^c$, for the first group; $1^f$, for the second; $1^i$, for the third and $1^m$ for the fourth group) by a gear $89^T$, having 89 teeth, keyed fast to said middle shaft and meshing with a gear $84^T$, having 84 teeth keyed fast to the highest shaft of the same group.

The shafts $1^a$, $1^b$ and $1^c$, constituting the first group, are driven by means of a gear $88^T$, keyed fast to the shaft $1^b$, having 88 teeth, and meshing with the gear wheel 9 that is keyed to the shaft 8; while the shafts $1^d$, $1^e$ and $1^f$, constituting the second group, are driven by means of a gear $74^T$, having 74 teeth, keyed fast to the shaft $1^e$ and also meshing with the gear wheel 9. But the third group of shafts ($1^g$, $1^h$ and $1^i$) and the fourth group ($1^k$, $1^l$ and $1^m$), respectively, are driven by the wheel 10 keyed to the shaft 8 and meshing with the gear $88^T$ of 88 teeth, keyed fast to the shaft $1^h$ and the gear $74^T$, of 74 teeth, geared fast to the shaft $1^l$. Supposing the alternators carried by each of the twelve pitch-shafts, $1^a$, $1^b$, $1^c$, $1^d$, $1^e$, $1^f$, $1^g$, $1^h$, $1^i$, $1^k$, $1^l$ and $1^m$ to be like (and in particular to produce the same numbers of cycles per revolution as) the corresponding alternators on each of the other pitch-shafts (in which case the only differences between the said twelve pitch-shafts, by which they are made to correspond respectively to the twelve notes of the chromatic scale, consist in the different angular velocities with which they are respectively driven, a condition of things which we shall term "Case A" to distinguish it from the other cases hereinafter explained) the wheels 9 and 10 may have respectively 128 and 181 teeth, or any equal multiples thereof as 256 and 362 teeth, respectively. And if the shaft 8 be driven with a speed of 233 revolutions per minute the twelve pitch-shafts, $1^a$, $1^b$, $1^c$, $1^d$, $1^e$, $1^f$, $1^g$, $1^h$, $1^i$, $1^k$, $1^l$, and $1^m$, will correspond respectively to the twelve consecutive notes of the chromatic scale founded on $c$; the shaft $1^a$ corresponding to the note $c$; $1^b$, to $c$-sharp or $d$-flat; $1^c$, to $d$; $1^d$, to $d$-sharp or $e$-flat; $1^e$, to $e$; $1^f$, to $f$; $1^g$, to $f$-sharp or $g$-flat; $1^h$, to $g$; $1^i$, to $g$-sharp or $a$-flat; $1^k$, to $a$; $1^l$, to $a$-sharp or $b$-flat; and $1^m$ to $b$; which makes the lowest note of the series of alternators before described, the $c$ ($C_1$) of 32 vibrations per second, (which is the lowest $c$ of the pianoforte), and the highest note, or at least the highest ground-tone, the $b$, seven octaves lacking one half-tone above the $c$ last mentioned. If the speed of the shaft 8 be altered, the pitches of all the notes will be altered together in exactly the same proportions. Thus, at a speed of 195.93 revolutions per minute, the shaft $1^a$, would correspond to the note $a$, making the lowest note of the instrument the low A of the piano, the A of 26.9 vibrations per second; at a speed of 293.63 revolutions per minute, to the note $e$, making the lowest note of the instrument the low orchestral E of 40.3 vibrations per second. The builder or user can drive the machine at whatever speed, within its safe working limits, may best suit his purposes, and at whatever speed the shaft 8 may be driven, the twelve shafts $1^a$, $1^b$, $1^c$, $1^d$, $1^e$, $1^f$, $1^g$, $1^h$, $1^i$, $1^k$, $1^l$, and $1^m$, will, as before said, correspond respectively to the twelve consecutive notes of the chromatic scale; and the ground-tone alternators 2, 2, (Figs. 8 to 17) carried by each such shaft, will produce the successive octaves of that note of the chromatic scale to which the pitch-shaft carrying them corresponds.

Any variation in the angular velocity of the series of shafts will produce, as before said, a corresponding alteration in the pitch of all, but the relative pitches of the various alternators will remain fixed and unchangeable: for all the twelve shafts $1^a$, $1^b$, etc., are geared together in such a manner that no change can be made in the angular velocity of any one shaft without a corresponding change being made in the angular velocity of all the others. This fixed and unchangeable relation of the notes of any given chord, this impossibility of the notes getting out of tune with one another without an actual breaking down of the machine, is, so far as I am aware, a new result never attained before in any electrical music apparatus, nor so far as I am aware in any commercially useful or musically meritorious musical instrument.

Numerous alterations may be made in the arrangement of the shafts and gearing without departing from certain of the essential principles, combinations or subcombinations belonging to my invention. Some of these alterations and modifications will be described hereinafter.

Of the alternators.

We have already stated the relative vibration-frequencies of the various alternators 2, 2, of the ground-tone set and also of the supplemental sets 3, 3, and 4, 4, when such supplemental sets are used. Any kind of alternator whatever that is suitable for the purpose may be used. But whatever kind of alternator be used, it is important that the successive cycles of any given alternator be similar, or at least that the periodic time of each wave be substantially the same as that of every other wave. For if the successive cycles of an alternator have materially unequal periodic times or if it generate simultaneously in its several armature coils, waves of unequal periodic times (which will happen if the pole pieces of such alternators as those illustrated in Figs. 11 and 12, or the teeth of the revolving inductors illustrated in Figs. 13 to 17 be unequally spaced) the effect upon the purity of the notes and especially upon the chords is liable to be disastrous. Inequalities may perhaps exist so minute as not to be sensibly prejudicial, and possibly some special effects might be produced in special cases by inequalities (I affirm nothing on that point); but at least for all ordinary purposes, it is, according to my experience, a safe rule to make the pole pieces 24, 24, and 25, 25, in Figs. 8, 10, 11 and 12 as nearly as is conveniently possible of equal sizes and disposed equidistant one from another. So also, while the different inductors illustrated in Figs. 8, 9 and 10, and 13 to 17 have preferably teeth of different sizes, each inductor should, in my judgment, to secure the best effect, have all its teeth as nearly as is conveniently possible of exactly equal size and exactly equidistant one from another. To this end, I have cut the teeth of the inductors that I have used in a large and carefully built gear-cutting machine, provided with a very accurate indexing mechanism, and in particular having a large and very accurate worm-wheel and worm.

Further, with such an arrangement of circuits as is illustrated in Figs. 3, 3$^A$, 5 and 6, (or in Figs. 46, 48, 49 and 61) it is desirable to construct the alternators in such a manner that they will produce sinusoidal or very nearly sinusoidal current waves, that is, current waves as free from harmonies as is practicable. But with some of the modifications of the apparatus hereinafter described, some irregular or non-sinusoidal shapes of waves are in my judgment as good as the sinusoidal waves, if not preferable to them.

The problem of constructing an alternator so that it will give a sinusoidal wave of voltage or of current is one that has received a great deal of attention from persons skilled in the art—from electrical engineers and alternator builders, and many alternators have been built whose waves of impressed voltage are very nearly sinusoidal. I shall therefore say nothing further on the subject here than that to produce a sine-wave of impressed voltage the rate of cutting of the lines of force by the armature coils or the rate of change of the magnetic flux through those coils should vary sinusoidally; that a close enough approximation to a sine-wave of impressed voltage, for most purposes, is easily obtained from an alternator having an armature of coils without iron, such as the two generators have that are illustrated to the left of Figs. 8 and 10 and in Figs. 11, 12, 12$^A$ and 12$^B$, and hereinafter described; and that with inductor alternators, such as are illustrated in Figs. 8, 9 and 10 and 13 to 19, the teeth of the rotating inductors should be curved (and it is common practice to curve them) so as to make the introduction of lines of force or of magnetic flux into the armature coils and the withdrawal of the same therefrom gradual; and that the point to be aimed at, in order to produce a sine-wave of impressed electro-motive force, is to so shape the curvature of the teeth of the inductor that the rate of cutting of lines of force by the armature coils, as the inductor revolves, shall vary sinusoidally. In the drawings, Figs. 13 to 19, no attempt has been made to illustrate the curvature of the teeth, as those figures are on too small a scale to admit of accurate representation of the curvature required, but in Fig. 18$^A$ one form of curved tooth is illustrated. But here two points are to be borne in mind, first, that in building an inductor alternator to produce a perfect or nearly perfect sine-wave, particularly if it be a small machine or one with small teeth, it is often (if not always) necessary first to cut the teeth with a view to producing the curve of impressed voltage desired; then to run the machine and to ascertain with the instruments usually used for that purpose the exact shape of its actual curve of impressed voltage, and then not infrequently to alter the cutters more or less (supposing the cutting to be done with milling cutters), and recut the teeth so as to produce more nearly the exact curve of impressed voltage desired. Secondly, it is to be understood that while I consider a sine-wave of impressed voltage as preferable in certain cases, as before stated, even in those cases an excellent musical effect may be produced when the wave of impressed voltage is not exactly sinusoidal and that in some of the modified constructions hereinafter described, I consider a wave that is not strictly sinusoidal to be preferable. And thirdly, the nature of the circuits upon which the alternators act is also very important as affecting the shape of the current wave. This matter is referred to more at length hereinafter.

As I have before said, any form of alternator whatever that is suitable for the purpose may be used. But for divers practical reasons, which it is not necessary to enlarge upon here, I have found it convenient to use inductor alternators for the higher tones and a different form of alternators, in some cases at least, for the lower tones. Figs. 8 to 17 show one convenient arrangement of alternators (out of many possible ones) for producing the successive octaves of one of the notes of the scale. 21, 22, and 23 (Figs. 8, 10, 11 and 12) are turned disks of iron or steel (preferably steel castings or iron or steel forgings) to which the iron or steel pole pieces 24, 24, belonging to the lowest or leftmost alternator, Figs. 8 and 10, and 25, 25, belonging to the second alternator, Figs. 8 and 10, are suitably attached, as for example by the nuts 26, 26, and washers 26$^a$, 26$^a$. The pole pieces 24, carried by the disk 21, are exactly opposite the corresponding pole-pieces 24, carried by the disk 22; and the pole-pieces 25 carried by the disk 23 are exactly opposite the corresponding pole-pieces 25 carried by the disk 22. Exciting coils 27, 27, are wound upon the pole-pieces 24, 24, and similar coils 28, 28, are wound upon the pole-pieces 25, 25. The coils 27, 27, are connected together in series or in parallel (preferably in series) and have their opposite terminals connected to the insulated contact rings 29, 29, upon which the brushes 30, 30, bear, which are connected through a rheostat 12, Fig. 8, with the opposite poles of a direct current dynamo 31, or other suitable electric source. The exciting coils 28, 28, have their opposite terminals connected to similar insulated contact-rings 29, 29, upon which other brushes bear that are connected through a similar rheostat 12, with the opposite poles of the exciting dynamo 31, before mentioned. In the air gap or space between the poles 24, 24, and 25, 25, lie the armature coils 32, 32, made preferably of insulated copper ribbon or strip, wound upon cores 32$^a$, 32$^a$, of vulcanite or other suitable insulating material. To give greater strength and stiffness to the coils 32, 32, the copper ribbon or strip out of which they are wound, and the external surface of the cores upon which they are wound, are preferably a little curved, as illustrated, for example, in section in Fig. 12$^B$. And to prevent the ribbon out of which the coil is wound from unwinding, the coil may be securely wrapped with binding wire at 32$^b$, as illustrated in Fig. 12$^A$, the binding wire being well insulated from the coil about which it is wrapped and being soldered together in the usual manner to prevent it from unwrapping. Each of the coils 32 is firmly attached by a segmental clamp 33, to the stiff fixed ring 35; a bolt 34, passing through said clamp 33 and the core 32$^a$ and ring 35, with a tightening nut 34$^a$ by which the coil 32 is locked firmly in place. Pieces of hard fiber or other suitable insulating material, 32$^c$ and 32$^d$, (Figs. 12$^A$ and 12$^B$), are interposed between the coil 32 and the segmental clamp 33 and ring 35 respectively. The segmental clamp 33 is provided with two ears or lugs 33$^a$, 33$^a$, to engage the outer surface of the ring 35 and these lugs, with the bolt 34, hold the clamp 33 in place. The ring 35 is preferably made of bronze, German silver or other non-magnetic material and is firmly bolted to the cast iron foot 35$^a$, which is in turn bolted to the bed-plate 7.

The exciting coils 27 and 28 are wound in such a manner ($a$) that each of the poles 24, 25, on the disks 21 and 23 is of opposite polarity to the pole facing it on the disk 22; ($b$) that, advancing circumferentially, the successive poles 24, 24, are alternately of opposite polarity, while ($c$) all the pole-pieces 25 carried by the disk 22 are of one polarity and all the pole-pieces carried by the disk 23 are of the opposite polarity. In the drawings, Figs. 8, 11 and 12, the differing polarities are indicated by the letters N, signifying north pole, and S, signifying south pole. The purpose and the result of the arrangement described is that with every revolution of the pitch-shaft carrying them, the six pairs of pole-pieces 24, 24, belonging to the leftmost alternator, Figs. 8 and 10, produce three cycles or complete electrical vibrations, in the armature coils 32, 32, that lie in the gap between said pole-pieces 24, 24; while the six pairs of pole-pieces 25, 25, belonging to the next adjacent alternator produce just twice as many electrical vibrations per revolution in the armature-coils 32, 32, that lie in the gap between said pole-pieces 25, 25.

The armature-coils 32, 32, that lie in the gap between the pole-pieces 24, 24, are connected together into one series in such a manner, according to the known rules of the electrical art, that the voltage in one reinforces the voltage in another.

The armature-coils 32, 32, that lie in the gap between the pole-pieces 25, 25, are arranged in two groups, one to furnish the ground-tone of the note to which the alternator of which such coils form part corresponds; the other group to furnish the second-partial of the note an octave below such note. The several coils of each of these groups are connected together in series so that the voltage in each reinforces that in the other.

The general type of alternator just described, having a disk armature, without iron, in the air-gap between opposite sets of pole-pieces, may be used, if desired, to produce some of the tones of the middle compass as well as the tones of lower range; the number of pole-pieces being doubled with each ascending octave. But in many cases, if not in all, it will probably be found more convenient to use, for the tones of the middle as well as the higher compass, alternators having rotating iron armatures or inductors.

Figs. 8 to 10 and 13 to 17 illustrate one arrangement of inductor-alternators for giving the higher octaves of the notes produced by the bass-generators, illustrated to the left of Figs. 8 and 10 and in Figs. 11 and 12, and already described. In each of these inductor-alternators there is (a) a rotating inductor 36, formed of thin plates of soft iron or steel suitably insulated from each other, bolted together between the stiffening side plates 37, 37, and keyed to the shaft 1ª, or 1ᵇ, etc., to rotate therewith; (b) a plurality of field poles 38, 38, of alternate north and south polarity, each having an exciting winding 39 wound about it, and a plurality of armature coils 40, 40, wound in slots formed in the polar face of the field pole, in immediate proximity to the rotating inductor 36; and (c) a suitable frame 43, preferably of annular internal shape, to which the pole-pieces 38, 38, are secured by the I-shaped keys 44, 44, shown in the drawings, or in any other suitable manner.

The stiffening side plates 37, 37, are separated from the iron or steel plates of the inductor 36, by annular plates or rings 37ª, 37ª, of German silver or other suitable nonmagnetic material, to prevent or reduce to a minimum the production of Foucault or eddy currents in said plates 37, 37. To prevent the production of such currents in the shaft 1ª, 1ᵇ, etc., a sleeve of German silver 37ᵇ is interposed between said shaft and each of the inductors 36; or said inductors may be mounted on spiders carried by said shaft.

Figure 14:
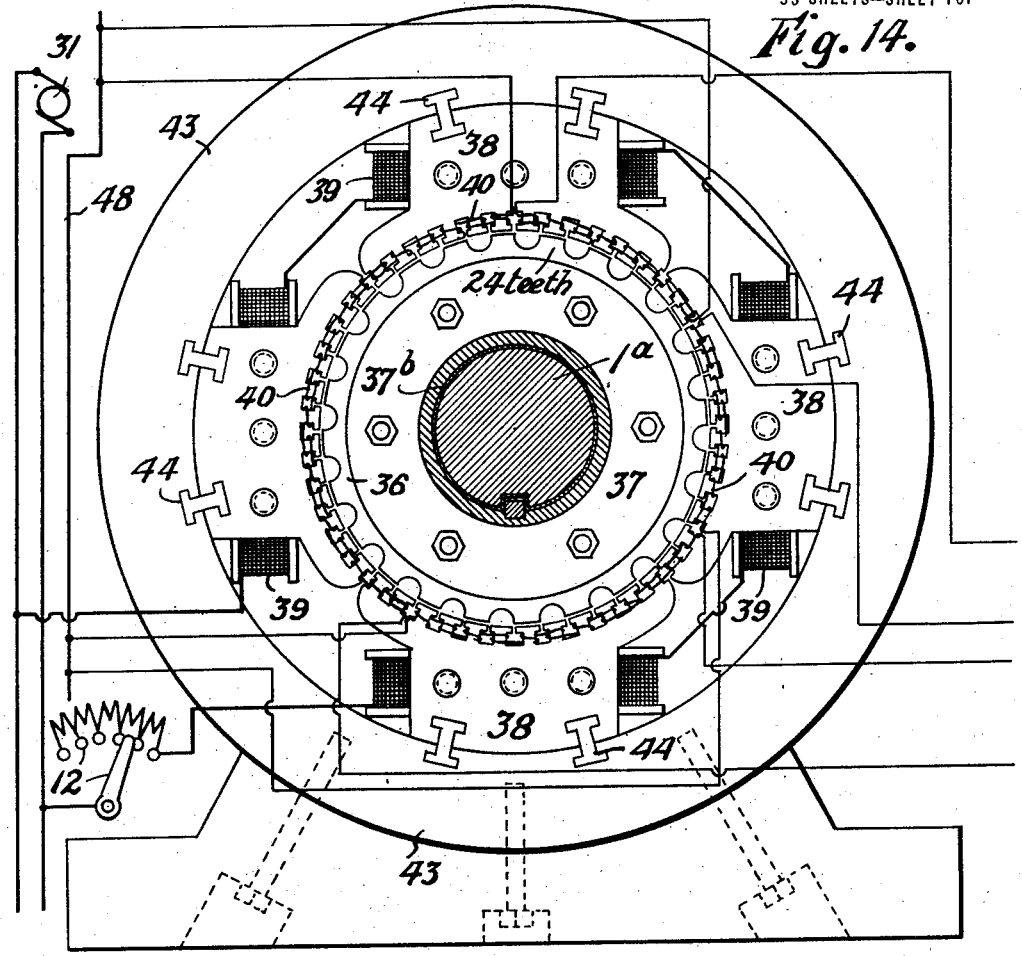

The five inductors illustrated in Figs. 8 and 10 (and in detail respectively in Figs. 13, 14, 15, 16 and 17) have respectively, 12, 24, 48, 96, and 192 teeth, and each of them makes as many complete electrical vibrations per revolution as it has teeth. For a given angular space there are, it will be observed, two armature teeth on the field poles 38, Figs. 13, 14, 15 and 16, for each tooth of the inductor lying in the same angular space. The armature coils 40, 40, belonging to a single inductor, may be, and we shall suppose are, connected together in series, in groups, as illustrated in Fig. 14; in which case, the several coils of a group should be connected together in such a manner that the voltage in each reinforces the voltage in the others. Thus, for example, the coils 40, surrounding the first, third, fifth, and other odd-numbered teeth of a given field-pole, should be wound in one direction and the similar coils surrounding the second, fourth, sixth and other even-numbered teeth of the same field-pole, should be wound in the opposite direction. For as the magnetic flux increases in the first, third and fifth coils, it decreases in the second, fourth and sixth coils, and vice versa. And the various groups of coils 40, 40, belonging to a given alternator but controlled by different keys 45, 45, should have their like terminals connected with the common-return wire 48, and their other terminals (like to each other but opposite in polarity to the terminals first mentioned) connected with the appropriate contact-springs 49, 49ª, etc. (or with their equivalents, the switches 282, 282ª, etc.), so that when a plurality of keys act to throw vibrations upon the line from different circuits, fed by the same alternator, those vibrations will reinforce each other in the effect they produce upon the line and vibration-translating devices and upon the ear, instead of counteracting each other, as they would do, if the connections were incorrectly made. And the energizing coils 39, 39, upon the field poles 38, 38, surrounding any given inductor 36, are connected and wound in such a manner that the current flows around the adjacent field poles 38, 38, in opposite directions, so that these field poles are alternately of opposite sign; each north pole having a south pole on each side of it and each south pole, a north pole on each side of it.

Figure 15:
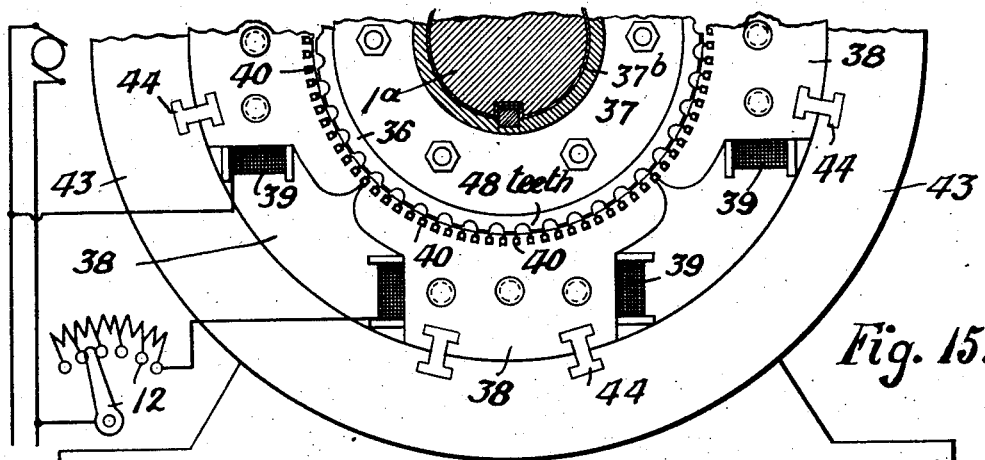

Except in very large machines, the inductors 36, 36, Figs. 15, 16 and 17, must have small teeth. To avoid the difficulty of winding these small teeth each with its own coil as illustrated in Figs. 13 and 14, we may pass a single insulated conductor, as in Fig. 15, (or a plurality of such conductors) forward through one armature slot between two contiguous teeth and backward through the next adjacent slot—passing the winding forward through the first, third, fifth, seventh slots, etc., and backward through the second, fourth, sixth, eighth slots, etc.; or we may arrange the teeth in groups and wind a single coil on each such group; the groups being preferably arranged in such a manner that the total magnetic flux through a given field pole 38 remains constant. One arrangement for this purpose is illustrated in Fig. 17, in which the several groups of teeth, formed upon a given field-pole 38, it will be observed, are so placed with relation to each other and with relation to the teeth of the corresponding inductor 36, that when the magnetic flux increases in the teeth of the first, third and fifth, etc., groups, it decreases in the teeth of the second, fourth and sixth, etc., groups, and vice versa. The coils wound about the stems of the teeth of the first, third and fifth, etc., groups, should, therefore, be wound in one direction, while the similar coils wound about the stems of the teeth of the second, fourth and sixth, etc., groups should be wound in the opposite direction.

For producing the third partials of the notes whose ground-tones are supplied respectively by the alternators illustrated in Figs. 11, 12, 13, 14, 15 and 16, respectively, we may employ, for example, inductor alternators in general similar to those already described but having, respectively, 9, 18, 36, 72, 144 and 288 teeth, as illustrated schematically in Fig. 9; and for producing the fifth partials of the notes whose ground-tones are supplied, respectively, by the alternators illustrated in Figs. 11, 12, 13, 14 and 15, respectively, we may employ, for example, inductor alternators in general similar to those already described, but having, respectively, 15, 30, 60, 120 and 240 teeth, as illustrated schematically in Fig. 9. But, as before said, it is to be understood that a set of ground-tone alternators, as illustrated, for example, in Figs. 8 and 10 and in Figs. 11 to 17, may be used, if desired, and the supplemental sets of alternators for producing the third and fifth partials, illustrated, for example, in Fig. 9, be entirely dispensed with; all which is more fully explained hereinafter.

Figs. 8 to 17 illustrate the alternators that may be used for producing the successive octaves of a single note of the chromatic scale, and which successive octaves have vibration frequencies of $n$, $2n$, $4n$, $8n$, $16n$, $32n$, and $64n$, respectively. For each of the other 11 notes of the chromatic scale a similar set of alternators may be used, the twelve similar sets of alternators carried by the twelve pitch-shafts $1^a$, $1^b$, etc., being made to give each its appropriate note by the different angular velocities with which said shafts are driven by suitable gearing, as, for example, that illustrated in Fig. 7 and already described.

Of the electrical circuits.

We are now in a position to explain the electrical circuits. Let us first consider the schematic views, Figs. 1 and 2, which show a single set of circuits, each key controlling one circuit only. 2, 2 are the ground-tone alternators before described as mounted on the twelve pitch-shafts $1^a$, $1^b$, etc. (Figs. 7 and 8 to 17), and having vibration frequencies corresponding, respectively, to consecutive notes of a musical scale; the several alternators on any given shaft having vibration frequencies standing to each other as 1, 2, 4, 8, 16, 32 and 64, respectively, and, with the construction illustrated in Figs. 8, 10, and 11 to 17, producing, respectively, 3, 6, 12, 24, 48, 96 and 192 cycles per revolution of the pitch-shaft carrying them; and the twelve pitch-shafts $1^a$, $1^b$, etc., having, as before described, angular velocities corresponding, respectively, to the vibration frequencies of the twelve notes of the chromatic scale in equal temperament. The result of this arrangement is that the seven alternators 2, 2, of the principal or ground-tone set (Figs. 8, 10, and 11 to 17), produce the seven successive octaves of that note of the chromatic scale to which the pitch-shaft carrying them corresponds and for which it serves. Thus the seven alternators of the ground-tone set (Figs. 8, 10, and 11 to 17) carried by the pitch-shaft corresponding to $c$ produce, respectively, the seven octaves of $c$; the seven similar alternators carried by the pitch-shaft corresponding to $c$-sharp produce, respectively, the seven octaves of $c$-sharp; the seven carried by the pitch-shaft corresponding to the note $d$, produce the seven octaves of $d$, and so on. While the twelve alternators of the kind illustrated in Fig. 11 carried by the twelve pitch-shafts, $1^a$, $1^b$, etc., respectively produce the lowest twelve half-tones or lowest octave of the instrument, the twelve alternators of the kind illustrated in Fig. 12, carried by the twelve pitch-shafts, respectively, produce the next twelve half-tones, or second octave, in the ascending scale; the twelve alternators like Fig. 13, the third octave; the twelve alternators, like Fig. 14, the fourth octave; the twelve alternators of the kind illustrated in Fig. 15, the fifth octave; the twelve alternators like that illustrated in Fig. 16, the sixth octave, in the ascending scale; while, finally, the twelve alternators like that illustrated in Fig. 17, and carried by the twelve pitch-shafts, respectively, produce the next twelve half-tones, or seventh octave, in the ascending scale.

Returning to the schematic views, Figs. 1 and 2: 45, 45, are the keys at the keyboard, centered at 46 on the bar 47, and which are preferably arranged like the keys of a pianoforte or organ; though of course it is to be understood that any other suitable arrangement of keys, or of switches, or of circuit-controlling devices, may be used instead. For greater convenience of construction, each of the alternators 2, 2, has one pole connected with the common-return wire 48, while the other pole is connected with a contact spring 49, which is attached by the screw 50, or in any other suitable manner, to the insulating bar 51. Each of the contact springs 49 carries a platinum contact point 52, which makes contact, when the corresponding key 45 is depressed, with a similar contact point set in the screw 53; which latter is adjustable by a lock-nut in the metal bar 54. The circuit is completed (if any of the switches 55, 55, or 55ª be closed), through the primary coil 56, which lies in inductive relation to the secondary coil 58, in the circuit of which are (*a*) the impedance coils 60, 60, controlled by the brushes or contact fingers 61, 61, of the electrical swell device (Figs. 1 and 28 to 33), and (*b*) the primary coil 62, which lies in inductive relation to the secondary 63, in the circuit of which latter are (*i*) the primary 64, which acts by induction on the secondary 65, and (*ii*) the set of impedance coils 66, 66, controlled by the keys 67, 67, of the dynamic manual. To the opposite terminals of the secondary coil 65 last mentioned are connected the line wires or mains 68 and 69, across which the vibration-translating devices 70, 70 (by which the electrical vibrations are translated into audible vibrations) may be connected, as illustrated, for example, in Fig. 1. 71, 72 and 73 is a rheostat in series with the vibration-translating device 70, and by means of which the loudness of the sounds produced by each vibration-translating device may be controlled independently of the other vibration-translating devices, so that each subscriber can control at will the loudness of the music produced upon his premises. 71 are the impedance coils of said rheostat; 72 the contact-plates or contact buttons, with which said coils are connected; and 73 is the contact brush or rheostat handle, by manipulating which the several coils 71 are inserted in the circuit or cut out of it as required.

The effect of the arrangement described is such that if any key 45 of the key-board is depressed, the alternator whose vibration frequency is identical with that of the note for which such key stands has its circuit closed through the contact spring 49, controlled by such key depressed, the screw 53 corresponding to such spring, the metal bar 54, in which such screw is set, the primary coil 56, the switches 55 or 55ª, and the common-return bar 48. And the vibratory currents which circulate through the primary coil 56, act by induction on the circuit containing the coils 58 and 62; which circuit acts by induction on the secondary coil 63, with which its primary 62 is in inductive relation; and the circuit containing the coils 63 and 64 acts inductively, if one of the dynamic keys 67, 67, be depressed or closed, upon the secondary 65, which, through the line wires or mains 68 and 69, transmits its vibrations to the vibration-translating devices, 70, 70, which may be located in places miles apart, and by which the electrical vibrations are converted into audible aerial vibrations. If a plurality of keys be depressed simultaneously, the alternators corresponding to those keys act, each in the manner already described, to produce its appropriate note in the vibration-translating devices 70, 70.

Obviously, if we were content to dispense with the expression devices which have been briefly described, such as the switches 55, 55ª, the rheostat 60, 60, and 61 and the dynamic manual, the line wires or mains 68 and 69 across which the vibration-translating devices 70, 70, are connected might be connected directly, one to the common-return bar 48 and the other to the conducting bar 54, in which the contact screws 53, 53, are set; or the vibration-translating devices 70, 70, might be fed in any other manner that is suitable to the purpose, by the vibratory currents which flow in the alternator circuits when the keys 45, 45, are depressed. On dispensing only with the switches 55, 55 and 55ª, and the coils 56, 58 and 120, we may connect one terminal of the coil 62 to the bar 54 and the other to the common-return wire 48, through the coils 60, 60, contact-buttons 130, brush 61, thus retaining the electrical swell device and the dynamic manual, as illustrated in the drawings. With such an apparatus as that illustrated in Figs. 1 and 2, musical notes and chords may be produced, and the expression may be controlled within certain limits.

But more satisfactory results can be produced by building up a composite musical note in the manner which we shall now describe, with reference particularly to Figs. 3, 3ᴬ, 4, 5 and 6. Fig. 3, it will be remembered, illustrates the vibration-generating devices and keys for the successive octaves of one single note of the scale only; the similar generators and keys used for the successive octaves of each of the other notes of the scale being of necessity omitted, on account of the smallness of the sheet and to prevent confusion of the numerous lines illustrating the various circuits, while Fig. 3ᴬ, illustrates more clearly a portion of the circuits of Fig. 3. 2, 2, are the ground-tone alternators, from which the ground-tones and the second, fourth, eighth and sixteenth partials are derived; 3, 3, are the third partial alternators, from which the third, sixth and twelfth partials are derived; and 4, 4, are the fifth partial alternators, from which the fifth and tenth partials are derived. The alternators which stand on the same horizontal level in the drawings (Figs. 3, 3ᴬ, and 5) serve, respectively, to furnish the first, third and fifth partials of the same note, or it may be the second, sixth and tenth partials. Let us first explain the arrangement of parts for one keyboard, after which the arrangement for the other keyboards will be easily understood. Each alternator, it will be observed, subject to certain exceptions hereinafter pointed out, has a plurality of windings, serving respectively for partial tones of different orders, but all of the same periodicity, and has one end of each winding connected with the common-return bar 48 and has the other end of each winding connected with the appropriate contact spring, 49, or 49$^a$, 49$^b$, 49$^c$, 49$^d$, 49$^e$, 49$^f$, 49$^g$, 49$^h$, 49$^i$, as the case may be, the different windings being connected respectively with different springs 49, 49$^a$, 49$^b$, etc., operated by keys 45, 45, that correspond to different octaves of the same note; so that each alternator, subject to the exceptions hereinafter mentioned, furnishes a partial-tone of one order to one key and a partial-tone of another order to another key. One alternator, with its plurality of windings, is illustrated geometrically in Fig. 14, but in the diagrammatic or schematic views Figs. 3, 3$^A$ and 5, each alternator is represented diagrammatically by a plurality of concentric circles (corresponding to real or imaginary contact-rings or slip-rings of the kind in universal use in those alternators in which the armature coils revolve), with brushes bearing thereon. The outer or heavier circle in the schematic views represents the contact-ring or other armature terminal to which the like ends of all the armature windings of an alternator are connected; while the inner circles represent each the other terminal of one of the windings. With this explanation the reader may find it easier to follow the drawing. Each key, Figs. 3, 3$^A$, 4 and 5 (excepting the keys of the highest octaves) controls a group of contact-springs (49, 49$^a$, 49$^b$, 49$^c$, 49$^d$, 49$^e$, 49$^f$, 49$^g$, 49$^h$, and 49$^i$), which correspond respectively to different partial-tones of the note for which such key stands; and these springs make electrical connection, when the corresponding key is depressed, with the contact screws 53, set respectively in the metal bars 54, 54$^a$, 54$^b$, 54$^c$, 54$^d$, 54$^e$, 54$^f$, 54$^g$, 54$^h$, and 54$^i$, which bars are insulated one from another and correspond respectively to and serve respectively for, the first, second, third, fourth, fifth, sixth, eighth, tenth, twelfth and sixteenth orders of partial tones. Each of the contact springs, 49, 49$^a$, 49$^b$, etc., is connected with the proper alternator, as illustrated in the drawing; so that the several contact springs 49, 49$^a$, 49$^b$, 49$^c$, 49$^d$, 49$^e$, 49$^f$, 49$^g$, 49$^h$, and 49$^i$, controlled by any given key, are connected respectively with the alternators that give the first, second, third, fourth, fifth, sixth, eighth, tenth, twelfth, and sixteenth partials of the note to which the key controlling them corresponds. If the alternator with which the spring 49, controlled by a given key, is connected, has a frequency of $n$, then the alternator with which the other springs 49$^a$, 49$^b$, 49$^c$, 49$^d$, 49$^e$, 49$^f$, 49$^g$, 49$^h$, and 49$^i$, controlled by said key, are respectively connected, have frequencies respectively of $2n$, $3n$, $4n$, $5n$, $6n$, $8n$, $10n$, $12n$, and $16n$. The bars 54, 54$^a$, 54$^b$, 54$^c$, 54$^d$, 54$^e$, 54$^f$, 54$^g$, 54$^h$, and 54$^i$, (with which the springs 49, 49$^a$, 49$^b$, 49$^c$, 49$^d$, 49$^e$, 49$^f$, 49$^g$, 49$^h$, and 49$^i$, respectively, make contact) have their circuits closed respectively through the corresponding primary coils 56, 56$^a$, 56$^b$, 56$^c$, 56$^d$, 56$^e$, 56$^f$, 56$^g$, 56$^h$, and 56$^i$, the impedance coils 120, 120, or the wires of small or negligible impedance 120$^a$, the switches 55, 55, or 55$^a$, 55$^a$, and the common-return wire 48.

Thus, it will be seen, the several contact-springs as 49, 49$^a$, 49$^b$, etc. (or their equivalents, the circuit-controlling switches, 282, 282$^a$, 282$^b$, etc., illustrated in Figs. 38, 39, 41 and 42, and hereinafter described), controlled by any key, 45, correspond respectively to different partial tones of the note for which such key stands. In like manner the bars 54, 54$^a$, 54$^b$, 54$^c$, 54$^d$, 54$^e$, 54$^f$, 54$^g$, 54$^h$ and 54$^i$ (Figs. 3, 3$^A$, 4, 5, 6, 38, 39, 43 and 44), belonging to a keyboard, with the primary coils 56, 56$^a$, 56$^b$, 56$^c$, 56$^d$, 56$^e$, 56$^f$, 56$^g$, 56$^h$ and 56$^i$, connected respectively with them, correspond respectively to the first, second, third, fourth, fifth, sixth, eighth, tenth, twelfth and sixteenth orders of partial tones respectively. And all the contact springs, corresponding to first partials, belonging to a keyboard and controlled by the different keys of that keyboard, close the circuit of the appropriate alternator when the corresponding key 45 is depressed, through the first-partial bar 54 and the first-partial coil 56; all the contact springs of a keyboard, corresponding to second partials, close circuit through the second-partial bar 54$^a$ and second-partial coil 56$^a$; all corresponding to third partials, through the third-partial bar 54$^b$ and the third-partial coil 56$^b$; all corresponding to fourth partials through the bar 54$^c$ and coil 56$^c$; all corresponding to fifth partials, through the bar 54$^d$ and coil 56$^d$; all corresponding to sixth partials, through the bar 54$^e$ and coil 56$^e$; all corresponding to eighth partials, through the bar 54$^f$ and coil 56$^f$; all corresponding to tenth partials, through the bar 54$^g$ and coil 56$^g$; all corresponding to twelfth partials, through the bar 54$^h$ and coil 56$^h$; and all corresponding to sixteenth partials through the bar 54$^i$ and coil 56$^i$.

Each of the alternators of the ground-tone set supplies the ground tone to one note, the second partial to the note an octave below, the fourth partial to the note two octaves below, the eighth partial to the note three octaves below, and the sixteenth partial to the note four octaves below; subject to the exception that where there is no note in the compass of the instrument four octaves below the pitch of an alternator to which it might supply a sixteenth partial, or three octaves below, to which it might supply an eighth partial, or two octaves below, to which it might supply the fourth partial, or one octave below to which it might supply a second partial, such alternator does not furnish such sixteenth, eighth, fourth, or second partial, as the case may be. And each of the alternators 3, 3, of the third partial set supplies the third partial to one note, the sixth partial to the note an octave below it, and the twelfth partial to the note two octaves below it; subject, of course, to the exception that where there is no note in the compass of the instrument two octaves below that to which the third partial alternator supplies the third partial, to which it might supply a twelfth partial, or one octave below, to which it might supply a sixth partial, such alternator does not supply such twelfth or sixth partial, as the case may be. And each of the alternators 4, 4, of the fifth partial set supplies the fifth partial to one note, and it also supplies the tenth partial to the note an octave below such note, except where there is no such note an octave below it in the compass of the instrument, to which a tenth partial might be supplied.

Such is the general rule; but to illustrate a specific case, let us assume, with reference to Fig. 3, that the keys 45, 45, shown correspond to the seven successive octaves of $c$, which may be written, ascending from the lowest to the highest, as $C_1$, C, $c$, $c^i$, $c^{ii}$, $c^{iii}$, and $c^{iv}$, and whose notes have relative vibration-frequencies which we may represent by $n$, $2n$, $4n$, $8n$, $16n$, $32n$, and $64n$, respectively, and whose numbers of complete vibrations per second may be represented arithmetically with sufficient accuracy by the numbers 32, 64, 128, 256, 512, 1024, and 2048, respectively. The alternator having a vibration frequency of $64n$ or of 2048 vibrations per second supplies the ground-tone to the $c$ of 2048 vibrations ($c^{iv}$); the second partial to the $c$ of 1024 vibrations ($c^{iii}$); the fourth partial to the $c$ of 512 vibrations ($c^{ii}$); the eighth partial to the $c$ of 256 vibrations ($c^i$), and the sixteenth partial to the $c$ of 128 vibrations ($c$). The alternator which has a frequency of 1024 vibrations per second supplies the ground-tone to the $c$ of 1024 vibrations ($c^{iii}$); the second partial to the $c$ of 512 vibrations ($c^{ii}$); the fourth partial to the $c$ of 256 vibrations ($c^i$); the eighth partial to the $c$ of 128 vibrations ($c$); and the sixteenth partial to the $c$ of 64 vibrations (C). The alternator of 512 vibrations per second supplies the ground-tone to the $c$ of 512 vibrations ($c^{ii}$); the second partial to the $c$ of 256 vibrations ($c^i$); the fourth partial to the $c$ of 128 vibrations ($c$); the eighth partial to the $c$ of 64 vibrations (C); and the sixteenth partial to the C of 32 vibrations ($C_1$). The alternator having a frequency of 256 vibrations per second supplies the ground-tone to the $c$ of 256 vibrations per second ($c^i$); the second partial to the $c$ of 128 vibrations per second ($c$); the fourth partial to the $c$ of 64 vibrations (C); and the eighth partial to the $c$ of 32 vibrations ($C_1$). The alternator having a frequency of 128 vibrations per second supplies the ground-tone to the $c$ of 128 vibrations ($c$); the second partial to the $c$ of 64 vibrations (C); and the fourth partial to the $c$ of 32 vibrations ($C_1$). The alternator having a frequency of 64 vibrations per second supplies the ground-tone to the $c$ of 64 vibrations (C); and the second partial to the $c$ of 32 vibrations ($C_1$). While the alternator having a frequency of 32 vibrations per second merely supplies the ground-tone to the C of 32 vibrations per second ($C_1$). In like manner, the alternator having a frequency of $96n$, (Fig. 3) or of 3072 vibrations per second supplies the third partial to the $c$ of 1024 vibrations per second ($c^{iii}$); the sixth partial to the $c$ of 512 vibrations ($c^{ii}$); and the twelfth partial to the $c$ of 256 vibrations ($c^i$). The alternator of frequency $48n$ (Fig. 3) or of 1536 vibrations per second supplies the third partial to the $c$ of 512 vibrations ($c^{ii}$); the sixth partial to the $c$ of 256 vibrations ($c^i$); and the twelfth partial to the $c$ of 128 vibrations ($c$). The alternator having a frequency of $24n$ (Fig. 3) or of 768 vibrations per second, supplies the third partial to the $c$ of 256 vibrations ($c^i$); the sixth partial to the $c$ of 128 vibrations ($c$); and the twelfth partial to the $c$ of 64 vibrations (C). The alternator of frequency $12n$ (Fig. 3) or of 384 vibrations per second supplies the third partial to the $c$ of 128 vibrations per second ($c$); the sixth partial to the $c$ of 64 vibrations (C); and the twelfth partial to the $c$ of 32 vibrations ($C_1$). The alternator of frequency $6n$ (Fig. 3) or of 192 vibrations per second, supplies the third partial to the $c$ of 64 vibrations (C), and the sixth partial to the $c$ of 32 vibrations ($C_1$). While the alternator of frequency $3n$ (Fig. 3) or of 96 vibrations per second, merely supplies the third partial to the $c$ of 32 vibrations ($C_1$). In like manner, the fifth partial alternators of frequencies $80n$, $40n$, $20n$, and $10n$, (Fig. 3) and which have for the note $c$ vibration frequencies of 2560, 1280, 640, and 320 per second respectively, supply respectively, the fifth partials to the C's of 512, 256, 128 and 64 vibrations respectively and the tenth partials to the $c$'s of 256, 128, 64, and 32 vibrations respectively; while the fifth partial alternator (Fig. 3) having a vibration frequency of $5n$ or in the case supposed, of 160 periods a second merely supplies the fifth partial to the c of 32 vibrations ($C_1$). And what is true of one of the notes of the chromatic scale, as illustrated in (Fig. 3) and just described is equally true of the other eleven notes of that scale, *mutatis mutandis*.

It will be observed that the higher partials fail in the upper part of the compass. Thus, with the exact arrangement of parts illustrated in the drawings, the key 45 corresponding to the note $c^{iv}$ of 2048 vibrations per second, controls a ground tone or first-partial alternator only; and the same is true of all the keys corresponding to notes of higher pitch; the keys corresponding to notes from the c of 1028 vibrations ($c^{iii}$) to the b eleven half-tones above it, each controls only alternators corresponding to its first, second and third partials; the keys corresponding to notes from the c of 512 vibrations ($c^{ii}$) to the b eleven half-tones above it, each controls alternators corresponding to its first, second, third, fourth, fifth, and sixth partials; the keys corresponding to notes from the c of 256 vibrations ($c^i$) to the b eleven half-tones above it, each controls alternators corresponding to its first, second, third, fourth, fifth, sixth, eighth, tenth and twelfth partials; while all the keys corresponding to notes below the c of 256 vibrations ($c^i$) each controls alternators having vibration frequencies corresponding to its first, second, third, fourth, fifth, sixth, eighth, tenth, twelfth and sixteenth partials. But first, it is to be observed that the range of the manuals illustrated in the drawings, of seven octaves lacking one-half tone, is considerably greater than the range of the keyboards of an organ; secondly, in my judgment it is not objectionable to have the higher over-tones fail when the pitch of the notes is very high, for the presence of high over-tones in very high notes tends to make them sharp and cutting; thirdly, we have partials as high as the sixteenth for all notes below the c of 256 vibrations (middle c); as high as the twelfth for all notes below the c of 512 vibrations; as high as the sixth for all notes below the c of 1024 vibrations; (and the vast majority of the notes played in any ordinary composition are below that c); while we have the first, second and third partials for all notes below the c of 2048 vibrations; fourthly, unless the alternators are constructed to produce perfectly sinusoidal waves, some weak harmonics (usually at least the third or fifth partial) will be present even in the waves of the ground-tone set of alternators; and fifthly, so far as the principle of my invention is concerned, and except for the mechanical and electrical difficulties involved in generators for producing such very rapid vibrations, and perhaps in the receivers for properly translating them, we might remedy the difficulty, if difficulty it be, by carrying the series of alternators, both of the ground-tone set and also of the supplemental sets for producing third and fifth partials, as much higher as may be required.

*Of the means for controlling the timbre or quality of the notes produced.*

Whether one key be depressed alone, or a plurality of keys simultaneously, all the first partials or ground-tone vibrations, it will be observed, vibrate, supposing the several switches 55, 55, 55$^a$, 55$^a$, to be closed, through the coil 56; all the second partial vibrations through the coil 56$^a$; all the third partials, through the coil 56$^b$; all the fourth partials, through the coil 56$^c$; all the fifth partials, through the coil 56$^d$; all the sixth partials, through the coil 56$^e$; all the eighth partials, through the coil 56$^f$; all the tenth partials, through the coil 56$^g$; all the twelfth partials through the coil 56$^h$; and all the sixteenth partials, through the coil 56$^i$; and all these coils act by induction upon the circuit which contains the secondary coil 58, the impedance coils 60, 60, and the primary coil 62; which circuit acts by induction, through the coil 62 on the coil 63; which latter is in series with the coil 64, which in turn acts by induction on the coil 65, with which the mains 68 and 69 are connected, and by which the vibration-translating devices 70, 70, are fed.

In series with each of the coils 56, 56$^a$, 56$^b$, 56$^c$, 56$^d$, 56$^e$, 56$^f$, 56$^g$, 56$^h$ and 56$^i$ and in parallel with each other is a group of impedance coils 120, 120, 120, (Figs. 3, 3$^A$, 5 and 6), the circuits of which may be closed, as required, by the switches 55, and in parallel with each group of these impedance coils 120, 120, is a conductor 120$^a$, of negligible impedance, the circuit of which is opened or closed, as required, by the switch 55$^a$. A greater or less number of the impedance coils may be used in each group, as the builder thinks best. A few only are illustrated in the drawings. Seven or eight in each group will, in my judgment, serve practically as well, in most cases, as a larger number. The exact amounts of ohmic resistance and of self-induction of these coils 120, 120, is not important, but I consider it preferable to give to each of said coils, if a large number be used in a group, and all the members of a group be made to be exactly alike, at least as much ohmic resistance and self-induction as the ohmic resistance and self-induction of the primary coil 56, or 56$^a$ or 56$^b$, in circuit with which they are connected, multiplied by a number not less than one-half the number of the coils 120, 120, in such group.

If in the case supposed, we indicate the ohmic resistance of the primary coil 56, or 56$^a$ or 56$^b$, etc., as the case may be, by R, and its self-induction by L, and the number of impedance coils 120, 120, similar to one another, by $n$, then, in such case I would consider it preferable to give to each of said coils an amount of ohmic resistance not less than $\frac{R}{2}$, and an amount of self-induction not less than $\frac{Ln}{2}$.

Greater amounts of ohmic resistance and of self-induction than this may be given to the similar coils 120, 120, particularly if there be a large number of them, or less amounts may be given, and still some effect of control be exercised by the manipulation of the switches 55, 55, and 55$^a$.

Instead of giving to each of the coils 120, 120, of a group the same self-induction and the same ohmic resistance as each of the others of said group, a better plan, at least in cases where a small number only of the coils 120, 120, is used in a group, is to give unequal amounts of self-induction and ohmic resistance to the several coils 120, 120, of a group. Thus, supposing that we have six such coils only in a group, we can give to one of them the same amount of ohmic resistance and the same amount of self-induction as the primary coil 56, 56$^a$, 56$^b$, etc., with which such coil 120 is in series, and to the other five coils 120, 120, of the same group we may give, respectively, 2, 4, 8, 16 and 32 times as much ohmic resistance and as much self-induction as the primary coils 56, 56$^a$, 56$^b$, with which they are in circuit; or we may give to them other and different amounts of self-induction and resistance, as the builder may think best. In any case, if all the switches 55, 55, and 55$^a$, of a given group be opened, no current will flow through the corresponding primary 56, or 56$^a$, or 56$^b$, etc., but if any of the switches 55, 55, of that group be closed, some current can flow. By giving, as above described, different amounts of impedance to the different coils 120, 120, of a group, each of the switches 55, 55, is made to correspond to a different degree of loudness of tone; and when a plurality of those switches are closed simultaneously, a resultant effect is obtained, louder than that produced by the closing of either of those switches by itself alone. And by closing the switch 55$^a$, the maximum effect of loudness is produced. Thus by opening all the switches, 55, 55, and 55$^a$ of a given group, the performer can entirely exclude from the notes of the corresponding keyboard the order of partial tones supplied by or through the primary 56, or 56$^a$, 56$^b$, 56$^c$, 56$^d$, 56$^e$, 56$^f$, 56$^g$, 56$^h$, or 56$^i$ (as the case may be) with which such switches are connected; by closing the different switches 55, 55, of a given group singly or in different combinations, he can cause the corresponding order of partial tones to sound with various degrees of loudness less than the maximum; and by closing any of the switches 55$^a$, 55$^a$, can cause the corresponding order of partial tones to sound in the note with its maximum loudness. Thus by properly manipulating the various switches 55, 55, and 55$^a$ of the different groups, particularly if the vibrations produced by the alternators 2, 2, 3, 3, and 4, 4, be strictly sinusoidal (that is, entirely free from harmonics), a skilful performer can produce a great variety of different qualities of tone and can change the timbre from time to time at will.

*Of the means for governing the loudness of the notes of a keyboard.*

The switches 55, 55, and 55$^a$, 55$^a$, it will be observed, bear a certain resemblance, in their musical functions and capacities, to the different draw-stops or register-controlling devices of an organ, though utterly different in their structure and in their physical mode of operation. And by suitably manipulating the various switches 55, 55, and 55$^a$, 55$^a$, a skilful performer could govern, within certain limits, the loudness as well as the timbre of the notes of the corresponding keyboard. I consider it preferable, however, to use the switches 55, 55, and 55$^a$, 55$^a$, only for varying the timbre; or at least to furnish another device, whose function is to govern the loudness of the note or notes of a keyboard whatever their timbre may be. I have contrived several devices for this purpose, the best of which, in my judgment, is that illustrated schematically in Figs. 1, 3, 3$^A$, and 6, and more in detail in Figs. 28 to 33. I shall first explain the principle, briefly, with reference to the schematic views, Figs. 1, 3, 3$^A$ and 6, and shall then explain the features of the preferred construction more in detail and with reference to Figs. 28 to 33. 60, 60, are impedance coils, electrically connected together in series with each other. 61 is a brush or contact-finger connected with one terminal of the coil 58, and mounted to travel over and make contact with the contact-plates (or contact buttons as they are represented in the schematic views, Figs. 1, 3, 3$^A$ and 6), 130, 130. The terminals of the series of impedance coils are connected with the extreme contact-plates 130, 130, and the junction of each impedance coil with the next is also connected with the corresponding contact-plate 130, as clearly illustrated in the drawings. One terminal of the coil 62 is connected with one of the extreme contact-plates or buttons 130, 130, (the rightmost one in the schematic views, though whether rightmost or leftmost is, of course, immaterial); the other terminal of said coil 62 is connected with one terminal of the coil 58 whose other terminal is connected with the brush or contact-finger 61. If said brush or contact-finger lie in contact with the leftmost contact-plate or button (as the thing is illustrated in Figs. 1, 3, 3ᴬ and 6) the whole series of impedance coils, 60, 60 (of which coils a few only are shown in the schematic views) are inserted in the circuit of the coils 58 and 62, giving it a large impedance. But as the brush 61 is moved toward the right, the impedance coils 60, 60, are gradually cut out of the circuit until, when the brush 61 reaches the rightmost contact-plate or button, all the coils 60, 60, are cut out of the circuit. Thus by moving the brush 61 from point to point, the impedance of the circuit containing the coils 58 and 62 can be altered within wide limits. By thus altering the impedance, we alter the amplitude of the vibrations transmitted from the alternators 2, 2, 3, 3, and 4, 4, to the vibration-translating devices 70, 70, and thus alter the loudness of the notes produced by those vibration-translating devices.

The device described constitutes, in effect, an electrical crescendo and diminuendo device, or as we may term it more shortly, an electrical swell, by which the loudness of the notes may be increased or decreased, slowly or rapidly, more or less, as required, and to secure the best effects, two things are important:

First. In order to produce slow and easy or smooth crescendos and diminuendos, it is necessary to have a sufficient number of the impedance coils, 60, 60, or their equivalents, so that the change in loudness, as the brush 61 moves from one to another, is scarcely perceptible, or at least not plainly marked. A few only of the coils 60, 60, are shown in the schematic drawings, such as Figs. 1, 3, 3ᴬ and 6, in illustration of the principle; but in practice I consider it advantageous to use a larger number. In one apparatus built according to my invention thirty-two of the coils 60, 60, were first used; but the apparatus was afterward improved by increasing the number to forty-eight; and while a smaller number, if nicely proportioned, in respect to self-induction and resistance, to one another and to the coils 58 and 62, might perhaps be used with a fair degree of satisfaction, a larger number would not be out of place.

Second. It is a matter of great importance, in securing smooth crescendos or diminuendos from this device that the contact device or brush 61 (Figs 1, 3, 3ᴬ and 6) in moving across the contact-plates or buttons 130, 130, shall not break the circuit but shall merely alter its impedance; for a sudden and total interrupting of the circuit not only results in silence, so far as the musical sound required is concerned, but also is apt to cause an unmusical sound—sometimes, a very perceptible noise—in the receivers 70, 70, at the instant of breaking the circuit. To avoid this difficulty, I have employed satisfactorily the device illustrated in Figs. 28 to 33, in which 60, 60, are the impedance coils before mentioned; 130, 130, the contact-plates, and 61, 61, the contact-fingers or brushes. 131 and 132 are stiff bars of any suitable material, between which the contact-plates are securely fastened by bolts 133 and nuts 134. It is convenient (but by no means necessary) to make the extreme contact-plates, 130, 130, several times as thick as the intermediate ones; for then the contact-fingers 61, 61, without requiring any very fine fitting, readily take their extreme positions, without passing entirely off the extreme contact-plates and breaking the circuit. The conducting plates 130, 130, are insulated from each other and from the metal bars 131, 132, by plates 135, 135, of suitable insulating material, and the bolts 133, 133, are insulated from the plates 130, 130, by sleeves or cylinders 136, of suitable insulating material, surrounding said bolts; see Fig. 33. I have used copper for the plates 130, 130; paper for the insulating plates 135, 135; iron and steel for the bars 131, 132; and hard rubber or hard fiber for the insulating sleeves 136, 136; but in each case any other suitable material might be used instead of that which I have used; and for a larger machine or higher voltages, it would probably be preferable to use some better insulating material than paper, such as mica, vulcanite or asbestos, for the insulating plates 135, 135. For greater convenience in making electrical connection with the corresponding coil 60, each of the conducting plates 130 is provided with an extension or lug 130ᵃ, to which the wire 137 is soldered that connects it electrically with the impedance coils.

After the conducting plates 130, 130, the insulating plates 135, 135, and the bars 131 and 132, have been properly assembled and fastened securely together by means of the bolts 133 and nuts 134, that portion of the plates over which the brushes 61, 61, are to travel is reduced to a good surface by filing, or in any other suitable manner; the insulation of the several contact plates 130, 130, is tested and said plates are connected with the impedance coils 60, 60, in the manner illustrated in the drawings and before described.

The contact fingers or brushes 61, 61, may be made of copper or other suitable conducting material. They are pivoted at 140, to the metal lever 141 and are held by contractile springs 61ᵃ, (a spring for each contact-finger) or in any other suitable manner, in contact with the faces of the plates 130, 130, and 135, 135. As I have already explained, it is very desirable to arrange things in such a manner that the impedance of the circuit is altered gradually without its continuity being broken; and to this end I have employed a plurality of contact-fingers of unequal lengths, (see particularly Fig. 28) so that, at any given instant and in any given position of the lever 141, some one or more of said fingers makes connection with one of the contact plates 130, 130. I have been using four contact-fingers in a set (Fig. 28), though it is not improbable that with fine fitting a smaller number, as two or three, might perhaps be made to suffice. The lever 141 that carries the contact-fingers 61, 61, is fulcrumed at 142 and connected at 143 by a rod 144, with the arm 145 of the rock shaft 146, whose other arm 147 is connected by the rod 148 with the arm 149 of the corresponding swell-pedal or swell-lever 95, which is fulcrumed on the rod 151; which rod is mounted in the lugs or posts 152, 152, that rise between the pedals of the pedal keyboard; or it may be mounted in any other suitable manner. A brake or friction-lever 153 is fulcrumed at 154, and pressed by the contractile spring 155 against the curved butt or heel of the lever 141, so as to hold that lever and the contact-fingers 61, 61, in whatever position they may be placed by the performer. The performer, by acting on the swell-pedal 95, can quickly move the corresponding contact-fingers 61, 61, to any position desired and can change the loudness of the notes controlled thereby from the minimum to the maximum or vice versa, either quickly or slowly as required.

Some details in relation to the coils 60, 60, will be given hereinafter.

*Of the plurality of pitch-keyboards.*

So far I have described the arrangement of circuits for one keyboard only, but the connections which are illustrated in Fig. 3 for one keyboard are the same in substance for the other keyboards. See particularly Figs. 5 and 6; also Figs. 20, 30 and 31. The sets of contact-springs 49, 49ª, 49ᵇ, 49ᶜ, 49ᵈ, 49ᵉ, 49ᶠ, 49ᵍ, 49ʰ and 49ⁱ, are repeated for each keyboard; so also the contact screws 53; the contact bars 54, 54ª, 54ᵇ, 54ᶜ, 54ᵈ, 54ᵉ, 54ᶠ, 54ᵍ, 54ʰ and 54ⁱ; the primary coils 56, 56ª, 56ᵇ, 56ᶜ, 56ᵈ, 56ᵉ, 56ᶠ, 56ᵍ, 56ʰ and 56ⁱ; with the impedance coils 120, 120, and switches 55, 55, and 55ª, 55ª, for controlling their circuits; the corresponding secondary coil 58, the impedance coils 60, 60, with the contact-plates 130, 130, and the contact-fingers 61, 61, for controlling the same; the lever 141 (Fig. 31), for carrying said fingers, and the swell-pedal 95 (Figs. 20 and 30), with the connections shown for transmitting movement therefrom to the lever 141, and fingers 61, 61,—all these are, or at least may be, repeated for each of the four keyboards, and in each case the vibration-combining circuit belonging to a keyboard and containing the primary coil 62 acts by induction upon the circuit in which the coils 63 and 64 are inserted, which in turn acts inductively upon the coil 65 and line or mains 68 and 69, to feed the vibration-translating devices 70, 70, with the requisite electrical vibrations. In brief, all the parts that we have described for one keyboard are, or at least may be, employed in and duplicated for the other keyboards,—all but the generators, which, on account of their great cost and expense, it is desirable to keep as few as possible, though of course they too may be duplicaed for the several keyboards if desired. But with the simpler and cheaper and, therefore, preferable arrangement illustrated in the drawings, and particularly in Fig. 5, each generator has multiple connections to the several keyboards, and each generator is connected in each of the keyboards with the contact devices which we have already described for one keyboard. The arrangement is so clearly illustrated in Figs. 5 and 6 as to require no further explanation.

Having, then, for each of the four pitch-keyboards the various devices already so fully described for one, it will be understood that the performer or performers can give to one keyboard one timbre or quality of tone, and to another keyboard another and a different timbre, by using different sets or combinations of over-tones in the different key-boards, or by giving different strengths to the same orders of partial tones in the different keyboards, or by a combination of the two methods just described; and it will also be understood that the timbre of each keyboard can be changed at any time independently of the other keyboards. Also, each keyboard may be given a different loudness of tone and its loudness changed from time to time independently of the other keyboards, by suitably controlling the swell-pedal 95, and contact-fingers 61, 61, corresponding to that keyboard.

*Of the dynamic manual.*

See particularly Figs. 1, 3, 5, 6 and 20.

The changes of loudness resulting from manipulating the pedals 95, 95, and thereby moving the contact-fingers 61, 61, with relation to the corresponding contact-plates 130, 130, may be made as slowly as required; they may also be made quite rapidly. But whether made slowly or rapidly, the changes of loudness thus produced are of necessity gradual, if a large number of the coils 60, 60, be used, as they should be, to produce the best effects. But by properly manipulating the keys 67, 67, of the dynamic manual, the loudness of the notes can be increased or decreased by greater or less steps as required, and with absolute instantaneousness. See Figs. 1, 3, 3ᴬ, 5, 6 and 20. A set of impedances or impedance coils 66, 66, are connected together in series. The keys 67, 67 of the dynamic manual (so called to distinguish it from the pitch-keyboards, whose keys correspond to notes, and are marked 45, 45,) serve to control these impedances, as clearly illustrated in the drawings. Thus in the drawings (though of course the order may be reversed) the leftmost or lowest dynamic key 67 closes the circuit of the coils 63 and 64 through all the impedance coils 66, 66; the second key, ascending from the left, closes circuit through all said coils 66, 66, save one; the third key closes circuit through all save two; and so on, each of the keys 67, 67, closes circuit through all the impedance coils above it in the series; each of said keys 67, 67, ascending from the left closes circuit through a less impedance than the coil below it in the series, until we reach the rightmost one of said keys 67, 67, which, as the drawings show, closes circuit independently of said coils 66, 66. Thus every one of the keys 67, 67 gives a different amount of impedance to the circuit containing the vibration-transferring coils 63 and 64. These changes in impedance, if a properly connected touch be used upon the keys 67, 67, so as to avoid interrupting the circuit, are made with absolute instantaneousness, and the loudness of the notes produced by the vibration-translating devices 70, 70, is changed with like instantaneousness. The dynamic keys 67, 67, are illustrated in the schematic views, such as Figs. 1, 3, 3$^A$, 5 and 6, as mere switch-keys. Such an arrangement would be a possible one, but preferably said keys are formed into a keyboard, much like that of a pianoforte, as illustrated in Fig. 20, and arranged to control circuit-closing devices or switches, electrically equivalent to the switch-keys 67, 67, Figs. 1, 3, 3$^A$, 5 and 6. Thus, in a small instrument, circuit-closing devices may be used for the dynamic keys, similar to those illustrated in Figs. 1 and 2, for the pitch-keys, the key-operated contact springs, 49, 49, being connected, for example, with the coils 66, 66, as the contact-buttons are in the schematic views, and the metal-bar 54 carrying the contact-screws 53, 53, being connected with one terminal of the coil 64, whose other terminal is connected through the coil 63 with the rightmost one of the contact-springs 49. Or in a larger instrument, a pneumatic power device, controlled by the dynamic key and controlling the appropriate switch, may be used.

When the dynamic manual is not being used, the rightmost key 67, (Figs. 3 and 20), or any other key desired, can be locked down so long as required, by placing a suitable weight on the key desired, thus leaving the performer's hand free for other purposes, until he again wishes to use such dynamic manual.

Fig. 20 illustrates the pitch keyboards and the dynamic keyboards disposed in such a manner as to permit of one performer operating the four pitch keyboards (three manuals and one pedal keyboard) or any one or more of them that he desires, while another performer operates the dynamic keyboard and the switches 55, 55, and 55$^a$, 55$^a$, controlling the different orders of partial tones in the four pitch keyboards; the four swell pedals 95, 95, being arranged in such positions that two of them can be conveniently operated by one performer and two by the other. But the whole arrangement is such, it will be seen, that one performer, playing upon one or more of the pitch manuals and the pedal keyboard, can operate to some extent the swell pedals 95, 95, the switches 55, 55, and 55$^a$, 55$^a$, and the dynamic keys 67, 67. But it is preferable to have two performers.

In Fig. 20 the group of switches 55 and 55$^a$ on the same horizontal level with the three manuals of pitch-keys or note-controlling keys 45, 45, correspond respectively to, and serve respectively for, the manuals with which they are on the same horizontal level; while the switches 55, 55, and 55$^a$, on the same level with the dynamic manual correspond to, and serve for, the pedal keyboard. See also Fig. 6.

It will be seen, that (a) each of the pitch-keys, 45, 45, excepting only the highest keys of the keyboard, controls a plurality of series of vibrations, having frequencies corresponding to different partials of the note for which such key stands; (b) the vibrations corresponding to partials of one order are passed through one coil and the vibrations corresponding to the partials of the other orders through other coils, as 56, 56$^a$, 56$^b$, etc., each order of partials having a coil of its own; (c) by manipulating the various switches 55, 55, and 55$^a$, 55$^a$, any order of partials with which the instrument is provided can be caused to act or not to act, as required, and if caused to act can be made to act with greater or less power as required; (d) by manipulating the various switches 55, 55, 55$^a$, 55$^a$, controlling, respectively, different orders of partial tones, the skilful performer can, particularly if the alternators 2, 2, 3, 3, and 4, 4, be constructed to produce strictly sinusoidal waves, produce a great variety of timbres by mixing with the ground-tone or first-partial, whose periodicity we may represent by $n$, the several higher partials or overtones, as $2n$, $3n$, $4n$, $5n$, $6n$, $8n$, $10n$, $12n$ and $16n$, giving to the ground-tone and to each of said over-tones different degrees of strength as required; (e) the skilful performer can thus produce tones of one timbre on one pitch keyboard and tones of different timbres on each of the other pitch keyboards; (f) by suitably controlling the contact-fingers 61, 61 (Figs. 1, 3, 3$^A$, 5, 6, and 28 to 33), the loudness of the notes of each keyboard can be increased or decreased by imperceptible degrees, rapidly or slowly as required, while (g) by playing upon the keys 67, 67, of the dynamic keyboard the loudness of the notes produced by the set of vibration-translating devices 70, 70, can be changed with absolute instantaneousness, by small or large degrees, as required.

By the proper manipulation of the various devices before described, very beautiful music may be produced and in a number of places simultaneously, and each subscriber can regulate the loudness of the music produced on his premises to suit his own taste by adjusting the position of the contact-fingers or rheostat handle 73. The impedance coils 71, 71, the contact-plates 72, 72, and the contact-fingers or brushes 73 may be constructed and arranged in all respects like the impedance coils 60, 60, contact-plates 130, 130, and contact-fingers 61, 61, illustrated in Figs. 28 to 33, and already described; the contact-fingers 73, 73, being pivoted to a lever as 141, and a brake as 153 and spring 155, as in Fig. 30, used to hold it in whatever position it may be placed; or said impedance coils 71, 71, with the contact devices for controlling them may be constructed and arranged in any other manner whatever that is suitable for the purpose.

*Of the vibration-translating devices.*

Any kind of vibration-receiving or vibration-translating device whatever that is suitable for the purpose may be used for translating the electrical vibrations, produced in the manner above described, into audible aerial vibrations, or for producing in any suitable manner audible vibrations by means of the electrical vibrations. Any good receiving telephone of the kind used in ordinary telephony will, if connected across the mains 68 and 69, produce some effect in translating the electrical vibrations into audible vibrations, but whether the effect be greater or less will depend much upon the receiving telephone that is used. The best device, however, that I have found for the purpose is that illustrated in the drawings. Each vibration-translating device 70, 70, in the schematic views consists of a horn 74 (Figs. 34 to 37), closed at one end by a telephone diaphragm 75, which is vibrated by the action of the undulatory electric currents passing from the lines or mains 68, 69, through the coils 76, that are wound about the poles or the polar extensions of the usual field-magnet 77. The diaphragm 75 and the magnet 77 are, for greater convenience, contained in and secured to the usual cylindrical case 78, whose mouthpiece 79 screws down upon it in the usual manner, to clamp the diaphragm 75 in position. The mouth-piece 79 is furnished with a cylindrical extension, 79$^a$, into which the small end of the horn 74 is fitted. I have used a diaphragm of the size usually employed in telephone receivers, having an extreme diameter of two and three-sixteenths ($2\frac{3}{16}$) inches, the diameter of the portion free to vibrate being one and fifteen-sixteenth ($1\frac{15}{16}$) inches. I have found a thin diaphragm of the above diameter and of about one one-hundredth of an inch thickness more satisfactory, particularly for the lower notes, than a diaphragm of greater thickness. I have used horns of metal and horns of wood of varying lengths from thirty inches to eight feet and think there is no doubt that either longer or shorter horns may be used. I have found the effect from a brass horn somewhat brighter than that from a wooden horn; and have found, particularly for the lower notes, a horn five or six feet long more satisfactory than a horn thirty inches long. I have also found a telephone with pole-pieces one-sixteenth ($\frac{1}{16}$) of an inch thick, measured on the line $x\ x$, Fig. 36, preferable to one with pole-pieces one-eighth ($\frac{1}{8}$) of an inch thick, measured on that line. I do not mention these various details as indispensably necessary, but I have found them advantageous in obtaining satisfactory results and therefore mention them for what they are worth, be that more or less. Under altered circumstances they may perhaps be wholly unimportant.

Instead of using a permanent steel magnet, as in Figs. 34 and 35, an electro-magnet might doubtless be used, supplied with the usual coils 76 on its polar terminals to receive current from the lines or mains 68, 69, and with exciting coils 80, 80, wound about its cores 81, and supplied with current by a local battery 82.

The telephonic receiver may, of course, be used entirely apart from the horn 74, but the effect, so far as my experience has extended is much less satisfactory. Under altered circumstances, however, supposing an improved arrangement of the magnet and diaphragm, if any such can be made, possibly the horn 74 may be found much less important than it is with the diaphragms and magnets that I have been using.

*Of the impedance coils and the inductoriums.*

Any form of impedance that is suitable for the purpose may be used for the impedance coils, such as 60, 60; 66, 66; 71, 71; 120, 120, etc.

So also any form of inductorium that is suitable for the purpose may be used. The impedance coils and the inductoriums may be made either with iron cores or without. If iron cores be used, I consider it preferable that the iron should not form a closed magnetic circuit, but that the magnetic circuit should be partly through iron and partly through air, with the principal portion of the reluctance (or magnetic resistance) in the portion of the circuit that is of air. And further, to secure the best results it is desirable that things be adjusted in such a manner, according to the known rules of the electric art that the currents flowing in the impedance coils as 60, 60; 67, 67; 71, 71; 120, 120, etc., will not be strong enough to magnetize the iron of the core to saturation. This end is easily accomplished by making the reluctance of the iron part of the circuit a small part of the whole reluctance and keeping the maximum current density (that is, the maximum current, measured in amperes, multiplied by the number of turns of wire to each unit of axial length of the coil) within the required limits. Thus, suppose the reluctance of the iron part of the circuit to not exceed (unless at very feeble intensities of magnetization) one-tenth of the whole reluctance (which is the case with short, thick cores, such as that illustrated in Figs. 24 and 25) and the maximum current density to not exceed forty ampere-turns per centimeter length, or 100 ampere-turns per inch length of the iron part of the core saturation, will not be approached. The object of keeping the reluctance in the air part of the circuit greater than that of the iron part (and which is the case with the impedance coil illustrated in Figs. 24 and 25 and also with the inductorium illustrated in Figs. 26 and 27, when the distance between the central core 165 and the side cores 166 and 166, is, as shown in Fig. 26, more than one one-hundredth of the length of the iron portion of the circuit) is to avoid or reduce that distortion of a sinusoidal wave which occurs in an electric circuit wound about a core forming a closed iron magnetic circuit, particularly when feeble currents are used or when saturation of the core is nearly approached.

Figure 26:
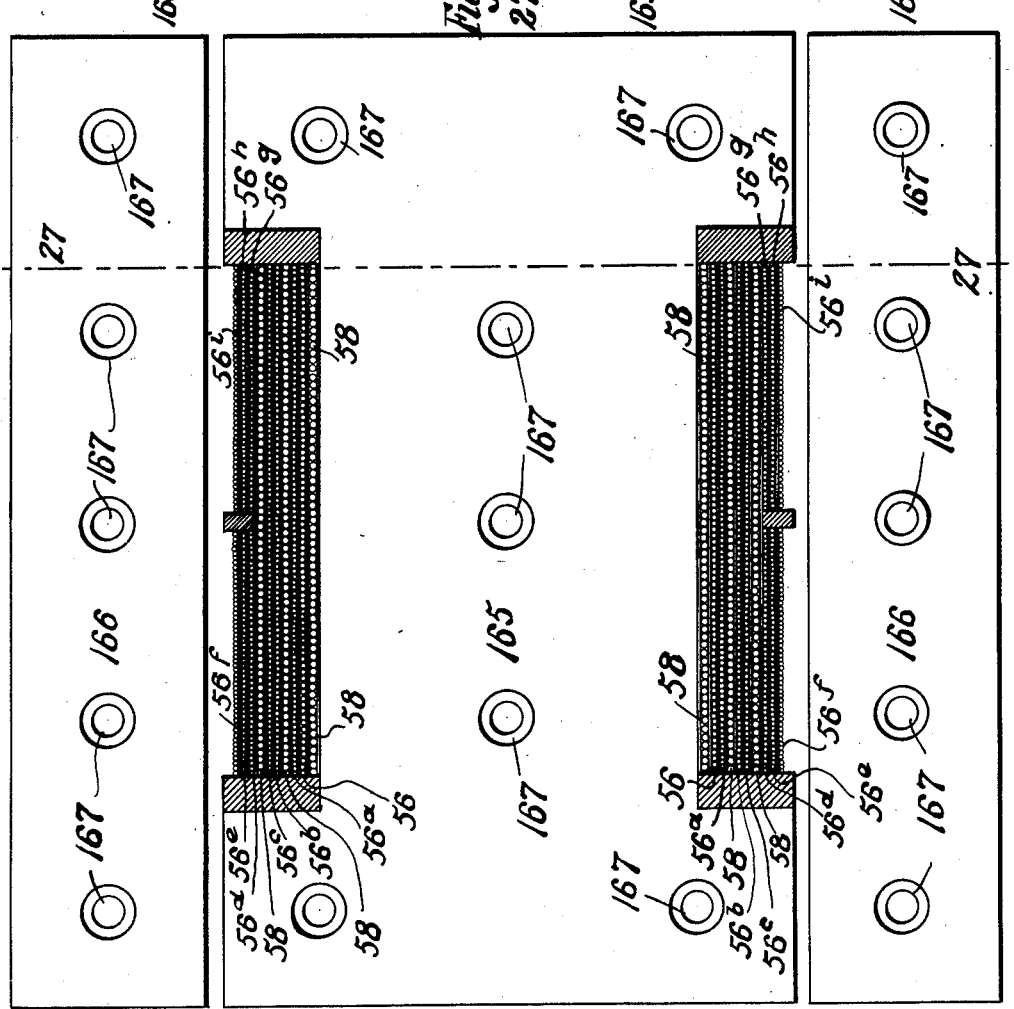
Fig. 26 is a sectional view, partly in elevation, illustrating one form of vibration combining inductorium.

Subject to these disadvantages, closed iron magnetic circuits may, of course, be used, either for the impedance coils or the inductoriums; but, as I have already said, I consider it much better to use iron and air magnetic circuits, as shown, for example, in Figs. 24, 25 and 26.

Figs. 24 and 25 illustrate a form of impedance coil that I have been using, in which 160 is the core, formed of thin plates of very soft iron or steel, such as is used in good transformers, insulated from each other and held together by insulated rivets 161, 161, and furnished with heads 162, 162, of hard vulcanized fiber or other suitable substance, between which the wire 163 of the coil is wound.

Figure 27:
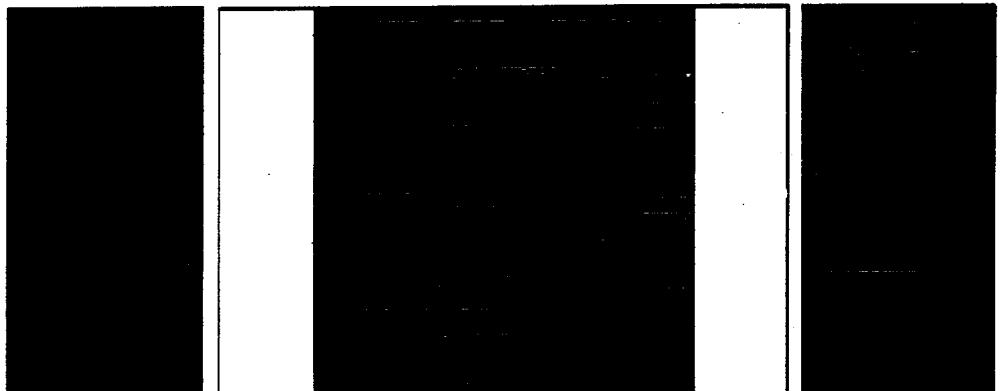
Fig. 27 is a detail sectional view, partly in elevation, on the line 27, 27, Fig. 26.

Figs. 26 and 27 illustrate one form of inductorium that may be used. 165 is the central part of the core and 166, 166, the side pieces, all made of very thin sheets of good soft iron or steel, such as is used in the best transformers and suitably insulated from each other in any approved manner. Insulated rivets 167, 167, fasten the core-plates of each core together. The primary and secondary coils may be wound upon the side pieces 166, 166, as well as upon the central part 165 of the core, but in Fig. 26 only the central part is wound. 56, 56$^a$, 56$^b$, 56c, 56$^d$, 56$^e$, 56$^f$, 56$^g$, 56$^h$, and 56$^i$, are the primary coils, shown schematically in Figs. 3, 3$^A$, 5 and 6 and serving respectively for the first, second, third, fourth, fifth, sixth, eighth, tenth, twelfth and sixteenth partials. 58, 58, 58, are sections of the secondary winding, which to increase the mutual induction, are interspersed between the layers of the primary winding, as shown in Fig. 26; or they may be arranged in any other suitable manner. Thus, for example, instead of arranging the various coils as 56, 56$^a$, 56$^b$, etc., and 58 in different circumferential layers, as illustrated in section in Fig. 26, they might be made into coils of short axial length and arranged side by side around the core-pieces 165 or 166, 166. The side plates 166, 166, may be adjusted to stand at a greater or less distance from the central core-piece 165, thereby varying the length of the air-gap, the relative reluctances of the air portion and the iron portion of the magnetic circuit, the total reluctance of that circuit, the self induction of each of the windings, as 56, 56$^a$, etc., and 58 and the mutual inductions subsisting between the coils 58, 58, and the primary coils as 56, 56$^a$, etc. A certain amount of adjustment is thus easily made by the builder.

An inductorium having fewer windings than that illustrated in Figs. 26 and 27 (for example, the inductorium including the coils 62, 62 and 63 or that including the coils 64 and 65, in Figs. 1, 3, 3$^A$ and 6, and 46 to 49 and 61, or those formed by these coils in the modified constructions, Figs. 50 to 60); may be made exactly like that illustrated in Figs. 26 and 27, except in respect to the smaller number of windings. And instead of the form of inductorium illustrated in said Figs. 26 and 27, any other form of inductorium that is suitable for the purpose may be used instead. Thus, for example, the side pieces 166, 166, may be entirely dispensed with, in which case to obtain the same effect, the core-piece 165 should be made of a larger size; or, subject to the disadvantages already pointed out, a closed iron circuit might be used of any suitable form; in which case a smaller inductorium can be used; or an inductorium may be used entirely without iron; in which case larger wires and a much greater weight of copper will need to be used; or, as before said, any other kind of inductorium that is suitable for the purpose may be used.

Referring, again, to the impedance coils 60, 60, Figs. 1, 3, 3ᴬ, 5 and 6, and Figs. 28 and 29, some effect of expression in controlling the loudness of the notes of the several keyboards can be obtained from a small number of said coils; indeed a very substantial effect could be obtained from even a single coil of sufficient size to markedly reduce the loudness of the tones when inserted in the circuit. One such coil would give, when in the circuit, the effect of a soft pedal or soft stop, and when cut out of the circuit by the movement of the brush 61, the effect of a loud pedal or a loud stop. But a better effect will be obtained by using a larger number as two, three, four, five, six or seven of said coils, and a still better effect by using a still larger number as forty, fifty or sixty. The best effect can only be obtained when the number of the coils 60, 60, is large enough to produce great variations in the loudness of the tone by successive steps which are so small that they are individually either not discernible by the average ear, or scarce discernible. One practical mode of effecting this end is for the builder to wind a coil of wire (a few turns will ordinarily be sufficient, at least if a laminated iron core be used for such coil, as in Figs. 24 and 25) using a wire large enough to carry the maximum current without undue heating and using this coil as the first coil of his series of coils 60, 60, (the rightmost coil in the schematic drawings, Figs. 1, 3, 3ᴬ, 5 and 6, and the leftmost coil in Figs. 28 and 29) winding on such an amount of wire that he can scarce discern the change in loudness when said coil is introduced into the circuit of the coils 58 and 62, or cut out from said circuit. He pursues the same course with the second coil and with the third coil and with all the higher coils of the series; winding preferably a greater number of turns, supposing the size of core to remain the same, into each coil of the ascending series than is used in the coil next below it in the series; winding such an amount of wire into each successive coil that he can not discern or can scarce discern the change in loudness, when (all the other coils 60, 60, below it in the series being in the circuit of the coils 58 and 62) it is inserted into the circuit or cut out of the circuit. It is also convenient with every few coils (for example every fifth or sixth coil in the ascending series in a set of fifty or more of the coils 60, 60) to take a wire one number of the Birmingham or other similar wire gage smaller than that used for the coils next below in the series. So far I have assumed that the same size of core or bobbin is used for the whole set of coils 60, 60. If the size of the core be increased in the ascending scale, the increase might, of course, possibly be at such a ratio that no increase in the number of turns of wire would be necessary; but in any case the substantial rule remains the same—to add with each of the coils 60, 60, some additional impedance to the circuit, but where the best effect in the way of smooth and easy crescendoes and diminuendoes is to be produced, not to add with any one coil such an amount of impedance as would very perceptibly vary the loudness of the sound, when that coil by itself alone is inserted into the circuit or cut out from it.

In one respect it is desirable to vary the self-induction and the ohmic resistance of the circuit containing the coils 56 and 62 in equal proportions; for thus the time-constant of the circuit, $\frac{L}{R}$, remains the same whether many or few of the coils 60, 60, be introduced into the circuit and the high notes and low notes are altered in strength in the same or nearly the same proportions by the addition of the successive coils 60, 60; while if we vary the resistance alone without varying the self-induction, or the self-induction alone without varying the ohmic resistance, high notes and low notes will be unequally affected. But it is not important that the self-induction and the ohmic resistance be varied in exactly the same proportions, and, in fact, a very good effect in controlling expression can be produced by a skilful performer by varying the self-induction alone, or the ohmic resistance alone. To vary the ohmic resistance, without varying the self-induction, we will make the successive coils 60, 60, of the appropriate resistances and of negligible self-induction as, for example, by winding two parallel wires, well insulated from each other, and connecting them in such a manner that the current flows into the coil through one and flows out through the other; or practically the same result may be accomplished in any other suitable manner. To vary the self-induction without varying the resistance we will make the coils 60, 60, of negligible resistance and of sufficient self-induction.

The same course may be pursued in adjusting the self-induction and resistance of the coils 71, 71, to the circuit for which they serve, as in adjusting the coils 60, 60, to the circuit for which they serve. Also, the same course may be pursued in adjusting the coils 66, 66, to the circuit for which they serve as in adjusting the coils 60, 60, to their circuit; but in the case of the coils 66, 66, it is preferable to arrange things in such a manner that there shall be a plainly perceptible difference in loudness, produced by the insertion of each of said coils into the circuit or the cutting it out of the circuit.

I have spoken of the series of impedance coils, 71, 71, being like the series of coils 60, 60. I mean similarity in principle and substance, and not mere identity in size and shape. Ordinarily, a plurality of receivers 70, 70, would be connected in parallel across the mains 68, 69. A few receivers only or a great number may be so connected. Ordinarily, the resistance of one of the receivers 70 would be much greater than that of the circuit in which the coils 60, 60, are inserted, and the amperage in any one of the sets of coils 71, 71, much smaller than that in the coils 60, 60. In such a case, the impedance coils 71, 71, would be made much smaller and wound with a finer wire and to a much higher resistance than the corresponding coils of the series 60, 60.

*Of the key-controlled power-action, for operating the switches.*

In what has preceded I have, for convenience sake, spoken only of the contact springs, 49, 49$^a$, 49$^b$, etc., illustrated for simplicity's sake in the schematic views (Figs. 1, 2, 3, 3$^A$, and 5, and in Fig. 4) as key-controlled, circuit-closing devices. It is possible to use contact springs, at least in a very small installation. I have so used them. But a much better construction, particularly for a large instrument or plant, is to employ knife-switches, making a sliding contact and operated by power mechanism that is controlled by the key. One device for this purpose is illustrated in Figs. 38 to 44, in which 45 is the key, centered at 46 on the bar 47, and operating, through an adjustable screw 170, the contact spring 171, which is clamped between and insulated from the parallel bars 172, 172. 173 is a coil of insulated copper wire, wound about the hollow spool or bobbin 174, which may be of thin German silver, brass, or other suitable material. This bobbin encircles the lower fixed core 175 of the electro-magnet, which core, 175, is preferably made in the form of a cleft cylinder, as illustrated in Fig. 38, and attached by the screw 176 to the stout bar 177 which may be of any suitable material, but preferably of soft iron or steel. The armature or movable core 178 is in general like the fixed core 175, but may be made shorter and should fit loosely in the hollow spool 174, so that it may move easily therein, without binding or sticking. The rod 179, screw-threaded at its lower end where it enters the armature 178, and adjustable by means of a lock-nut, is pivoted at 180 to the bell-crank lever 181, which lever is fulcrumed at 182 and connected at 183, by the link 184, with the stem 185, that carries the two disk-valves 186 and 187. One terminal of the coil 173 before mentioned, is connected to the insulated spring 171 aforesaid, and the other terminal of said coil is connected with one pole of the battery 188, whose other pole is connected with the common-return bar 189. This is, or at least may be, true of all the coils 173 belonging to the several magnets corresponding to the several keys of a keyboard; that is, each of said coils has, or at least may have, one terminal connected with one pole of the battery 188 aforesaid, and the other with the contact spring 171 corresponding to and controlled by the key to which such coil corresponds and for which it serves; so that when any key is depressed it presses the spring 171 corresponding to it upward, bringing the platinum contact point 190 in said spring in contact with a similar contact point set in the metal screw 191, which screw is set in the metal common-return bar 189 aforesaid, and adjustable up and down therein by means of a lock-nut.

The result is that when any key 45 of the keyboard is depressed, it closes the circuit of the corresponding coil 173 through the battery 188, whereupon the electric current, flowing through said coil, magnetizes the core 175 and armature 178, which immediately attract each other so that said armature moves toward said core, thereby moving the valve-stem 185 in the direction of the arrow, Fig. 38. 193 is a small metal cylinder, made preferably of brass, bronze, or other suitable non-rusting material, and 194 is a piston fitted to move easily and substantially air-tight in said cylinder. Said piston 194 is connected by a link 195 with the switch-controlling bar 196, said link being pivoted at 197 to said piston, and, at 198, to said switch-controlling bar. The piston 194 serves to move the switch-controlling bar 196, so as to close the various switches 282, 282$^a$, 282$^b$, 282$^c$, 282$^d$, 282$^e$, 282$^f$, 282$^g$, 282$^h$, and 282$^i$, which correspond to the different orders of partial tones controlled by the corresponding key 45. And there is, it is to be understood, for each keyboard a cylinder 193, and piston 194, with the switch-operating bar 186 and switches operated thereby, for each key of such keyboard. These cylinders and pistons are preferably ranged in a double row, as illustrated in Figs. 38 and 40. For the four keyboards illustrated in the drawing and hereinbefore described there would be, therefore, four double rows of the cylinders 194, 194, of which one double row only is illustrated in the drawing. The mechanism illustrated in Fig. 38, which we are now describing, is to be duplicated, it is to be understood, so far as the circuit-closing device, electro-magnet, valves, cylinder and piston, and switch-operating bar and switches, are concerned, for each key of the keyboard, and the parts for one keyboard are to be repeated for each of the other keyboards. The cylinders 194 are mounted upon and screwed to a metal table 270, whose top and bottom are planed true. Parallel bars, 271, 272, 273, are attached to said table and, a plate 274 is attached to said bars, as shown in cross-section in Fig. 38. The table 270, the plate 274, and the parallel bars 271 and 272, form the wind-chest 275, which extends continuously lengthwise the table 270 the whole length of the double row of cylinders 194, 194. This wind-chest is closed air tight at both ends, and is supplied with wind or compressed air from a suitable reservoir or pumping device, and at any suitable pressure, as for example from 3 pounds to 5 pounds to the square inch. The table 270, the plate 274, and the parallel bars 272, 273, form another chamber which is subdivided by air-tight partitions 276, into separate compartments 277, 277, for the several pairs of disk-valves 186, 187, etc., which serve respectively the cylinders 194, 194. For each of the compartments 277, there is (a) a port 278, communicating with the interior of the corresponding cylinder 193; (b) a port 279, communicating with the wind-chest 275, and (c) another port 280, communicating with the external atmosphere. Each disk-valve 186 normally covers the corresponding port 279, communicating between the compartment 277, for which such valve serves, and the wind-chest 275; and the similar port 280 is normally not covered by the other disk-valve 187, and so gives free communication between the external atmosphere and the compartment 277 and cylinder 193, connected with said compartment. A contractile spring 281 holds the disk valve 186 normally covering its port, but when the circuit is closed by the key 45, through the battery 188 and coil 173, in the manner above described, the armature 178 is attracted, as before stated, to the core 175, and, through the bell-crank lever 181 and link 184, moves the valve stem 185 in the direction of the arrow, Fig. 38, uncovering the port 279 and covering the port 280, so that compressed air passes from the wind-chest 275 through the ports 279 and 278 into the cylinder 193, moving the piston 194, and through the link 195, lifting the bar 196, which in turn lifts the several switches 282, 282$^a$, 282$^b$, 282$^c$, 282$^d$, 282$^e$, 282$^f$, 282$^g$, 282$^h$, 282$^i$, which correspond respectively to and take the places of the contact springs 49, 49$^a$, 49$^b$, 49$^c$, 49$^d$, 49$^e$, 49$^f$, 49$^g$, 49$^h$, 49$^i$, respectively (the electrical connections of which are illustrated in the various schematic views, Figs. 1, 3, 3$^A$, 5 and 6, and have been already fully described), so that each of said switches makes connection with the corresponding spring jaws 283, screwed fast to the conducting-bar 54, 54$^a$, 54$^b$, 54$^c$, 54$^d$, 54$^e$, 54$^f$, 54$^g$, 54$^h$, 54$^i$, as the case may be, corresponding to it. These conducting bars, 54, 54$^a$, 54$^b$, 54$^c$, 54$^d$, 54$^e$, 54$^f$, 54$^g$, 54$^h$, 54$^i$, and their place in the electrical system have been already fully described in connection with the schematic views, Figs. 1, 3, 3$^A$, 4, 5, 6, in which they are shown as supporting the contact screws 53, 53, which in these schematic views are the equivalents of the spring jaws 283, 283, Figs. 38 to 44. Each of the switches, 282, 282$^a$, 282$^b$, 282$^c$, 282$^d$, 282$^e$, 282$^f$, 282$^g$, 282$^h$, 282$^i$, is pivoted or hinged at 285 to its hanger 286, which may be of the usual construction, for hangers of knife-switches, well known in the electrical art. These hangers are secured fast to insulating bars 287, 287, which may be of vulcanized fiber, slate or other suitable material screwed fast to the corresponding conducting bar 54 or 54$^a$, etc., as the case may be; and each hanger is connected by a conducting wire 288 with one terminal of the corresponding armature winding, as the springs 49, 49$^a$, 49$^b$, etc., are connected in the schematic views as Figs. 1 to 5 and 46 to 49 (which springs, it will be remembered, are the equivalents in the schematic views of the switches 282, 282$^a$, 282$^b$, etc., in Figs. 38 to 44) the other terminal of which is connected with the common-return wire 48, before mentioned.

Thus, it will be seen, when the key 45 is depressed, it acts, through the power mechanism described, to close the switches 282, 282$^a$, 282$^b$, 282$^c$, 282$^d$, 282$^e$, 282$^f$, 282$^g$, 282$^h$ and 282$^i$, which close the circuits of the alternators having vibration-frequencies corresponding respectively to the first, second, third, fourth, fifth, sixth, eighth, tenth, twelfth and sixteenth partials of the note for which such key stands; closing the circuits of said alternators respectively through the bars 54, 54$^a$, 54$^b$, 54$^c$, 54$^d$, 54$^e$, 54$^f$, 54$^g$, 54$^h$ and 54$^i$; which bars correspond respectively to the first, second, third, fourth, fifth, sixth, eighth, tenth, twelfth and sixteenth orders of partial tones, and connect through the primary coils 56, 56$^a$, 56$^b$, 56$^c$, 56$^d$, 56$^e$, 56$^f$, 56$^g$, 56$^h$ and 56$^i$, respectively, with the common-return wire 48, Figs. 3, 3$^A$, 5 and 6. The coils 56, 56$^a$, 56$^b$, etc., act upon the vibration-translating devices, 70, 70, in the manner and by the means already described, to produce their appropriate sounds thereon.

When the key 45 is released by the performer, it returns to its normal position under the influence of the usual returning spring or leads (which are not shown in the drawing, being well known to all persons conversant with the building of piano and organ keyboards); the contact-spring 171 falls away from the contact-screw 191, thereby breaking the circuit through the coil 173; whereupon the core 175 loses its magnetism and ceases to attract the armature 178; upon which the contractile spring 281 returns said armature and the valves 186 and 187 to their normal positions; opening the port 280 which communicates between the cylinder 193 and the external atmosphere, and closing the port 279, which communicates between said cylinder and the wind-chest;

whereupon the pressure inside said cylinder ceasing, the contractile spring 290 returns the bar 196, piston 194, and switches 282, 282ª, 282ᵇ, 282ᶜ, 282ᵈ, 282ᵉ, 282ᶠ, 282ᵍ, 282ʰ and 282ⁱ to their normal positions, breaking the corresponding alternator circuits controlled by said switches, and causing the sounds which such alternators produced in the various vibration-translating devices 70, 70, to cease. Two lugs, 291, 291, attached fast to the bar 196, engage alternately the stop-bar 292, which limits the movements of the bar 196, piston 194, and switches 282, 282ª, etc. The stop 292 is screwed fast to the rail 292ª and is covered with thick felt 293 or other suitable sound-deadening material.

The switch-opening bar 196 is mounted by means of the bridle-levers 294, 294, which levers are pivoted to the hangers 295, 295, which are screwed fast to the bars 296, 296.

Each of the switch-levers 282, 282ª 282ᵇ, etc., is connected with the switch-operating bar 196 by a block 297 (Figs. 38 and 38ᴬ) of vulcanized fiber or other suitbale insulating material, which is pivotally mounted on a shoulder screw 298, which screw is set in the bar 196 and held in place by a lock nut. The block 297 has parallel sides to work in a groove formed in the corresponding switch-lever (282 or 282ª, etc., as the case may be) and serves with the insulating washer 297ª to insulate the switch lever from the bar 196. Any other means of insulating that is suitable for the purpose may of course be used instead.

Any suitable packing for the piston 194, that leaves it free to move under a moderate air pressure may be used. As various packings are known, I have not considered it necessary to burden this specification with any illustration or description of such details of construction.

Instead of using the cylinder 193, and the piston 194 as a motor device, any other motor device that is suitable for the purpose may be used instead; thus, to mention one example, we might use, instead of the cylinder 193 and piston 194, the form of pneumatic power device, resembling a bellows, sometimes used in large pipe organs to operate the valves, and known as a pneumatic lever; and for small installations it is not improbable that pneumatic levers may be found preferable; but for a large installation with large and heavy switches the cylinder and piston device will probably be found more satisfactory as being capable of operating with a higher pressure of compressed air and requiring less space.

Instead of operating the valves 186, 187, by an electro-magnet as illustrated in Fig. 38, they may be operated in any other suitable manner whatever. Thus, to mention one modification only, the wind-chest 275, and the compartments or chambers 277, 277, corresponding to and connected with the cylinders 193, belonging to a keyboard may be located in proximity to that keyboard, and the valves operated by the keys as illustrated in Fig. 45, in which pipes 297, 297, (broken away in the drawing) lead to and communicate with the interior of the several cylinders 193, 193.

The conducting bars 54, 54ª, etc., to 54ⁱ, of a set corresponding to the different orders of partial tones controlled by the keys of a keyboard, may be mounted by means of frames 298, 298, Figs. 43 and 44, to which said bars are connected and from which they are electrically insulated; the several frames, carrying respectively the sets of bars corresponding to the several keyboards, being arranged in any convenient positions whatever, as, for example, in line with each other, in proximity to a wall or rack, along which the wires corresponding to the different windings of the several alternators are led. With such a construction as that illustrated in Figs. 38 to 44, the several wind-chests may be ranged each under its own set of cylinders 193, 193. But with the arrangement illustrated in Fig. 45, the several wind-chests and valve-chests belonging to a keyboard may be mounted one over another, the pipes 297, 297, being led each to the cylinder 193, mounted on the cylinder-table 270, Figs. 38, 39, 43 and 44, or mounted in any other suitable manner and corresponding to and controlled by the key that operates the valves which control the supply of wind to the chamber 277 with which said pipe connects. And numerous other modifications may be made, which is would be useless to describe.

*Of modified and alternative constructions.*

I have now described one form of apparatus for practising my invention. Many modifications of that apparatus may be made without departing materially from the essential features, or at least without departing materially from certain of the essential features of my invention. A few of these modifications I shall now describe. First I shall point out some of the more important of the modifications that may be made in the means for producing tone of an agreeable timbre and for varying the timbre; then I shall point out a few of the many possible modifications of the expression mechanism; then certain modifications in the vibration-generating devices, apart from the gearing; then certain modifications of the gearing; and then certain modifications of a miscellaneous character.

And in describing the various modified constructions, illustrated in Figs. 46 and following, those parts in any figure that are like the preferred construction, and which have been before described, will require no further description. The reader will understand them from the description already given and the further description will be confined in the case of each of the figures illustrating modifications, to those parts shown therein, which have not been before described.

*Of modified and alternative constructions for synthesizing notes of the timbre required.*

I have already pointed out the well-known fact that a rich musical note usually, if not invariably, includes with the ground-tone or first partial a number of upper partials, overtones or harmonics; and I have pointed out two modes of producing such tones electrically, namely, first, the mode described in the specification accompanying the Letters Patent before mentioned, dated April 6, 1897, in which for each note a group of alternators is used, all serving for that note only and each serving to give one of the partials of that note; an example of which construction combined with certain of the improvements hereinbefore described, and particularly with the means for using one order of partials or another, or any combination of these, each order of partials with the power required, is illustrated schematically in Fig. 46; and, second, the simpler and more economical mode illustrated in Fig. 3 and hereinbefore described, by which a ground-tone set of alternators and two supplemental sets, corresponding respectively to the third and fifth partials, are used, and the ground-tones, the second partials, the fourth partials, and, if desired, the eighth and sixteenth partials, are derived from the ground-tone set of alternators; the third and sixth partials, and, if desired, the twelfth partials, derived from the third-partial supplemental set of alternators; and the fifth partials, and, if, desired, the tenth partials, derived from the fifth-partial supplemental set of alternators. But to more perfectly and fully explain the present invention and to avoid any misapprehension, it will be advantageous to point out the following facts:

First. A good, or at least a fair, musical effect may be produced from a single set of alternators, each alternator supplying vibrations to one note only, and each key controlling one alternator only. Fig. 1 illustrates such an arrangement.

Second. A much better musical effect may be produced, with a very moderate increase in expense, by using a single set of alternators to supply the ground-tones, and the second partials and fourth partials, and, if desired, the eighth and sixteenth partials, as already described in connection with Figs. 3 and 3ᴬ; the supplemental set of alternators for the third and fifth partials being entirely omitted. Such an arrangement is illustrated in the schematic view, Fig. 47, which differs, it will be seen, from Fig. 3ᴬ only in that the supplemental set of alternators for supplying the third, sixth and twelfth partials, and the other supplemental set of alternators for supplying the fifth and tenth partials, with the various circuits and contact devices and coils for controlling said third, sixth, twelfth, fifth and tenth partials have been omitted.

Third. We may, of course, use, with the ground-tone alternators, the supplemental set of alternators from which the third and sixth, and, if desired, the twelfth partials are derived, and may omit the supplemental set of alternators from which the fifth and tenth partials are derived; or we may use with the ground-tone set of alternators, the supplemental set of alternators from which the fifth partials, or the fifth and tenth partials, are derived, and may omit the supplemental set of alternators from which the third, sixth and twelfth partials are derived. These facts are so obvious that illustration by drawings is unnecessary.

Fourth. A true third partial has a frequency exactly three times that of the corresponding ground-tone; a true sixth partial a frequency exactly six times and a true twelfth partial a frequency exactly twelve times that of the ground-tone. Thus if we designate the frequency of the ground tone by $n$, the third, sixth and twelfth partials should have frequencies of exactly $3n$, $6n$, and $12n$, respectively. In the equal temperament system of tuning, any two notes that are an octave and a fifth or nineteen half tones apart have frequencies of nearly one to three; any two notes that are two octaves and a fifth or thirty-one half tones apart have frequencies of nearly one to six; and any two notes that are three octaves and a fifth or forty-three half tones apart have frequencies of nearly one to twelve; assuming, in each case, that the tuning is mathematically perfect. The higher note, in any such case, is very nearly .00113 or 1/886 flat of the perfect interval. In fact, we can not only derive from the ground-tone set of alternators ground-tones, second partials, fourth, eighth and sixteenth partials, as already fully described, but we can also derive approximate but somewhat imperfect third, sixth and twelfth partials from the same ground-tone set of alternators, and thereby dispense, for economy's sake, with the third partial supplemental set of alternators 3, 3, before described in connection with Fig. 3, thus reducing the cost of the plant at the expense, it must be very clearly understood, of being compelled to use third, sixth and twelfth partials a little flat of the perfect intervals. Such an arrangement is illustrated schematically in Fig. 48, which, in illustration of the principle, shows one key with the various alternators by which its several partial tones are supplied, and one alternator with its connections to all the different keys of the keyboard to which it supplies partial tones of its own frequency. In this figure, as in Figs. 3, 3ᴬ, 5, 46, 47 and 49, an alternator with a plurality of armature windings is illustrated schematically by concentric circles with brushes bearing thereon, each of said circles, excepting the outer one, representing a different armature winding, and the outer circle representing the common return for all said windings. In Fig. 48 we have the alternators 2, 2, of the ground-tone set, supplying the ground-tones or first partials, and the second, fourth, eighth and sixteenth partials in the manner already fully described in connection with Fig. 3, and also supplying approximate third, sixth and twelfth partials, namely, in the case of each ground-tone alternator the third partial is supplied to the note one octave and a fifth below that to which such alternator supplies the ground-tone; the sixth partial, to the note two octaves and a fifth below and the twelfth partial to the note three octaves and a fifth below that to which such alternator supplies the ground-tone; subject, of course, to the exceptions, in every case, that if there be no note in the compass of the instrument three octaves and a fifth below the note to which a given alternator supplies the ground-tone, to which it can supply a twelfth partial, or two octaves and a fifth below, to which it can supply a sixth partial, or one octave and a fifth below, to which it can supply a third partial, it does not in such case supply a twelfth, sixth or third partial, as the case may be. The supplemental set of alternators 4, 4, for supplying the fifth partials or the fifth partials and the tenth partials, as already fully described, in connection with Figs. 3 to 19, may be used, it is to be understood, in connection with the modification illustrated in Fig. 48, as illustrated schematically in said figure, or they may be dispensed with, thereby reducing the cost of the instrument and reducing also its range of capacities, particularly in respect of timbre. Or, Fifth. A perfect fifth partial has a frequency exactly five times that of the corresponding first partial or ground-tone, and musically, forms a just or natural major third to the double octave or fourth partial of the ground-tone. In like manner, a perfect tenth partial has a frequency exactly ten times that of the corresponding ground-tone, and musically forms a just major third to the third octave above the ground-tone or to the eighth partial of the tone, when the tone contains an eighth partial. A major third in equal temperament has not the exact ratio of 4 to 5, which characterizes the major third of the just or natural temperament, but has more nearly the ratio of 4 to 5.0397; and in the equal temperament system any given note forms an approximate but imperfect fifth partial to the note two octaves and a major third below it and an approximate but imperfect tenth partial to the note three octaves and a major third below it. And we may, for economy's sake, dispense with the supplemental set of alternators 4, 4, by which the perfect fifth and tenth partials, are supplied, as already fully described in connection with Fig. 3, and use, at least for some purposes and to some limited extent, the approximate but imperfect fifth-partials, or fifth and tenth partials derived, in the case of any given ground-tone, from the alternators which supply the ground-tones to the notes respectively two octaves and a major third and three octaves and a major third above the first-mentioned ground-tone. Fig. 49 illustrates schematically a construction of this kind, showing for one key, the alternators by which it is supplied with the electrical vibrations answering to the required tone partials; and showing also, for one alternator, its connections to all the keys of a keyboard to which it supplies vibrations, supplying a partial of one order to one key, and partials of other orders, but all of the same frequency as the first, to other keys. With the system illustrated schematically in Fig. 49 we have only the alternators of the ground-tone set 2, 2, and each of these (a) supplies, as before described, a ground-tone to one note, a second partial to the note an octave below the first, a fourth partial to the note two octaves below the first, an eighth partial to the note three octaves below the first, and a sixteenth partial to the note four octaves below the first; subject to the exceptions already pointed out in connection with Fig. 3; and (b) supplies also, as already described in connection with Fig. 48, approximate but slightly imperfect third, sixth, and twelfth partials respectively to the notes one octave and a fifth, two octaves and a fifth and three octaves and a fifth below that to which it supplies the ground-tone; subject, of course, to the exceptions already pointed out in connection with Fig. 48; and (c) also supplies approximate but imperfect fifth and tenth partials to the notes, respectively, two octaves and a major third and three octaves and a major third below that to which it supplies the ground-tone; subject, of course, to the exceptions, that if there be no note in the compass of the instrument two octaves and a major third below a given alternator, to which it can supply an approximate fifth partial, or no note three octaves and a major third below such alternator, to which it can supply an approximate tenth partial, it does not supply such fifth or tenth partial.

To now briefly recapitulate this matter, we may say:

First. That from a single set of alternators and an arrangement of keys or note-controlling devices, each of which controls one alternator only, musical notes of good, or, at least, of fair quality, and of great power may be produced, and that with such an apparatus as is illustrated for example in Fig. 1, a skilful performer can produce some agreeable musical effects.

Second. That from a single set of alternators supplying the ground-tones or first partials, and also the second and fourth partials, and, if desired, the eighth and sixteenth partials, as illustrated, for example, in Fig. 47, much richer and more striking tones and much better musical effects can be produced.

Third. That by employing for each note of the scale a group of alternators having vibration-frequencies corresponding respectively to the ground-tone and to a plurality of the overtones thereof, as described in the specification of the Letters Patent before mentioned, dated April 6, 1897, and as illustrated in connection with my other improvements hereinbefore described in Fig. 46, still better musical effects may be produced, since the performer has not only the first, second and fourth partials under his control, but has also the third, fifth and sixth partials to use or not use, singly or in combination, as he may desire; but in this case the improvement in musical capacity is attained at the cost of a great increase in the complexity and expense of the plant.

Fourth. That with the simple construction illustrated in Fig. 3, and before fully described, by which we employ with the ground-tone set of alternators, from which the ground-tones and the second, fourth, eighth and sixteenth partials are derived, a supplemental set of alternators from which the third partials, and also preferably the sixth and twelfth partials are derived, and another supplemental set of alternators from which the fifth partials, and also preferably the tenth partials, are derived, we obtain as good musical results as with the system illustrated in Fig. 46, at a very much lower expense.

Fifth. That with the modification illustrated in Fig. 48, in which the supplemental set of alternators for the third, sixth and twelfth partials is dispensed with, and approximate but somewhat imperfect, third, sixth and twelfth partials derived from the ground-tone set, we reduce the cost of the plant at the expense of having some of our partial tones not exact multiples by the requisite small numbers of the corresponding ground-tones. And, Sixth. That with the further modification illustrated in Fig. 49, by which not only the third partial supplemental set of alternators is dispensed with, as just described, but also the fifth partial supplemental set, and approximate but imperfect fifth and tenth partials are derived from the ground-tone set of alternators, a further reduction in expense is effected as compared with the structure illustrated in Figs. 3, 3A, 5, and 8 to 19, at the expense of having the fifth and tenth partials imperfect, as well as the third, sixth and twelfth partials, and in a greater degree.

In any case in which extreme economy is necessary, the structure illustrated in Fig. 1, or better, if it can be at all afforded, that illustrated in Fig. 47 should be used. The construction already described in connection with Fig. 3 and Figs. 8 to 19, is preferable in that it gives perfect third, fifth, sixth, tenth and twelfth partials as well as perfect first, second, fourth, eighth and sixteenth partials. With the cheaper construction illustrated in Fig. 48, the extent to which the approximate but imperfect third, sixth and twelfth partials may be used, and with that illustrated by Fig. 49, the extent to which the approximate but imperfect fifth and tenth partials may be used must be determined by the taste and skill of the performer and the nature of the effects to be produced. By properly operating the switches 55, 55, 55$^a$, 55$^a$, any performer can use any one or more of the imperfect sets of partials (as well as any one or more of the perfect sets of partials) as and when he will and with more or less strength, as he desires. And when he does not wish to use them, he cuts them out of the tone completely.

With the arrangements of alternators and circuits illustrated in Figs. 3 and 46, I consider it, as before stated, desirable that the several alternators should produce current-waves as nearly as possible sinusoidal; and this is even more emphatically true with reference to the modified constructions illustrated in Figs. 48 and 49, in both of which a third partial or harmonic $3n$, existing in the waves of the ground-tone alternators 2, 2, would tend to beat with the approximate third, sixth and twelfth partials derived from higher alternators of the same set; while in the construction of Fig. 49 any fifth partials in the waves of the alternators 2, 2, of the ground-tone set would tend to beat more strongly with the imperfect fifth and tenth partials derived from the higher alternators of the same ground-tone set. But with a system such as that illustrated in Fig. 1, in which there is but one set of alternators and in which each key controls one alternator only, the presence of harmonics of moderate power in the waves of the alternators is rather beneficial than objectionable, at least in the lower part of the compass, and in so far, at least, as the harmonics of frequencies three and five times respectively the ground-tone, are concerned. And with the arrangement illustrated in Fig. 47, I consider that a weak third partial, which it is well known often exists in the waves of an alternator, and even a weak fifth partial may be rather beneficial than injurious.

Finally, the wave-form of any given alternator, if it be not strictly sinusoidal, is more or less altered in transmission from its source to the vibration-translating devices 70, 70. The general effect, of this alteration consists in a suppression of the higher components of the wave to a greater extent than the lower components. Thus the waves of electric current vibrating through the coils 76 (Figs. 34 and 35) of the receiving telephones, may be much more nearly sinusoidal than the waves of impressed voltage in the alternators producing them; and this effect of tone-purifying, by suppressing the higher harmonics of the waves to a greater extent than the ground-tone, may be heightened by increasing the self-induction and resistance of the several circuits which act inductively one upon another, to transmit vibrations from the alternators to the vibration-translating devices and reducing the mutual inductions of each pair of inductively-interacting circuits. Thus, if, avoiding in our inductoriums and impedance coils all closed or nearly closed iron magnetic circuits, as before described, we increase the self-induction and the ohmic resistance of the following circuits, namely: (*a*) the circuits including the coils 56, 56$^a$, 56$^b$, etc.; (*b*) the circuit including the coils 58, 62 and 60, 60; (*c*) the circuit including the coils 63, 64 and 66, 66; and (*d*) the circuit including the coil 65, mains 68 and 69 and vibration-translating devices 70, 70, Fig. 3; and if at the same time we diminish the mutual inductions subsisting between the primary coils as 56, 56$^a$, 56$^b$ and their secondary 58, and that between the coils 62 and 63, and that between the coils 64 and 65, an alternator whose wave of impressed voltage contains a number of harmonics of considerable strength, will cause waves of current much more nearly sinusoidal in the mains 68 and 69. Thus, it is possible to make the very same circuits that serve for the combining of the vibrations serve also to some extent as tone-purifying devices. But by generating sinusoidal waves in the first instance, the need for tone-purifying is eliminated and the loss of power that it involves prevented. Whatever the nature of the waves produced by an alternator may be, the distributed capacity of a long line or cable tends to alter any complex wave-form more or less, suppressing the higher components of the wave to a greater extent than the lower components. This difficulty, however, should not with good lines be so serious as to prevent the practical distribution of electrical music, produced in the manner hereinbefore described, to considerable distances from a central station. It has been distributed by my system over a metallic circuit more than a hundred miles in length and which included several miles of cable, producing, under these circumstances, sounds almost as loud as those produced by an orchestra. Finally, the difficulties just mentioned in respect of alteration of the wave-forms of the impressed vibrations by a distributed capacity of a long line or cable, are not practically by any means so serious in distributing music generated electrically, with an instrument such as that hereinbefore described, as in distributing music electrically by means of microphones. First, for the reason that the currents produced by the alternators hereinbefore described are enormously more powerful than any currents that a microphone can handle; and, second, because by means of the rheostats 12, 12, each alternator can be given such a voltage as is required to put its vibrations over the line with the requisite power relative to the vibrations of the other alternators; and, finally, the power of each note, and, indeed, of each partial tone of each note, is controlled by the performer, who listens to one of the receivers 70, 70, similar to that to which his hearers listen, at their more or less distant stations, and is thereby enabled to counteract or compensate in some measure the effects of a line in altering the wave-forms of the transmitted vibrations, producing in the result such sounds as seem agreeable to him.

The supplemental sets of generators 3, 3, and 4, 4, before described, have frequencies respectively three times and five times that of the corresponding ground-tone generators. I consider supplemental generators of these frequencies more useful in general than supplemental generators of other frequencies. But supplemental generators of other frequencies may be used, either with the third partial generators 3, 3, and fifth-partial generators 4, 4, or without them. To give one illustration of this principle, we may use, with a set of ground-tone alternators 2, 2, adapted to produce sinusoidal or nearly sinusoidal waves, a supplemental set of alternators 2$^a$, 2$^a$, of exactly the same frequencies as the alternators 2, 2, but constructed to produce a different shape of wave. Let us suppose the alternators of the first set for the lower notes to be of the kind illustrated to the left of Figs. 8 and 10, and in Figs. 11, 12, 12$^A$ and 12$^B$, and the alternators of the same set for the higher notes to be inductor-generators of the type illustrated in Figs. 8 and 10 and Figs. 13 to 16, having the teeth of their rotating inductors curved, as illustrated in Fig. 18$^A$ or in such a manner as to produce a sinusoidal or nearly sinusoidal wave; and let us suppose one supplemental set of alternators 2$^a$, 2$^a$, to have rotating inductors for all its alternators (of which the two carried by a pitch-shaft and corresponding to the two lowest notes of that shaft, may be of the type illustrated in Figs. 62 and 63, or of any other suitable kind; the four corresponding to the third, fourth, fifth and sixth notes of that shaft may be of the type illustrated in Figs. 62 and 63, or of the type illustrated in Figs. 8 and 10 and 13 to 16, or of any other suitable type; and the alternator corresponding to the highest note of said shaft may be of the kind illustrated in Fig. 17 or of any other suitable kind) said inductors being keyed to the same shaft that gives movement to the corresponding alternators 2, 2, and furnished with sharp or square-cornered teeth of a peripheral breadth of, say, one third the pitch (that is, one-third the distance from the center of a tooth to the center of the next adjacent tooth), as illustrated, for example, in Fig. 18$^B$; the seven inductors of the supplemental set 2$^a$, 2$^a$, carried by a pitch-shaft having for the arrangement of parts illustrated in the drawings 3, 6, 12, 24, 48, 96 and 192 teeth, respectively, so as to produce exactly the same number of cycles in unit time as the corresponding alternators of the set 2, 2, carried by the same shaft. The wave-shape of the vibrations produced by the supplemental ground-tone set of alternators 2$^a$, 2$^a$, will be different in the case described from the wave-shape produced by the alternators 2, 2; and the timbre of the notes produced from the vibration-translating devices 70, 70, by the two sets of alternators 2, 2 and 2$^a$, 2$^a$, will be markedly different. With these two ground-tone sets of alternators 2, 2 and 2$^a$, 2$^a$, of differing wave-shapes, we may use also the third-partial supplemental set of alternators 3, 3 and the fifth-partial supplemental set 4, 4; or we may omit one or both of said supplemental sets. Further, with the two ground-tone sets of alternators, 2, 2 and 2$^a$, 2$^a$, adapted to produce notes of different timbres, we may derive from each set of alternators a plurality of sets of vibrations having frequencies corresponding respectively to the first, second, fourth, and if desired also to the eighth and sixteenth partials; which vibrations may be sinusoidal or nearly sinusoidal in the case of the alternators 2, 2, and more or less highly complex in the case of the alternators 2$^a$, 2$^a$. And each of these sets of vibrations may be made to be usable and controllable independently of the others, in the manner and by the means already described in connection with the coils 56, 56$^a$, 56$^b$, 56$^c$, 56$^d$, etc.

Fig. 82, which is a view in general similar to Fig. 3$^A$, illustrates such a construction, in which two ground-tone sets of alternators are used, namely, the set 2, 2, for producing vibrations as nearly sinusoidal as possible, and the set 2$^a$, 2$^a$, for producing markedly complex vibrations, containing odd-numbered partials as well as the ground-tone; the first, second, fourth, eighth and sixteenth partials being derived from the alternators of the set 2, 2; and three sets of composite vibrations having frequencies corresponding respectively to the first, second and fourth partials being derived from the set of alternators 2$^a$, 2$^a$. The construction, arrangement and mode of operation, appear so clearly from Fig. 82, in the light of the description already given, that further description would be out of place.

Instead of using a single set of supplemental ground-tone alternators 2$^a$, 2$^a$, a plurality of such sets may be used, each constructed to produce a different wave-shape and a different quality of tone.

*Of modified and alternative constructions of the timbre-controlling devices, and of the expression-controlling devices.*

Figure 52:
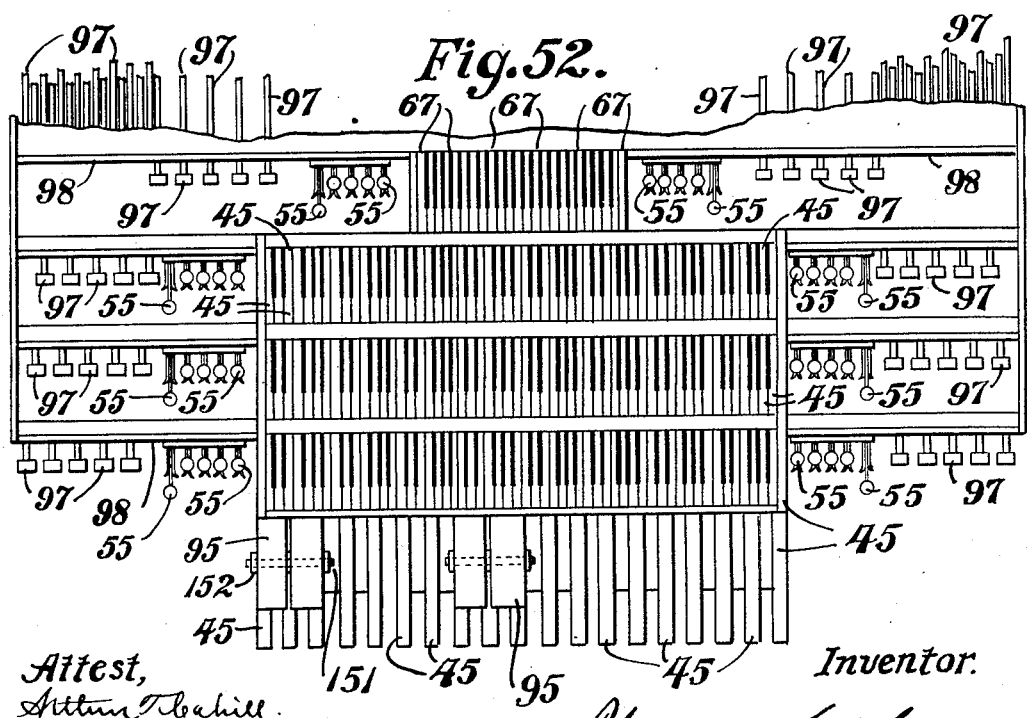

Instead of using the means for controlling the timbre and loudness already described and illustrated particularly in Figs. 3, 3$^A$, 6, and 20 to 33, we may use a variety of other devices. Thus, for example, instead of controlling the loudness of the several sets of partial tones of a keyboard, or the loudness of the notes of a keyboard by varying the resistance and self-induction of a circuit, or by varying the resistance or the self-induction of a circuit, as before described, we may produce similar results by varying the mutual induction subsisting between vibration-transferring and vibration-receiving circuits. One arrangement for this purpose is illustrated in Figs. 50 to 53$^A$, of which Fig. 50, which is a schematic view, shows the connections between the bars as 54, 54$^a$, etc., before described, and the coils as 56, 56$^a$, etc., before described, of one keyboard, and the vibration-translating devices; the connections, controlled by the keys, between said coils as 56, 56$^a$, and said bars as 54, 54$^a$, etc., and the alternators being as before described in connection with, and as illustrated in, the preceding figures. Fig. 51, which is also a schematic view, shows the coils 56, 56$^a$, etc., corresponding respectively to the different order of partial-tones, for one of the four keyboards, with the connections between the same and the vibration-translating devices; Fig. 52 is a detail, a plan view, illustrating the arrangement of the four pitch keyboards (three manuals and a pedal keyboard), the dynamic manual, the switches 55, for each keyboard, for interrupting the circuits of the coils 56, 56ª, 56ᵇ, etc., corresponding to the different orders of partial-tones of that keyboard, the swell-pedals 95, 95, corresponding to the four keyboards, and the draw-tops 97, 97, for each keyboard, corresponding to the different orders of partial-tones with which such keyboard is supplied and serving for regulating the strength thereof, one independently of another. And Figs. 53 and 53^A are detail sectional views, partly in elevation in a plane parallel with the length of the draw-stops 97, or parallel with the length of one of the keys 45 of the keyboard, illustrating the connection between the draw-stops and the inductoriums controlled by them, and also between the swell-pedals and the inductoriums controlled by them. Fig. 53 illustrates the front portion of the mechanism, and Fig. 53^A the rear portion.

Figure 50:
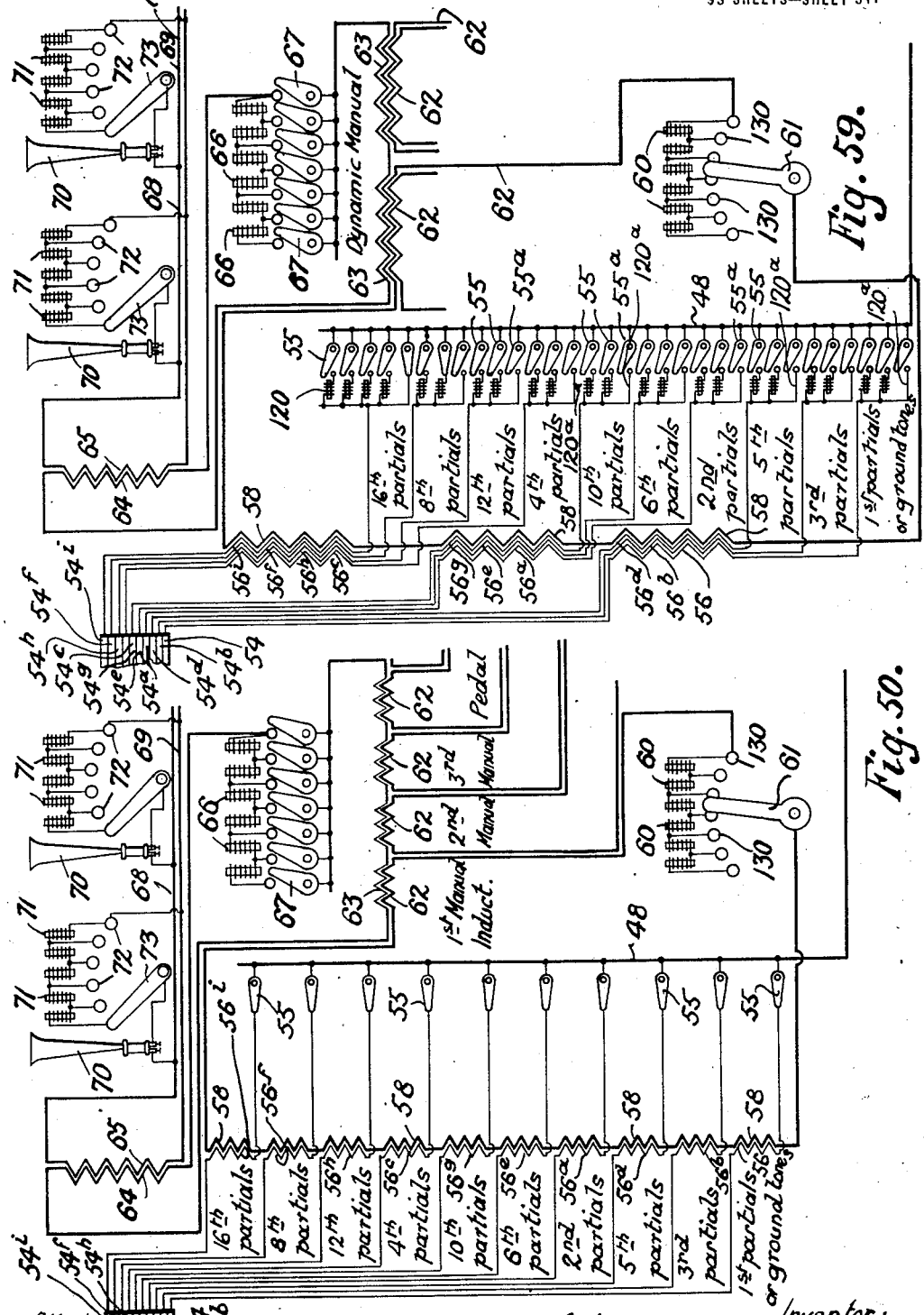

Those parts illustrated in Figs. 50 to 53^A, that are illustrated in Figs. 1 to 45, and have been before described, will require no description, but the present description will be confined to those parts in Figs. 50 to 53^A which have not been before described. The primary coils 56, 56ª, 56ᵇ, 56ᶜ, 56ᵈ, 56ᵉ, 56ᶠ, 56ᵍ, 56ʰ, 56ⁱ, for each keyboard, corresponding to the different orders of partial tones of that keyboard are retained, but are wound upon separate cores 83, 83, made of thin and very soft and well annealed iron or steel plates, which are bolted firmly to the bar 84. For the single secondary coil 58 of Figs. 3 and 6, a plurality of secondary coils 58, 58, one for each of the primary coils 56, 56ª, 56ᵇ, 56ᶜ, 56ᵈ, 56ᵉ, 56ᶠ, 56ᵍ, 56ʰ, and 56ⁱ, is used. Thus, it will be seen, there is a distinct inductorium for each different order of partial tones of each keyboard, and one of the coils of each of these tone partial inductoriums is mounted to move with relation to the other. Electrically, it makes no difference whether we move the primary or the secondary, or both; but mechanically it is convenient to move only one and that the lighter one. In the drawings, the secondary is the lighter coil and it is mounted to move with relation to the primary. The several secondaries 58, 58, belonging to a keyboard are illustrated in Figs. 50 and 51 as connected together in series to form one circuit, though, obviously, it would be possible to arrange them in parallel circuits. Each of the secondary coils 58, 58, is wound upon a spool or bobbin 85, which has a hollow interior sufficiently large to permit it to slip easily over the corresponding primary coil (56, 56ª, 56ᵇ, etc., as the case may be). Each of the bobbins 85 with its coil 58, is mounted upon and firmly attached to a bar 86, which is mounted by means of the grooved wheels 87, 87, 87, 87, pivoted at 88 to the hangers 89, which are screwed fast to the rail 90, as illustrated in the drawing.

The bar 86 is connected by a link 91, with one arm 92, of a rock-shaft 93, whose other arm 94 is connected by another link 96, with the draw-stop 97, which slides in the framing 98 of the keyboard and is furnished with a knob or handle, which the performer manipulates. When the parts occupy the positions in which they are shown in Figs. 53 and 53^A, the secondary coil 58 stands remote from the corresponding primary coil (56, 56ª, 56ᵇ, etc., as the case may be). But the performer, by pulling the draw-stop 97 toward him, gives movement through the link 96, rock-arm 94, rock-shaft 93, arm 92 and link 91 to the secondary coil 58, moving said coil into a position of greater or less proximity as required to the corresponding primary coil, (56, 56ª, etc., as the case may be,) thereby varying the mutual induction between such secondary 58 and the corresponding primary coil, thus increasing or decreasing the loudness of the corresponding order of partial tones, at the will of the performer.

The secondary coils 58, 58, corresponding to the different orders of partial tones belonging to a keyboard, are connected in series, it will be observed, with a primary coil 62, whose secondary 63, (like the secondaries 58, 58) is mounted upon a similar but larger bobbin 85, constructed to move over the primary coil 62, said bobbin being mounted upon a bar 86, which is itself mounted between the grooved wheels 87, 87, 87, 87, and connected by a link 91 with the arm 92, of a rock-shaft 93, all as before described, in connection with the bobbin 85, that carries one of the coils 58, 58. But the four rock-shafts 93, 93, that serve to transmit movement to the secondary coils 63, 63, corresponding respectively to the four pitch keyboards, have their lower arms 94, 94, connected by the links 148, with the arms 149, of the swell pedals 95, 95, as illustrated in Fig. 53, instead of being connected with draw-stops 97, 97.

In like manner, the secondary coils 63, 63, of the several key-boards are connected in series with each other (though of course they might be connected in parallel with each other) and in series with the primary coil 64, and with the impedance-coils 66, 66, controlled by the keys 67, 67, of the dynamic manual.

The primary 64 acts by induction on the secondary 65, which is connected with the mains 68, 69, and the vibration-translating devices 70, 70, as before described.

Thus, it will be seen, with the apparatus illustrated in Figs. 50 to 53^A, the performer can, by opening the switches 55, 55, wholly prevent any one or more of the coils 56, 56ª, 56ᵇ, 56ᶜ, etc., from acting on the lines 68, 69, and by properly manipulating the drawstops 97, 97, he can regulate the intensity of the action of such of the coils 56, 56ª, 56ᵇ, etc., as he permits to act upon the line, from the minimum to the maximum, merely by drawing the stops 97, 97, in or out, more or less, as he finds necessary to produce the desired effect. By operating the swell-pedals 95, 95, he varies the strength of the tones of each keyboard at will independently of any other keyboard. While by the dynamic keys 67, 67, he can alter the loudness of the note by greater or less degrees, and with absolute instantaneousness.

And numerous other modifications of the expression mechanism may be made. Thus, for example, instead of varying the loudness of the tones by varying the impedance of a circuit, as illustrated, for example, in Figs. 3 to 6 and 28 to 33, or by varying the mutual induction subsisting between vibration-transferring and vibration-receiving circuits, as illustrated, for example, in Figs. 50 to 53ᴬ, we may vary the loudness by varying the number of active turns in a coil—that is, by varying the number of turns through which the current circulates. Fig. 54, which is a schematic view similar in kind to Figs. 6 and 50, but illustrating the expression mechanism for one of the four keyboards only, shows an arrangement for varying the loudness of the different elements of the tone by varying the number of active turns in the several primary coils 56, 56ª, 56ᵇ, 56ᶜ, 56ᵈ, 56ᵉ, 56ᶠ, 56ᵍ, 56ʰ, 56ⁱ. Each of these coils is in fact divided into sections by the leading-out wires 200, which connect with contact buttons 201, with which the switch 202 makes contact. From an inspection of the drawing, it will appear that the number of active turns in any of the primary coils 56, 56ª, 56ᵇ, etc., that is to say, the number of turns of said coil through which the currents from the alternators circulate, can be varied at will within certain limits by throwing the switch 202, centered at 203, into contact with the different contact buttons 201, 201. An impedance-coil 204 is inserted in series with each of the coils 56, 56ª, etc., so as to prevent any very considerable increase in the amperage or intensity of current in said coil when the current flows through only a small portion of its turns. For greater clearness and to avoid multiplicity of crossing lines, the secondary coils 58, 58, corresponding respectively to the primary coils 56, 56ª, 56ᵇ, etc., are illustrated in Fig. 54 as connected in series with each other and with the rheostat-coils 60, 60, and brush 61, and with the primary coil 62, which acts upon the line and receiving telephones 70, 70, through the coils 63, 64 and 65, in the manner illustrated in the drawings and already described in connection with Figs. 1, 3, and 6. But obviously a single secondary coil 58, might be used for a keyboard, and all the corresponding primary coils 56, 56ª, 56ᵇ, etc., be arranged in direct inductive relation to it, as illustrated for example in Figs. 3 and 6.

In Fig. 55, each of the primary coils 56, 56ª, 56ᵇ, etc., acts by induction on a corresponding secondary coil 205, which is divided, in effect, into sections by the leading-out-wires 200, which connect with the several contact buttons 201, 201, with which the corresponding switch 202 makes contact. This switch serves by its movement from one contact-button 201 to another to cause the current induced by the corresponding primary coil (56, 56ª, 56ᵇ, etc., as the case may be) in the coil 205, to circulate through a greater or less number of the turns of said secondary coil 205. The several secondary coils 205, 205, are connected in series each with the corresponding primary coil 206, and all the primary coils 206 act by induction upon the secondary coil 207, which acts upon the line in the same manner as the coil 58, Figs. 1, 3, 3ª and 6; or it may act upon the line in any other suitable manner. An impedance coil 204 (Fig. 55) is inserted in series with each pair of coils 205, 206, to prevent dissipation of energy in any of the coils 206, conveyed to it by induction from one or more other of said coils 206, when the coil 205 connected with the first mentioned coil 206 has but a few of its turns active; a condition of things in which the voltage generated in the coil 205 would be low and its impedance small, making it possible, apart from the impedance coil 204, for current to flow in one of the primaries 206, very much as if it were a short-circuited secondary to one of the other of said primaries 206 or to the secondary 207. A few sections only are shown for each of the coils 56, 56ª, 56ᵇ, etc., (Fig. 54) and 205, 205, (Fig. 55), in illustration of the principle, but a much larger number may be used in practice.

The principle of governing the loudness of an electrically-produced sound, by governing the intensity of inductive action of one coil upon another, by varying the number of active turns in one of said coils, which I have illustrated in Figs. 54 and 55, as applied to governing the loudness of the several partial tones of a keyboard, may be used, if desired, for other purposes. Obviously, the intensity of action of the coils 62, 62, corresponding to the several keyboards, upon the coil 63 might be governed in this manner, or the intensity of action of the coil 64 upon the coil 65 might be thus governed. But I consider the means illustrated in Figs. 1 to 6, 20, 28 to 33, before described, for governing the intensity of action of the coils 62, 62, upon the coil 63, and of the coil 64 upon the coil 65 to be preferable.

Another mode of varying the loudness either of the several partial tones of a keyboard or of the notes of the different keyboards, or of the ensemble, is to vary the number or character of circuits or conductors that are used to transfer vibrations inductively from one field to another. One arrangement for this purpose is illustrated in Fig. 56, in which 56, $56^a$, $56^b$, etc., are the primary coils, corresponding respectively to the different orders of partial tones of a keyboard, and which coils are connected through the bars 54, $54^a$, $54^b$, etc., and the key-controlled contact-springs 49, $49^a$, $49^b$, etc., or switches 282, $282^a$, $282^b$, etc., with the alternators as before described, and through which primary coils the electrical vibrations corresponding respectively to the different orders of partial tones vibrate, when the proper keys are depressed, as already explained in connection with Figs. 3, $3^A$, and 6. In inductive relation to each of these primary coils 56, $56^a$, $56^b$, etc., is a group of secondary coils 210, 210, a different group for each of the primary coils 56, $56^a$, $56^b$, etc. Each of the secondary coils, 210 of the several groups corresponding to one keyboard has one end connected with the common-return wire 211 of small or negligible self-induction and resistance and the other end connected through an impedance coil 214 and a switch 212 with a plurality of primary coils 213, arranged in parallel circuit and having their other terminals connected with the common-return wire 211 aforesaid. Each of the secondary coils 210, corresponding to a keyboard, it will be seen, passes its vibrations, when the switch 212 corresponding to it is closed, through the primary coils 213, aforesaid. We might of course make all the coils 210 of a group exactly alike, in which case any given primary coil as 56, $56^a$, $56^b$, etc., would exert a greater or less influence upon the inductorium of which the coils 213, aforesaid constitute the primary winding, according to the number of said coils 210 whose switches 212 were closed. Or we may give unequal numbers of turns to the different coils 210 of a group, giving, for example, to one of said coils, a small number of turns which we shall designate as $n$ turns, to another $2n$ turns, to another $4n$ turns, and so on; or giving a uniform number of turns to all the coils 210 of a group (that is, all the coils 210 that are acted upon by the same primary coil 56 or $56^a$, etc.,) or we may give different amounts of impedance to the several impedance coils 214, 214, which are inserted in the circuits of the several coils 210, 210, aforesaid. Whatever arrangement we adopt, by closing different ones of the switches 212, or by closing different combinations of said switches, we can alter greatly the intensity of action on the coils 213, of any of the coils 56, $56^a$, $56^b$, etc., independently of the other coils 56, $56^a$, $56^b$, etc., and by giving different intensities of action from zero to their maximum powers to the different coils 56, $56^a$, $56^b$, etc., can alter the timbre, within certain limits, as required.

In inductive relation to the primary coils 213, Fig. 56, is a group of secondaries 215; and the secondaries 215 of the four keyboards (those for one keyboard only being shown in Fig. 56), act in turn by induction through the primary coils 216, that are connected in series with said coils 215, respectively, upon the ensemble circuits, as illustrated schematically in Fig. 56. 217, 217, are impedance-coils, inserted in series with the coils 215 and 216; and 218 are switches inserted in said circuits, by the manipulating of which any one or more of the secondary coils 215, corresponding to any given keyboard, can be made to act through the primary coil 216, in series with it upon the ensemble circuits, each of which includes the secondary coils 219, 219 (in inductive relation to the groups of primary coils 216, 216, of the several keyboards), the primary coil 220, the impedance coil 221 and the switch 222.

By suitably manipulating the switches 212 controlling the coils 210, 210, corresponding to a keyboard, the timbre of the notes of that keyboard can be varied within wide limits, at the will of the performer. And by suitably manipulating the switches 218, 218, each of the secondary coils 215, of the group belonging to a given keyboard, may be made to act upon the ensemble circuits (219, 219, 220) or not, as required; and thus the intensity of the notes of each keyboard can be governed, as required, independently of the other keyboards. And by manipulating the switches 222, 222, the power of the ensemble of tones can be governed.

The several impedance coils 214, 214, should each have sufficient impedance to prevent any of the coils 210 from acting as a short circuit of small impedance to the currents which any other of the coils 210 should produce in the coils 213. In like manner, the impedance coils 217 should each have sufficient impedance to prevent the circuit in which it is inserted from acting as a closed secondary of small impedance, to any other parallel circuit 215, 216, of the same group. So, also, each of the impedance coils, 221, should have a sufficient amount of impedance to prevent the circuit in which it is inserted from acting as a closed secondary, of small impedance, to any of the other circuits 219, 219, 220. In these, as in other cases, the builder can give to each coil the impedance desired, by winding on more or less wire, as required.

Another kind of expression device is illustrated in Figs. 57 and 58, of which Fig. 57 is a view similar to Fig. 53^A and makes with Fig. 53 a complete view, Fig. 53, showing the front portion of the mechanism of Fig. 57, as well as of Fig. 53^A, the front portion being identical in the two cases. In these figures 56 is the primary coil and 58 the secondary coil of a tone-partial inductorium (see Fig. 50); or the two coils might constitute one the primary and the other the secondary of a keyboard inductorium answering to the coils 62 and 63 in Figs. 3, 3^A and 6, or to the coils 64 and 65 in Figs. 3, 3^A and 6. 230 is a thick plate or screen of copper or other suitable well-conducting material, mounted by a bar 86, which bar is itself mounted by means of the grooved wheels 87, 87, 87, 87, and connected by a link 91 with the arm 92 of the rock-shaft 93, to receive movement from one of the draw-stops 97, or from one of the swell-pedals 95, by the means and in the manner already described in connection with Figs. 53 and 53^A.

When this metal screen 230 is clear of or remote from the two coils, as 56 and 58, Figs. 57 and 58, for which it serves, the action of the one upon the other is not interfered with, but when the screen 230 is thrust fully between said coils 56 and 58 the action of one upon the other is greatly hindered or reduced or screened by means of the Foucault or eddy currents that are generated by induction in the substance of the thick conducting plate or screen 230. A coil of copper wire or ribbon closed upon itself might, of course, be used as a screen, instead of the solid plate 230, but the plate is preferable in respect of being simpler and cheaper. The screening action is somewhat more intense for the high notes than for the low. The operation of this expression device is more satisfactory when the coils 56 and 58 used are of large diameter and short axial length than where they are of small diameter and great axial length. The former is the preferable construction.

Another mode of governing the loudness of the tones by varying the intensity of inductive action of one circuit upon another is to place a third circuit in inductive relation to the first circuit or to both circuits, and to open and close the third circuit, or to alter its impedance. Fig. 83 illustrates a possible construction of this kind for varying the intensity of action of the primary coils 56, 56^a, 56^b, 56^d, 56^e, and 56^g, before described, upon their respective secondary coils, 58, 58. 300, 300, are the regulating coils or circuits arranged in intimate inductive relation to the pairs of inductively-interacting circuits, (as 56 and 58, 56^a and 58, etc.), the intensity of action of one of which upon the other is to be controlled. 120, 120, are the impedance coils, before described, arranged in parallel; and 301 are switches corresponding to said coils 120, 120, by which the circuit of the coil 300 may be closed through one or more of the impedance coils 120, as desired. If the switch 55, controlling the circuit of the coil 56, or 56^a, 56^b, etc., be open, such coil can, of course, exert no influence upon its secondary coil 58. But if the switch 55, controlling the circuit of the coil 56, for example, be closed, the intensity of action of said coil 56 upon its secondary 58 will be influenced more or less by the coil 300 if any of the switches 301 be closed. If the circuit of the coil 300 be open, the coil 56 will exert its full influence on the coil 58, unaffected by the coil 300. But if any one or more of the switches 301, 301, or 301^a, be closed, the vibratory currents in the coil 56 will produce, by induction, currents in an opposite sense in the coil 300, which latter will tend to weaken the influence of the coil 56 upon the coil 58, more or less, according to the circumstances. The greater the mutual induction subsisting between the coil 300 and the coils 56 and 58, and the greater the admittance of the circuit of which the coil 300 forms part, the more powerful will the influence of said coil be in weakening or neutralizing the influence of the coil 56 on the coil 58. That influence, in any given case, will be at its maximum when the switch 301^a is closed, which, it will be seen, short-circuits the coil 300 on itself. If the builder wind the coil 300 of a wire of the same diameter and length as that used for the coil 56, and parallel to it around the same core, he can readily, by winding a greater or less amount of wire of greater or less resistance into the several coils 120, 120, produce, when the circuit of 300 is closed through one of said coils 120, by the appropriate switch 301, a greater or less change in the intensity of action of the coil 56, for any given note upon the coil 58 corresponding to it.

In like manner the intensity of inductive action of the coil 62 upon the coil 63 may be varied by varying the impedance of a coil 302 wound about the same core as the coils 62 and 63 in intimate inductive relation to them. One arrangement for this purpose is illustrated in Fig. 83, the coils 60, 60, and switch 61 (see also Figs. 28 to 33), being inserted in series with the coil 302 aforesaid.

Instead of governing the loudness of the tones by varying the intensity of inductive action of one coil, as 56, upon another as 58, by varying the impedance of the coil 300, an effect of control may be produced by varying the number of active turns in the coil 300. Such a construction is illustrated in Fig. 83, for controlling the action of the coils 56^c and 56^h upon the coils 58, 58, corresponding respectively to them. 200 are the leading out wires; 201 the contact-buttons with which such wires are connected, and 202 the switch which, by making contact with one or another of said contact-buttons, regulates the number of turns of the coil 300 that are closed and therefore active in weakening the inductive action of the primary-coil (as 56$^c$ or 56$^h$) on the corresponding secondary coil. With this form of device, as with those illustrated in Figs. 54 and 55, the smaller the sections of the coil connected with the contact-buttons 201, and the greater the number of such sections and buttons, the more perfect the control.

Instead of using one coil 300, for each pair of inductively interacting coils (as 56 and 58 or 56$^a$ and 58, etc.), and varying its impedance or varying the number of its active turns as before described, we may employ a plurality of such coils, each of less power than the coil 300 before described, and close one or another of them, or a combination of them, as required. Such an arrangement is illustrated in Fig. 83, for governing the action of the coils 56$^f$ and 56$^i$ on their respective secondary coils 58, 58. 300, 300, are the coils; 301 the switches controlling them and 335 the impedance coils that may be inserted in their circuits to prevent them from acting as closed secondaries of small impedance to the circuit of the coil 58, when 56$^f$ or 56$^i$ is inactive.

Instead of arranging the impedance coils 60,-60, in series with one another, as illustrated in Figs. 3, 6 and other figures, it would be possible to arrange them in parallel. One arrangement for this purpose is illustrated in Figs. 84, 85, 86 and 87, of which Fig. 84 is a schematic view and in part a detail front elevation; Fig. 85 a detail top view largely schematic; Fig. 86 a detail sectional view, partly in elevation, on the line 86, 86, Fig. 85; illustrating the connection between the swell-pedal 95 (Figs. 20 and 30) and the switch-operating frame 312; and Fig. 87 a detail front elevation of said switch-operating frame and the milled bar by which it is mounted; and in each of these figures a portion of the apparatus is broken away or omitted. In these figures 60, 60, are the impedance coils, arranged in parallel circuit, all having one terminal connected with the terminal of the coil 62, and each having its other terminal connected with a contact-screw 305, set in the insulating bar 306, and adjustable by means of a lock-nut. 314 is a metal bar, by which the insulating bar 306 is supported. 307, 307, are platinum contact-points, inserted in the ends of the screws 305, 305. 308, 308, are contact-levers or switches, mounted on the rod 309 and set in slots milled in the metal bar 310. The levers 308 correspond to and control the coils 60, 60; and to this end each of said levers has a platinum point set in its front end to make connection with the contact-point 307, in the screw 305 that connects with the corresponding coil 60. The milled bar 310 and rod 309 are electrically connected with one terminal of the coil 58, whose other terminal is connected through the coil 62 with the coils 60, 60, as illustrated in Figs. 84 and 85. Contractile springs 311, a spring for each of the levers 308, 308, draw said levers downward so that each of said levers (when not held up by the frame 312), makes good electrical connection with the rod 309 and with the corresponding contact-point. 312 is the switch-lifting frame, which is mounted on the rod 309, and furnished with a rear brace-rod or stiffening rod 313 and with a stepped front, which serves when the frame moves in the direction of the arrow, Fig. 86, to lift the levers 308, 308, gradually one after another, thereby breaking the circuits of the coils 60, 60, one after another. Thus, it will be seen, as the frame 312 moves in the direction of the arrow, the impedance of the circuit including the coils 58 and 62 gradually increases as the circuits of the coils 60, 60, are broken, one after another, and the amplitude of the waves propagated from that circuit to the vibration-translating devices 70, 70, gradually diminishes. But when said frame 312 moves in the opposite direction, the impedance of the circuit mentioned gradually diminishes and the amplitude of the waves propagated from it to the translating devices gradually increases. The frame 312 is connected with the swell-pedal 95 by a rod 144, pivoted at 143 to the arm 312$^a$ of said frame, connected at its other end with the arm 145 of the rock-shaft 146, whose other arm 147, is connected by the link 148 with the arm 149 of the swell-pedal 95.

A few of the coils 60, 60, only are shown in Figs. 84 and 85, but a much larger number may used. To produce smooth crescendos and diminuendos, as many as sixty or more of said coils may be used, the number of steps on the frame 312, of contact-screws 305 and levers 308, being increased proportionally. The coils 60, 60, whose circuits are first broken as the frame 312 moves in the direction of the arrow (Fig. 86), should have smaller impedances and those whose circuits are broken later should have larger impedances. A coil 60$^a$ of large impedance, connected as shown, prevents the total interrupting of the circuit by the frame 312. The builder may wind into the coil 60$^a$ enough fine wire to weaken the tone to the minimum desired. He winds the next coil to such an impedance that when added to the circuit, the loudness is increased by such small amount as he thinks best; and so with each succeeding coil; the impedance of each coil added preferably diminishing, as the number added is increased.

Instead of inserting the impedance coils 120, 120, in series with the coil 56, as illustrated in Figs. 3, 3ᴀ, 6 and other figures, said impedances may be inserted in a shunt to said coil, as illustrated schematically in Fig. 88. The same applies, of course, to the coils 56ª, 56ᵇ, etc. So the impedance coils 60, 60, instead of being inserted in series with the coil 62, may be placed in shunt to it; in like manner the impedance coils 66, 66, may be placed in shunt to the coil 64, as illustrated schematically in Fig. 83.

The impedance of a circuit may be varied by altering its ohmic resistance or its self-induction or both. It may also be altered by altering its capacity. And it is possible to produce some variations in the power of the vibrations and in the loudness of the resulting notes, if we substitute for the impedance coils 120, 120, illustrated in Figs. 3, 3ᴀ, 6 and other figures, condensers 320 and resistances 321, as illustrated schematically in Fig. 89, preferably making the condensers of a group of differing capacities. Also some effect of control may be produced if we substitute for the impedance coils 60, 60, of Figs. 1, 3 and 6, etc., condensers 324 and resistances 325, as illustrated in Fig. 89, or if we substitute for the impedance coils 66, 66 (Figs. 3, 6 and other figures) condensers 322 and resistances, 323, as illustrated in Fig. 89. Or the condensers 322 may be arranged in parallel, as illustrated in Fig. 90, which is a view similar to Fig. 85, but showing condensers 322 and resistances 323 substituted for the impedance coils 60, 60, belonging to the construction illustrated in Figs. 85, 86 and 87 and before described. The parallel-circuit arrangement is cheaper with condensers than the series arrangement. I say some effect of control is possible to a skilful performer when condensers are substituted for the impedance coils 120, 60, and 66 of the preferred construction and it seems not impossible that a skilful performer, making a study of his instrument, might produce some striking effects with an arrangement of condensers such as is illustrated in Figs. 89 and 90. But for all ordinary purposes and for all ordinary performers, I consider the preferred form of expression mechanism illustrated in Figs. 3, 3ᴬ and 6, and in Figs. 20 to 33, vastly preferable to that illustrated in Figs. 89 and 90, in which the resonance phenomena (or phenomena in the nature of or related to resonance phenomena, that is to say, the phenomena which takes place in a circuit having resistance, self-induction and capacity when the frequency of the vibrations is widely changed or the capacity, resistance or self-induction substantially altered), which, with much study and great skill on the part of the performer, might, perhaps, be turned to excellent advantage, would for most purposes and in the hands of the great majority of performers be liable to produce serious difficulties from which the preferred construction is entirely free.

Another mode of controlling the expression is to insert a choking coil in a circuit over which vibrations corresponding to a sound to be produced circulate, and to vary the loudness of the sound by varying the virtual or effective impedance of the choking coil. One arrangement for this purpose is illustrated in Fig. 91, in which 340 is a choking coil in series with the coils 56ⁱ, etc.; 341 is a secondary coil which is made to be in intimate inductive relation to the choking coil 340 in any suitable manner, as, for instance, by winding them upon a suitable core, such as the core 165, Figs. 26 and 27. If the choking coil 340 be given a sufficient amount of self induction, very little current can circulate through it while the circuit of the coil 341 is open, but if we close the circuit of the coil 341, the impedance of the choking coil 340 will be reduced more or less according as the impedance of the coil 341 is greater or less. In Fig. 91, 120, 120 are the parallel impedance coils controlled by the switches 342, 342, while the switch 343 closes the circuit of the coil 340 directly. With this arrangement, the flow of current through the coils 56ⁱ and 340 is controlled by controlling the switches 342 which affect the impedance of the circuit of the coil 341. A similar choking coil 340 is placed in circuit with the coils 58 and 62, and a secondary coil 341 is placed in intimate inductive relation to said coil 340, as before described, and the impedance coils 60, 60, connected with the contact-plates or buttons 130, and controlled by the brushes 61, before described, are connected in series with said coil 341, so that the performer, by varying the position of said brushes 61, controls the impedance of the circuit of the coil 341, and thereby affects the intensity of the currents in the circuit of the coils 58 and 62.

Instead of using a single secondary 341 to the choking coil 340, a plurality of secondaries may be used, each having preferably a much greater impedance than the coil 340, and the loudness of the tone may be controlled by closing the circuits of these different coils 341ª, either singly or in different combinations. This construction is illustrated as a means of controlling the power of the vibrations in the coil 56ᶠ, Fig. 91. Or we may vary the number of active turns either in the choking coil 340 or in the secondary 341 in inductive relation to it. These modes are illustrated as applicable to controlling the power of the vibrations in the circuits of the coils 56ʰ and 56ᶜ, Fig. 91.

In Fig. 91, I have illustrated different variations for the several coils 56ⁱ, 56ᶠ, 56ʰ, and 56ᶜ, respectively, but it will be obvious that either type might be used for all the coils 56, 56ᵃ, 56ᵇ, etc.

Numerous other modifications may be made in the expression mechanism. Those described have been described by way of illustration, and not by any means as an enumeration of all possible modifications, for many others are possible. But I wish it to be very clearly understood that while I have illustrated the various forms of expression mechanism before described, in order to make clear the principles of my invention and, as far as space would permit, some of the many variations and modifications that may be made in the practising of it, I consider the expression mechanism illustrated in Figs. 3 to 6 and 20 to 33 as much preferable to any of the others. The intimate inductive relation which it is easy to secure between the several primary coils as 56, 62, 64, etc., and the secondary coils as 58, 63 and 65, corresponding respectively to them, reduces the loss of energy resulting from the inductive transfer of the vibrations from one circuit to another; while the fact that the loudness of the tones can be governed instantly, merely by throwing the different switches as 55, 55, 55ᵃ, 55ᵃ, or operating upon the keys 67, 67, of the dynamic manual, or by shifting the contact fingers 61, 61, over the contact plate 130, 130, makes it possible to change the loudness very rapidly, and to do this even in a large machine without giving movement to the heavy bodies which would have to be moved in a large machine, particularly with the modifications illustrated in Figs. 50 to 53ᴬ and 57 to 58.

Instead of using a single secondary coil 58 for a keyboard, upon which all the coils 56, 56ᵃ, 56ᵇ, etc., act, as illustrated for example in Figs. 3, 3ᴬ and 6, we may use a distinct secondary for each of said primary coils. See, for example, Figs. 50, 54 and 55. Or instead of using one single secondary coil 58, common to all the primary coils 56, 56ᵃ, 56ᵇ, etc., of a keyboard, as in Figs. 3, 3ᴬ and 6, or using as many secondaries 58, 58, as there are primaries, as in Figs. 50, 54 and 55, we may use a plurality of the secondaries 58 for a keyboard, and arrange a plurality of the primaries 56, 56ᵃ, 56ᵇ, etc., in inductive relation to one or more of such secondaries or to each of them. One such arrangement is illustrated in Fig. 59.

Or on the other hand, we may use a single secondary coil 58 for a keyboard, and instead of the several primary coils 56, 56ᵃ, 56ᵇ, etc., may use one single primary coil made of a single thick wire or of a plurality of wires, connected together in parallel, so as to have a very low resistance, relatively to the impedance coils, 120, 120, controlled by the switches 55, 55. One arrangement is illustrated in Fig. 60, in which 234 is a primary coil of very low resistance, inserted between the switches 55, 55, and the common-return wire 48, in place of the several primary coils 56, 56ᵃ, 56ᵇ, etc., before described. But I consider the separate coils 56, 56ᵃ, 56ᵇ, 56ᶜ, etc., preferable to the one common coil 234.

Similar remarks apply to the coils 62, 62, and 63. A single coil 63 may be used, upon which all the coils 62, 62, act; as illustrated, for example, in Figs. 3, 3ᴬ and 6; or a coil 63 may be used for each of the coils 62, 62, as illustrated for example in Fig. 50; or a plurality of coils 63, may be used with a plurality of coils 62, acting on each of them, as illustrated, for example, in Fig. 59.

Instead of using a plurality of armature windings, corresponding to the different orders of partial-tones that an alternator is designed to furnish to notes of different pitches, we may supply vibrations in any other suitable manner from the alternator to the several circuits which it is designed to feed.

Thus, to mention one example, we may connect the terminals of an alternator through the primary coil of an inductorium or transformer, and may furnish such inductorium or transformer with a plurality of independent secondary coils that are connected with the contact-springs 49 49ᵃ, 49ᵇ, etc. (or with the switches 282, 282ᵃ, 282ᵇ, etc.), on the one hand, and with the common-return wire 48 on the other hand, in the same manner in which the several armature windings are connected. Fig. 61, which is a view in general similar to Fig. 3ᴬ, illustrates such a modification; 2, 2, 3, 3, and 4, 4, are the alternators before described; 232, 232, are the primary coils with which the terminals of said alternators are connected and through which they respectively pass their vibratory currents; 233, 233, are the secondary coils in inductive relation to the corresponding primary coils 232, 232. In general, it will be observed, there are a plurality of secondaries 233 for each of the primaries 232; and each of these secondaries has one end connected with the common-return wire 48 and the other with the appropriate contact spring 49, 49ᵃ, etc. (Figs. 3, 3ᴬ and 6) or with the appropriate switch 282, 282ᵃ, 282ᵇ, etc. (Figs. 38 to 44). The construction appears so clearly from Fig. 61, when viewed in the light of the preceding figures and description before given applying to them, that further description is unnecessary.

*Of modified and alternative alternators.*

Instead of using the forms of alternators illustrated in Figs. 8 to 19 and before described, any other kind of alternator that is suitable for the purpose may be used. But if we use alternators with rotating-toothed inductors, we may, instead of using field-poles circumferentially arranged, of alternately north and south polarity, and having armature coils wound upon their teeth (as illustrated for example in Figs. 13 to 19 inclusive) arrange the rotating-toothed inductors in pairs with an armature ring built up of thin sheets of soft iron or steel surrounding each inductor and an annular yoke connecting such armature rings and a single exciting coil located between the two armature rings, or between the two inductors, and surrounding the rotating shaft to which said two inductors are secured. One illustration of this construction is given in Figs. 62 and 63, which illustrate six alternators forming a ground-tone set, though the principle is of course the same whether applied to the ground-tone set of alternators or to one or both of the supplemental sets, the only necessary difference being in the number of teeth in the several inductors and in the armature rings surrounding them which number of teeth (where all the alternators corresponding to the different octaves of a note and to harmonics of said octaves are mounted upon the same shaft) may be as already explained in connection with Figs. 8 to 19 inclusive, being of course more numerous for the alternators of the supplemental sets than for the corresponding alternators of the ground-tone sets. Also, with the construction illustrated in Figs. 62 and 63, the alternators are arranged in pairs, so that there should be an even number of them on a shaft.

Fig. 62 is a view partly in section, partly in elevation. The two leftmost alternators, whose rotating inductors have 3 teeth and 6 teeth respectively, are shown in elevation; the next two alternators are shown with their annular frame, armature rings and energizing coil in section and the inductors in elevation, while with the two rightmost alternators the inductors also are shown in section. Fig. 63, is a transverse section on the line 63, 63, Fig. 62. 1$^a$ is a pitch-shaft, and 36, 36, are the rotating inductors which, supposing the one of lowest frequency to have three teeth, should have 3, 6, 12, 24, 48 and 96 teeth respectively. 245, 245 are the armature rings surrounding each its own inductor, and each having preferably twice as many teeth as the corresponding inductor (see Fig. 63) subject to the qualification that where the teeth are very small on the inductors of high frequency, the construction illustrated in Fig. 17, as applied to the teeth formed upon the field-poles 38, 38, may be applied to the corresponding teeth formed upon the rings 245, 245. The coils on adjacent teeth 246, 246, of an armature ring 245, are oppositely wound because the magnetic flux increases in one tooth as it decreases in the next adjacent tooth, and vice versa. 247 is the annular yoke piece which may be shaped as shown in the drawing, Figs. 62 and 63, and bolted firmly to the bed-plate. It may be made of cast iron, or steel. Stiffening side rings 248, 248, are riveted to the rotating inductors, and similar rings 249 and 250 are riveted to the armature rings 245; the outer ring 250 being extended radially so that it may be bolted to the annular yoke piece 247. Sleeves of wrought iron or mild steel 251, 252, are placed on the pitch-shaft between the inductors 36, 36, to hold them the proper distance apart, and also in the case of the sleeves 251, to give additional cross-section to the magnetic circuit. This circuit is created by the action of the currents in the exciting coil 253 wound on the spool 254. The lines of force or of magnetic flux, created by this coil, may be supposed to flow through the shaft 1$^a$, outward through one of the inductors 36, and across the air-gap to the armature ring 245, corresponding to such inductor, thence through the annular yoke piece 247 and through the other armature ring 245 of the same pair, and thence inward across the air-gap to the rotating inductor 36 corresponding to it, and so back into the shaft 1$^a$.

The several exciting coils 253, 253, are connected, each through its own regulating rheostat 12, with the direct-current exciting dynamo 31, before described.

Many other forms of alternators are known and in common use. I have invented neither the alternator itself nor any improvement in the alternator, considered by itself alone. My invention, so far as the alternators are concerned, relates not to the individual unit, but to the combination of units, having the requisite frequencies, with the toothed gearing and with the various expression devices and other improvements, described in this specification. Such being the case, it will be understood that any other alternators that are suitable for the purpose may be used instead of those before described.

I consider alternators to be the best and most satisfactory means of producing electrical vibrations for producing music. I was once of the opinion that the simplicity and cheapness of a rheotome device made it in general preferable to an alternator, but my present opinion is in favor of the alternator. The positive gearing hereinbefore described and illustrated, for example, in Figs. 7 and 64 to 77, may obviously be used for rotatory rheotomes as well as for alternators. Also very obviously the dynamic manual and the electrical swell devices may be used whether the electrical vibrations be produced by alternators, by rheotomes, or in some other manner. And in general the various features of the expression mechanism, hereinbefore described, seem applicable, whether the requisite electrical vibrations be produced in the first instance in one manner or in another. Thus, to give an illustration, if in Fig. 61, the requisite electrical vibrations be produced in the several circuits 232 by any other means instead of the alternators, very obviously, the keys 45, 45, the coils 56, 56$^a$, 56$^b$, 56$^c$, etc., and 58, the various switches 55, 55 and 55$^a$, the electrical swell (with its coils 60, its contact-buttons or plates 130, and its brushes or contact fingers 61), the dynamic manual with its coils 66 and keys 67, 67; all those, obviously perform their functions the same, whether the electrical vibrations be generated or initiated by one means or by another. And what is true of Fig. 61 is equally true of the other figures illustrating the expression mechanism. The various expression devices, before described, will act to control the electrical vibrations of their respective circuits, whether these electrical vibrations be generated or initiated by alternators, or by other devices.

*Of modified and alternative arrangements of the gearing.*

For simplicity's sake and for that reason only, we have thus far supposed the twelve pitch-shafts in Fig. 7, with the alternators carried by them, to be each exactly like the pitch-shaft and alternators illustrated in Figs. 8 to 19, the differences in pitch of the several shafts being made solely by the differences in the angular velocities with which they are respectively driven. Such an arrangement may be used. It involves, however, very considerable differences in the angular velocities of the shafts, which it is desirable to reduce. But by constructing the alternators driven by some of the pitch-shafts so that they produce a certain number of cycles per revolution, and constructing the corresponding alternators carried by other pitch-shafts so that they produce a different number of cycles per revolution, in other words, by making the alternators carried by some pitch-shafts to differ in the number of their teeth or pole-pieces, as well as in their angular velocities, from the corresponding alternators carried by other pitch-shafts, the extreme differences in angular velocities of the several pitch-shafts can be greatly reduced. For example, we may make the alternators carried by the pitch-shafts 1$^g$, 1$^h$, 1$^i$, 1$^k$, 1$^l$ and 1$^m$ to have one and one-half (1½) times as many revolving pole-pieces or inductor-teeth as the corresponding alternators carried by the pitch-shafts 1$^a$, 1$^b$, 1$^c$, 1$^d$, 1$^e$ and 1$^f$, the alternators carried by the pitch-shafts first mentioned having, for example, the numbers of pole-pieces or of teeth illustrated in Figs. 8 to 19; or inclusive and before described, and the corresponding alternators carried by the pitch-shafts 1$^a$, 1$^b$, 1$^c$, 1$^d$, 1$^e$ and 1$^f$ having each but two-thirds (⅔) as many rotating pole pieces or inductor-teeth as the corresponding alternator illustrated in Figs. 8 to 19; or giving to the alternators carried by the pitch-shafts 1$^a$, 1$^b$, 1$^c$, 1$^d$, 1$^e$ and 1$^f$, the same numbers of rotating pole-pieces and inductor teeth as the alternators that are illustrated in Figs. 8 to 19, we may give exactly one-third more rotating pole-pieces or inductor-teeth to the corresponding alternators that receive movement from the pitch-shafts 1$^g$, 1$^h$, 1$^i$, 1$^k$, 1$^l$ and 1$^m$. We may, then, for convenience sake, take these three cases as typical, namely:

Case A: The alternators carried by each of the twelve pitch-shafts have exactly the same cyclical frequencies as the corresponding alternators carried by the other pitch-shafts, and the alternators carried by the twelve pitch-shafts are made to correspond respectively to the successive octaves of the twelve notes of the chromatic scale by giving to the twelve pitch-shafts angular velocities having the same or substantially the same numerical ratios as the vibration-frequencies of the twelve notes of the chromatic scale within the compass of an octave.

Case B: The alternators carried by the six pitch-shafts 1$^g$, 1$^h$, 1$^i$, 1$^k$, 1$^l$ and 1$^m$, are constructed to produce one and one-half (1½) times as many cycles per revolution as the corresponding alternators carried by the pitch-shafts 1$^a$, 1$^b$, 1$^c$, 1$^d$, 1$^e$, 1$^f$; and Case C: The alternators carried by the six pitch-shafts 1$^g$, 1$^h$, 1$^i$, 1$^k$, 1$^l$ and 1$^m$, are constructed to produce one-third more cycles per revolution than the corresponding alternators carried by the pitch-shafts 1$^a$, 1$^b$, 1$^c$, 1$^d$, 1$^e$ and 1$^f$.

These three cases are typical and will be referred to hereinafter as Case A, Case B and Case C, respectively. Many other cases might, of course, be put, which there is not space to discuss. Cases A, B and C are sufficient to illustrate the subject. I consider Case B and Case C as preferable constructions to Case A for large machines, if not for all machines. If we use the gearing illustrated in Fig. 7, the wheels 9 and 10 in Case A may have, respectively, 128 and 181 teeth, or some equal multiples thereof, as 256 and 362; in Case B they may have 192 and 181 teeth, respectively, or some equal multiples thereof, as 384 and 362 teeth, respectively; in Case C they may have preferably some equal multiples of 33 and 35, respectively; as, for example, 198 teeth for the wheel 9 and 210 for the wheel 10.

Another form of gearing is illustrated in Fig. 64. In this figure, as also in Figs. 7 and 65 to 81, inclusive, a reference-numeral consisting of figures followed by the letter T, indicates a gear wheel, having as many teeth as the number indicated by the figures. Thus "89ᵀ," applied to a part, indicates that it is a gear wheel having 89 teeth; 49ᵀ, a gear wheel of 49 teeth; 55ᵀ, a gear wheel of 55 teeth, and so on; such gear wheel being in each case keyed to the shaft carrying it. 1ᵃ, 1ᵇ, 1ᶜ, 1ᵈ, 1ᵉ, 1ᶠ, 1ᵍ, 1ʰ, 1ⁱ, 1ᵏ, 1ˡ and 1ᵐ, Fig. 64, are the twelve pitch-shafts corresponding, respectively, to the twelve consecutive notes of the chromatic scale of equal temperament, and which serve each to give movement to the alternators (see for example Figs. 8 to 19 or Figs. 62 and 63) that produce the successive octaves of the note to which it corresponds. Remembering these two facts, and remembering, also, what is meant by Case A, Case B and Case C, as above explained, Fig. 64 and most of the figures following, illustrating gearing, are so plain upon the face of the drawing that verbal explanation can add nothing to them, and will be given only as to special points or comparative features, etc.

The adjacent shafts of a group correspond in Fig. 7 to notes of the chromatic scale a semitone apart, and in Fig. 64 to notes of the chromatic scale a whole tone apart.

Fig. 65 illustrates an arrangement of gearing in which the twelve pitch-shafts are arranged in three groups, the adjacent shafts in each group corresponding to notes of the chromatic scale a minor third (or three halftones) apart.

Subject to the qualification already pointed out, that we must not, according to the size of the machine, unduly diminish the distance between the main driving-shaft 8 and the pitch-shafts as 1ᵃ, 1ᵇ, etc., the wheels 320ᵀ, 356ᵀ and 220ᵀ, keyed to the shaft 8, Fig. 65, may have only three-fourths or one-half, or even one-fourth as many teeth as they now have. The exact arrangement of the gearing and tooth-numbers in Fig. 65 is for Case A, before described. For Case B, each of the three groups of pitch-shafts may be modified by substituting for the gear 74ᵀ, of seventy-four teeth, on the third shaft (1ᵍ or 1ʰ or 1ⁱ) of the group, a gear having one hundred and eleven teeth. To adapt the gearing illustrated in Fig. 65 to Case C, described above, we have only to substitute for the gear 88ᵀ, of eighty-eight teeth, on the shafts 1ᵈ, 1ᵉ and 1ᶠ, a similar gear, having sixty-six (66) teeth to mesh with the gear 74ᵀ, of seventy-four (74) teeth on the next higher shaft (1ᵍ, 1ʰ or 1ⁱ).

Fig. 66 illustrates another arrangement of gearing, in which the pitch-shafts 1ᵃ, 1ᵇ, 1ᶜ, 1ᵈ, 1ᵉ and 1ᶠ, are driven by gears keyed to the shaft 8, while the pitch-shafts 1ᵍ, 1ʰ, 1ⁱ, 1ᵏ, 1ˡ, and 1ᵐ, are driven by gears keyed to the supplemental shaft 8ᵃ. The shaft 8 is connected with the shaft 8ᵃ by means of a gear 300 keyed to the shaft 8 and meshing with a gear 300ᵃ keyed to the shaft 8ᵃ. For the arrangement of alternators before described as "Case A," the wheels 300 and 300ᵃ should have 181 and 128 teeth, respectively, or some equal multiples thereof, as for example, 362 and 256 teeth, respectively. For Case B said wheels 300 and 300ᵃ should have 181 and 192 teeth, respectively, or some equal multiple thereof, as for example 362 and 384 teeth, respectively. And for Case C, before described, the wheels 300 and 300ᵃ may have 210 and 198 teeth, respectively, or any other numbers of teeth that are equal multiples of 35 and 33, respectively.

Giving to the several gears in Fig. 66, respectively, the numbers of teeth indicated on the drawing and before described, the shafts 8 and 8ᵃ, respectively, have just one-fourth the angular velocities of the shafts 1ᵈ and 1ᵏ, respectively. We may, without altering the number of teeth in the gears keyed to the shafts 1ᵃ, 1ᵇ, 1ᶜ, 1ᵈ, 1ᵉ, 1ᶠ, 1ᵍ, 1ʰ, 1ⁱ, 1ᵏ, 1ˡ and 1ᵐ, reduce the numbers of teeth in all the gears (except gears 300 and 300ᵃ) carried by the shafts 8 and 8ᵃ, Fig. 66, to three-quarters ($\frac{3}{4}$) or to one-half ($\frac{1}{2}$), or even to one-fourth ($\frac{1}{4}$), the numbers marked on the drawing and before described, subject to the qualification (which in many cases would prevent any such reduction) that we must not make the gears on the shafts 8 and 8ᵃ so small as to bring the pitch-shafts as 1ᵃ, 1ᵇ, 1ᵍ, 1ʰ, etc., so close to the shafts 8 and 8ᵃ as not to leave sufficient room for the alternators carried by said pitch-shafts. By using bevel gears, the number of teeth in the driving gears on the shafts 8 and 8ᵃ that mesh with the wheels 44ᵀ, 55ᵀ, 89ᵀ, 80ᵀ, 84ᵀ and 49ᵀ, respectively, may be made to be, respectively, 37, 49, 84, 80, 89 and 55, respectively, as is indicated in Fig. 67; or they may be made to be equal multiples of these numbers, the numbers of teeth in the driving gears on the shafts 8 and 8ᵃ (that mesh with the gears on the twelve pitch-shafts 1ᵃ, 1ᵇ, etc.) being all multiplied, in such case, by the same number as 2, 3, 4, etc.

In Fig. 67, it will be observed, the angular velocities of the shafts 8 and 8ᵃ are identical respectively with the angular velocities of the shafts 1ᵈ and 1ᵏ, and in Fig. 66, in which the gears on the driving shafts 8 and 8ᵃ have each four times as many teeth as the corresponding gears on said shafts 8 and 8ᵃ, in Fig. 67, said shafts 8 and 8ᵃ have exactly one-fourth the angular velocities of the shafts 1ᵈ and 1ᵏ respectively. The essential thing is the relative angular velocities given to the twelve pitch-shafts 1ᵃ, 1ᵇ, 1ᶜ, 1ᵈ, 1ᵉ, 1ᶠ, 1ᵍ, 1ʰ, 1ⁱ, 1ᵏ, 1ˡ and 1ᵐ; numerous variations of the gearing may be made, so long as the relative angular velocities of the twelve pitch-shafts are kept the same or substantially the same as illustrated in Figs. 64 or 65 or 66; and Fig. 68, illustrates one of the many possible variations. The twelve gears 13 keyed respectively to the twelve pitch-shafts and the twelve gears on the shafts 8 and 8ª meshing with them may have respectively the numbers of teeth indicated in Fig. 68.

For Cases A, B and C, before described, the wheels 300 and 300ª, Figs. 67 and 68, may have the respective numbers of teeth before described in connection with Fig. 66.

Instead of using the two shafts 8 and 8ª, we may drive each of the twelve pitch-shafts directly from a single shaft 8. One such arrangement, out of many possible ones, is illustrated in Fig. 69, as adapted to Case A, before described. By altering the number of teeth in the gears, however, gearing like that of Fig. 69, having a single driving-shaft connected directly with each of the twelve pitch-shafts, may be used in Cases B and C before described. Fig. 70 shows such a modification adapted to Case C before described.

I consider it preferable to run the driving-shaft 8 (or the driving-shafts 8 and 8ª) at a less number of revolutions per minute than the pitch-shafts 1ª, 1ᵇ, etc. With spur-gearing (as illustrated in Figs. 7, 64, 65, 66 and 69) particularly this is necessary, at least in a large machine, in order to separate the pitch-shafts 1ª, 1ᵇ, etc., carrying the inductors or armatures, a sufficient distance from the main driving-shaft 8, or 8ª, without using such large gears on the pitch-shafts as would involve excessive peripheral velocities for the gears. With bevel gearing this objection does not apply. Also, it may be obviated by using an intermediate gear, or "idle wheel", between the driving gear on the shaft 8, or 8ª, and the driven gear on the pitch-shaft. But it is desirable to avoid all such complication and, in any case, I consider it in general preferable to drive the main shaft 8 at a lower speed than the pitch-shafts 1ª, 1ᵇ, etc. Assuming, however, that the groups of alternators carried by the twelve pitch-shafts are alike (that is, that the alternators of one group have the same cyclical frequencies per revolution as the corresponding alternators in each of the other groups) so that said pitch-shafts are made to correspond respectively to the twelve notes of the chromatic scale, by driving them with angular velocities corresponding to the vibration-frequencies of the twelve notes of the chromatic scale; and assuming, also, that the pitch-shaft 1ª is to be driven with the same angular velocity as the main driving-shaft 8, then the gear on said pitch-shaft 1ª should have the same number of teeth as the gear on the driving-shaft with which it meshes and by which it is driven, and the numbers of teeth, respectively, of the driving gear on the main shaft 8 and of the intermeshing driven gear on the pitch-shaft 1ᵇ, 1ᶜ, etc., for each of the other eleven notes of the chromatic scale may be as follows, the number of teeth of the gear on the driving-shaft being first given, in each case, namely:

For the shaft 1ᵇ, 89 and 84;
" " " 1ᶜ, 110 " 98;
" " " 1ᵈ, 88 " 74;
" " " 1ᵉ, 247 " 196; or less perfectly in respect of equal temperament tuning, 121 and 96, or still less perfectly, 87 and 69;

For the shaft 1ᶠ, 295 and 221, or less perfectly for equal temperament tuning 120 and 90;

For the shaft 1ᵍ, 181 and 128;
" " " 1ʰ, 120 " 80;
" " " 1ⁱ, 127 " 80;
" " " 1ᵏ, 111 " 66;
" " " 1ˡ, 114 " 64;
" " " 1ᵐ, 168 " 89.

The notes of the alternators carried by the shaft 1ʰ in the table just given are a little sharp (about one-fiftieth of a semitone) for equal temperament. A wheel of 442 teeth, on the driving-shaft, meshing with a wheel of 295 teeth on the shaft 1ʰ, would give almost mathematically perfect equal temperament tuning to said shaft 1ʰ; but such large numbers of teeth on rapidly moving wheels are subject to great, if not practically insuperable, objections. In a high-speed machine, the numbers of teeth first given in the above table for the gears for the shafts 1ᵉ and 1ᶠ are so large as to be objectionable; and in any such case the numbers of teeth next given in said table for said gears may be used instead.

Instead of driving all the pitch-shafts, each directly from one common driving-shaft, as in Figs. 69 and 70, or from two driving-shafts 8 and 8ª, as in Figs. 66, 67 and 68; or arranging the pitch-shafts in groups, each driven from a main driving-shaft, as in Figs. 7, 64 and 65, we may connect the twelve pitch-shafts together in series. One arrangement of gearing for this purpose is illustrated in Fig. 71, in which each of the twelve pitch-shafts, 1ª, 1ᵇ, 1ᶜ, 1ᵈ, 1ᵉ, 1ᶠ, 1ᵍ, 1ʰ, 1ⁱ, 1ᵏ, 1ˡ and 1ᵐ, commencing with 1ª, is connected with the pitch-shaft next above it in the series by a gear 89ᵀ, keyed to the lower shaft, meshing with a gear 84ᵀ, having eighty-four teeth keyed to the next higher shaft of the series; except that gears 90ᵀ and 85ᵀ, having ninety teeth and eighty-five teeth respectively, are keyed to the shafts 1ᶠ and 1ᵍ respectively to mesh with the driving gear 45ᵀ, keyed to the armature-shaft of the electric motor 11. Thus any pair of pitch-shafts, corresponding to two consecutive half-tones of the chromatic scale, have angular velocities whose numerical ratios are eighty-four to eighty-nine, except that, in the middle of the series, we give the two shafts $1^f$ and $1^g$ angular velocities standing to each other as 85 to 90. For the gears $90^T$ and $85^T$ on the shafts $1^f$ and $1^g$ we might substitute gears of eighty-nine teeth and eighty-four teeth respectively—in other words we might give to every pair of adjacent shafts the relative angular velocities of 84 to 89; but the tuning is improved by using a slightly smaller ratio, as for example 85 to 90 for at least one pair of shafts. It is not necessary to use this different ratio between the sixth and seventh shafts of the series; it might be used at some other point; but with the ratio 85 to 90, it is desirable to use it at or near the exact middle of the series.

Fig. 71 is adapted to Case A, above described. To adapt the gearing illustrated in Fig. 71 to Case B, described above, we have only to substitute a gear of sixty teeth for the gear $90^T$, of ninety teeth, keyed to the shaft $1^f$ to engage the driving gear $45^T$. To adapt the gearing illustrated in said Fig. 71 to Case C, described above, we have only to substitute for the gear $90^T$ on the shaft $1^f$ a gear of eighty-nine teeth, and for the gear eighty-five teeth on the shaft $1^g$, a gear of one hundred and twelve teeth; in which case it will be desirable also to substitute for the intermeshing gears $89^T$ and $84^T$ on the shafts $1^e$ and $1^f$ respectively (or on the shafts $1^g$ and $1^h$ respectively) two gears having ninety and eighty-five teeth respectively. Or we may keep all the gears on the shafts $1^a$ to $1^f$ inclusive and $1^g$ to $1^m$ inclusive, exactly as illustrated in Fig. 71, and before described, and use two gears on the driving-shaft of the motor 11, for example, a gear $45^T$, of forty-five teeth, with which the gear $85^T$, keyed to the shaft $1^g$, meshes, and another gear, $60^T$, having exactly one-third more teeth, with which the gear $90^T$, keyed to the shaft $1^f$, meshes, as illustrated in the detail view, Fig. 72.

Instead of arranging the pitch-shafts in one series, as in Fig. 71, we may divide them into two or more groups, connecting the members of each group in series and connecting the several groups each preferably at or about its center with the main driving-shaft. Fig. 73 illustrates one construction for this purpose, in which the wheels 9 and 10 may have for Cases A, B and C, before described, the numbers of teeth respectively before described in connection with Figs. 7 and 64.

Figure 77:
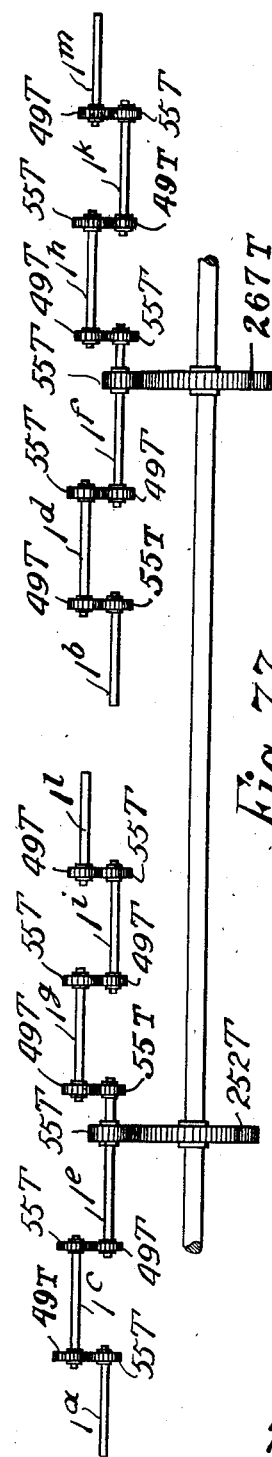

Figs. 74, 75, 76 and 77 illustrate still other modifications. The wheels 9 and 10, respectively, in Figs. 74 and 76, may have, for Cases A, B, and C, respectively, the numbers of teeth already described in connection with Figs. 7 and 64. Figs. 75 and 77, as drawn, are adapted for Case A, before described, but may easily be altered to one of the other cases, if desired.

I consider gearing such in principle as that illustrated in Figs. 66 and 69 most suitable for large and heavy machines. For machines of small or medium size, gearing such as that illustrated in Figs. 7 and 76 may be found more convenient, since it does not require so many large (and therefore expensive) cut gear wheels. The gearing illustrated in Figs. 67 and 68 seems more suitable for small or very small machines than for very large ones. The series gearing illustrated in Figs. 71 and 72 has the advantage of requiring no large gears at all, but is subject to the disadvantage that a single pair of intermeshing wheels bears the load of driving half a dozen pitch-shafts, and to the further disadvantage, particularly in connection with the larger and more sensitive intervals, such as the fifth, that the connection between one shaft and another is in most cases made through six or more pairs of intermeshing gears, and is, or may be, subject, as the gears wear, to the back-lash of all.

The tuning is a little nearer to absolute mathematical perfection with the arrangements of gearing illustrated in Figs. 7, 76, 64 and 66 to 68 than with Figs. 71 to 74.

Figs. 7 and 64 to 81, inclusive, are diagrammatic or schematic views in which no attempt is made to show the correct proportions of the parts; to illustrate the scheme of which clearly, without unduly increasing the size of the drawings, the gear wheels, which are the essential features, are illustrated on a much larger scale than the pitch-shafts. The proper arrangement of the pitch-shafts and the gears, with the numbers of teeth in the several gears, are clearly marked, but the size of the gears, which should vary according to the loads they are to transmit, is left, of course, to the judgment and skill of the builder. Also no attempt is made to show the journals or bearings, which are matters of ordinary mechanical skill.

The numbers of teeth for the several wheels, given in the several lists preceding and marked on the several figures are believed to be, in each case, on the whole, the most convenient. But, first, it is to be understood that for any intermeshing pair of wheels, in any of the figures in which gearing is shown, we may, so far as the mere principle of the thing is concerned, instead of using the numbers of teeth specified or marked, use equal multiples thereof, or where possible, equal sub-multiples; for if the number of teeth in each of two intermeshing gears be either multiplied by the same number or divided by the same number, the relative angular velocities of those wheels remain unaltered. But in many cases, any such multiplication of the numbers of teeth would necessitate either making the teeth very small or the peripheral speeds very high, both of which are to be avoided; and in many cases any great reduction in the number of the teeth would involve other disadvantages. Secondly, instead of using the relative speed ratios given in the drawings, for the several pairs of intermeshing gears, other and slightly different speed ratios may be used, at least in some cases. But as I have given in each case the speed ratios that I consider most practicable, I shall not burden this specification with any further lists. Thirdly, if the speed of the driving shaft, as 8 or 8ª, with relation to one of the shafts, as 1ª or 1ᵍ, driven by it, be materially altered, the speed of said driving shaft with relation to that of each of the other pitch-shafts driven by it should be altered in the same or substantially the same proportions; the essential thing being to give to the several pitch-shafts the requisite angular velocities. The relative angular velocities for the twelve pitch-shafts are as follows, for Cases A, B, and C, respectively, representing that of the slowest moving or lowest pitch-shaft, 1ª, by 256 arbitrary units (not degrees or radians), namely:

|  | In Case A. | In Case B. | In Case C. |
|---|---|---|---|
| For the pitch-shaft 1ª | 256. | 256. | 256. |
| " " 1ᵇ | 271.22 | 271.22 | 271.22 |
| " " 1ᶜ | 287.35 | 287.35 | 287.35 |
| " " 1ᵈ | 304.44 | 304.44 | 304.44 |
| " " 1ᵉ | 322.54 | 322.54 | 322.54 |
| " " 1ᶠ | 341.72 | 341.72 | 341.72 |
| " " 1ᵍ | 362.04 | 241.36 | 271.53 |
| " " 1ʰ | 383.57 | 255.71 | 287.68 |
| " " 1ⁱ | 406.37 | 270.92 | 304.78 |
| " " 1ᵏ | 430.54 | 287.03 | 322.90 |
| " " 1ˡ | 456.14 | 304.09 | 342.11 |
| " " 1ᵐ | 483.26 | 322.18 | 362.45 |

Very slight variations from these relative speeds may be made (and in some of the drawings, Figs. 7, and 64 to 77 are made) without any perceptible injury to the tuning, but any large variations would affect the tuning injuriously for equal temperament.

I have used gears of cast steel very accurately cut. Steel is preferable to iron on account of its greater strength and wearing qualities and its ability to run safely at higher speeds. Accuracy of the teeth of each gear is important not only to insure smooth and rapid running without undue noise, shock or vibration, but also because variations in the speed of the shafts, resulting from inaccuracies in the gearing would affect the tuning. The best, if not the only way, to secure accuracy in the teeth of the gears is to cut them carefully with a well-built and accurate gear-cutter, or other similar machine. The shafts upon which any two intermeshing gears are respectively mounted should be arranged, in the case of spur gears (Figs. 7, 64, 65, 66 and 69 to 81) as nearly as possible rigidly parallel and with the intermeshing or pitch-line nicely adjusted. Excessive peripheral speeds, on the one hand, and unduly small teeth, on the other, should be avoided; but using, as I have done, cast-steel gears very accurately cut, speeds are quite safe that would be excessive with uncut castiron gears.

It is important that the shaft 8, Figs. 7 and 64 to 81 be driven with a uniform or nearly uniform velocity; and any motor which is subject to considerable variations in velocity at different points in its cycle or at different moments, is ill adapted to the purpose. For these variations in the angular velocity of the shaft 8 and of the pitch-shafts and alternators connected with it, would result in corresponding variations in the key of the composition that is being played, the key rising with any increase in the velocity of the shaft 8, and falling with any decrease in its velocity. But the pitch-shafts 1ª, 1ᵇ, etc., with the alternators carried by them, have a very considerable equalizing or fly-wheel effect; and if the electrical motor 11 be well built, to run at a constant speed and be fed from a suitable source of current of constant voltage, as for example a large and well designed direct current dynamo, run by a good engine, the variations in the angular velocity of the shaft 8 will not be noticed by the average listener.

The forms of gearing illustrated in Fig. 7 and Figs. 64 to 77, and before described, are adapted to the chromatic scale of equal temperament, which is now in universal or almost universal use throughout Christendom. But the principles of my invention are applicable to other scales. Figs. 78, 79, 80 and 81 illustrate different forms of gearing for the diatonic scale in the natural or just temperament. 1ª, 1ᶜ, 1ᵉ, 1ᶠ, 1ʰ, 1ᵏ, and 1ᵐ, are the pitch-shafts, corresponding respectively to the seven notes of the diatonic scale and each giving movement to a plurality of alternators, for producing successive octaves of the note to which the shaft carrying them corresponds. In Fig. 78 the shafts 1ª, 1ᶜ, 1ᵉ, 1ᶠ, 1ʰ, 1ᵏ and 1ᵐ are connected together in series by gear wheels keyed to the respective shafts and having the numbers of teeth marked on them in the drawing; while in Fig. 79 said shafts 1ª, 1ᶜ, 1ᵉ, 1ᶠ, 1ʰ, 1ᵏ and 1ᵐ are driven respectively by the wheels 192ᵀ, 216ᵀ, 240ᵀ, 256ᵀ, 288ᵀ, 320ᵀ and 360ᵀ, which are keyed to the shaft 8 and have respectively 192, 216, 240, 256, 288, 320 and 360 teeth, said wheels meshing each with a gear 48ᵀ, of 48 teeth keyed to the corresponding pitch-shaft.

Figs. 78 and 79 show gearing adapted to "Case A," described above, in which the alternators carried by each pitch-shaft produce the same number of cycles per revolution as the corresponding alternators carried by the other pitch-shafts. To adapt the gearing illustrated in Fig. 78 to "Case B"

or "Case C," above described, it is only necessary to change the numbers of teeth in the gears 54$^T$ and 48$^T$ that connect the shafts 1$^f$ and 1$^h$, a gear of 54 teeth, keyed to the shaft 1$^f$ and a gear of 72 teeth, keyed to the shaft 1$^h$, being used for "Case B," and for "Case C," a gear of 54 teeth keyed to the shaft 1$^f$, and one of 64 teeth keyed to the shaft 1$^h$. And to adapt the gearing illustrated in Fig. 79 to "Case B" or "Case C" we have only to substitute for the gears 48$^T$ of 48 teeth, on the shafts 1$^h$, 1$^k$ and 1$^m$ gears of 72 teeth for "Case B" and of 64 teeth for "Case C."

In Fig. 80, two pitch-shafts 330 and 331 only are used, of which 331 carries the toothed inductors 36, that produce the notes do, mi and sol, in their successive octaves, while the shaft 330 carries the toothed inductors 36, that produce the notes fa, la, do, mi, in their successive octaves. With the exact arrangement of parts illustrated in Fig. 80 (which may of course be altered within certain limits), the inductors carried by the shaft 331 have respectively 8, 10, 12, 16, 20, 24, 32, 40, 48, 64, 80 and 96 teeth, while those carried by the shaft 330 have respectively 8, 10, 12, 15, 16, 20, 24, 30, 32, 40, 48, 60, 64, 80, 96 and 120 teeth. The shaft 330 is connected with the shaft 331 by means of a gear 54$^T$ of 54 teeth keyed to said shaft 331 and meshing with a gear 48$^T$, of 48 teeth, keyed to the shaft 330.

In Fig. 81, all the inductors 36, 36, are carried by a single shaft 330. With the exact arrangement of parts illustrated in Fig. 81 (and which may, of course, be varied from, more or less,) there are thirty-one inductors, having, respectively, 6, 8, 9, 10, 12, 15, 16, 18, 20, 24, 27, 30, 32, 36, 40, 45, 48, 54, 60, 64, 72, 80, 90, 96, 108, 120, 128, 144, 160, 180 and 192 teeth, and of which the inductors having 6, 8, 9 and 10 teeth, respectively, give do, fa, sol and la in the lowest octave; those having, 12, 15, 16, 18 and 20 teeth give respectively, do mi, fa, sol, and la in the next octave; those having 24, 27, 30, 32, 36, 40 and 45 teeth give, respectively, the seven notes do, re, mi, fa sol, la and si in the third octave; those having 48, 54, 60, 64, 72, 80 and 90 teeth give the same seven notes in the fourth octave; those having 96, 108, 120, 128, 144, 160 and 180 teeth give, respectively, the same seven notes in the fifth octave; while the inductor of 192 teeth gives the tonic (do) in the sixth octave. Such arrangements of the field-magnet systems and armature coils as are illustrated in Figs. 8 and 10 and 13 to 19 (or such as are illustrated in Figs. 62 and 63) may be used for the inductors illustrated in Figs. 80 and 81; the numbers and sizes of the armature teeth in the field system, being adapted in each case, to the number of teeth on the corresponding rotating inductor; or any other suitable arrangement of field-magnets and armature cores may be used with the rotating inductors; or any other suitable form of alternator, not being an inductor alternator, may be used instead of the inductor alternators shown.

I have illustrated my circuit-closing devices, such as the springs 49, 49$^a$, 49$^b$, 49$^c$, 49$^d$, etc., illustrated in the schematic views (Figs. 1, 3 to 6, 46 to 49 and others) and the knife switches, 282, 282$^a$, 282$^b$, 282$^c$, 282$^d$, etc., illustrated in Figs. 38 and 39, as combined with and arranged to be controlled by, the keys of a keyboard, like to that of a pianoforte or organ. But in the first place it will be obvious that such circuit-closing devices may be operated in any other suitable manner; and secondly as many musical devices are operated or played automatically by note-sheets or the like, which in some cases control, through suitable mechanism, the keys of a pianoforte or cabinet organ and in others control the hammers, valves or other note-taking devices more directly, such note-sheets or other similar automatic devices might be employed to operate my circuit-closing devices above mentioned or their equivalents, either by operating the keys 45, 45, of a keyboard or in any other suitable manner.

The various gearings for the pitch-shafts, illustrated in Figs. 7 and 64 to 81, may be used to give movement to an organization of rotatory rheotomes, such as is described in the specification of the Letters Patent before mentioned, dated April 6, 1897, or to any other suitable arrangement of rotary rheotomes or of rotary electrical vibration-generating devices quite as well as to the set of alternators before described. But for most purposes, if not for all, I consider the alternators preferable, as before stated.

By means of the rheostats 12, 12, (Figs. 8, 13, 14 and 15 and 62) of which it is to be understood, as before explained, that there is one for each alternator (with the construction illustrated in Figs. 8 to 19), the builder or voicer or performer can vary the intensity of excitation of the alternator field-magnets within wide limits, and can thus give to each alternator the voltage which he thinks best. And by connecting different numbers of the armature coils 32, 32 or 40, 40, of an alternator into the several groups which serve for partial tones of different orders in different notes, he can vary the relative strength of those partials within wide limits, to produce the effects required. A very clear illustration of this latter point is afforded by Fig. 14, in which of the forty-eight armature coils, 40, 40, twenty are connected together in one group to furnish the first partial of the c of 256 vibrations ($c^1$); twelve others in another group, to furnish the second partial of the c of 128 vibrations ($c$); eight in another group, to furnish the fourth partial to the c of 64 vibrations (C); and eight others in a fourth group, to furnish the eighth partial to the c of 32 vibrations ($C_1$). Now a careful voicer or regulator can, by taking coils out of a group that sounds too loud and adding them to a group that does not sound loud enough, give to each group such loudness as he thinks best and can thus prepare the instrument for the hand of the performer, who, by the various expression devices before described, controls the music in such manner as he thinks best.

Instead of using one common-return wire 48 for all the armature windings, corresponding to different orders of partial tones, (as illustrated for convenience's sake and to avoid a multiplicity of lines in the drawings), we may use, preferably a different common-return for each different order of partial tones. So also instead of using a single primary winding, as 56, $56^a$, etc., for all the partial tones of one order in an inductorium, we may use, if desired, a distinct primary winding in each inductorium, for each note that feeds vibrations into such inductorium. With the construction illustrated in the drawings, in which a single primary as 56, or $56^a$, $56^b$, etc., is used for each order of partial tones in a keyboard, it is desirable to make the resistance of such primary much less than that of the armature circuits that feed it, so that when two or three keys, 45, 45, of the same keyboard are depressed simultaneously, the effect of each on the coil as 56, or $56^a$, etc., which it feeds will not be too much weakened by the passing of a portion of its current through the armature circuit corresponding to the other key depressed, as a shunt.

The spring-pressed break-lever 153, illustrated in Figs. 30 and 86, for holding the electric swell in whatever position it may be placed in by the performer, may be used to press upon the bars 86, to act as a frictional check thereon, a friction lever, as 153 and spring being used for each of said bars 86 (Figs, 53, $53^A$ and 57).

If the spring-lifting bar $45^a$, Fig. 4, operated by the key 45 be made of metal, the pins $45^b$, set in it to lift said springs, should be of vulcanite, or other suitable insulating material and the various parts should be so adjusted that none of the springs 49, $49^a$, $49^b$, etc., operated by said bar will come in contact with it.

Instead of governing the loudness of the tones upon the subscriber's premises by means of the impedance coils 71, contact-buttons or plates 72, and brushes 73, we may control the loudness in any other suitable manner whatever. For example, we may use an inductorium for each vibration-translating device, connecting the primary of said inductorium across the lines or mains 68 and 69, and closing the circuit of the secondary through the coils 76 of the receiving telephone, Figs. 34 and 35; and we may vary the intensity of the inductive action between the primary and secondary of said inductorium (and thereby the loudness of the tones produced upon the subscribers' premises) in the modes hereinbefore described for varying the intensity of action of the primary 56 on the secondary 58. But I consider the preferred construction, having impedance coils 71, contact-button or plates 72, and brushes 73, as much the better form of device for the purpose, particularly when the impedance coils 71, contact-plates 72, and brushes 73, are arranged, as before described, in the same manner as the impedance coils 60, contact-plates 130, and brushes 61, 61, Figs. 28 to 33.

Thus, for example, we may move the primary coil connected across the mains 68 and 69 with relation to the secondary coil, connected in series with the telephone coils 76, 76, or vice versa, mounting the one coil to move with relation to the other in any suitable manner, as, for example, by means of a hollow spool 85, rod piece 86 and wheels 87, 87, Fig. $53^A$. Or, we may move a metallic plate or a short-circuited coil of wire or other well-conducting metallic screen between a line-connected primary and a telephone-connected secondary, arranging said primary and secondary, and the screen mounted to move between them after the fashion illustrated for the coils 56 and 58 in Figs. 57 and 58; or we may vary the number of active turns either in the primary or in the secondary after the fashion illustrated, for example, in Fig. 54 for the coils 56 and 58, or after the fashion illustrated in Fig. 55 for the coils 56, 205, 206, 207; or we may employ a plurality of circuits inductively intermediate a line-connected primary coil and the telephone coil 76 after the fashion of the coils 210 intermediate the coil 56 and the coils 213, Fig. 56; or after the fashion of the circuits 215, 216 inductively intermediate the coils 213 and 219, Fig. 56; or we may use, for varying the intensity of action of a line-connected primary upon a secondary coil connected with or arranged to feed the telephone coils 76, 76, any of the arrangements illustrated in Figs. 83 or 91 for varying the intensity of action of any of the coils as 56, $56^a$, $56^b$, $56^c$, $56^d$, $56^e$, $56^f$, $56^g$, $56^h$, and $56^i$, upon the corresponding secondary coil 58, or for varying the intensity of action of the coil 62 on the coil 63; or we may insert in series or in shunt to the telephone coil 76, 76, or in series or in shunt to a line-connected primary, or a telephone-connected secondary (or a secondary arranged in any suitable manner to feed the telephone coils 76, 76,)

any of the the devices illustrated in Figs. 84 to 90 for governing the impedance of the circuit containing the coils 56 and 62; or the means illustrated in any of said figures for governing the impedance of any other of the circuits illustrated in said figures. Or we may control the loudness of the sounds produced upon the subscribers' premises in any other suitable manner whatever, as, for example, by inclosing the vibration-translating device in a closed box or chamber, furnished with one or more valves or swells, which may be opened more or less, to permit the sound to pass from such closed box or chamber to the room in which the listeners are.

But I consider the preferred construction having impedance coils 71, contact buttons or plates 72, and brushes 73 arranged, as before described, in the same manner as the impedance coils 60, contact plates 130, and brushes 61, 61, Figs. 28 to 33 to be better.

And on the other hand, while it is in some respects very desirable to employ on the premises of each subscriber a means for varying the loudness of the tones produced on those premises, independently of the loudness of the tones produced on other subscribers' premises, all the apparatus for this purpose may be omitted and the telephone receiver and horn may be used by themselves alone, and an excellent effect may be thus produced. The question of using a loudness-controlling device on the premises of the subscriber is largely a question of expense, and some economy may be effected by dispensing with all such devices.

Instead of using a receiving telephone with a diaphragm, as a vibration-translating device, any other vibration-translating device whatever that is suitable for the purpose may be used. Thus, to mention one example out of several possible ones, an arc lamp may be used as a vibration-translating device.

Whatever form of expression device has been shown in any of the drawings before described or in Fig. 91, for any of the pairs or coils, as 56 and 58, 56$^a$ and 58, 56$^b$ and 58, 56$^c$ and 58, 56$^d$ and 58, 56$^e$ and 58, 56$^f$ and 58, 56$^g$ and 58, 56$^h$ and 58, or 56$^i$ and 58, may be used for any of the others of said pairs or for all of them. Also, whatever form of device has been illustrated in the drawings before described or in Fig. 92, for controlling the intensity of the vibrations or the amperage of the current in any circuit (as, for example, in the circuit of the coil 56, or in the coil 56$^a$, or 56$^b$ or 56$^c$ or 56$^d$ or 56$^e$ or 56$^f$ or 56$^g$ or 56$^h$ or 56$^i$, or in the circuit of the coils 58 and 62, or in the circuit of the coils 62 and 64, or in the circuit of the coils 76, 76,) may be used for any other circuit or for all the other circuits instead of the devices shown in any particular figure.

The coils 56, 56$^a$, 56$^b$, 56$^c$, etc., may be made to act directly upon the lines or mains 68 and 69, the circuits 58 and 62 and 63 and 64 being in such case omitted and the common-return wire 48 connected with one of the line wires or mains as 68 and the switches 55 and 55$^a$ to the other of said lines or mains. Or the several circuits each including the coils 58 and 60 may be connected directly to the lines 68 and 69, the coils 62 being omitted or the coils 60, 60, and 62, being omitted, and the circuit containing the coils 63, 64 and 66, with the dynamic manual keys 67, 67, being entirely omitted. Or, retaining the set of coils 60, 60, in circuit with each of the coils 58, 58, these circuits (that is, the circuits each consisting of a coil 58 with the impedance coils 60, 60, belonging to it) may be connected directly with the mains 68 and 69 in parallel with each other, one terminal of the coil 58 in each case being connected with one of the lines or mains, and the brushes 61 being connected with the other. Or, one or more of the coils 63 may be inserted in the line or made in any suitable manner to act upon the line, and the circuit including the coils 58 and 62 (the coils 60, 60, being either retained in the circuit with said coils 58 and 62 or omitted from said circuit, as desired) made to act by induction upon said coil or coils 63 as before described.

In the preferred construction, I have illustrated a plurality of registers of circuits acting upon the same vibration-translating devices. In some cases, if not in all, I consider this construction preferable, as it enables a single set of lines or mains to be used for all the tones of the instrument. But a distinct and independent vibration-translating device may be used, if desired, for each register of circuits; and where music is to be produced in a plurality of places simultaneously, a line or main or a pair of lines or mains may be used for each register of circuits, with a vibration-translating device for each such pair of lines or mains, on each of the premises to be supplied with electrical music. One illustration of this construction is given in the schematic view Fig. 92 which, in the light of the drawings before explained and description before given, is so clear as to require no further explanation. The apparatus of Fig. 92 will probably be found more suitable in any case in which the vibration-translating devices are near to the keyboards or alternators, by which the vibrations are produced and a fair expenditure for lines and vibration-translating devices is justified; and the other form of apparatus illustrated in Figs. 3, 3$^A$, 5, 6, etc., (in which all the vibrations from the alternators are thrown upon a single distributing circuit) will perhaps be found most practicable in those cases in which the receiving-devices are remote from the central station and economy in the distributing lines and in the vibration-translating apparatus, is important.

A single register of circuits may be used by itself alone; see Figs. 1 and 1^A. Also a smaller number of keyboards than the four illustrated in the drawings may be used; and even a single keyboard may be used by itself alone, the other keyboards with their circuits, switches and expression devices being omitted and the dynamic manual retained, as shown in the drawings; or using a single keyboard and omitting the dynamic manual, one terminal of the coil 58 may be connected with one of the lines or mains, the other terminal of said coil being connected through the series of impedance coils 60, 60, and the brushes 61 with the other of said lines or mains; or the coil 58 may be connected directly with the lines or mains 68 and 69, the impedance coils 60, 60, and brushes 61 being omitted. A musical effect may be produced from a single keyboard, but a much better effect in many ways can be produced from a plurality of keyboards. It is preferable to use a plurality of keyboards as illustrated in the drawings, but the expense may be reduced by using one keyboard only, or by using a smaller number of keyboards or switchboards than the four illustrated in the drawings; see Figs. 5, 6, 20, 31, etc. Thus, for example, by using two switchboards and keyboards only, instead of the four illustrated in the drawings, a great reduction would be made in the cost of keyboards, switchboards and expression devices, and yet a large part of the advantage which comes from a plurality of switchboards, is retained.

Instead of connecting the receiving telephone 70 directly to the lines or mains 68 and 69 (or 353, 354, 355, 375), transformers may be used whose primaries are fed from the lines or mains and whose secondaries feed each a single receiving telephone or a plurality of receiving telephones connected together in parallel or in series or in series parallel. Instead of using a single pair of lines or mains, a net-work may, of course, be used, and would probably be in fact used, in distributing electrical music to a city. Instead of feeding all the lines or mains from a single secondary coil as 65, a plurality of such coils may be used, all acted upon by the same primary, and various other modifications in the arrangement of the receiving devices may be used.

Rheotomes, as before stated, might be used, at least to some extent, instead of the alternators. If rotary rheotomes be used, they may either be of the kind that interrupts the circuit, or of the kind that gradually varies its resistance. A circuit which is interrupted, or whose resistance is varied by the action of the rheotomes, may be made to act by induction upon a secondary or a plurality of secondaries, whose action upon the vibration-translating devices may be controlled in the manner before described. Using rotary rheotomes, those having frequencies corresponding to octaves of the same note would preferably be carried by the same shaft, as also those which serve to produce overtones of such notes and the shafts corresponding to notes would be connected together by gearing as already fully described in connection with the alternators.

Referring to Fig. 61, we might use rheotomes of the same frequencies as the alternators whose places they take to produce vibrations in the circuits 232, 232, the circuits 233 being connected with the switches or circuit-controlling devices and the expression mechanism in the various ways hereinbefore described. But, as before said, I consider alternators to be very much preferable to rheotomes; and as before said, however, the vibrations be initiated in the circuits, and whatever the source or means of producing vibratory electrical currents in the circuits, the various combinations of circuits and of circuit-controlling devices and expression devices before described, may be used for the purpose before described, although the vibrations be produced by some means other than alternators.

Using a single keyboard, the coil 62 might be brought into direct inductive relation to the coil 65, Figs. 1 to 92 inclusive, the dynamic manual being omitted; or the coils 62 and 65 might be omitted and the coil 53 connected (either through the brushes 61 and coil 60 directly, the brushes 61 and coil 60 being omitted) with the parts to which the coil 65 is connected in the several figures; or, using a single keyboard and omitting the dynamic manual and the electrical swell device, the coils 56, 56^a, 56^b, 56^c, 56^d, 56^e, 56^f, 56^g, 56^h, and 56^i might be brought into direct inductive relation to the coil 65 or might be connected directly to the lines or mains. And many other modifications may be made in this respect without departing from the essential features, or at least without departing from certain of the essential features of my invention.

The dynamic manual may well be omitted, in which case the several coils 62 might be brought into direct inductive action upon the coil 65, or might be connected directly with the lines or mains each in the manner in which the coil 65 is connected with the lines or mains, Figs. 1 to 92, or in any other suitable manner.

In this specification and in the statement of claim at the end hereof, I use the words partial or partial tone and harmonic whether in the singular or in the plural synonymously. The first partial or first partial tone is the ground-tone or first harmonic, whose frequency we may represent by $n$; then $2n$, as before said, is the frequency of the second partial or second harmonic; $3n$ is the frequency of the third partial or third harmonic; $4n$, the frequency of the fourth harmonic; and so on.

In this specification and particularly in the statement of claim at the end hereof, I use the words "register of circuits", as referring to a collection or a set of circuits, having certain common relations. Thus, to make my meaning clearer by a reference to the drawings, the circuits illustrated in Fig. 1, corresponding to, and controlled respectively by, the several keys 45, and contact springs 49, constitute one register of circuits. And so in Fig. 3 and following, the circuits controlled by the contact springs 49, and which find a common path in the bar 54, and primary coil 56, constitute one register of circuits; the circuits controlled by the contact springs $49^a$, and which find a common path in the bar $54^a$ and the primary coil $56^a$, constitute another register of circuits; the circuits controlled by the contact springs $49^b$, and which find a common path in the bar $54^b$ and primary coil $56^b$, constitute still another register of circuits, and so on. The furnishing of these distinct sets or registers of circuits, the combining of them with suitable means for producing the necessary vibrations, and the arranging of the apparatus in such a manner that these registers or sets of circuits are independently controllable, constitute important features of my present invention. These registers of circuits may be used for any one of several different purposes. Thus, in Figs. 3, $3^A$, 5, 6, 46, 47, 48, 49, etc., the several registers of circuits belonging to any one keyboard, correspond respectively to different orders of harmonics, one register of circuits serving for the ground tones; another register serving for the second harmonics of these ground tones; another register, for the third harmonics of those ground tones; and so on; the vibration-translating devices being constructed and arranged in such a manner that they produce in each register of circuits, the requisite electrical vibrations.

Secondly, a plurality of registers of circuits may serve for vibrations of similar fundamental frequencies, but of different wave shapes. Thus in Fig. 82, the corresponding register of circuits, supplied one from the alternators 2, 2, and the other from the alternators $2^a$, $2^a$, (such as the registers that close circuit through the bars 54, 54 and coils 56, 56) or the registers that close circuit through the bars $54^a$, $54^a$, and coils $56^a$, $56^a$, serve, as has already been described, for vibrations of different wave-shapes, but of the same fundamental frequencies. And, Thirdly, the corresponding circuits of a plurality of registers may serve for electrical vibrations of the same fundamental frequencies and of the same wave shapes. The ground-tone registers of circuits, in the four keyboards of the preferred construction hereinbefore described, will serve as one illustration; the corresponding circuits in each of these four registers serve, it will be remembered, for vibrations of the same frequency and of the same wave shape. On the other hand, with the modification illustrated in Fig. 82 and hereinbefore described, in which a plurality of vibration-generating devices, tuned in unison, are used to produce electrical vibrations of different wave shapes, one key-board may be supplied with electrical vibrations of the one wave shape and another key-board may be supplied with electrical vibrations of a different wave shape, while a third keyboard may be supplied with electrical vibrations of both these wave-shapes, with a certain vibration strength, and a fourth keyboard with both these wave-shapes with different relative strengths. The connections of all four keyboards are, of course, not shown in full, in Fig. 82, which is, a view like Fig. 3, largely diagrammatic, but illustrating a modification of the preferred construction, illustrated in Figs. 3, 4, 5, 6, etc., and is to be considered (as Fig. 3 is) in the light of the other figures (as 4, 5, 6, etc.) and of the description hereinbefore given. Also, it should be remembered that Fig. 82 not only illustrates the principle of using simultaneously (whether in the same keyboard or in a plurality of keyboards) registers of circuits, corresponding to electrical vibrations of similar frequencies, but of different wave shapes, it also illustrates the use with these registers of circuits, and preferably in each of a plurality of keyboards, of other registers of circuits corresponding to higher harmonics of the ground-tone vibrations or, in the case of the generators $2^a$, $2^a$, to higher octaves of the complex vibrations of the lowest register.

One of the important heads or subheads of my invention consists in making the several registers or sets of circuits independently-controllable, as registers; and here it will be observed, that I have provided, at least in the preferred construction and in some of the modifications, two distinct kinds of control, namely:

(a) Any register of circuits may either be permitted to act on the vibration-translating apparatus, or it may be entirely prevented from acting on the vibration-translating apparatus. By this means, we control what orders of harmonics, or what tone-elements, shall enter into a given note; and, (b) Secondly, we control the relative intensities of the several registers of tones that sound, whether these be harmonics or not. For any register of tones, of any keyboard, it will be observed, with the preferred construction and with most of the modifications, may be made to sound with any loudness required, from the minimum to the maximum. It is convenient to have this control of every register or set of circuits; but obviously, it might be omitted, in the case of one or more registers and still be very useful in connection with the other registers, for which it was retained. Thus, to give a single illustration, if in Figs. 3, 3ᴬ, 5 and 6, the switches 55, and 55ᵃ, were omitted from the ground-tone circuits of one or more of the keyboards and the bar 54, in any such keyboard, permanently connected through the corresponding primary coil 56, with the common-return bar 46, the switches 55 and 56ᵃ, retained for the other harmonics, would make possible a very large control of the timbre.

I have described the best form of vibration-translating device that I have been able to contrive and have also pointed out that any other form of vibration-translating apparatus whatever, that is suitable for the purpose, may be used instead.

An important feature of my invention relates to the use of a plurality of keyboards as hereinbefore described, and in particular, to the use of a plurality of keyboards, combined with means whereby the timbre of the tones of each keyboard may be varied and with means whereby the power of the tones of each keyboard may be varied. I have described hereinbefore and illustrated in the drawings two distinct modes of governing the timbre. One of these consists in using electrical vibrations of the same fundamental frequencies, but of different wave shapes, as, for example, the vibrations produced respectively by the principal set of generators 2, 2, and supplemental set of generators 2ᵃ, 2ᵃ, in Fig. 82 and before described. The other mode consists in using electrical vibrations (preferably sinusoidal or as nearly sinusoidal as may be) corresponding with the different orders of harmonics, with independent control of the power of each. Both these methods of control are used in the apparatus illustrated in Fig. 82, and before described, in which we derive from the principal set of generators 2, 2, a plurality of sets of harmonics of different orders and derive from the supplemental set of generators 2ᵃ, 2ᵃ, a set of fundamental or ground-tone vibrations of different wave shape from those produced by the generator 2, 2, and also derive from the same generators 2ᵃ, 2ᵃ, vibrations of complex wave shape, but of harmonically-related frequencies, as for example, two or four times the frequencies of the fundamental set. Other sub-heads of my invention relate to the deriving of a plurality of sets of harmonics from a single set of vibration devices, with means for controlling these harmonics independently of one another, etc. Now, it will be readily understood that the keyboards or collection of finger keys, as 45, 45, are merely a convenient arrangement for operating the switches or contact devices as 49, 49ᵃ, 49ᵇ, etc., (or 282, 282ᵃ, 282ᵇ, etc., in Figs. 39 to 44). The more essential thing, therefore, is the switch-board or combination of circuit-controlling devices; and while the keys 45, 45, are very convenient and for some purposes very important, they might, in certain other cases, be omitted and something else substituted for them. Thus, for example, it would obviously be possible with a sufficient number of performers to operate the switch-lifting bars (45ᵃ in Fig. 4, or 196 in Figs. 38 and 39) or the switches themselves (as the contact springs 49, 49ᵃ, 49ᵇ, in Figs. 1 to 5, 46, 47, etc.) or the switch-levers 282, 282ᵃ, 282ᵇ, etc., in Figs. 38 and 39, without the keys 45, 45.

And indeed, as I have before pointed out, it is generally understood that note-sheets may be used to a certain extent and at least for some purposes instead of a performer playing on the keys of a keyboard; such note-sheets with the pneumatic or electric or mechanical devices controlled by them, being used either to operate the keys, on which the performer plays or to control the devices, for the operating of which the keys serve (in the present case the switch-lifting bars 45ᵃ or 196, or circuit-controlling devices as 49, 49ᵃ, 49ᵇ, etc., or 282, 282ᵃ, 282ᵇ, etc., or their equivalents). Thus, the notes may be controlled, either by means of the keys of the keyboard, or by means of switches or the like that are operated independently of the keys, either by the performer's hands, or by electro-magnets or by pneumatic devices or other suitable devices, operated by or through a note-sheet. The term "note-controlling device," then, is used by me as a generic term to refer to any suitable device for controlling the note, whether that be a key or digital at a keyboard, or some other device that is used instead thereof, as before explained.

In the most of the drawings, I have shown a plurality of keyboards; and with a plurality of keyboards, various musical effects may be produced that are not possible with a single keyboard. But obviously, for economy's sake, a single keyboard may be used; the other keyboards, obviously, may be omitted.

In an earlier part of this specification, I have said, with reference to the generators, that "variations of the whole set from concert pitch are, of course, possible, but said variations do not affect the tuning of the notes with relation to one another nor the goodness of the chords." This is to be taken subject to the qualification that, at the very instant at which the concert pitch is being changed, the goodness of the chords, or indeed the goodness of a single note, may be affected by the variation in pitch, if that be sufficiently rapid. Any such sensible variation of pitch may be avoided, as before stated, by driving the generators with a uniform velocity. Using an electrical drive, that is, driving the generators with a good, constant-speed electrical motor, fed from a generator of constant voltage, I have not found the changes in pitch, resulting from changes in speed, sufficiently great to be noticed by the average man.

In several places in this specification and in the statement of claim at the end hereof, I speak of making the tuning perfect or of making the chords perfect, by means of the toothed gearing connecting the pitch shafts. The word perfect here is used by me to mean and is to be understood as meaning such perfection or such substantial perfection as the system of temperament used admits of. Thus, in the form of apparatus illustrated in Figs. 78, 79, 80 and 81, the chords are "just"; that is to say, the three notes of the common chord as do, mi, sol, or sol, si, re, or fa, la, do, have exactly and absolutely the ratios of four, five and six, but with this apparatus, there is no capacity for modulation. It can play in one key only; it can, therefore, play only very simple tunes or short musical selections, and these, for the most part, it can play only out of their natural keys; that is, it cannot play them in the keys in which they are written, but only in that one single key in which it plays. On the other hand, with the systems of gearing for the chromatic scale of equal temperament before described and illustrated in Figs. 7, and 64 to 77, there is that unlimited capacity for modulation which constitutes the great merit of the equal temperament system, but the chords are perfect only in the sense of equal temperament; they are not exactly just, but have the defects mentioned, namely, that the fifths are slightly flat (about 1/886) of the just fifth and the major thirds are slightly sharper (about 1/126) than the just major thirds, with other variations from perfect truth, of less consequence. The perfection of tuning or of chords spoken of, then, it is to be understood, is only such perfection as the system of temperament used may admit of, or such a close approach to that temperamental perfection as is not to be practically distinguished therefrom.

In this specification, and particularly in the statement of claim at the end hereof, I sometimes speak of a "common-receiver" or of a "telephonic-receiver". I use both these terms synonymously, and I use them with reference to a vibration-translating device, for translating electrical vibrations into audible aerial vibrations, and which is capable of translating electrical vibrations of more than one given frequency, that is to say, capable of translating more than a single note and its harmonics. I use the term "telephonic-receiver" or "common-receiver" to distinguish a receiver of the kind just defined from that other class of vibration-translating devices, for translating electrical vibrations into audible aerial vibrations, that is capable of translating only a single note and its harmonics. A tuned string, a tuning fork or a tuned reed, vibrated by periodic currents of the requisite frequency will serve as an illustration of this second class of tuned or monotone receivers. The words "telephonic-receiver" and "common-receiver" are used by me by way of contradistinction to the tuned or monotone receivers. But I do not mean by the word "telephonic-receiver" to imply a hearing telephone only in the common or popular sense of that word, but only to imply a receiver capable of translating electrical vibrations of varying fundamental frequencies. An electrically vibrated sound-board device, such as that illustrated in the United States Letters Patent to me No. 580,035, dated April 6, 1897, is a telephonic receiver, in the sense in which I use the term. Also when I speak of a common receiver, I use the word common with reference to the capacity or capability of the receiver to serve in common for a plurality of notes of varying fundamental frequencies, to translate any of them into audible aerial vibrations. But I do not mean at all to imply that one single diaphragm or sound-board or horn must be common to, and serve for the translating of all the vibrations of every character produced by the instrument. In the preferred construction, illustrated in the drawings, it is true, I have contrived and arranged the apparatus in such a manner that a single receiver does serve to translate all the vibrations of every kind; and since this construction admits of the use of a single line or circuit, I consider it, for many purposes, preferable on the ground of economy at least. But I have also illustrated in Figs. 1, and 1ᴬ, a single register of circuits having its own receiver; and I have also described with reference to Fig. 92, the construction in which a plurality of telephonic receivers are used, each serving for a different element of the tone, so that one receiver is used for the ground-tones, another for the second harmonics, another for the third harmonics, etc. The arrangement of the apparatus, then, in such a manner, as hereinbefore described that all the registers of circuits which correspond to the different harmonics that enter into a note, act on a single receiver or so that a single receiver serves for every purpose, and for translating all the vibrations of every kind, is one feature of my invention and for many purposes a most useful one, since it enables the complex tones or chords of a composition to be distributed over a single circuit. But I do not limit any of the claims at the end hereof, to the construction in which a single receiver is used, except in those few paragraphs of claim at the end hereof where it is specified that the circuits or vibration-generating devices act upon a line, with which receivers are connected; and in which case each such receiver must receive, more or less, all the vibrations of that line. And in particular, I use the words telephonic-receiver and common-receiver synonymously, as I have before said, not implying by the word telephonic a receiving telephone in the popular sense only, nor implying by the word common that the same receiver must serve for all the tones; but implying by the word telephonic or the word common as before stated, the capacity of the receiver to serve in common for notes of varying fundamental pitches in contradistinction to a tuned or monotone receiver, as before mentioned, capable of translating only a single note or the harmonics thereof.

*Part two.*

In various places of this specification, and particularly in several of the paragraphs of claim at the end hereof, I use the words electrical swell or electrical-swell device, and also the words electrical crescendo-and-diminuendo device or the like. I use these expressions synonymously.

Various illustrations of the electrical swell device are given in the drawings.

In the drawings, I have illustrated an electrical swell device, for each of the keyboards. I consider an electrical intensity-regulating-device for each keyboard desirable. But if we were to omit such a device from one keyboard and retain it for another keyboard, a considerable effect of control of the relative intensities of the tones belonging to these two keyboards respectively, would still be possible, by means of the electrical swell retained for one of them. When a single register of circuits only is used, a considerable effect of control of the intensity of the tones belonging to that register of circuits can be obtained apart from the electrical swell, illustrated in the drawings as serving for all the registers of a keyboard, by means of the register-controlling devices for that register of circuits, in the constructions illustrated in the drawings. Thus, in Fig. 1, a considerable control of the loudness of the tones can be effected by a skilful performer, by manipulating the switches 55, 55, and 55ª; and in Figs. 51 to 53ª, the loudness of the tones of any register of circuits can be increased or decreased by moving the secondary 58 with relation to the primary 56 or 56ª, or 56ᵇ, etc., as the case may be. And in all the constructions illustrated in the drawings, the intensity-regulating device or devices provided for a register of circuits, might by a skilful performer be so manipulated as to serve, at least to some extent, as a crescendo-and-diminuendo device or as an electrical-swell device more or less perfectly, for the tones belonging to that register of circuits; and if that register were the only register used, the other electrical-swell or crescendo-and-diminuendo device, illustrated in the drawings as serving for the whole keyboard, would be less important. But practically, it is very important to use more than one register of circuits in a keyboard or switchboard, and to have register-controlling devices for one or more of said registers—preferably one for each register; and also to have an electrical-swell device for such keyboard, serving to control the intensity of action on the vibration-translating apparatus of all the registers belonging to that keyboard or switchboard, or at least of all of said registers that are at the moment in action. Likewise, it is practically very desirable to have an electrical-swell for each keyboard or switchboard.

An important feature of my invention hereinbefore described and illustrated in the accompanying drawings, is the use of a plurality of registers of circuits with register-controlling devices for one or more of these registers (preferably for each register) whereby the action of such registers of circuits upon the vibration-translating apparatus may be controlled. This feature of my invention has several uses, of which the most important is the control of the timbre. Another feature of my invention relates to the deriving of a plurality of sets of harmonics from a single set of alternators, etc. See Figs. 3, 3ᴬ, 5, 47, 61, 82, etc. Now, both these features of invention I consider desirable to use in one and the same apparatus. Each, however, may be used without the other. As an illustration of the use of independently controllable registers of circuits apart from the principle of deriving a plurality of harmonics from the same set of vibration-generating devices, see, for example, Fig. 46; also, consider the ground-tone registers of circuits, supplied one from the alternators 2, 2, and the other from the alternators 2ª, 2ª, in Fig. 82, or the ground-tone register of circuits fed from the alternators 2, 2; the third harmonic register fed from the alternators 3, 3; and the fifth harmonic register fed from the alternators 4, 4, in Fig. 3. That the second feature of my invention before mentioned (namely the deriving of a plurality of sets of harmonics from a single set of vibration-generating devices) may be used apart from the independently controllable registers of circuits will be obvious on considering, for example, Fig. 3, and observing that the switches as 55, 55, and 55ª, 55ª, might obviously be permanently closed or, which amounts to the same thing, entirely omitted, each register of circuits being used whenever the appropriate keys were depressed. It will be understood, then, that while these two features of my invention may advantageously be used together, each may be used without the other.

In various places in this specification and particularly in the statement of claim at the end thereof, I use the term timbre-controlling device or timbre-changing device or timbre-controlling mechanism or timbre-changing mechanism or some similar words or words of similar import. I use these terms synonymously. By a timbre-changing device or timbre-controlling mechanism, I mean, a device by means of which the performer can change the timbre or quality of the notes used by him.

A note and its octave are mathematically related as a first and second harmonic. That is to say, if the frequency of a note be indicated by $n$, the frequency of its octave above will be $2n$ and of its octave below $\frac{n}{2}$; so if the frequency of a ground-tone be $n$, its second harmonic will be $2n$. And the octave above a note or ground-tone, whether a pure harmonic of that ground-tone or note, is, for the sake of convenience and simplicity, spoken of and treated in this specification as the second harmonic of that ground-tone or note.

In various places in this specification, I have spoken of producing in different registers of circuits, different orders of harmonics and I speak of these registers of circuits as corresponding to different orders of harmonics, and so on. But I mean only that the frequencies or the fundamental frequencies of the vibrations produced in these several registers of circuits stand related to each other mathematically as harmonics; that they have harmonically-related frequencies, as 1, 2, 3, 4, or 1, 3, 5, and so on. It it not to be understood, however, that the vibrations produced in these circuits are absolutely pure harmonics, with the apparatus illustrated in the drawings, nor is that indispensable to the production of good musical effects. The closer the approach toward absolutely pure harmonics, with such an apparatus as that illustrated in Fig. 3 or Fig. 46, the better the result will probably be, for the performer's control of the timbre will be more perfect. But with such an apparatus as that illustrated in Fig. 1 or Fig. 47, the presence as before said, with the proper vibrations in each register of weak third and fifth harmonics thereof is in my judgment, rather beneficial than injurious, at least in the lower notes. So, also, in this specification and in the paragraphs of claim at the end hereof, I speak of the elements of a composite tone, whose frequencies are harmonically related, as harmonics of that tone. Thus, in Figs. 3 and 3^A, the tones produced in the registers of circuits which find a common return portion respectively in the primary coils 56, 56ᵇ, and 56ᵈ, and whose frequencies are respectively $n$, $2n$, and $4n$, are spoken of constantly in this specification as harmonics (or the latter two as harmonics of the former) whether the vibrations be exactly and absolutely sinusoidal (a case which is not perhaps very likely to occur in actual practice) or whether they be practically sinusoidal or whether they be notably complex. If the vibrations in the registers of circuits connected respectively with the coils, as 56, 56ª or 56ᵇ, etc., be absolutely sinusoidal, they are, of course, harmonics in the strictest use of the language. But as I have above said, absolute sinusoidalness is not very likely to occur in actual practice, in which there is very likely to be some deviation, however slight, from exact sinusoidalness at least in the case of one or more of the notes. But whether this deviation be very slight or quite noticeable, it is convenient to speak of the vibrations in the several registers of circuits as harmonics of the ground-tones, remembering always, that these so-called harmonics may either be practically pure or be alloyed more or less with over-tones, to which each stands as a ground-tone. In the circuits fed by the supplemental generators 2ª, 2ª, in Fig. 82 (assuming that these generators have teeth shaped as shown in Fig. 18ᴮ) the vibrations in any given circuit would be far from pure. And obviously, without departing from the essential features of my invention hereinbefore described and illustrated in and by the accompanying drawings, a skilful electrician, exercising the skill of his art, may, by the substitution of equivalents and by omissions, additions or alterations, vary the apparatus illustrated in the drawings in many particulars, while still retaining the essential principles and combinations or one or more of the essential principles or combinations, belonging to my invention.

*Part three.*

The producing of music electrically in many places from one central station or the producing of music in any manner by means of alternators is, so far as I am aware, wholly new; and I have had no precedents to aid me and no experience to go by, save that derived from my own experiments. The apparatus is necessarily complicated and many features enter into the problem, each of which is more or less important in producing good results. A poor musical effect is produced comparatively easily, but a thoroughly artistic musical effect or even good commercial music involves close attention to many things. For attaining the best effects, the following points may be mentioned in addition to those explained above, namely:

First. By using for each order of harmonics, a line of its own, as illustrated in Fig. 92, with one or more receivers on each subscriber's premises, connected with each line circuit, a louder and more brilliant musical effect can be produced, than with the system illustrated in Figs. 3, 3A, 5, 6, etc., in which a single receiver is used to translate electrical vibrations, corresponding to all the harmonics and notes, into audible music. But the greatly increased cost, however, which accompanies the multiplying of the number of lines and vibration-translating devices is, of course, to be weighed against it, and the single line has the important advantage of being cheaper to construct and to keep in order. But in the case of an isolated plant or of a transmission for a short distance, where the expense for the lines is justified, a broader, larger, better musical effect can be obtained with numerous line circuits and numerous receivers, as in Fig. 92, than with a single line circuit as in Figs. 3, 3A, 5, 6, etc.

Second. In central-station plants and even with small isolated plants, it is desirable to separate the performer specially from the alternators and running machinery, preferably by placing the alternators and machinery in one room and the keyboards in another room, which is separated from the first and is, as far as practicable, insulated acoustically therefrom. The room in which the keyboards are placed (which we may call the music-room) is furnished with receivers or vibration-translating devices which are connected electrically with the lines or mains, so that the performer as he plays hears the same music, which the subscribers hear, in their more or less distant houses. The switchboards and inductoriums or transformers may be placed in the music-room, if that be large enough; but there are sounds in the switchboards and inductoriums, resulting from the operation of the switches and from the magnetic changes that go on in the inductoriums; and for this reason, it is preferable to keep them out of the music-room and to place them either in the same room with the alternators or in a third room.

Third. A very serious difficulty, for a long time, in our efforts to produce good music by means of alternators, resulted from the shouting of particular notes and elements of the tone. By shouting, I mean the sounding of a note or of one of the elements of a note with excessive loudness—so excessive indeed at times, as to seriously injure, if not to destroy, the artistic effect. At one time, one note or tone would shout; at another time, a different tone. This difficulty, it is believed, results from the following facts; or at least these facts should be understood in order to understand the difficulty of shouting in electrical music, and the remedy for it, namely:

($i$) A diaphragm or receiver of the kind illustrated in Figs. 34 to 37, responds very unequally to electrical vibrations of different frequencies, responding loudly to moderate vibratory forces near its point of resonance and responding but feebly to much more powerful vibratory forces, at points remote from its point of resonance. In other words, electrical vibrations that synchronize, or nearly synchronize, with the natural rate of vibration of the diaphragm, cause it to shout; while much stronger electrical vibrations that are not in synchronism with it, affect it but moderately;

($ii$) The point of resonance or pitch of resonance of the diaphragm changes somewhat with changes in temperature. Also, the actual pitch of any note produced by an alternator, changes with any change in the speed of the alternator by which it is produced;

($iii$) Assuming constant temperature for the diaphragms and constant speeds for the running alternators, the difficulty above mentioned can be, to a great extent, eliminated by the means before described, namely, ($a$) by regulating with the rheostats 12, 12, (shown in Figs. 8, 13, 14 and 15) the intensity of excitation of the different alternators, giving to each such a voltage that it produces its tone with appropriate loudness in a standard vibration-translating device or receiver, used for this purpose; and ($b$) by using in each of the different circuits, belonging to an alternator, but which serve for different orders of partial tones (as, for example, to give the ground-tone to middle-$c$, the second harmonic to the $c$ an octave below, the fourth harmonic to the note two octaves below middle-$c$, and the eighth harmonic to the note three octaves below middle-$c$, as before described and illustrated in connection with Figs. 3, 3A, 13, 14 and 15) different numbers of coils or turns for the armature winding, so as to give appropriate loudness to the partial tone or harmonic, which each armature winding produces.

Thus, by means of the rheostats 12, 12 (Figs. 8, 13 and 14) each alternator is given such a voltage, whether great or small, as is necessary to produce a tone of the desired loudness in the standard receiver; and by inserting in each of the different armature circuits belonging to an alternator, and corresponding to different harmonics (see Figs. 3, 3ᴬ, 13 and 14) a suitable number of active turns or coils, suitable relative strengths can be given to the different circuits, fed from that alternator and which correspond to the different partial tones. Thus, for example, the armature circuit which corresponds to a ground-tone can be given a voltage of $10x$; the armature circuit belonging to the same alternator, but which gives the second harmonic to the note an octave below, can be given a voltage of $7x$; the third armature circuit, belonging to the same alternator and which serves to give the fourth harmonic to the note two octaves below that to which said alternator furnishes a ground-tone, may be given a voltage of $4x$; the armature circuit belonging to the same alternator which gives the eighth harmonic to the note three octaves below that to which said alternator furnishes a ground-tone, may be given a voltage of $2x$; while the armature circuit, belonging to the same alternator and which serves to give the sixteenth harmonic to the note four octaves below that to which said alternator furnishes a ground-tone, can be given a voltage of $x$; or other voltages may be given to the several circuits fed by an alternator, as required;

(iv) The vibration-translating devices or receivers used (see Figs. 34 to 37) should be as nearly as possible alike, or at least, their diaphragms should have as nearly as possible the same point of resonance. And all receivers which differ substantially from the one used as a standard should be discarded;

(v) Using receivers that are as nearly as possible alike, keeping them at substantially the same temperature (say about 70 degrees Fahrenheit) running the alternators at a constant speed, regulating the voltage of each alternator by means of the rheostats 12, 12 (Figs. 8, 13, 14 and 15) as before described, and regulating the relative strengths of the different harmonics fed from the same alternator, by assigning different numbers of active turns or coils to each winding, as before described—by doing all these things, the difficulties resulting from shouting can be eliminated or greatly reduced; and (vi) But if the receivers used in the music-room are substantially different from the standard receiver to which the apparatus was regulated or voiced, the musician is likely to have difficulty in producing good results. Or, if the receivers on the subscribers' premises are substantially different from those the performer hears in the music-room where he plays, then the effect produced on the subscribers' premises will be different from, and inferior to, that produced in the music-room at the central-station, and the unequal resonances of the different receivers are liable to produce difficulties—or even to ruin the music. And even if the receivers used in the music-room and those used on the subscribers' premises are as nearly as possible like the standard receiver, to which the alternators were regulated, then, if the speed of the alternators is different from that which they had when the regulating or voicing of the apparatus was done, or if the speed changes even a few per cent., when the machine is in operation, the resulting alteration between the frequencies of the notes and the resonances of the diaphragms, is liable to produce bad musical effects—in some cases, shouting of some of the notes will result, accompanied by weakness of other notes and a more or less serious alteration in the musical balance of the sounds produced.

To illustrate more specifically, let us suppose that the standard diaphragm and all others used, are resonant to the $c$ two octaves above middle-$c$; then, supposing uniform voltage in the alternators, that note would shout. But by properly manipulating the rheostat 12, controlling the corresponding generator, its voltage is reduced sufficiently to compensate for the resonance and to produce a note of moderate loudness. But the notes a tone above and a tone below, will require a much greater voltage to produce the same loudness. If, then, the speed is increased a few per cent., the $c$ mentioned, will become weaker, and the $c$-sharp or $d$, above it, will shout; or if the normal speed of the alternators be reduced a few per cent., $b$ or $b$-flat will shout. This phenomena of shouting also not only alters the loudness of the tone, but alters its timbre or character, for when any harmonic of a note is increased in intensity more than the others, the quality or timbre changes. The shouting of a particular harmonic, then, it will be seen, alters the musical effect prejudicially in several ways.

In addition, then, to the precautions above described, it is desirable to insure a very uniform speed of the alternators. Any means suitable for the purpose may be used. One convenient means, which I have used, is to drive the alternators by means of a good, constant-speed, shunt-wound, electric motor, feeding that motor with a voltage as nearly constant as practicable and furnishing said motor with a good regulating rheostat, inserted in its field circuit, by which the speed may easily be altered. For this purpose, I have used a compound rheostat. in effect, two rheostats, one in series with the other, and each having its own handle by which it is shifted from button to button; the steps in one rheostat are made much smaller than those in the other, and the total resistance of the rheostat with very small steps is much less than that of the one with larger steps, in series with it; and by regulating both, it is made possible to vary the speed over a range of say ten per cent., by very small steps; the rheostat with the larger steps being used for larger changes in speed, and the rheostat with the smaller steps for smaller changes. In some cases, I have used this regulating rheostat with an accurate tachometer, the latter being connected to the driving shaft of the alternators and mounted in a position in which it is easily read by an attendant in the alternator room, who then, by means of the regulating rheostat for the motor before described, compensates for any variation in the speed of the alternators as soon as he can perceive it, and keeps their speed substantially constant. As an alternative, I have mounted the regulating rheostat for the motor that drives the alternators in the music-room, within reach of one of the musicians; and he, as soon as he discovers, either with his unaided ear, or by the help of a tuning-fork, that the pitch is sharping or flatting, operates the rheostat so as to bring the speed of the alternators and pitch of the tones back to normal. By the use of the precautions above described the serious difficulties of diaphragm-shouting have been overcome or greatly reduced. But any other speed-regulating device that is suitable for the purpose, may, of course, be used.

Fourth. Another difficulty in obtaining the best results is what is known in my laboratory as "robbing," that is, a note sounds with sufficient strength when sounded alone, but when another note or several notes are sounded with it, its strength declines, and in some cases, to a very prejudicial extent. Referring to Figs. 1 or 1ᴬ, 3, 3ᴬ and 5, with Figs. 1 and 1ᴬ, and 3ᴬ, the robustness of the chords (that is, the maintenance of the strength of the individual notes, when used in chords) is best maintained when the armature circuits that are closed by the keys of the keyboard, have a fair amount of impedance and the primary 56, of the tone-combining transformer (in Figs. 1, 3 and 3ᴬ) has, or when the line circuit in Fig. 1ᴬ has, a much smaller impedance. For in that case, if several armature circuits be closed simultaneously by the corresponding keys, the current from each armature-circuit flows chiefly through the primary circuit 56, (or in Fig. 1ᴬ through the line circuit and receiver), while if the impedance of the armature-circuits is small and especially if their impedance is small and that of the primary 56, is not small, the current from each armature circuit. (Figs. 1, 3 and 3ᴬ) when several are closed simultaneously, leaks or flows back, to a great extent, through the other armature circuits that are simultaneously closed, and a smaller part of the current from each such armature-circuit flows usefully through the line circuits and receivers. But if the armature-circuits have a larger amount of impedance than the primary 56, as they should have to give the best effect in chords with such an arrangement of the circuits as is illustrated in Figs. 1, 2, 3 and 3ᴬ, and if, turning now to Figs. 5 and 6, two unison keys be depressed at the same time, one on one keyboard and one on another, the unison notes "rob", that is, one weakens the other; and in one apparatus of this sort that I built, it was frequently necessary to avoid such unisons as would result from playing the same note on two keyboards simultaneously.

Figure 5:
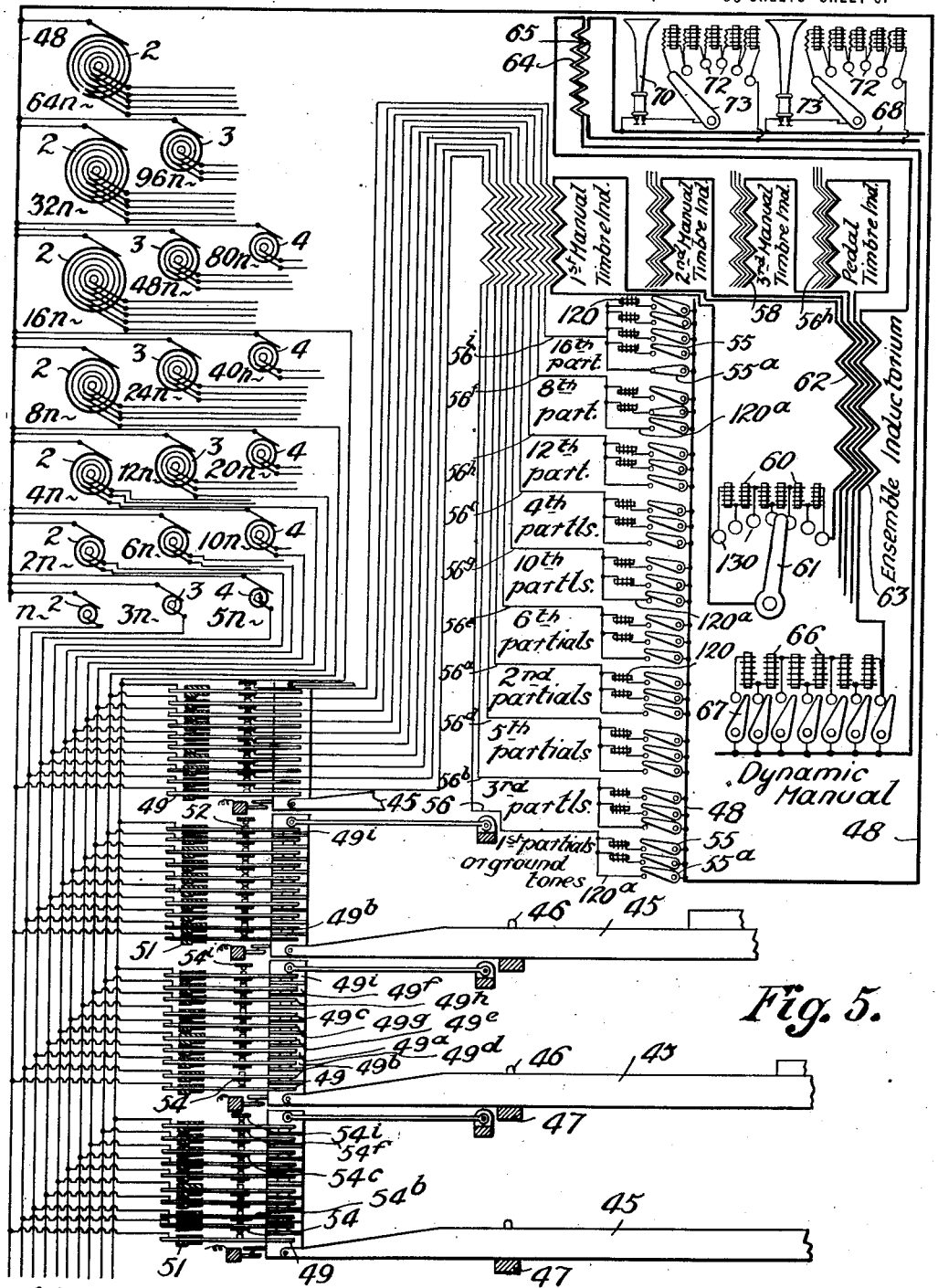

But this difficulty may be greatly reduced, as follows, namely:

(a) By using separate and distinct windings for the different keyboards, as illustrated diagrammatically in Fig. 5ᴬ; that is, by using as before described in connection with Figs. 3, 3ᴬ, 13, 14 and 47, etc., one winding for the ground-tone, another for the second harmonic, another for the fourth harmonic, another for the eighth harmonic, and preferably also, another for the sixteenth harmonic, in the generators of the principal set, making five windings for one keyboard and duplicating these for each additional keyboard, using ten windings for two keyboards, fifteen windings for three keyboards, twenty windings for four keyboards, etc. In like manner, in the generators of the third harmonic supplemental set, one winding should be used for the third harmonics, another for the sixth harmonics, and preferably another for the twelfth harmonics, as before described in connection with Figs. 3, 3ᴬ, etc., making three windings for a keyboard, and duplicating these for each keyboard using six windings for two keyboards, nine windings for three keyboards, twelve windings for four keyboards, etc. And in like manner, the alternators of the fifth-harmonic supplemental set should each have one winding for the fifth harmonic, and another for the tenth harmonic, as before described in connection with Figs. 3, 3ᴬ, etc., making two windings for one keyboard, and duplicating these for each keyboard, making four windings for two keyboards, six windings for three keyboards, etc. Thus, the difficulty resulting from "robbing" on unisons is greatly reduced;

(b) Another way of reducing the difficulties from robbing on unisons, is to use a transformer whose primary is fed by the generator corresponding to a particular tone, and which has a plurality of secondaries, after the general fashion illustrated in Fig. 61, and more in detail in Fig. 5ᵇ, using, preferably, secondaries as numerous as the armature windings described in the preceding paragraph, namely, for the transformers corresponding to, and fed from, the ground-tone set of alternators, preferably five secondaries for one keyboard, ten secondaries for two keyboards, fifteen secondaries for three keyboards, etc.; for the transformers corresponding to, and fed by, the alternators of the third-harmonic supplemental set, preferably three secondaries for one keyboard, six secondaries for two keyboards, nine secondaries for three keyboards, etc.; and for the transformer corresponding to, and fed from, the fifth-harmonic supplemental set, preferably two windings for one keyboard, four windings for two keyboards, six windings for three keyboards, and so on; and (c) Another mode of reducing the difficulties resulting from robbing, is by using impedance coils combined with the circuits in the manner fully described and illustrated in my pending applications, Nos. 436,013, filed June 1, 1908, and 485,645, filed March 25, 1909, which, being fully described and claimed in those applications, I do not deem it proper to describe here; for this would greatly lengthen an already lengthy specification.

Fifth. One of the greatest difficulties in producing a thoroughly good artistic effect, with electrical music, is the phenomenon known in the Cahill laboratory as "diaphragm-crack." Diaphragm-crack is most troublesome in connection with short notes and rapid movements, and it is least troublesome in slow and solemn music. By diaphragm-crack, I mean a certain roughness or harshness which accompanies the beginning or ending of a tone—a roughness or harshness which exists for a small fraction of a second when the alternator is brought into action on the line, and again, for another brief instant, when the alternator ceases to act on the line. That roughness or harshness is sometimes too small to be noticed even with close attention, but at other times, especially when the notes are short, the movement rapid and the touch staccato, it is very perceptible. And this effect is probably due to the fact that the circuit, when first closed, vibrates for an instant at its own natural rate of vibration. For every circuit, it is well known, that has ohmic-resistance, self-induction and electrostatic capacity, has its own natural rate of vibration; and every practical working circuit has more or less resistance, self-induction and capacity; and so has a natural rate of vibration of its own. These natural vibrations of the circuit have, in general, no proper harmonious relation to the musical vibrations that are impressed on the line by the alternators, when the key is depressed. The disturbing vibration that is natural to the circuit itself, is superimposed on the true musical vibrations that are impressed on the lines by the alternators, and the disturbing vibration dies rapidly away, with a logarithmic rate of decline. But despite the short period and feeble power of these vibrations proper to the line, they are more or less prejudicial in rapid music, especially when the notes are short and played staccato. The above is believed to be the correct explanation of the difficulty, but whether it is correct or not and whatever the true explanation of the phenomenon of diaphragm-crack may be, the following things have been found desirable in reducing the difficulties arising from it, namely:

(a) By applying the voltage to the line gradually, the diaphragm-crack is very perceptibly reduced as compared with what exists when the voltage is applied to the line suddenly. Apparatus for applying the voltage to the line gradually is described at considerable length in my other pending applications, No. 436,013, filed June 1, 1908;
No. 485,645, filed March 25, 1909; and
No. 513,961, filed August 21, 1909;

such apparatus adds somewhat (in its best form, it adds a great deal) to the complexity and expense of the music-generating plant, and as it is fully described and claimed in the applications above mentioned, I consider it sufficient to refer to the fact here, and do not think it necessary or beneficial to burden this specification, which is already very lengthy, with a repetition of the description of the apparatuses for the purpose of applying the voltage gradually, which is given in the specifications above referred to;

(b) If the performer will use a careful and somewhat special legato touch, taking care, as a rule not to break the armature circuit of the note which is sounding until he has closed the circuit for the next following note and taking care also, that the amount of overlap of the two notes is so small that no prejudicial effect results therefrom, the amount of diaphragm-crack is much less than when a staccato touch or an imperfect legato is used. Practice is required to acquire a correct legato touch, but the gain resulting from it is very substantial;

(c) So far as my experience extends, the disturbing effect of diaphragm-crack may be reduced by keeping the alternators and their frame-work well insulated from the ground and keeping also the distributing wires or cables well insulated from the ground. Or at all events, I found greater trouble from diaphragm-crack and related phenomena in operating through underground telephone wires, in the case of a plant, the frame-work of whose alternators was grounded and which stood upon cement foundations set in damp earth, than in the case of machines resting upon dry brick work (which stood upon dry sand) or upon a pine floor and which were well insulated from the earth. In the first case above referred to, the grounding of the frame-work of the alternators, resulting from setting them or their steel frame on cement foundations, which stood in damp earth, caused or at least seemed to cause a very perceptible deterioration in the quality of the music when working over underground telephone cables, as compared with the same machine working over such cables, but itself well insulated from the ground;

(d) In reducing diaphragm-crack, good over-head lines seem preferable to underground cables — probably because of the greater freedom from earth currents and because the distributed electrostatic capacity is less than the distributed self-induction is greater;

(e) In my somewhat limited experience, I have found less difficulty from diaphragm-crack, when using a low voltage and a large conductor than when using a high voltage and a small conductor, transmitting the same amount of energy. But while this has been so in my experience, I do not lay it down as a universal rule. The explanation of my experience, I suppose is, that for equal amounts of energy transmitted, the total electrostatic effect or electrostatic energy of the circuit, which is equal to the electrostatic capacity of the circuit, multiplied by the square of the voltage to which it is charged, equals $QV^2/2$ (in which Q is the electrostatic capacity of the circuit, and V, the electro-motive force) is less in the first case than in the second; and as the electrostatic effect is less, the diaphragm-crack is less, for the two things are closely related; and (f) In my original designs and in the models made from them, each circuit was broken at one place only and each circuit was connected at another point permanently with a common return; and this construction is illustrated in Figs. 1, 1$^A$, 3, 3$^A$, etc. I afterward found, however, especially when the music-room with the keyboards was separated by a few rods from the alternators in the machinery-room, that breaking each circuit in two places seemed to give a better musical effect; probably by reason of the fact that by this means each circuit was normally disconnected from its common return, and was only connected with the common return when the circuit was in action; and so, as there was only a small fraction of the circuits connected at any one instant with the common return, the electrostatic effect was less striking. Whether this explanation be correct or not, the improvement under the circumstances existing in the case referred to, resulting from breaking the circuits each in two places, so as to disconnect each (when not in action) from its common return, seemed very perceptible. I afterward found that by breaking the circuit in three places, a still better effect was produced; that is to say, I broke each circuit in two places at the alternator or very close to it and in a third place at the switchboard. By these means, as I understand it, the electrostatic effect was still further reduced. But whether this be the correct explanation or not, the musical effect seemed to be perceptibly improved by the use of three breaks in the circuit.

One form of my apparatus having three breaks in each circuit, is illustrated diagrammatically in Fig. 5$^c$, in which the key 45 controls substantially as before described and illustrated in Figs. 1, 2, 3, 4, etc., the circuits which correspond respectively to the ground-tone and the second, third, fourth, fifth, sixth and eighth harmonics; the key lifting the insulating bar, 45$^a$, which through the projections 45$^b$, 45$^b$, lifts the contact springs 49, 49$^a$, 49$^b$, etc., for the circuits aforesaid; a contact spring for each circuit, and seven such springs for each key, bringing each of said springs into contact with the corresponding contact screw 53, which is set in the conducting bar (54, 54$^a$, 54$^b$, etc., as the case may be) and adapted to be locked in position therein by a locknut; one of said bars 54, 54$^a$, 54$^b$, etc., serving for the ground-tone, another for the second harmonic, another for the third harmonic, and so on— one for each order of harmonics; the circuits for harmonics higher than the eighth harmonic are omitted in Fig. 5$^c$ to save space. The key-controlled bar 45$^a$, also lifts an eighth contact spring 76$^a$ (the lowest of the set in Fig. 5$^c$) which, being pressed up against the corresponding contact screw set in the conducting bar 76$^b$, closes the circuit of the battery 300, through an electro-magnet 301, that corresponds to the key depressed, whereby energizing said electro-magnet. Said magnet, when energized, attracts its armature 302, and so gives movement to the armature lever 303; said lever is centered at 304; and when actuated by the magnet 301, it lifts the bar 45$^{aa}$, which differs from the bar 45$^a$, in that it is made of metal and so is a good conductor, while the bar 45$^a$ is preferably of hard wood or other suitable insulating material. The metal bar 45$^{aa}$, is connected with the positive pole of the battery 308. Said bar carries contact points 305, 305, of silver or other suitable material, which, when said bar is lifted, make contact with and close circuit with the contact springs 307, 307; and each of these is connected through two small electro-magnets 309, 309, with the common-return bar 310, and thence through the wire 311, with the negative pole of the battery 308, aforesaid. Each of these magnets 309, serves, when magnetized, to attract its armature 312, so giving movement to the corresponding armature levers 313 and 313$^a$, which, when thus moved, make contact respectively with the screws, 314 and 315, to which the two poles of the corresponding musical alternator are connected. The lever 313, it will be seen, is connected with the corresponding contact spring 49, (or 49$^a$ or 49$^b$, etc., as the case may be) while the lever 313$^a$ is connected with the common return.

Considering, then, an alternator and its circuit, Fig. 5$^c$, it will be seen that when the key 45 is depressed, it directly closes one gap in the circuit, namely, that between the corresponding contact spring 49 (or 49$^a$, 49$^b$, 49$^c$, etc., as the case may be) and its contact screw 53 (set in the conducting bar 54, 54$^a$ or 54$^b$, etc., as the case may be) and through the push-piece 45$^{aa}$ which the key 45 controls (through the contact spring 76$^d$, the battery 300, the electro-magnet 301, armature 302, and armature lever 303) makes contact with the contact spring 307, and closes the circuit of the battery 308, through the magnets 309, 309, so that these attract their armatures 312, 312, and give movement to the levers 313, 313$^a$, bringing them up into contact with the screws 314 and 315, respectively, and thereby closing circuit between the alternator and the spring 49 (or 49$^a$, 49$^b$, etc., as the case may be) on the one hand, and its common-return on the other.

Thus, when a key is depressed, the current flows (or at least the currents of one sign flow) from the alternator through the contact screw 314, to the lever 313, thence to the corresponding contact spring 49 (or 49$^a$, 49$^b$, 49$^c$, etc., as the case may be) and from said contact spring (when the key, 45, is depressed and the bar 45$^a$ and contact-springs 49, 49$^a$, 49$^b$, etc., are lifted thereby) to the corresponding contact screw 53; and so to the conducting bar 54 (or 54$^a$, 54$^b$, 54$^c$, etc., as the case may be); and from this to the primary of the corresponding tone-partial-inductorium 56 (or 56$^a$, 56$^b$, 56$^c$, etc., as the case may be) and from this to the common return and so back to the lever 313$^a$, and to the contact screw 315; and thus to the other pole of the alternator. And this is true for one alternator winding in each of the alternators of the group which a key controls and which alternators have frequencies corresponding respectively to the ground-tones and overtones of the note for which such key serves.

In Fig. 5$^c$, for simplicity's sake, the key 45 is shown as giving movement directly to the switch-operating bar 45$^a$, as before described in connection with Fig. 4. But instead of thus connecting the key to give movement to the switches 49, 49$^a$, 49$^b$, etc., directly, it may be connected to impel them through a pneumatic or electro-pneumatic action, after the general fashion already described in connection with Figs. 38 to 45; or said switches 49, 49$^a$, 49$^b$, etc., may be impelled by an electro-magnet, controlled by the key 45, as before described, as the switches 307, 307, in Fig. 5$^c$ are controlled; or said switches 49, 49$^a$, 49$^b$ and 307, 307, may be operated by the key in any other suitable manner.

Fig. 5$^D$ is a diagrammatic view showing a system of parts and of circuits the same as Fig. 5$^c$, save that the alternator feeds the primary 232 of a transformer having secondaries 233, 233, (as illustrated in Fig. 61 and before described) and the three breaks of the circuit which in Fig. 5$^c$ are in the circuit of the alternator, in Fig. 5$^D$ are inserted into the secondary circuits 223, 223.

Divers improvements on or special adaptations of my present invention (as illustrated in the accompanying drawings and hereinbefore described) are illustrated and described in my pending applications before mentioned, namely:

No. 436,013, filed June 1, 1908;
No. 485,645, filed March 25, 1909; and
No. 513,961, filed August 21, 1909;

and as these improvements (some of which are of great complexity) are fully described in the other pending applications before mentioned, I do not consider it necessary to repeat that description here; nor could the same be repeated herein without a very great increase in the length of an already lengthy specification.

Sixth. In my experience, I have found rheostats preferable to the various modified constructions illustrated in Figs. 51 to 58, etc., for varying the strength of the different harmonics entering into a tone as well as for varying the loudness of the notes of the different key boards and of the ensemble. Also, I have found rheostats of the general type illustrated in Figs. 29 to 33 and 84 to 90, or the rheostat 60, 61, in Figs. 1, 3, 3$^A$, 5, 6, etc., in which a pedal, drawstop, frame or handle is used to move the brushes so as to operate the rheostat, preferable to the type of rheostat seen in Figs. 1, 3, 3$^A$, 5, 6, 20, 21, 22, 23, etc., in which independent switches 55 and 55$^a$ are used to control the several sections of the rheostat, an independently-acting switch for each such section. The rheostat then, having a pedal or handle or drawstop to operate it (see, for example, Figs. 1 to 6 and 28 to 33) should preferably be used for regulating the strength of the different harmonics, as well as for regulating the strength of the different keyboards; but, of course, other forms of apparatus (several of which have been hereinbefore described) may be used instead, if desired.

Seventh. A direct electro-magnetic action, in which the electro-magnet operates the switch-lifting bar (Figs. 4 and 5) or its equivalent which in Figs. 4 and 5 is pivoted to and lifted directly by the key 45, has been used by me practically instead of a pneumatic or electro-magnetic action, just as, in Fig. 5$^c$ and 5$^D$, the switch-lifting bar 45$^{aa}$ is operated by the electro-magnet 301, acting through the armature 302 and armature-lever 303, said magnet 301 being itself controlled by the key 45; but in a larger apparatus, a pneumatic action or an electro-pneumatic action, as described hereinbefore, in connection with Figs. 35 to 46, might, perhaps, be preferable.

Eighth. In the drawings, a single common-return wire, 48, is shown. This is convenient, in the diagrammatic views, by reason of the smallness of the sheet and the great number of circuits to be shown on it, but I have before pointed out that it seems preferable to use a plurality of common returns, "preferably a different common return for each different order of partial tones". So, also, I consider it preferable to use a plurality of primary coils where several orders of harmonics are combined in one inductorium, rather than to use a single primary for all. Thus, in Figs. 3, 3$^A$, 5, 6, 46, 47, etc., primaries are used equal in number to the orders of harmonics combined into a tone; all said primaries belonging to one and the same inductorium. In Figs. 50 and 51, several inductoriums are used for the several harmonics; in Fig. 59, a plurality of inductoriums are used, each serving for a plurality of harmonics, while in Fig. 60, a single primary is used for all the different harmonics corresponding to a single keyboard.

The partials that make up a composite tone may be combined, then in various ways and any way that is suitable for the purpose may be used. Thus, as we have seen, in Figs. 3, 3$^A$, 5, 6, 46, 47, etc., they are combined by means of a single inductorium, each harmonic or partial tone having a primary of its own in that inductorium. A single primary into which all the partials feed, is illustrated in Fig. 60. An inductorium for each order of partials is shown in Fig. 50. A plurality of inductoriums, each serving for a plurality of partials are illustrated in Fig. 59; and so on. In combining the different partial tones into a note and the notes into chords, many things are to be considered. Thus, it is important to be able to control the different orders of partial tones (as the ground-tones, the second partials, the third partials, etc.,) each by itself, for one or more keyboards; it is important also, to combine them efficiently with as little waste as practicable, into composite tones or notes and to combine these notes into chords with as much robustness and as little robbing as practicable.

It is my present impression that the most satisfactory results, everything considered, are obtained, in an apparatus of the general type illustrated in Figs. 3, 5, 6, etc., as follows, namely:

(*a*) By using an inductorium for each order of partial tones, that is, one inductorium for the ground-tones of a keyboard or switchboard, another inductorium for the second harmonics, another for the third harmonics, and so on; see Fig. 50;

(*b*) By combining the various partial tones or harmonics (at least where so many orders of harmonics are used, as in Figs. 3, 5, 6, etc.) first in small groups and then by combining the composite vibrations thus produced into a single set of more highly complex vibrations. Using an inductorium of its own for each order of partial tones, after the general fashion illustrated in Fig. 50, we may then after the general fashion illustrated in Fig. 59, combine the first, third, and fifth harmonics in another inductorium; the second, sixth and tenth harmonics in another inductorium; and the fourth, eighth, twelfth and sixteenth, in another; and the composite vibrations formed in the secondaries of these three inductoriums may then be combined in any suitable manner into one ensemble; in other words, several inductoriums for the several harmonics may be used, after the general fashion illustrated in Fig. 50, and the secondaries of these, 58, 58, instead of being connected in series, may then be connected to feed into a smaller number of inductoriums, by connecting said secondaries, for example, to feed respectively into the primaries 56, 56$^a$, 56$^b$, etc., illustrated in Fig. 59; the secondary 58, corresponding to the primary 56, in Fig. 50, being connected in series with one of the primaries 56 in Fig. 59; the secondary 58, acted on by the primary 56$^a$, Fig. 50, being connected in series with the primary 56$^a$, Fig. 59, and so on; thus, a small number of harmonics are combined in one combining-inductorium into composite electrical vibrations and a few other harmonics are combined into composite electrical vibrations in another inductorium, and then the composite electrical vibrations thus formed, are again combined into the more highly-complex vibrations desired. In illustrating this mode of combining, by reference to Figs. 50 and 59, it is to be understood, of course, that the primaries 56, 56$^a$, 56$^b$, 56$^c$, etc., of Fig. 59, when connected each in series with the secondary 58, corresponding to the similarly marked primary 56, 56$^a$, 56$^b$, etc., in Fig. 50, is, of course, disconnected from the bars 54, 54ª, 54ᵇ, to which said primaries 56, 56ª, 56ᵇ, etc., are shown as connected in Fig. 59. And (c) Another arrangement of the combining transformers which I have employed, and which is perhaps the most satisfactory of those which I have tried, is to use an inductorium for each order of harmonics, that is, one inductorium for the ground-tones, another for the second harmonics, another for the third harmonics, and so on; and to combine the second and third harmonics in a combining-inductorium, which is furnished with one primary to serve for the second harmonics, and with another primary to serve for the third harmonics, and to combine the fourth and fifth and sixth and all higher harmonics in another inductorium which may either be furnished with one primary for each order of harmonics so combined, or with a smaller number of primaries, each serving for two or more different orders of harmonics; and lastly, the vibrations from the secondary circuit of the ground-tone-inductorium and from the secondary of the combining-inductorium that serves for the second and third harmonics and also from the secondary of the inductorium that serves to combine the fourth, fifth and all higher harmonics, are combined into one set of more highly composite vibrations in another combining transformer. One convenient arrangement of circuits for this purpose is illustrated in Fig. 5ᴱ.

Rheostats are used to control the strengths of the several orders of harmonics; preferably a rheostat for each order of harmonics; such a rheostat I prefer to insert in the secondary circuit of the corresponding inductorium, but it may, of course, be inserted elsewhere—as, for example, in the primary circuit.

Still other forms of apparatus for combining harmonics into composite tones and for combining notes into chords, are described in my pending applications before mentioned—

No. 436,013, filed June 1, 1908;
No. 485,645, filed March 25, 1909;
No. 513,961, filed August 21, 1909.

Ninth. Referring to the type of alternators illustrated in Figs. 11, 12, 12ᴬ and 12ᴮ, and in Figs. 8 and 10 to the left of the figure, and, on the other hand, the inductor type of alternator, illustrated to the right of Figs. 8 and 10 and in Fig. 9, and in Figs. 13 to 19 inclusive I have, for practical reasons and under the conditions in which I have worked, found the inductor type of alternator preferable at least, in a small plant, even in the bass notes, to the type of alternator with revolving field-poles and armature circuits located in the air-gap, illustrated in Figs. 8, 11, 12, 12ᴬ and 12ᴮ. But in a large plant, some form of alternator with revolving field poles will, I think, be found preferable, for the lower notes, But another builder, under other conditions, might, perhaps, prefer to use some other type of alternators than the inductor type.

Tenth. In the drawings (Figs. 3, 3ᴬ, 5, etc.), I have illustrated a principal or ground-tone set of alternators, having a compass of seven octaves, less one half-tone; a third-harmonic supplemental set, having a compass of six octaves, less one half-tone; and a fifth-harmonic supplemental set, having a compass of five octaves, less one half-tone—the ground-tones set running upward from the C three octaves below middle-c to the b four octaves above middle-c. With C, three octaves below middle-c, as the lowest note, experience shows that eight octaves are much preferable to seven for the ground-tone set, and it seems clear that eight and one-half octaves, or possibly nine, would be better still. So, for the third-harmonic set, about seven octaves compass is desirable; and for the fifth-harmonic set, six octaves are desirable. But if the lowest note were cello C (that is, the C two octaves below middle-c and which gives approximately sixty-four vibrations per second) a less compass of the alternators would, of course, be sufficient.

The main reason for extending the compass of the alternators upward (as above described) lies in the fact that the high frequencies are important, if not indispensible, to the production of brilliant, cheerful tones. My experience shows that the use of the eighth harmonic is important in producing a cheerful effect, at least in the lower and middle part of the gamut or compass. And in the bass, higher harmonics may be used with advantage; I have, in fact, used the twelfth, sixteenth, twenty-fourth, thirty-second and even the forty-eighth harmonics in the bass, with advantage, provided always that the higher harmonics are used with but little intensity; for if they have too much intensity, they render the tone thin, cheap and poor.

Eleventh. I have before explained the importance of the ground-tone, second, fourth and eighth harmonics, especially the ground-tone, second and fourth. My experience also shows that harmonics of the third-harmonic series, (the third, sixth and even the twelfth) are of great importance, while the fifth and tenth harmonics seem, on the whole, to be of very much less importance; and wherever economy is important, they can be omitted.

Twelfth. The approximate third, sixth and twelfth harmonics, furnished by the apparatus illustrated in Fig. 48 and before described, (although varying by only a little more than one one-thousandth (1/1000) part from true third, sixth and twelfth harmonics) I find to be much inferior to the corresponding true harmonics—so much inferior, that they ought not, in general, to be substituted for them and can have, it seems to me, but a very limited and special use, depending upon the genius of the musician. Wherever the expense can be afforded, true third, sixth and twelfth harmonics should be furnished; and wherever economy is important, the approximate third, sixth and twelfth harmonics, furnished by the apparatus illustrated in Fig. 48, before described, should be omitted.

Also, the imperfect fifth and tenth harmonics, furnished by the apparatus illustrated in Fig. 49 before described, are so far imperfect that they ought not to be used as substitutes for the true fifth and tenth harmonics. The latter should be furnished wherever the expense can be afforded; though I consider them, as before said, very much less important than the third, sixth and twelfth harmonics; and the imperfect fifth and tenth harmonics, furnished by the apparatus illustrated in Fig. 49, should be omitted, in all cases where economy is important, for their use would be very limited.

And obviously, without departing from the essential features of my invention hereinbefore described and illustrated in and by the accompanying drawings, a skilful electrician and acoustician, exercising the skill of his art may, by the substitution of equivalents and by omissions, additions and alterations vary the apparatus illustrated in the drawings in many particulars, while still retaining some of the essential principles, combinations or sub-combinations belonging to my invention.

I have found alternators preferable, as sources of electrical vibrations, to the other devices that I have tried for the purpose. But I have before specifically pointed out the fact that rheotomes or any other suitable sources of electrical vibrations may be used instead of the alternators; that the rheotomes or other sources of electrical vibrations might be used (to mention one way of using them only) to produce electrical vibrations of the same frequencies as the alternators, in place of the alternators, in the circuits 232, 232, Fig. 61, the circuits, 233, being connected with the switches or circuit-controlling devices of the several keyboards or switchboards and with the expression devices, in the various ways before described. And, as I have before pointed out, however, the vibrations may be initiated in the circuits which my switchboards control, and whatever the source of means of producing the electrical vibrations in the circuits may be (whether alternators, rheotomes or electrical sources of some other kind) the various combinations of circuits and of circuit-controlling devices and of expresison devices before described, may be used for the purposes before described, although the requisite electrical vibrations be produced by some means other than alternators. And it will be understood, then, that in those paragraphs of claim at the end of this specification in which I speak, in whatever form of words of electrical vibration-generating devices, or devices for producing electrical vibrations, or means for producing electrical vibrations, or speak of producing electrical vibrations, I do not restrict or limit myself to alternators, except in those paragraphs of claim in which the alternators are expressly named as an element of the combination.

And in general, each of the more important novel features of my present invention may be used whether the other novel features be used or not, and a great number of variations may be made from the specific things illustrated in the drawings, without departing from some of the essential features of my invention that are embodied in the construction illustrated in the accompanying drawings. And I wish it to be distinctly understood that I desire adequate and just protection for the whole and every part of my invention herein disclosed that is not covered by the prior patents to me before mentioned. Nos. 1,213,803 and 1,213,804, dated January 23, 1917, on the applications before mentioned, No. 194,111, and No. 194,113, which were co-pending with this present application; and that I do not desire or intend to dedicate or abandon my invention or any part thereof to the public.

Apart from the fact that certain modified and alternative constructions of apparatus are illustrated in the accompanying drawings and hereinbefore described, four forms of apparatus, broadly speaking, are illustrated and described herein, namely:

First. A very simple form of apparatus, illustrated by Figs. 1ᴬ, 7 to 18ᴬ, inclusive, and 34 to 37, inclusive, with the modifications of the gearing illustrated in Figs. 64 to 81, inclusive; and in this simple form of apparatus, expense and complexity are avoided, as far as possible, and the maximum of economy and simplicity, as far as possible attained. In this apparatus, only one keyboard or switchboard is used; only one register of circuits is used for that switchboard; all the expense and complexity involved by expression devices are avoided, save the voltage regulators for the alternators; and a larger percentage of the electric-current generated by the alternator, corresponding to a note that is sounding, is transmitted to the line, with the single register of circuits and simple apparatus, than can be done when many registers of circuits co-act to build a composite tone in a vibration-combining circuit, as illustrated in the more complicated apparatus of Figs. 3, 3ᴬ, etc. But, of course, the tone of the simpler apparatus, illustrated by Fig. 1ᴬ, is less rich and flexible than that produced by the more complicated apparatus, illustrated, for example, by Figs. 3, 3ᴬ, etc.

Second. A second form of apparatus is illustrated in and by Figs. 1, 2, 3, 3ᴬ, 4, 7 to 19, 21 to 30, and 32 to 45, inclusive, and with various modifications and alternative constructions, in Figs. 46 to 92, inclusive. In this second form of apparatus (as in the first or simplest form) a single switchboard and a single keyboard are used; but this second form of apparatus, as illustrated in the drawings and in its preferred form, differs from the first or simplest form of apparatus above briefly described, in the following among other particulars:

(a) One or more expression devices are furnished, by which the performer is enabled to vary the loudness of the sounds belonging to his keyboard or switchboard from time to time, as he thinks best, in a view to the musical effect to be produced. Various devices are shown for this purpose in the various figures; of these the form of rheostat illustrated in Figs. 28 to 33, or the modified forms illustrated in Figs. 84 to 90, is, according to my present opinion, on the whole the most generally serviceable;

(b) Means are furnished by which a plurality of alternators, whose frequencies correspond respectively to the ground-tone of a note and to one or more over-tones thereof, are made to co-act to produce a richer tone than any of these alternators would produce by itself alone;

(c) Also a plurality of sets or registers of circuits are used, corresponding as registers or as sets to different orders of harmonics, as, for example, one register of circuits to serve for the electrical vibrations corresponding to ground-tones of notes; another register of circuits, to serve for the electrical vibrations that correspond to the second harmonics of the notes; a third register of circuits, to serve for the third harmonics of that correspond to the third harmonics of fourth harmonics of the notes; and so on; and (d) Register controlling-devices or set-controlling devices, are furnished by which, in the preferred form of apparatus, a particular order of harmonics can be used or not used, as required; and when used, can be used with more or less power, as required;

Third. A third form of apparatus is illustrated in Figs. 1 to 81 and 83 to 92, inclusive, (see particularly Figs. 5, 6, 20, 31) and this third form differs from the second form of apparatus briefly described above, in that a plurality of switchboards and also, preferably, a plurality of manuals or keyboards are provided for the playing of different musical parts or voices; with means, in the preferred form of apparatus, by which different timbres or different degrees of loudness of tone, or both, are given to the different keyboards; and by which, also, in the preferred form of the apparatus, the performer or performers can change from time to time the loudness of the tone of each keyboard and the timbre of the notes controlled by each keyboard or switchboard; or, at least, can change the loudness or the timbre of one or more switchboards. This form of apparatus is inevitably more expensive and complicated—indeed much more expensive and complicated—than the first and second forms of apparatus above described, but its musical powers are greater.

Fourth. A fourth form of apparatus is illustrated by Fig. 82, taken in connection with the other drawings; and this fourth form of apparatus, whether provided with a single keyboard and switchboard or with a plurality of keyboards or switchboards, is characterized by the use of unison sets of alternators, the corresponding members of which produce electrical vibrations of unison frequencies, but differing more or less in wave shape and in musical quality.

The second form of apparatus, above described, it will be observed, includes the first, combined with certain important additions. That is to say, the first form of apparatus exists in the second, as a part of the same; and the second form of apparatus exists in the third, as a part of that.

Now the first or simplest form of apparatus above mentioned forms the principal part of the subject matter of the Letters Patent aforesaid, No. 1,213,803, dated January 23, 1917. The second form of apparatus above briefly and roughly described, in which one manual or keyboard or switchboard is used, combined with an electrical swell or with other expression devices and with alternators or other electrical sources having harmonically-related frequencies, combined in such a manner that they co-act in producing a richer note than either could produce alone, with registers of circuits corresponding to different orders of harmonics and with means for altering the timbre of the tones, may be stated (not by way of definition or of limitation or of exact statement, but as a brief, rough, general indication of subject-matter) to form the subject-matter or the principal part of the subject-matter of the other Letters Patent aforesaid, to me, No. 1,213,804, which issued on the application aforesaid, No. 194,113, which was co-pending with this application. And the third and fourth forms of apparatus above briefly and roughly described may be stated (not by way of limitation or of definition, or of exact statement, but as a rough, general indication of subject-matter) to form the chief part of the subject-matter of the present application.

It is to be understood, then, that various novel features of invention which are illustrated in the drawings and described in the specification of the present application are not claimed herein, for the reason that they are claimed in the Letters Patent aforesaid, Nos. 1,213,803 and 1,213,804, which issued January 23, 1917, on the applications aforesaid, Nos. 194,111 and 194,113, which were co-pending with this application.

I do not, therefore, claim in this application anything that is claimed in my earlier patents aforesaid, Nos. 1,213,803 and 1,213,804, but what I do claim in this application and desire to secure by Letters Patent hereunder is:

1. An electrical music-generating system, including, in combination, (a) a plurality of keyboards of pitch keys; (b) vibration-generating devices, for producing electrical vibrations of the requisite frequencies; and (c) one or more common-receiver vibration-translating devices, each common to the several keyboards aforesaid, and acting to translate into audible vibrations the electrical vibrations coming to it from any one of the keyboards aforesaid.

2. In combination, in an electrical music-generating system (a) a plurality of keyboards; and (b) electrical vibration-generating devices, whereby electrical vibrations corresponding to notes of one timbre are produced for one key-board, and electrical vibrations corresponding to notes of another timbre for another keyboard.

3. In combination, in an electrical music-generating system, (a) a plurality of keyboards; (b) electrical vibration-generating devices, whereby electrical vibrations corresponding to notes of one timbre are produced for one keyboard, and electrical vibrations corresponding to notes of another timbre for another keyboard; and (c) one or more common-receiver vibration-translating devices, fed with vibrations controlled by the several keyboards aforesaid.

4. In combination, in an electrical music-generating system, (a) a plurality of keyboards; and (b) electrical vibration-generating devices, whereby electrical vibrations corresponding to notes of one degree of loudness are produced for one keyboard and electrical vibrations corresponding to notes of a different degree of loudness for another keyboard.

5. In combination, in an electrical music-generating system, (a) a plurality of keyboards; (b) electrical vibration-generating devices, whereby electrical vibrations corresponding to notes of one degree of loudness are produced for one keyboard and electrical vibrations corresponding to notes of a different degree of loudness for another keyboard; and (c) one or more common-receiver vibration-translating devices, each fed with vibrations controlled by the several keyboards aforesaid.

6. An electrical music-generating system including, in combination, (a) a plurality of keyboards; (b) means whereby electrical vibrations, corresponding to the notes of a musical scale, through one or more octaves, are produced for each keyboard; and (c) expression devices for the several keyboards aforesaid, each serving to regulate the intensity of the electrical vibrations corresponding to its keyboard.

7. In combination, in an electrical music-generating system, (a) a plurality of keyboards; (b) means whereby electrical vibrations, corresponding to the notes of a musical scale, through one or more octaves, are produced for each keyboard; and (c) an expression device for each keyboard, acting independently of the keys of such keyboard, to control a plurality of the tones of such keyboard.

8. In combination, in an electrical music-generating system, (a) a plurality of keyboards; (b) means whereby electrical vibrations, corresponding to the notes of a musical scale, through one or more octaves, are produced for each keyboard; and (c) independent loudness-governing devices, for the several keyboards aforesaid, whereby the loudness of the tones of each keyboard can be altered, one keyboard independently of another.

9. In combination, in an electrical music-generating system, (a) a plurality of keyboards; (b) means whereby electrical vibrations, corresponding to the notes of a musical scale, through one or more octaves, are produced for each keyboard; and (c) independent timbre-controlling mechanisms for the several keyboards aforesaid, whereby the timbre of the notes of the several keyboards aforesaid may be altered, one keyboard independently of another.

10. An electrical music-generating system, including, in combination, (a) vibration-generating devices, whereby electrical vibrations corresponding to the notes of a musical scale through one or more octaves, are produced; (b) vibration-translating apparatus, whereby electrical vibrations are translated into audible vibrations; (c) two keyboards, each controlling the action of the vibration-generating apparatus upon the vibration-translating apparatus; and (d) expression devices for the several keyboards aforesaid, each serving to regulate the amplitude of the electrical vibrations corresponding to such keyboard.

11. In combination, in an electrical music-generating system, (*a*) vibration-generating devices, whereby electrical vibrations corresponding to the notes of a musical scale through one or more octaves, are produced; (*b*) vibration-translating apparatus, whereby electrical vibrations are translated into audible vibrations; (*c*) two keyboards, each controlling the action of the vibration-generating apparatus aforesaid on the vibration-translating apparatus aforesaid; and (*d*) an expression device for each keyboard, acting independently of the keys of such keyboard, to control the loudness of a plurality of the tones of such keyboard.

12. In combination, in an electrical music-generating system, (*a*) vibration-generating devices, whereby electrical vibrations corresponding to the notes of a musical scale through one or more octaves, are produced; (*b*) vibration-translating apparatus, whereby electrical vibrations are translated into audible vibrations; (*c*) two keyboards, each controlling the action of the vibration-generating apparatus aforesaid on the vibration-translating apparatus aforesaid; and (*d*) independent loudness-governing devices, for the several keyboards aforesaid; whereby the loudness of the tones of each keyboard can be altered, one keyboard independently of another.

13. In combination, in an electrical music-generating system, (*a*) vibration-generating devices, whereby electrical vibrations corresponding to the notes of a musical scale through one or more octaves, are produced; (*b*) vibration-translating apparatus, whereby electrical vibrations are translated into audible vibrations; (*c*) two keyboards, each controlling the action of the vibration-generating apparatus aforesaid on the vibration-translating apparatus aforesaid; and (*d*) timbre-controlling mechanism for one or more of the several keyboards aforesaid.

14. In an apparatus for producing music electrically, and in combination, a plurality of keyboards of pitch keys; vibration-generating devices controlled by the keys; vibration-translating apparatus; and means whereby the qualities of the tones belonging to the different keyboards respectively are varied independently of each other.

15. In an electrical music-generating system and in combination, (*a*) a plurality of keyboards of pitch-keys; (*b*) composite-tone vibration-generating devices, controlled by the keys of each keyboard; (*c*) vibration-translating apparatus, whereby electrical vibrations are translated into audible vibrations; and (*d*) timbre-varying mechanism for one or more of the keyboards aforesaid, whereby different qualities of tone may be given to the notes of the different keyboards aforesaid.

16. In an electrical music-generating system, and in combination therein with suitable vibration-translating apparatus, (*a*) a plurality of keyboards of pitch-keys; (*b*) a plurality of groups of sets of circuits; the different groups aforesaid belonging to the different keyboards aforesaid; a plurality of the keys of each keyboard controlling each a circuit in each of the sets of circuits belonging to that keyboard; and (*c*) vibration-generating devices, whereby the requisite electrical vibrations are produced in the different circuits aforesaid.

17. An electrical music-generating system, including, in combination, (*a*) suitable vibration-translating apparatus; (*b*) a plurality of keyboards of pitch keys; (*c*) a plurality of groups of sets of circuits; the different groups aforesaid belonging to the different keyboards aforesaid; a plurality of the keys of each keyboard controlling each a circuit in each of the sets of circuits belonging to that keyboard; (*d*) vibration-generating devices, whereby the requisite electrical vibrations are produced in the different circuits aforesaid; and (*e*) devices corresponding respectively to the different sets of circuits controlled by a keyboard, said devices each controlling the action of the corresponding set of circuits, upon the vibration-translating apparatus.

18. In an apparatus for producing music electrically, and in combination, (*a*) a plurality of keyboards of pitch keys; (*b*) vibration-generating devices controlled by said keys; (*c*) a vibration-translating apparatus affected by the vibration-generating devices aforesaid, when the appropriate keys of the different keyboards aforesaid are depressed; and (*d*) independently-acting loudness-controlling devices, for the different keyboards aforesaid, whereby different strengths of tone are given to the different keyboards aforesaid in the vibration-translating apparatus aforesaid.

19. In an apparatus for producing music electrically, and in combination, (*a*) a plurality of keyboards of pitch keys; (*b*) vibration-generating devices controlled by said keys; (*c*) a vibration-translating apparatus affected by all the vibration-generating devices aforesaid, when the appropriate keys of the different keyboards aforesaid are depressed; and (*d*) independently-acting rheostats for the different keyboards aforesaid, whereby the amplitudes of the electrical vibrations communicated to the vibration-translating apparatus aforesaid, and corresponding respectively to the different keyboards aforesaid, may be varied independently one of another.

20. In an apparatus for producing music electrically, and in combination, (*a*) a plurality of keyboards of pitch keys; (*b*) vibration-generating devices, controlled by the keys of the keyboards aforesaid; each keyboard controlling vibration-generating devices corresponding to the notes of a musical scale; (c) a single vibration-translating apparatus, acting to translate into audible vibrations the electric vibrations coming to it from all the keyboards aforesaid; and (d) means whereby the loudness of the tones of each keyboard can be varied independently of the other keyboards.

21. In an apparatus for producing music electrically, and in combination, (a) a plurality of keyboards of pitch keys; (b) vibration-generating devices, controlled by the keys of the keyboards aforesaid; each keyboard controlling vibration-generating devices corresponding to the notes of a musical scale; (c) a single circuit, affected by the vibrations controlled by the several keyboards aforesaid; and (d) one or more telephonic receivers fed from said circuit.

22. In an apparatus for producing music electrically, and in combination, (a) a plurality of keyboards of pitch keys; (b) vibration-generating devices, controlled by the keys of the keyboards aforesaid; each keyboard controlling vibration-generating devices corresponding to the notes of a musical scale; (c) a single circuit, affected by the vibrations controlled by the several keyboards aforesaid; (d) one or more telephonic receivers fed from said circuit; and (e) means whereby the loudness of the tones of each keyboard can be varied independently of the other keyboards.

23. An apparatus for producing music electrically, including in combination, (a) a plurality of keyboards of pitch keys; (b) circuits for said keyboards; (c) vibration-generating devices, whereby the requisite electrical vibrations are produced in the circuits of the different keyboards aforesaid; (d) a vibration-translating device, affected by the circuits belonging to the different keyboards aforesaid; and (e) devices controlling the loudness of the tones of the keyboards aforesaid, one keyboard independently of another.

24. In an apparatus for producing music electrically, and in combination, (a) a plurality of keyboards of pitch keys; (b) a plurality of sets of circuits for each keyboard, the different sets of circuits belonging to a keyboard serving respectively for different orders of partial tones; and (c) vibration-generating devices, whereby electrical vibrations of the requisite frequencies are produced in the circuits before mentioned.

25. In an apparatus for producing music electrically, and in combination, (a) a plurality of keyboards of pitch keys; (b) a plurality of sets of circuits for each keyboard, the different sets of circuits belonging to a keyboard serving respectively for different orders of partial tones; (c) vibration-generating devices, whereby electrical vibrations of the requisite frequencies are produced in the circuits before mentioned; and (d) means whereby the different partial tones of each keyboard are combined in varying proportions, whereby electrical vibrations corresponding to tones of different timbres are produced.

26. In an apparatus for producing music electrically, the combination of (a) a plurality of keyboards of pitch keys; (b) a plurality of sets of circuits for each keyboard, the different sets of circuits belonging to a keyboard serving respectively for different orders of partial tones; (c) vibration-generating devices, whereby electrical vibrations of the requisite frequencies are produced in the circuits above mentioned; (d) vibration-translating apparatus, whereby electrical vibrations are translated into audible aerial vibrations; and (e) set-controlling devices for some or all of the sets of circuits aforesaid, each such set-controlling device serving to control the action of the set of circuits for which it serves on the vibration-translating apparatus aforesaid.

27. In an electrical music-generating system, and in combination, (a) a keyboard or switchboard; (b) circuits, belonging to and controlled by such keyboard or switchboard; (c) another keyboard or switchboard and other circuits belonging to and controlled by such last-mentioned keyboard or switchboard; (d) one or more vibration-translating devices, for translating electrical vibrations into audible aerial vibrations; and (e) a single set of vibration-generating devices, feeding vibrations to the circuits of the several keyboards or switchboards aforesaid, substantially as hereinbefore described.

28. In an electrical music-generating system, and in combination, (a) a keyboard or switchboard; (b) circuits, belonging to and controlled by such keyboard or switchboard; (c) another keyboard or switchboard and other circuits belonging to and controlled by such last-mentioned keyboard and switchboard; (d) one or more vibration-translating devices, for translating electrical vibrations into audible aerial vibrations; and (e) a single set of vibration-generating devices, feeding vibrations to the circuits of the several keyboards or switchboards aforesaid; the apparatus being constructed and arranged and operating in such a manner, that the electrically produced tones, controlled by one keyboard or switchboard may be of one timbre while the electrically produced tones, controlled by another keyboard are of a different timbre; substantially as hereinbefore described.

29. In an electrical music-generating system, and in combination, (a) a keyboard or switchboard; (b) circuits, belonging to and controlled by such keyboard or switchboard; (c) another keyboard or switchboard and other circuits belonging to and controlled by such last-mentioned keyboard or switchboard; (d) one or more vibration-translating devices, for translating electrical vibrations into audible aerial vibrations; and (e) a single set of vibration-generating devices, feeding vibrations to the circuits of the several keyboards or switchboards aforesaid, the apparatus being constructed, arranged and operating in such a manner that the electrically-produced tones belonging to and controlled by one keyboard or switchboard, may be made to be of one degree of loudness and the electrically-produced tones belonging to and controlled by another keyboard or switchboard, made to be of a distinctly different degree of loudness, whereby facility is afforded to the performer or performers to emphasize the melody and subdue the accompaniment; all substantially as hereinbefore described.

30. In an electrical music-generating system, and in combination (a) a keyboard or switchboard; (b) circuits, belonging to and controlled by such keyboard or switchboard; (c) another keyboard or switchboard and other circuits belonging to and controlled by such last mentioned keyboard or switchboard; (d) one or more vibration-translating devices, for translating electrical vibrations into audible aerial vibrations; (e) a single set of vibration-generating devices, feeding vibrations to the circuits of the several keyboards or switchboards aforesaid; and (f) timbre changing mechanism for one or more of the keyboards aforesaid, whereby the timbre of the notes of such keyboard can be altered, from time to time, as required; substantially as hereinbefore described.

31. In an electrical music-generating system, and in combination, (a) a keyboard or switchboard; (b) circuits, belonging to and controlled by such keyboard or switchboard; (c) another keyboard or switchboard and other circuits belonging to and controlled by such last-mentioned keyboard or switchboard; (d) one or more vibration-translating devices, for translating electrical vibrations into audible aerial vibrations; (e) a single set of vibration-generating devices, feeding vibrations to the circuits of the several keyboards or switchboards aforesaid; (f) timbre-changing mechanism for one or more of the keyboards aforesaid, whereby the timbre of the notes of such keyboard can be altered, from time to time, as required; and (g) means, whereby the relative intensities of the notes, produced by the several keyboards or switchboards aforesaid, may be varied from time to time, according to the musical effect required; substantially as hereinbefore described.

32. An electrical music-generating system, including, in combination, (a) suitable vibration-translating apparatus, whereby electrical vibrations are translated into audible vibrations; (b) a keyboard or switchboard; (c) a plurality of sets of circuits controlled by said keyboard or switchboard; (d) another keyboard or switchboard; (e) one or more other sets of circuits, controlled by said last mentioned switchboard; and (f) vibration-generating devices, whereby the requisite electrical vibrations are produced in the circuits of the several sets aforesaid.

33. An electrical music-generating system, including, in combination, (a) suitable vibration-translating apparatus, whereby electrical vibrations are translated into audible vibrations; (b) a keyboard or switchboard; (c) a plurality of sets of circuits, controlled by said keyboard or switchboard; (d) another keyboard or switchboard; (e) one or more other sets of circuits, controlled by said last-mentioned switchboard; (f) vibration-generating devices, whereby the requisite electrical vibrations are produced in the circuits of the several sets aforesaid; and (g) means whereby the relative intensities of the electrically-produced sounds, belonging respectively to the two switchboards aforesaid, may be varied from time to time according to the musical effect required.

34. An electrical music-generating system, including, in combination, (a) suitable vibration-translating apparatus, whereby electrical vibrations are translated into audible vibrations; (b) a keyboard or switchboard; (c) a plurality of sets of circuits controlled by said keyboard or switchboard; said sets of circuits serving respectively for different orders of harmonics; (d) another keyboard or switchboard; (e) one or more other sets of circuits, controlled by said last-mentioned switchboard; and (f) vibration-generating devices, whereby the requisite electrical vibrations are produced in the circuits of the several sets aforesaid.

35. An electrical music-generating system, including, in combination (a) suitable vibration-translating apparatus, whereby electrical vibrations are translated into audible vibrations; (b) a keyboard or switchboard; (c) a plurality of sets of circuits controlled by said keyboard or switchboard; said sets of circuits serving respectively for different orders of harmonics; (d) another keyboard or switchboard; (e) one or more other sets of circuits, controlled by said last-mentioned switchboard; (f) vibration-generating devices, whereby the requisite electrical vibrations are produced in the circuits of the several sets aforesaid; and (g) means whereby the relative intensities of the electrically-produced sounds, belonging respectively to the two switchboards aforesaid, may be varied from time to time according to the musical effect required.

36. In an electrical music-generating system, the method of transmitting musical notes of different timbres over the same circuit simultaneously, in the form of electrical vibrations, which consists in, (a) producing, in a plurality of sets of circuits, electrical vibrations corresponding to different orders of partial tones; producing partials of one order in the circuits of one set and partials of another order in the circuits of another set; (b) producing in a conductor, by means of electrical vibrations in a plurality of the circuits before mentioned, composite electrical vibrations corresponding to a note of one timbre; (c) producing, at the same time, in a plurality of other sets of circuits, other electrical vibrations corresponding to different orders of partial tones; producing electrical vibrations corresponding to partials of one order in the circuits of one of said sets and producing electrical vibrations corresponding to partials of another order in the circuits of another of said sets; (d) producing, in a conductor, by means of the electrical vibrations in a plurality of the circuits last mentioned, composite electrical vibrations corresponding to a note of a different timbre from that above-mentioned; and (e) producing, by means of the different sets of composite electrical vibrations before mentioned, corresponding to notes of different timbres, audible aerial vibrations.

37. In an electrical music-generating system, the method of transmitting musical notes of different timbres over the same circuit simultaneously, in the form of electrical vibrations, which consists in, (a) producing by induction, in a plurality of sets of circuits, electrical vibrations corresponding to different orders of partial tones; producing partials of one order in the circuits of one set and partials of another order in the circuits of another set; (b) producing in a conductor, by means of the electrical vibrations in a plurality of the circuits before mentioned, composite electrical vibrations corresponding to a note of one timbre; (c) producing, at the same time, in a plurality of other sets of circuits, other electrical vibrations corresponding to different orders of partial tones; producing electrical vibrations corresponding to partials of one order in the circuits of one of said sets and producing electrical vibrations corresponding to partials of another order in the circuits of another of said sets; (d) producing, by means of the electrical vibrations in a plurality of the circuits last mentioned, composite electrical vibrations corresponding to a note of a different timbre from that above-mntioned; (e) producing, by means of the different sets of composite electrical vibrations before mentioned, other and more highly composite electrical vibrations in a conductor; and (f) producing, by means of the vibrations aforesaid, audible aerial vibrations.

38. In an electrical music-generating system, the method of transmitting musical notes of different timbres over the same circuit simultaneously, in the form of electrical vibrations, which consists in, (a) producing, in a plurality of sets of circuits, electrical vibrations corresponding to different orders of partial tones, producing partials of one order in the circuits of one set and partials of another order in the circuits of another set; (b) producing, in a conductor, by means of the electrical vibrations in the different circuits before-mentioned, composite electrical vibrations corresponding to tones of one timbre; (c) producing, at the same time, in a plurality of other sets of circuits, other electrical vibrations corresponding to different orders of partial tones, producing electrical vibrations corresponding to partials of one order in the circuits of one of said sets and producing electrical vibrations corresponding to partials of another order in the circuits of another of said set; (d) producing, in another conductor, composite electrical vibrations from vibrations in circuits of the different sets last-mentioned; (e) producing, by means of the composite electrical vibrations in the conductors mentioned in the preceding clauses, more highly composite electrical vibrations in still another conductor; and (f) producing, by means of the electrical vibrations aforesaid, audible aerial vibrations.

39. In an electrical music-generating system, the method of transmitting musical notes of different timbres over the same circuit simultaneously, in the form of electrical vibrations, which consists in, (a) producing, in a plurality of sets of circuits, electrical vibrations corresponding to different orders of partial tones, producing partials of one order in the circuits of one set and partials of another order in the circuits of another set; (b) producing, in a conductor, by means of the electrical vibrations in the different circuits before - mentioned, composite electrical vibrations corresponding to tones of one timbre; (c) producing, at the same time, in a plurality of other sets of circuits, other electrical vibrations corresponding to different orders of partial tones, producing electrical vibrations corresponding to partials of one order in the circuits of one of said sets and electrical vibrations corresponding to partials of another order in the circuits of another of said sets; (d) producing, in another conductor, composite electrical vibrations, from the vibrations in different sets of the circuits last mentioned; (e) transferring, by independently-controllable inductions, vibrations from the conductor mentioned in clause (b), and vibrations from the conductor mentioned in clause (d) to a vibration-combining circuit, wherein more highly composite vibrations are produced;

and (*f*) producing, by means of the electrical vibrations aforesaid, audible, aerial vibrations.

40. In an electrical music-generating system, the method of producing a plurality of composite notes simultaneously, which consists in, (*a*) producing electrical vibrations, corresponding to the ground-tones of a plurality of notes, in different circuits simultaneously; (*b*) producing, also simultaneously, in other circuits, electrical vibrations corresponding to over-tones of said notes; (*c*) producing, by means of said ground-tone vibrations and over-tone vibrations, resultant electrical vibrations, corresponding to a chord of composite tones, in a vibration-combining circuit; (*d*) producing also, at the same time, in other circuits, electrical vibrations corresponding to ground-tones of one or more other notes; (*e*) producing, also simultaneously, in still other circuits, electrical vibrations corresponding to over-tones of the ground-tones last mentioned; (*f*) producing, by means of the last-mentioned ground-tone vibrations and over-tone vibrations, composite electrical vibrations of the timbre desired in another vibration-combining circuit; and (*g*) producing, by means of the electrical vibrations aforesaid, audible, aerial vibrations.

41. In an electrical music-generating system, the method of producing a plurality of composite notes simultaneously, which consists in, (*a*) producing electrical vibrations, corresponding to the ground-tones of a plurality of notes, in different circuits simultaneously; (*b*) producing, also simultaneously, in other circuits, electrical vibrations corresponding to over-tones of said notes; (*c*) producing, by means of said ground-tone vibrations and over-tone vibrations, resultant electrical vibrations in a vibration-combining circuit; (*d*) producing, also, at the same time, in other circuits, electrical vibrations corresponding to ground-tones of one or more other notes; (*e*) producing, also simultaneously, in still other circuits, electrical vibrations corresponding to over-tones of the ground-tones last mentioned; (*f*) producing, by means of the last-mentioned ground-tone vibrations and over-tone vibrations, composite electrical vibrations, of the timbre desired, in another vibration-combining circuit; (*g*) producing, by means of the composite electrical vibrations in the vibration combining circuits above mentioned, more highly composite electrical vibrations in a conductor; and (*h*) producing, by means of the electrical vibrations aforesaid, audible, aerial vibrations 42. In an electrical-music-generating system, the method of producing electrical vibrations, corresponding to a plurality of composite notes, simultaneously, which consists in, (*a*) producing electrical vibrations corresponding to the ground-tones of a plurality of notes, in different circuits simultaneously; (*b*) producing, also simultaneously, in other circuits, electrical vibrations corresponding to over-tones of said notes; (*c*) producing, by means of said ground-tone vibrations and over-tone vibrations, resultant electrical vibrations in a vibration-combining circuit; (*d*) producing, also, at the same time, in other circuits, electrical vibrations corresponding to ground-tones of one or more other notes; (*e*) producing, also simultaneously, in still other circuits, electrical vibrations corresponding to over-tones of the ground-tones last mentioned; (*f*) producing, by means of the last-mentioned ground-tone vibrations and over-tone vibrations, composite electrical vibrations of the timbre desired in another vibration-combining circuit; and (*g*) producing more highly composite electrical vibrations by transferring vibrations inductively from the vibration-combining circuits above-mentioned to another vibration-combining circuit.

43. In an electrical music-generating system, the method of producing a plurality of composite notes simultaneously, which consists in, (*a*) producing electrical vibrations, corresponding to the ground-tones of a plurality of notes, in different circuits simultaneously; (*b*) producing, also simultaneously, in other circuits, electrical vibrations corresponding to over-tones of said notes; (*c*) producing, by means of said ground-tone vibrations and over-tone vibrations, resultant electrical vibrations in a vibration-combining circuit; (*d*) producing, also at the same time, in other circuits, electrical vibrations corresponding to ground-tones of one or more other notes; (*e*) producing, also simultaneously, in still other circuits, electrical vibrations corresponding to over-tones of the ground-tones last mentioned; (*f*) producing, by means of the last mentioned ground-tone vibrations and over-tone vibrations, composite electrical vibrations of the timbre desired in another vibration-combining circuit; (*g*) producing more highly composite electrical vibrations, by transferring vibrations inductively from the vibration-combining circuits above-mentioned to another vibration-combining circuit; and (*h*) producing, by means of the vibrations last mentioned, audible aerial vibrations.

44. In an electrical music-generating system, the method of producing electrical vibrations corresponding in wave shape to tones of one timbre for one keyboard and to tones of a different timbre simultaneously for a different keyboard, hereinbefore described, which consists in producing a plurality of series of electrical vibrations having harmonically-related frequencies simultaneously and in using one combination of the said simple or relatively-simple electrical vibrations for one keyboard and in synthesizing from the same, composite electrical vibrations corresponding in wave shape to tones of one timbre, and in using a different combination of simple or relatively-simple electrical vibrations for a different keyboard and in synthesizing from said last mentioned relatively-simple electrical vibrations, composite electrical vibrations corresponding in wave shape to tones of a different timbre.

45. The method of producing tones of different timbres corresponding to different keyboards, simultaneously, which consists in producing a plurality of series of electrical vibrations having harmonically-related frequencies simultaneously and in using one combination of the said simple or relatively-simple electrical vibrations for one keyboard and in synthesizing from the same, composite electrical vibrations corresponding in wave shape to tones of one timbre, and in using a different combination of simple or relatively-simple electrical vibrations for a different keyboard and in synthesizing from said last mentioned relatively-simple electrical vibrations, composite electrical vibrations corresponding in wave shape to tones of a different timbre; and in producing audible aerial vibrations by means of the composite electrical vibrations aforesaid.

46. The method of producing tones of different timbres corresponding to different keyboards, simultaneously, which consists in producing a plurality of series of electrical vibrations having harmonically-related frequencies simultaneously and in using one combination of the same simple or relatively-simple electrical vibrations for one keyboard and in synthesizing from the same, composite electrical vibrations corresponding in wave-shape to tones of one timbre, and in using a different combination of simple or relatively-simple electrical vibrations for a different keyboard and in synthesizing from said last-mentioned relatively-simple electrical vibrations, composite electrical vibrations corresponding in wave-shape to tones of a different timbre; and in synthesizing by means of the composite electrical vibrations aforesaid, which serve for different keyboards respectively, electrical vibrations of still greater complexity; and in translating the complex electrical vibrations thus produced into audible aerial vibrations.

47. In an electrical music-generating system, the method of producing composite electrical vibrations, corresponding in wave shape to tones of different timbres from one and the same set of vibration-generating devices, as hereinbefore described, which consists in producing by means of said set of vibration-generating devices, a plurality of series of electrical vibrations, having harmonically-related frequencies, simultaneously, and in using one combination of said simple or relatively-simple electrical vibrations for one keyboard and in synthesizing from the same, composite electrical vibrations corresponding in wave shape to tones of one timbre, and in using a different combination of simple or relatively-simple electrical vibrations produced by the same set of vibration-generating devices aforesaid, for a different keyboard and in synthesizing from said last mentioned relatively-simple electrical vibrations, composite electrical vibrations corresponding in wave shape to tones of a different timbre.

48. In an electrical music-generating system, the method of producing tones of different timbres simultaneously, from one and the same set of vibration-generating devices, as hereinbefore described, which consists in producing by means of said set of vibration-generating devices, a plurality of series of electrical vibrations, having harmonically-related frequencies, simultaneously, and in using one combination of said simple or relatively-simple electrical vibrations for one keyboard and in synthesizing from the same, composite electrical vibrations corresponding in wave-shape, to tones of one timbre, and in using a different combination of simple or relatively-simple electrical vibrations produced by the same set of vibration-generating devices aforesaid, for a different keyboard and in synthesizing from said last mentioned relatively-simple electrical vibrations, composite electrical vibrations corresponding in wave shape to tones of a different timbre; and in producing audible aerial vibrations by means of the composite electrical vibrations aforesaid.

49. In an electrical music-generating system, the method of producing tones of different timbres simultaneously, from one and the same set of vibration-generating devices, as hereinbefore described, which consists in producing by means of said set of vibration-generating devices, a plurality of series of electrical vibrations, having harmonically-related frequencies, simultaneously, and in using one combination of said simple or relatively-simple electrical vibrations for one keyboard and in synthesizing from the same, composite electrical vibrations corresponding in wave shape, to tones of one timbre, and in using a different combination of simple or relatively-simple electrical vibrations produced by the same set of vibration-generating devices aforesaid, for a different keyboard and in synthesizing from said last mentioned relatively-simple electrical vibrations, composite electrical vibrations corresponding in wave shape to tones of a different timbre; and in synthesizing by means of the composite electrical vibrations aforesaid, which serve for different keyboards respectively, electrical vibrations of still greater complexity; and in translating the complex electrical vibrations thus produced into audible aerial vibrations.

50. An electrical music-generating apparatus including, in combination, (a) a plurality of independently-controllable switchboards; (b) circuits, belonging to said switchboards respectively; a set of circuits for each switchboard; (c) means, whereby musical electrical vibrations of the requisite frequencies are supplied to the circuits of the several switchboards aforesaid; and (d) vibration-translating apparatus, whereby electrical vibrations are translated into audible aerial vibrations.

51. An electrical music-generating apparatus including, in combination, (a) a plurality of independently-controllable switchboards; (b) circuits, belonging to said switchboards respectively; a set of circuits for each switchboard; (c) means, whereby musical electrical vibrations of the requisite frequencies are supplied to the circuits of the several switchboards aforesaid; and (d) a telephonic receiver, supplied with electrical vibrations from a plurality of the switchboards aforesaid and serving to translate the electrical vibrations thus received into audible aerial vibrations.

52. An electrical music-generating apparatus, including, in combination, (a) a plurality of independently-controllable switchboards; (b) circuits, belonging to said switchboards respectively; a set of circuits for each switchboard; (c) means, whereby musical electrical vibrations of the requisite frequencies are supplied to the circuits of the several switchboards aforesaid; and (d) vibration-translating apparatus, for translating electrical vibrations into audible aerial vibrations, and to which electrical vibrations are propagated from the circuits belonging to the switchboards aforesaid; the whole being constructed, arranged and operating in such a manner that a greater intensity is given to the vibrations propagated to the vibration-translating apparatus aforesaid, from the circuits of one switchboard and a less intensity to the vibrations propagated to said vibration-translating apparatus from the circuits of another of the switchboards aforesaid.

53. An electrical music-generating apparatus, including, in combination, (a) a plurality of independently-controllable switchboards; (b) circuits, belonging to said switchboards respectively; a set of circuits for each switchboard; (c) means, whereby musical electrical vibrations of the requisite frequencies are supplied to the circuits of the several switchboards aforesaid; and (d) vibration-translating apparatus, for translating electrical vibrations into audible aerial vibrations, and to which electrical vibrations are propagated from the circuits belonging to the switchboards aforesaid; said switchboards and the parts connected with them being constructed, arranged and operating in such a manner that the electrical vibrations propagated to the vibration-translating apparatus aforesaid, from one of the switchboards aforesaid, produce sounds of one timbre, while the vibrations propagated to said vibration-translating apparatus from another of the switchboards aforesaid, produce tones of a different timbre.

54. An electrical music-generating apparatus, including, in combination, (a) a plurality of independently-controllable switchboards; (b) circuits, belonging to said switchboards respectively; a set of circuits for each switchboard; (c) means, whereby musical electrical vibrations of the requisite frequencies are supplied to the circuits of the several switchboards aforesaid; and (d) a telephonic receiver, to which electrical vibrations are propagated from two or more of the switchboards aforesaid; the whole being constructed, arranged and operating in such a manner that a greater intensity is given to the vibrations propagated to the vibration-translating apparatus aforesaid, from the circuits of one switchboard and a less intensity to the vibrations propagated to said vibration-translating apparatus from the circuits of another of the switchboards aforesaid.

55. An electrical music-generating apparatus, including, in combination, (a) a plurality of independently-controllable switchboards; (b) circuits, belonging to said switchboards respectively; a set of circuits for each switchboard; (c) means, whereby musical electrical vibrations of the requisite frequencies are supplied to the circuits of the several switchboards aforesaid; and (d) a telephonic receiver, to which electrical vibrations are propagated from two or more of the switchboards aforesaid; said switchboards and the parts connected with them being constructed, arranged and operating in such a manner that the electrical vibrations propagated to the receiver aforesaid, from one of the switchboards aforesaid, produce sounds of one timbre, while the vibrations propagated to said receiver from another of the switchboards aforesaid, produce tones of a different timbre.

56. An electrical music-generating apparatus, including, in combination, (a) a plurality of independently-controllable switchboards; (b) circuits, belonging to said switchboards respectively; a set of circuits for each switchboard; and (c) vibration-generating devices, having frequencies corresponding to the notes of a musical scale through one or more octaves; said devices each serving to supply electrical vibrations of the same unison frequency to the appropriate circuit in each of the switchboards aforesaid.

57. An electrical music-generating apparatus, including, in combination, (a) a plurality of independently-controllable switchboards; (b) circuits, belonging to said switchboards respectively; a set of circuits for each switchboard; (c) vibration-generating devices, having frequencies corresponding to the notes of a musical scale through one or more octaves; said devices each serving to supply electrical vibrations of the same unison frequency to the appropriate circuit in each of the switchboards aforesaid; and (d) vibration-translating apparatus, for translating electrical vibrations into audible aerial vibrations.

58. An electrical music-generating apparatus, including, in combination, (a) a plurality of independently-controllable switchboards; (b) circuits, belonging to said switchboards respectively; a set of circuits for each switchboard; (c) vibration-generating devices, having frequencies corresponding to the notes of a musical scale through one or more octaves; said devices each serving to supply electrical vibrations of the same unison frequency to the appropriate circuit in each of the switchboards aforesaid; and (d) a telephonic receiver, to which electrical vibrations are supplied from a plurality of the switchboards aforesaid and whereby said electrical vibrations are translated into audible aerial vibrations.

59. An electrical music-generating apparatus, including, in combination, (a) a plurality of independently-controllable switchboards; (b) circuits, belonging to said switchboards respectively; a set of circuits for each switchboard; (c) vibration-generating devices, having frequencies corresponding to the notes of a musical scale through one or more octaves; said devices each serving to supply electrical vibrations of the same unison frequency to the appropriate circuit in each of the switchboards aforesaid; and (d) vibration-translating apparatus, for translating electrical vibrations into audible aerial vibrations, and to which electrical vibrations are propagated from the circuits belonging to the switchboards aforesaid; the whole being constructed, arranged and operating in such a manner that a greater intensity is given to the vibrations propagated to the vibration-translating apparatus aforesaid, from the circuits of one switchboard and a less intensity to the vibrations propagated to said vibration-translating apparatus from the circuits of another of the switchboards aforesaid.

60. An electrical music-generating apparatus, including, in combination, (a) a plurality of independently-controllable switchboards; (b) circuits, belonging to said switchboards respectively; a set of circuits for each switchboard; (c) vibration-generating devices, having frequencies corresponding to the notes of a musical scale through one or more octaves; said devices each serving to supply electrical vibrations of the same unison frequency to the circuits corresponding to such device in each of the switchboards aforesaid; and (d) vibration-translating apparatus, for translating electrical vibrations into audible aerial vibrations, and to which electrical vibrations are propagated from the circuits belonging to the switchboards aforesaid; said switchboards and the parts connected with them being constructed, arranged and operating in such a manner that the electrical vibrations propagated to the vibration-translating apparatus aforesaid, from one of the switchboards aforesaid, produce sounds of one timbre, while the vibrations propagated to said vibration-translating apparatus from another of the switchboards aforesaid, produce tones of a different timbre.

61. An electrical music-generating apparatus, including, in combination, (a) a plurality of independently-controllable switchboards; (b) circuits, belonging to said switchboards respectively; a set of circuits for each switchboard; (c) vibration-generating devices, having frequencies corresponding to the notes of a musical scale through one or more octaves; said devices each serving to supply electrical vibrations of the same unison frequency to the circuits corresponding to such device in each of the switchboards aforesaid; and (d) a telephonic receiver, to which electrical vibrations are propagated from two or more of the switchboards aforesaid; said switchboards and the parts connected with them being constructed, arranged and operating in such a manner that the electrical vibrations propagated to the receiver aforesaid, produce sounds of one timbre, while the vibrations propagated to said receiver from another of the switchboards aforesaid, produce tones of a different timbre.

62. In an electrical music-generating apparatus, the combination of (a) a plurality of switchboards; (b) circuits, connected with each of said switchboards; (c) means, whereby electrical vibrations, having frequencies corresponding to the notes of a musical scale are produced in the circuits of each of the switchboards aforesaid; (d) a line, to which electrical vibrations are propagated from circuits belonging to a plurality of switchboards aforesaid; and (e) vibration-translating apparatus, supplied with electrical vibrations from said line and serving to translate electrical vibrations into audible aerial vibrations.

63. In an electrical music-generating apparatus, the combination of (a) a plurality of switchboards; (b) circuits, connected with each of said switchboards; (c) means, whereby electrical vibrations having frequencies corresponding to the notes of a musical scale, are produced in the circuits of each of the switchboards aforesaid; (*d*) a line, to which electrical vibrations are propagated from circuits belonging to a plurality of the switchboards aforesaid; and (*e*) vibration-translating apparatus, supplied with electrical vibrations from said line and serving to translate electrical vibrations into audible aerial vibrations, the whole being constructed, arranged and operating in such a manner that a greater intensity is given, when required, to the vibrations propagated to the vibration-translating apparatus from the circuits of one of the switchboards aforesaid and a less intensity to the vibrations propagated to the vibration-translating apparatus from the circuits of another of the switchboards aforesaid.

64. In an electrical music-generating apparatus, the combination of (*a*) a plurality of switchboards; (*b*) circuits, connected with each of said switchboards; (*c*) means whereby electrical vibrations, having frequencies corresponding to the notes of a musical scale are produced in circuits of each of the switchboards aforesaid; (*d*) a line, to which electrical vibrations are propagated from circuits belonging to a plurality of the switchboards aforesaid; and (*e*) vibration-translating apparatus, supplied with electrical vibrations from said line and serving to translate electrical vibrations into audible aerial vibrations; said switchboards and the parts connected with them being constructed, arranged and operating in such a manner that the electrical vibrations propagated to the vibration-translating apparatus from one of the switchboards aforesaid produce sounds of one timbre, while those propagated to the vibration-translating apparatus from another of the switchboards aforesaid, produce tones of a different timbre, when required.

65. In an electrical music-generating apparatus, the combination of (*a*) a plurality of switchboards; (*b*) circuits, connected with each of said switchboards; (*c*) means, whereby electrical vibrations, having frequencies corresponding to the notes of a musical scale, are produced in circuits of each of the switchboards aforesaid; (*d*) a line, to which electrical vibrations are propagated from circuits belonging to a plurality of the switchboards aforesaid; (*e*) vibration-translating apparatus, supplied with electrical vibrations from said line and serving to translate electrical vibrations into audible aerial vibrations; and (*f*) an intensity-regulating device for one of the switchboards aforesaid, whereby the intensity of the vibrations propagated to the line aforesaid from the circuits connected with such keyboard, may be varied more or less as desired.

66. In an electrical music-generating apparatus, the combination of (*a*) a plurality of switchboards; (*b*) circuits, connected with each of said switchboards; (*c*) means, whereby electrical vibrations, having frequencies corresponding to the notes of a musical scale are produced in circuits of each of the switchboards aforesaid; (*d*) a line, to which electrical vibrations are propagated from circuits belonging to a plurality of the switchboards aforesaid; (*e*) vibration-translating apparatus, supplied with electrical vibrations from said line and serving to translate electrical vibrations into audible aerial vibrations; and (*f*) independently-acting intensity-regulating devices for a plurality of the switchboards aforesaid, whereby the intensities of the vibrations propagated to the line aforesaid, from said switchboards, can be varied, one switchboard independently of another, as required.

67. In an electrical music-generating apparatus, the combination of (*a*) a plurality of switchboards; (*b*) circuits, connected with each of said switchboards; (*c*) means, whereby electrical vibrations, having frequencies corresponding to the notes of a musical scale are produced in circuits of each of the switchboards aforesaid; (*d*) a line, to which electrical vibrations are propagated from circuits belonging to a plurality of the switchboards aforesaid; (*e*) vibration-translating apparatus, supplied with electrical vibrations from said line and serving to translate electrical vibrations into audible aerial vibrations; and (*f*) timbre-controlling devices for one or more of the switchboards aforesaid, whereby the timbre of the tones produced in the vibration-translating apparatus, aforesaid, by the vibrations propagated thereto from the circuits connected with such switchboard can be altered from time to time.

68. In an electrical music-generating apparatus, the combination of (*a*) a plurality of switchboards; (*b*) circuits, connected with each of said switchboards; (*c*) means, whereby electrical vibrations, having frequencies corresponding to the notes of a musical scale are produced in circuits of each of the switchboards aforesaid; (*d*) a line, to which electrical vibrations are propagated from circuits belonging to a plurality of the switchboards aforesaid; (*e*) vibration-translating apparatus, supplied with electrical vibrations from said line and serving to translate electrical vibrations into audible aerial vibrations; and (*f*) independently-acting timbre-controlling devices for a plurality of the switchboards aforesaid, whereby the timbre of the tones produced in the vibration-translating apparatus aforesaid, by the vibrations propagated thereto from the circuits of such switchboard, can be altered from time to time, one switchboard independently of another.

69. In an electrical music-generating apparatus, the combination of (a) a plurality of switchboards; (b) circuits, connected with each of said switchboards; (c) means, whereby electrical vibrations, having frequencies corresponding to the notes of a musical scale are produced in circuits of each of the switchboards aforesaid; (d) a line, to which electrical vibrations are propagated from circuits belonging to a plurality of the switchboards aforesaid; (e) vibration-translating apparatus, fed with electrical vibrations from said line and serving to translate electrical vibrations into audible aerial vibrations; (f) an intensity-regulating device, for one of the switchboards aforesaid, whereby the intensity of the vibrations propagated to the line aforesaid, from the circuits connected with such switchboard, may be varied more or less as desired; and (g) timbre - controlling devices, for one or more of the switchboards aforesaid, whereby the timbre of the tones produced in the vibration-translating apparatus, aforesaid, by the vibrations propagated thereto from the circuits connected with such switchboard can be altered from time to time.

70. In an electrical music-generating apparatus, the combination of (a) a plurality of switchboards; (b) circuits, connected with each of said switchboards; (c) means, whereby electrical vibrations, having frequencies corresponding to the notes of a musical scale are produced in circuits of each of the switchboards aforesaid; (d) a line, to which electrical vibrations are propagated from circuits belonging to a plurality of the switchboards aforesaid; (e) vibration-translating apparatus, supplied with electrical vibrations from said line and serving to translate electrical vibrations into audible aerial vibrations; (f) independently-acting intensity-regulating devices for a plurality of the switchboards aforesaid, whereby the intensities of the vibrations propagated to the line aforesaid, from said switchboards, can be varied, one switchboard independently of another, as required; and (g) timbre-controlling devices, for one or more of the switchboards aforesaid, whereby the timbre of the tones produced in the vibration-translating apparatus aforesaid, by the vibrations propagated thereto from the circuits connected with such switchboard can be altered from time to time.

71. An electrical music-generating apparatus, including, in combination, (a) a plurality of independently-controllable switchboards; (b) circuits, belonging to said switchboards respectively, a set of circuits for each switchboard; and (c) alternators, whereby the requisite electrical vibrations are supplied to the various circuits aforesaid.

72. An electrical music-generating apparatus, including, in combination, (a) a plurality of independently-controllable switchboards; (b) circuits belonging to said switchboards respectively; a set of circuits for each switchboard; (c) alternators, whereby the requisite electrical vibrations are supplied to the various circuits aforesaid; (d) shafts, on which the rotary members of said alternators are mounted; and (e) gearing, connecting said shafts, whereby each alternator is made to rotate with the requisite angular velocity and accurate tuning secured for the notes of both switchboards.

73. In an electrical music-generating system, the combination of (a) a plurality of switchboards; (b) circuits, belonging to said switchboards respectively, a set of circuits for each switchboard; (c) alternators, for supplying the requisite electrical vibrations to the circuits of the switchboards aforesaid and whereby electrical vibrations of the same unison frequencies are supplied to corresponding circuits in the several switchboards aforesaid; and (d) vibration - translating apparatus, for translating electrical vibrations into audible aerial vibrations, supplied with electrical vibrations from a plurality of the switchboards aforesaid; the whole being constructed, arranged and operating in such a manner that a greater intensity may be given, when required, to the vibrations propagated to the vibration-translating apparatus aforesaid, from the circuits of one switchboard and a less intensity to the vibrations propagated to said vibration-translating apparatus from the circuits of another of the switchboards aforesaid.

74. In an electrical music-generating system, the combination of (a) a plurality of switchboards; (b) circuits, belonging to said switchboards respectively, a set of circuits for each switchboard; (c) alternators, for supplying the requisite electrical vibrations to the circuits of the switchboards aforesaid and whereby electrical vibrations of the same unison frequencies are supplied to corresponding circuits in the several switchboards aforesaid; and (d) vibration-translating apparatus, for translating electrical vibrations into audible aerial vibrations, supplied with electrical vibrations from a plurality of the switchboards aforesaid; said switchboards and the parts connected with them being constructed, arranged and operating in such a manner that the electrical vibrations propagated to the vibration-translating apparatus aforesaid, from one of the switchboards aforesaid, produce sounds of one timbre, while the vibrations propagated to said vibration-translating apparatus from another of the switchboards aforesaid, produce, when required, tones of a different timbre.

75. An electrical music-generating apparatus, including, in combination, (a) a plurality of independently-controllable switchboards; (b) circuits, belonging to said switchboards respectively, a set of circuits for each switchboard; (c) alternators, whereby the requisite electrical vibrations are supplied to the circuits of the several switchboards aforesaid; and (d) a telephonic receiver, supplied with electrical vibrations from a plurality of the switchboards aforesaid and serving to translate the electrical vibrations thus received into audible aerial vibrations.

76. In an electrical music-generating apparatus, the combination of (a) alternators, having vibration frequencies corresponding to the notes of a musical scale, through one or more octaves; (b) vibration-translating apparatus, whereby electrical vibrations are translated into audible vibrations; and (c) a plurality of independently-acting switchboards, intermediate the alternators aforesaid and the vibration-translating apparatus aforesaid; each switchboard controlling the action of the alternators aforesaid on the vibration-translating apparatus aforesaid.

77. An electrical music-generating apparatus, including, in combination, (a) a plurality of independently-controllable switchboards; (b) circuits, belonging to said switchboards respectively; and (c) a single set of alternators for supplying vibrations to two or more of the switchboards aforesaid; a plurality of said alternators serving each to supply electrical vibrations of the same frequency to one or more circuits in each of the two switchboards aforesaid.

78. An electrical music-generating apparatus, including, in combination, (a) a plurality of independently-controllable switchboards; (b) circuits, belonging to said switchboards respectively; (c) a single set of alternators for supplying vibrations to two or more of the switchboards aforesaid; a plurality of said alternators serving each to supply electrical vibrations of the same frequency to one or more circuits in each of the two switchboards aforesaid; and (d) vibration-translating apparatus, whereby electrical vibrations are translated into audible aerial vibrations.

79. An electrical music-generating apparatus, including, in combination, (a) a plurality of independently-controllable switchboards; (b) circuits, belonging to said switchboards respectively; a set of circuits for each switchboard; (c) a single set of alternators, whereby the requisite electrical vibrations are supplied to the circuits of the several switchboards aforesaid; and (d) vibration-translating apparatus, whereby electrical vibrations are translated into audible aerial vibrations, and to which electrical vibrations are propagated from the circuits belonging to the switchboards aforesaid; the whole being constructed, arranged and operating in such a manner that greater intensity is given, when required, to the vibrations propagated to the vibration-translating apparatus aforesaid, from the circuits of one switchboard and less intensity to the vibrations propagated to said vibration-translating apparatus from the circuits of another of the switchboards aforesaid.

80. An electrical music-generating apparatus, including, in combination (a) a plurality of independently-controllable switchboards; (b) circuits, belonging to said switchboards respectively; (c) a single set of alternators, whereby the requisite electrical vibrations are supplied to the circuits of the several switchboards aforesaid; and (d) vibration-translating apparatus, whereby electrical vibrations are translated into audible aerial vibrations, and to which electrical vibrations are propagated from the circuits belonging to the switchboards aforesaid; said switchboards and the parts connected with them being constructed, arranged and operating in such a manner that the electrical vibrations propagated to the vibration-translating apparatus aforesaid, from one of the switchboards aforesaid, produce sounds of one timbre, while the vibrations propagated to said vibration-translating apparatus from another of the switchboards aforesaid, produce tones of a different timbre, when required.

81. An electrical music-generating apparatus, including, in combination, (a) a plurality of independently-controllable switchboards; (b) circuits, belonging to said switchboards respectively; (c) alternators, whereby the requisite electrical vibrations are supplied to the various circuits aforesaid; (d) shafts, on which the rotary members of said alternators are mounted; and (e) toothed-gearing, connecting said shafts, so that they rotate without slip with the relative angular velocities required.

82. An electrical music-generating apparatus, including, in combination (a) a plurality of independently-controllable switchboards; (b) circuits, belonging to said switchboards respectively; (c) alternators, whereby the requisite electrical vibrations are supplied to the various circuits aforesaid; (d) shafts, on which the rotary members of said alternators are mounted; and (e) toothed-gearing, connecting said shafts, so that they rotate without slip, with the relative angular velocities required; and (f) vibration-translating apparatus, whereby electrical vibrations are translated into audible aerial vibrations.

83. An electrical music-generating apparatus, including, in combination, (a) a plurality of switchboards; (b) circuits, belonging to said switchboards respectively; (c) a single set of alternators, whereby the requisite electrical vibrations are supplied to the circuits of the several switchboards aforesaid; (d) shafts, on which the rotary members of said alternators are mounted; and (e) toothed-gearing, connecting said shafts, so that they rotate without slip, with the relative angular velocities required.

84. An electrical music-generating apparatus, including, in combination, (a) a plurality of switchboards; (b) circuits, belonging to said switchboards respectively; (c) a single set of alternators, whereby the requisite electrical vibrations are supplied to the circuits of the several switchboards aforesaid; (d) shafts, on which the rotary members of said alternators are mounted; and (e) toothed-gearing, connecting said shafts, so that they rotate without slip, with the relative angular velocities required; and (f) vibration-translating apparatus, whereby electrical vibrations are translated into audible aerial vibrations.

85. An electrical music-generating system, including, in combination, (A) a central-station plant for producing music in the form of electrical vibrations; (B) vibration-translating devices, located on different premises, more or less remote from said central station, and serving to translate electrical vibrations into audible aerial vibrations; the central-station plant aforesaid, including; (a) vibration-generating devices, for producing the requisite electrical vibrations; (b) lines or mains, for propagating electrical vibrations from the central-station to the subscribers' premises; and (c) a plurality of switchboards, electrically intermediate the vibration-generating devices aforesaid and the lines or mains aforesaid; whereby the different vibration-generating devices are brought into action upon the vibration-translating apparatus, as required.

86. An electrical music-generating system, including, in combination, (A) a central-station plant for producing music in the form of electrical vibrations; (B) vibration-translating devices, located on different premises, more or less remote from said central station, and serving to translate electrical vibrations into audible aerial vibrations; the central-station plant aforesaid, including: (a) alternators, for producing the requisite electrical vibrations; (b) lines or mains, for propagating electrical vibrations from the central station to the subscribers' premises; and (c) a plurality of switchboards electrically intermediate the alternators aforesaid and the lines or mains aforesaid; whereby the different alternators aforesaid are brought into action upon the vibration-translating apparatus aforesaid, as required, 87. An electrical music-generating system, including, in combination, (A) a central-station plant for producing music in the form of electrical vibrations; (B) vibration-translating devices, located on different premises, more or less remote from said central station, and serving to translate electrical vibrations into audible aerial vibrations; the central-station plant aforesaid, including: (a) alternators, for producing the requisite electrical vibrations; said alternators having rotary members; (b) shafts, on which the rotary members of said alternators are mounted; (c) toothed-gearing, connecting said shafts, so that they rotate with slip, with the relative angular velocities required; (d) lines or mains for propagating electrical vibrations from the central station to the subscribers' premises; and (e) a plurality of switchboards, electrically intermediate the alternators aforesaid, and the lines or mains aforesaid; whereby the different alternators aforesaid are brought into action upon the vibration-translating apparatus, aforesaid, as required.

88. The combination in an electrical music-generating apparatus of (a) alternators, for producing electrical vibrations having frequencies corresponding to the notes of a musical scale; (b) vibration-translating devices, whereby electrical vibrations are translated into audible aerial vibrations; (c) a plurality of independently-acting keyboards; and (d) means, controlled by the keys of said keyboards, whereby the alternators aforesaid are made to act on the vibration-translating apparatus aforesaid, as required.

89. The combination in an electrical music-generating apparatus of (a) alternators, for producing electrical vibrations having frequencies corresponding to the notes of a musical scale; (b) vibration-translating devices, whereby electrical vibrations are translated into audible aerial vibrations; (c) a plurality of keyboards; and (d) means, controlled by the keys of said keyboards, whereby the alternators aforesaid are made to act on the vibration-translating apparatus aforesaid, as required; the whole apparatus being constructed, arranged and operating in such a manner that the electrically-produced tones, controlled by one keyboard, may be made to be of one timbre or of one degree of loudness, while the electrically-produced tones, controlled by another keyboard, are of a distinctly different timbre or of a distinctly different degree of loudness.

90. The combination in an electrical music-generating apparatus of (a) alternators, for producing electrical vibrations having frequencies corresponding to the notes of a musical scale; (b) vibration-translating devices, whereby electrical vibrations are translated into audible aerial vibrations; (c) a plurality of keyboards; (d) means, controlled by the keys of said keyboards, whereby the alternators aforesaid are made to act on the vibration-translating apparatus aforesaid, as required; and (e) timbre-changing mechanism, for one or more of the keyboards aforesaid, whereby the timbre of notes belonging to such keyboard can be altered from time to time, as required.

91. The combination in an electrical music-generating apparatus of (a) alternators, for producing electrical vibrations having frequencies corresponding to the notes of a musical scale; (b) vibration-translating devices, whereby electrical vibrations are translated into audible aerial vibrations; (c) a plurality of keyboards; (d) means, controlled by the keys of said keyboards, whereby the alternators aforesaid are made to act on the vibration-translating apparatus aforesaid, as required; and (e) an intensity-regulating device for one or more of the keyboards aforesaid; whereby the loudness of the electrically-produced sounds corresponding to and controlled by such keyboard, can be increased or decreased as required.

92. The combination in an electrical music-generating apparatus of (a) a plurality of independently-acting keyboards; (b) circuits for each keyboard, belonging to and controlled by that keyboard; (c) alternators, for producing the requisite electrical vibrations in the circuits aforesaid; (d) one or more vibration-translating devices, whereby electrical vibrations are translated into audible aerial vibrations; and (e) switches, controlled by the keys of the keyboards aforesaid, and acting to bring the circuits aforesaid into action on the vibration-translating apparatus aforesaid, as required.

93. The combination in an electrical music-generating apparatus of (a) a plurality of keyboards; (b) circuits for each keyboard, belonging to and controlled by that keyboard; (c) alternators, for producing the requisite electrical vibrations in the circuits aforesaid; (d) one or more vibration-translating devices, whereby electrical vibrations are translated into audible aerial vibrations; and (e) switches, controlled by the keys of the keyboards aforesaid, and acting to bring the circuits aforesaid into action on the vibration-translating apparatus aforesaid, as required; the whole apparatus being constructed and arranged and operating in such a manner that the electrically-produced tones, controlled by one keyboard, may be made to be of one timbre, and of one degree of loudness, while the electrically-produced tones, controlled by a different keyboard, are of a distinctly different timbre or of a distinctly different degree of loudness, substantially as hereinbefore described.

94. The combination in an electrical music-generating apparatus of (a) a plurality of keyboards; (b) circuits for each keyboard, belonging to and controlled by that keyboard; (c) alternators, for producing the requisite electrical vibrations in the circuits aforesaid; (d) one or more vibration-translating devices, whereby electrical vibrations are translated into audible aerial vibrations; (e) switches, controlled by the keys of the keyboards aforesaid, and acting to bring the circuits aforesaid into action on the vibration-translating apparatus aforesaid, as required; and (f) means, whereby the timbre of the notes belonging to a keyboard may be altered from time to time, according to the musical effect required.

95. The combination in an electrical music-generating apparatus of (a) a plurality of keyboards; (b) circuits for each keyboard, belonging to and controlled by that keyboard; (c) alternators, for producing the requisite electrical vibrations in the circuits aforesaid; (d) one or more vibration-translating devices, whereby electrical vibrations are translated into audible aerial vibrations; (e) switches, controlled by the keys of the keyboards aforesaid, and acting to bring the circuits aforesaid into action on the vibration-translating apparatus aforesaid, as required; and (f) an intensity-regulating device, for one or more of the keyboards aforesaid, whereby the loudness of the electrically-produced sounds, corresponding to and controlled by such keyboard, can be increased or decreased from time to time, as required.

96. The combination in an electrical music-generating apparatus of (a) a plurality of independently-acting keyboards; (b) circuits for each keyboard, belonging to and controlled by that keyboard; (c) alternators, for producing the requisite electrical vibrations in the circuits aforesaid; said alternators having rotary members; (d) shafts, on which the rotary members of said alternators are mounted; (e) toothed-gearing, connecting said shafts, so that they rotate without slip with the relative angular velocities required; (f) one or more vibration-translating devices, whereby electrical vibrations are translated into audible aerial vibrations; and (g) switches, controlled by the keys of the keyboards aforesaid, and acting to bring the circuits aforesaid into action on the vibration-translating apparatus aforesaid, as required.

97. The combination in an electrical music-generating apparatus of (a) a plurality of keyboards; (b) circuits for each keyboard, belonging to and controlled by that keyboard; (c) alternators, for producing the requisite electrical vibrations in the circuits aforesaid; said alternators having rotary members; (d) shafts, on which the rotary members of said alternators are mounted;

(e) toothed-gearing, connecting said shafts, so that they rotate without slip with the relative angular velocities required; (f) one or more vibration-translating devices, whereby electrical vibrations are translated into audible aerial vibrations; and (g) switches, controlled by the keys of the keyboards aforesaid, and acting to bring the circuits aforesaid into action on the vibration-translating apparatus aforesaid, as required; the whole apparatus being constructed and arranged and operating in such a manner that the electrically produced tones, controlled by one keyboard, may be made to be of one timbre, and of one degree of loudness, while the electrically-produced tones, controlled by a different keyboard, are of a distinctly different timbre or of a distinctly different degree of loudness, substantially as hereinbefore described.

98. The combination in an electrical music-generating apparatus of (a) a plurality of keyboards; (b) circuits for each keyboard, belonging to and controlled by that keyboard; (c) alternators, for producing the requisite electrical vibrations in the circuits aforesaid; said alternators having rotary members; (d) shafts, on which the rotary members of said alternators are mounted; (e) toothed-gearing, connecting said shafts, so that they rotate without slip with the relative angular velocities required; (f) one or more vibration-translating devices, whereby electrical vibrations are translated into audible aerial vibrations; (g) switches, controlled by the keys of the keyboards aforesaid, and acting to bring the circuits aforesaid into action on the vibration-translating apparatus aforesaid, as required; and (h) means, whereby the timbre of the notes belonging to a keyboard may be altered from time to time, according to the musical effect required.

99. The combination in an electrical music-generating apparatus of (a) a plurality of keyboards; (b) circuits for each keyboard, belonging to and controlled by that keyboard; (c) alternators, for producing the requisite electrical vibrations in the circuits aforesaid; said alternators having rotary members; (d) shafts, on which the rotary members of said alternators are mounted; (e) toothed-gearing, connecting said shafts, so that they rotate without slip with the relative angular velocities required; (f) one or more vibration-translating devices, whereby electrical vibrations are translated into audible aerial vibrations; (g) switches, controlled by the keys of the keyboards aforesaid, and acting to bring the circuits aforesaid into action on the vibration-translating apparatus aforesaid, as required; and (h) an intensity-regulating device, for one or more of the keyboards aforesaid, whereby the loudness of the electrically-produced sounds, corresponding to and controlled by such keyboard, can be increased or decreased from time to time, as required.

100. The combination in an electrical music-generating apparatus of (a) a plurality of independently-acting keyboards; (b) circuits, for each keyboard, belonging to and controlled by that keyboard; (c) a single set of alternators, common to two or more of the keyboards aforesaid, and serving to produce electrical vibrations of the requisite frequencies in the circuits of each such keyboard; (d) one or more vibration-translating devices, whereby electrical vibrations are translated into audible aerial vibrations; and (e) switches, controlled by the keys of the keyboards aforesaid, and acting to bring the circuits aforesaid into action on the vibration-translating apparatus aforesaid, as required.

101. The combination in an electrical music-generating apparatus of (a) a plurality of keyboards; (b) circuits, for each keyboard, belonging to and controlled by that keyboard; (c) a single set of alternators, common to two or more of the keyboards aforesaid, and serving to produce electrical vibrations of the requisite frequencies in the circuits of each such keyboard; (d) one or more vibration-translating devices, whereby electrical vibrations are translated into audible aerial vibrations; and (e) switches, controlled by the keys of the keyboards aforesaid, and acting to bring the circuits aforesaid into action on the vibration-translating apparatus aforesaid, as required; the whole apparatus being constructed and arranged and operating such a manner that the electrically-produced tones, controlled by one keyboard, may be made to be of one timbre, and of one degree of loudness, while the electrically-produced tones, controlled by a different keyboard, are of a distinctly different timbre or of a distinctly different degree of loudness, substantially as hereinbefore described.

102. The combination in an electrical music-generating apparatus of (a) a plurality of keyboards; (b) circuits for each keyboard, belonging to and controlled by that keyboard; (c) a single set of alternators, common to two or more of the keyboards aforesaid, and serving to produce electrical vibrations of the requisite frequencies in the circuits of each such keyboard; (d) one or more vibration-translating devices, whereby electrical vibrations are translated into audible aerial vibrations; (e) switches, controlled by the keys of the keyboards aforesaid, and acting to bring the circuits aforesaid into action on the vibration-translating apparatus aforesaid, as required; and (f) means, whereby the timbre of the notes belonging to a keyboard may be altered from time to time, according to the musical effect required.

103. The combination in an electrical music-generating apparatus of (a) a plurality of keyboards; (b) circuits for each keyboard, belonging to and controlled by that keyboard; (c) a single set of alternators, common to two or more of the keyboards aforesaid, and serving to produce electrical vibrations of the requisite frequencies in the circuits of each such keyboard; (d) one or more vibration-translating devices, whereby electrical vibrations are translated into audible aerial vibrations; (e) switches, controlled by the keys of the keyboards aforesaid, and acting to bring the circuits aforesaid into action on the vibration-translating apparatus aforesaid, as required; and (f) an intensity-regulating device, for one or more of the keyboards aforesaid, whereby the loudness of the electrically-produced sounds, corresponding to and controlled by such keyboard, can be increased or decreased from time to time, as required.

104. The combination in an electrical music-generating apparatus of (a) a keyboard; (b) circuits, belonging to and controlled by said keyboard; (c) switches, inserted in said circuits, said switches being controlled by the keys of the keyboard aforesaid; (d) another keyboard; (e) other circuits, belonging to and controlled by said second keyboard; (f) switches, inserted in the circuits last mentioned, said switches being controlled by the keys of the second keyboard; (g) alternators, whereby electrical vibrations of the requisite frequencies are produced in the circuits aforesaid; (h) a line, to which electrical vibrations are propagated from the circuits, controlled by the keys of the two keyboards aforesaid; and (i) one or more telephonic receivers, fed with vibrations from the line aforesaid.

105. The combination in an electrical music-generating apparatus of (a) a keyboard; (b) circuits, belonging to and controlled by said keyboard; (c) switches, inserted in said circuits, said switches being controlled by the keys of the keyboard aforesaid; (d) another keyboard; (e) other circuits, belonging to and controlled by said second keyboard; (f) switches, inserted in the circuits last mentioned, said switches being controlled by the keys of the second keyboard; (g) alternators, whereby electrical vibrations of the requisite frequencies are produced in the circuits aforesaid; (h) a line, to which electrical vibrations are propagated from the circuits, controlled by the keys of the two keyboards aforesaid; and (i) one or more telephonic receivers, fed with vibrations from the line aforesaid; the apparatus being constructed, arranged and operating in such a manner that the electrically-produced tones, controlled by one keyboard, are of one timbre and of one degree of loudness, while the electrically-produced tones controlled by the other keyboard, are of a different timbre or else of a different degree of loudness.

106. The combination in an electrical music-generating apparatus of (a) a keyboard; (b) circuits, belonging to and controlled by said keyboard; (c) switches, inserted in said circuits, said switches being controlled by the keys of the keyboard aforesaid; (d) another keyboard; (e) other circuits, belonging to and controlled by said second keyboard; (f) switches, inserted in the circuits last mentioned, said switches being controlled by the keys of the second keyboard; (g) alternators, whereby electrical vibrations of the requisite frequencies are produced in the circuits aforesaid; (h) a line, to which electrical vibrations are propagated from the circuits, controlled by the keys of the two keyboards aforesaid; (i) one or more telephonic receivers, fed with vibrations from the line aforesaid; and (k) means, whereby the timbre of the notes of a keyboard may be altered from time to time, according to the musical effect required.

107. The combination in an electrical music-generating apparatus of (a) a keyboard; (b) circuits, belonging to and controlled by said keyboard; (c) switches, inserted in said circuits, said switches being controlled by the keys of the keyboard aforesaid; (d) another keyboard; (e) other circuits, belonging to and controlled by said second keyboard; (f) switches, inserted in the circuits last mentioned, said switches being controlled by the keys of the second keyboard; (g) alternators, whereby electrical vibrations of the requisite frequencies are produced in the circuits aforesaid; (h) a line, to which electrical vibrations are propagated from the circuits, controlled by the keys of the two keyboards aforesaid; (i) one or more telephonic receivers, fed with vibrations from the line aforesaid; and (k) an intensity-regulating device, for one or more of the keyboards aforesaid, whereby the loudness of the electrically-produced tones, corresponding to and controlled by said keyboard, can be increased or decreased from time to time, as required.

108. The combination in an electrical music-generating apparatus of (a) a keyboard; (b) circuits, belonging to and controlled by said keyboard; (c) switches, inserted in said circuits, said switches being controlled by the keys of the keyboard aforesaid; (d) another keyboard; (e) other circuits, belonging to and controlled by said second keyboard; (f) switches, inserted in the circuits last mentioned, said switches being controlled by the keys of the second keyboard; (g) alternators, whereby electrical vibrations of the requisite frequencies are produced in the circuits aforesaid; said alternators having rotary members; (*h*) shafts, on which the rotary members of said alternators are mounted; (*i*) toothed-gearing, connecting said shafts, so that they rotate without slip with the relative angular velocities required; (*k*) a line, to which electrical vibrations are propagated from the circuits, controlled by the keys of the two keyboards aforesaid; and (*l*) one or more telephonic receivers, fed with vibrations from the line aforesaid.

109. The combination in an electrical music-generating apparatus of (*a*) a keyboard; (*b*) circuits, belonging to and controlled by said keyboard; (*c*) switches, inserted in said circuits, said switches being controlled by the keys of the keyboard aforesaid; (*d*) another keyboard; (*e*) other circuits, belonging to and controlled by said second keyboard; (*f*) switches, inserted in the circuits last mentioned, said switches being controlled by the keys of the second keyboard; (*g*) alternators, whereby electrical vibrations of the requisite frequencies are produced in the circuits aforesaid; said alternators having rotary members; (*h*) shafts, on which the rotary members of said alternators are mounted; (*i*) toothed-gearing, connecting said shafts, so that they rotate without slip with the relative angular velocities required; (*k*) a line, to which electrical vibrations are propagated from the circuits, controlled by the keys of the two keyboards aforesaid; and (*l*) one or more telephonic receivers, fed with vibrations from the line aforesaid; the apparatus being constructed, arranged and operating in such a manner that the electrically-produced tones, controlled by one keyboard, are of one timbre and of one degree of loudness, while the electrically-produced tones controlled by the other keyboard, are of a different timbre or else of a different degree of loudness.

110. The combination in an electrical music-generating apparatus of (*a*) a keyboard; (*b*) circuits, belonging to and controlled by said keyboard; (*c*) switches, inserted in said circuits, said switches being controlled by the keys of the keyboard aforesaid; (*d*) another keyboard; (*e*) other circuits, belonging to and controlled by said second keyboard; (*f*) switches, inserted in the circuits last mentioned, said switches being controlled by the keys of the second keyboard; (*g*) alternators, whereby electrical vibrations of the requisite frequencies are produced in the circuits aforesaid; said alternators having rotary members; (*h*) shafts, on which the rotary members of said alternators are mounted; (*i*) toothed-gearing connecting said shafts, so that they rotate without slip with the relative angular velocities required; (*k*) a line, to which electrical vibrations are propagated from the circuits, controlled by the keys of the two keyboards aforesaid; (*l*) one or more telephonic receivers, fed with vibrations from the line aforesaid; and (*m*) means, whereby the timbre of the notes of a keyboard may be altered from time to time, according to the musical effect required.

111. The combination in an electrical music-generating apparatus of (*a*) a keyboard; (*b*) circuits, belonging to and controlled by said keyboard; (*c*) switches, inserted in said circuits, said switches being controlled by the keys of the keyboard aforesaid; (*d*) another keyboard; (*e*) other circuits, belonging to and controlled by said second keyboard; (*f*) switches, inserted in the circuits last mentioned, said switches being controlled by the keys of the second keyboard; (*g*) alternators, whereby electrical vibrations of the requisite frequencies are produced in the circuits aforesaid; said alternators having rotary members; (*h*) shafts, on which the rotary members of said alternators are mounted; (*i*) toothed-gearing connecting said shafts, so that they rotate without slip with the relative angular velocities; (*k*) a line, to which electrical vibrations are propagated from the circuits, controlled by the keys of the two keyboards aforesaid; (*l*) one or more telephonic receivers, fed with vibrations from the line aforesaid; and (*m*) an intensity-regulating device, for one or more of the keyboards aforesaid, whereby the loudness of the electrically-produced tones, corresponding to and controlled by said keyboard, can be increased or decreased from time to time, as required.

112. An electrical music-generating system, including, in combination, (*a*) suitable vibration-translating apparatus, whereby electrical vibrations are translated into audible aerial vibrations; (*b*) a keyboard; (*c*) a plurality of sets of circuits, controlled by said keyboard; said sets of circuits serving respectively for different orders of harmonics; (*d*) switches, inserted in said circuits, said switches being controlled by the keys of the keyboard aforesaid; (*e*) alternators, whereby electrical vibrations of the requisite frequencies are produced in the circuits aforesaid; (*f*) devices, each controlling the action of one of the sets of circuits aforesaid on the vibration-translating apparatus; and (*g*) another keyboard, with one or more other sets of circuits controlled thereby and in which the requisite electrical vibrations are produced.

113. An electrical music-generating system, including in combination, (*a*) suitable vibration-translating apparatus, whereby electrical vibrations are translated into audible aerial vibrations; (*b*) a keyboard; (*c*)

a plurality of sets of circuits, controlled by said keyboard; said sets of circuits serving respectively for different orders of harmonics; (d) switches, inserted in said circuits, said switches being controlled by the keys of the keyboard aforesaid; (e) alternators, whereby electrical vibrations of the requisite frequencies are produced in the several sets of circuits aforesaid; (f) devices, each controlling the action of one of the sets of circuits aforesaid on the vibration-translating apparatus; (g) another keyboard or switchboard with one or more other sets of circuits controlled thereby and in which the requisite electrical vibrations are produced; and (h) set-controlling devices for the sets of circuits last named; the set-controlling devices for the sets of circuits belonging respectively to the two keyboards aforesaid, serving to afford facility to the performer or performers to change the timbres of the electrically-produced sounds, corresponding respectively to and controlled respectively by such keyboards; substantially as hereinbefore described.

114. An electrical music-generating system, including, in combination, (a) suitable vibration-translating apparatus, whereby electrical vibrations are translated into audible aerial vibrations; (b) a keyboard; (c) a plurality of sets of circuits, controlled by said keyboard; said sets of circuits serving respectively for different orders of harmonics; (d) switches, inserted in said circuits, said switches being controlled by the keys of the keyboard aforesaid; (e) alternators, whereby electrical vibration of the requisite frequences are produced in the circuits aforesaid; (f) devices, each controlling the action of one of the sets of circuits aforesaid on the vibration-translating apparatus; (g) another device, controlling the intensity of action of all the sets of circuits aforesaid on the vibration-translating apparatus aforesaid; the set-controlling devices aforesaid serving to afford facility for changing the timbre of the electrically-produced tones, and the intensity-controlling device aforesaid serving to afford facility for changing the loudness of said tones; and (h) another keyboard, with one or more other sets of circuits controlled thereby and in which the requisite electrical vibrations are produced.

115. An electrical music-generating system, including, in combination, (a) suitable vibration-translating apparatus, whereby electrical vibrations are translated into audible aerial vibrations; (b) a keyboard; (c) a plurality of sets of circuits, controlled by said key board; said sets of circuits serving respectively for different orders of harmonics; (d) switches, inserted in said circuits, said switches being controlled by the keys of the keyboard aforesaid; (e) alternators, whereby electrical vibrations of the requisite freqencies are produced in the several sets of circuits aforesaid; (f) devices, each controlling the action of one of the sets of circuits aforesaid on the vibration-translating apparatus; (g) another keyboard or switchboard with one or more other sets of circuits controlled thereby and in which the requisite electrical vibrations are produced; and (h) set-controlling devices for the sets of circuits last-named; the set-controlling devices for the sets of circuits belonging respectively to the two keyboards aforesaid, serving to afford facility to the performer or performers to change the timbres of the electrically-produced sounds, corresponding respectively to and controlled respectively by such keyboards; and (i) loudness-governing devices for the two keyboards aforesaid, each of said loudness-governing devices serving to govern the loudness of the electrically produced tones corresponding to and controlled by the keyboard for which it serves.

116. An electrical music-generating system, including, in combination; (a) suitable vibration-translating apparatus, whereby electrical vibrations are translated into audible aerial vibrations; (b) a keyboard; (c) a plurality of sets of circuits, controlled by said keyboard; (d) switches, inserted in said circuits, said switches being controlled by the keys of the keyboard aforesaid; (e) alternators, whereby the requisite electrical vibrations are produced in the circuits of the several sets aforesaid, said alternators having rotary members; (f) shafts, on which the rotary members of said alternators are mounted; (g) toothed-gearing, connecting said shafts, so that they rotate without slip with the relative angular velocities required; (h) devices, each controlling the action of one of the set of circuits aforesaid, on the vibration-translating apparatus; and (i) another keyboard, with one or more other sets of circuits controlled thereby and in which the requisite electrical vibrations are produced.

117. An electrical music-generating system, including, in combination, (a) suitable vibration-translating apparatus, whereby electrical vibrations are translated into audible aerial vibrations; (b) a keyboard; (c) a plurality of sets of circuits, controlled by said keyboard, said sets of circuits serving respectively for different orders of harmonics; (d) switches, inserted in said circuits, said switches being controlled by the keys of the keyboard aforesaid; (e) alternators, whereby electrical vibrations of the requisite frequencies are produced in the circuits aforesaid; said alternators having rotary members; (f) shafts, on which the rotary members of said alternators are mounted; (g) toothed gearing connecting said shafts, so that they rotate without slip with the relative angular velocities required; (h) devices, each controlling the action of one of the sets of circuits aforesaid on the vibration-translating apparatus; and (i) another keyboard, with one or more other sets of circuits controlled thereby and in which the requisite electrical vibrations are produced.

118. An electrical music-generating system, including, in combination, (a) suitable vibration-translating apparatus, whereby electrical vibrations are translated into audible aerial vibrations; (b) a keyboard; (c) a plurality of sets of circuits, controlled by said keyboard; said sets of circuits serving respectively for different orders of harmonics; (d) switches, inserted in said circuits, said switches being controlled by the keys of the keyboard aforesaid; (e) alternators, whereby electrical vibrations of the requisite frequencies are produced in the several sets of circuits aforesaid; said alternators having rotary members; (f) shafts, on which the rotary members of said alternators are mounted; (g) toothed gearing, connecting said shafts, so that they rotate without slip with the relative angular velocities required; (h) devices, each controlling the action of one of the sets of circuits aforesaid on the vibration-translating apparatus; (i) another keyboard, with one or more other sets of circuits controlled thereby and in which the requisite electrical vibrations are produced; and (k) set-controlling devices for the sets of circuits last named; the set-controlling devices for the sets of circuits belonging respectively to the two keyboards aforesaid, serving to afford facility to the performer or performers to change the timbres of the electrically-produced sounds, corresponding respectively to and controlled respectively by such keyboards; substantially as hereinbefore described.

119. An electrical music-generating system, including, in combination, (a) suitable vibration-translating apparatus, whereby electrical vibrations are translated into audible aerial vibrations; (b) a keyboard; (c) a plurality of sets of circuits, controlled by said keyboard; said sets of circuits serving respectively for different orders of harmonics; (d) switches, inserted in said circuits, said switches being controlled by the keys of the keyboard aforesaid; (e) alternators, whereby electrical vibrations of the requisite frequencies are produced in the circuits aforesaid; said alternators having rotary members; (f) shafts, on which the rotary members of said alternators are mounted; (g) toothed-gearing, connecting said shafts, so that they rotate without slip with the relative angular velocities required; (h) devices, each controlling the action of one of the sets of circuits aforesaid on the vibration-translating apparatus aforesaid; (i) another device, controlling the intensity of action of all the sets of circuits aforesaid on the vibration-translating apparatus aforesaid; the set-controlling devices aforesaid serving to afford facility for changing the timbre of the electrically-produced tones, and the intensity-controlling device aforesaid serving to afford facility for changing the loudness of said tones; and (k) another keyboard, with one or more other sets of circuits controlled thereby and in which the requisite electrical vibrations are produced.

120. An electrical music-generating system, including, in combination, (a) suitable vibration-translating apparatus, whereby electrical vibrations are translated into audible aerial vibrations; (b) a keyboard; (c) a plurality of sets of circuits, controlled by said keyboard; said sets of circuits serving respectively for different orders of harmonics; (d) switches, inserted in said circuits, said switches being controlled by the keys of the keyboard aforesaid; (e) alternators, whereby electrical vibrations of the requisite frequencies are produced in the several sets of circuits aforesaid; said alternators having rotary members; (f) shafts, on which the rotary members of said alternators are mounted; (g) toothed gearing, connecting said shafts, so that they rotate without slip with the relative angular velocities required; (h) devices, each controlling the action of one of the sets of circuits aforesaid on the vibration-translating apparatus; (i) another keyboard, with one or more other sets of circuits controlled thereby and in which the requisite electrical vibrations are produced; (k) set-controlling devices for the sets of circuits last named; the set-controlling devices for the sets of circuits belonging respectively to the two keyboards aforesaid, serving to afford facility to the performer or performers to change the timbres of the electrically-produced sounds, corresponding respectively to and controlled respectively by such keyboards; and (l) two loudness-governing devices for the two keyboards aforesaid respectively, each of said loudness-governing devices serving to govern the loudness of the electrically-produced tones, corresponding to and controlled by the keyboard for which it serves.

121. An electrical music-generating apparatus, comprising, (a) a plurality of switchboards; (b) circuits, connected with said switchboards; (c) a set of alternators, having vibration-frequencies corresponding to the notes of a musical scale and adapted to produce electrical vibrations of different frequencies in circuits corresponding to said set of alternators and belonging to one or more of the switchboards aforesaid; and (d) another set of alternators, tuned in unison with the set of alternators first mentioned, and serving to produce, in circuits corresponding respectively to said alternators and belonging to one or more of the switchboards aforesaid, electrical vibrations of frequencies substantially identical with those produced by the corresponding alternators in the set first mentioned, but of a different wave shape, corresponding to a different timbre.

122. An electrical music-generating apparatus, comprising, (a) a plurality of switchboards; (b) circuits, connected with said switchboards; (c) a set of alternators, having vibration-frequencies corresponding to the notes of a musical scale and adapted to produce electrical vibrations of different frequencies in circuits corresponding to said set of alternators and belonging to one or more of the switchboards aforesaid; (d) another set of alternators, tuned in unison with the set of alternators first mentioned, and serving to produce, in circuits corresponding respectively to said alternators and belonging to one or more of the switchboards aforesaid, electrical vibrations of frequencies substantially identical with those produced by the corresponding alternators in the set first mentioned, but of a different wave shape, corresponding to a different timbre; and (e) vibration-translating apparatus, whereby electrical vibrations are translated into audible aerial vibrations; the switchboards aforesaid serving to afford facility for bringing the different alternators aforesaid into action upon the vibration-translating apparatus, each alternator as required.

123. An electrical music-generating apparatus, comprising (a) a plurality of switchboards; (b) circuits, connected with said switchboards; (c) a set of alternators, having vibration-frequencies corresponding to the notes of a musical scale and adapted to produce electrical vibrations of different frequencies in circuits corresponding to said set of alternators and belonging to one or more of the switchboards aforesaid; (d) another set of alternators, tuned in unison with the set of alternators first mentioned, and serving to produce, in circuits corresponding respectively to said alternators and belonging to one or more of the switchboards aforesaid, electrical vibrations of frequencies substantially identical with those produced by the corresponding alternators in the set first mentioned, but of a different wave shape, corresponding to a different timbre; (e) vibration-translating apparatus, whereby electrical vibrations are translated into audible aerial vibrations; the switchboards aforesaid serving to afford facility for bringing the different alternators aforesaid into action upon the vibration-translating apparatus, each alternator as required; and (f) one or more expression devices, whereby the loudness of the electrically-produced tones is governed.

124. An electrical music-generating apparatus, comprising, (a) a plurality of switchboards, (b) circuits, connected with said switchboards; (c) a set of alternators, having vibration-frequencies corresponding to the notes of a musical scale and adapted to produce electrical vibrations of different frequencies in circuits corresponding to said set of alternators and belonging to one or more of the switchboards aforesaid; (d) another set of alternators, tuned in unison with the set of alternators first mentioned, and serving to produce, in circuits corresponding respectively to said alternators and belonging to one or more of the switchboards aforesaid, electrical vibrations of frequencies substantially identical with those produced by the corresponding alternators in the set first mentioned, but of a different wave shape, corresponding to a different timbre; (e) vibration-translating apparatus, whereby electrical vibrations are translated into audible aerial vibrations; the switchboards aforesaid serving to afford facility for bringing the different alternators aforesaid into action upon the vibration-translating apparatus, each alternator as required; and (f) keyboards for controlling the switchboards aforesaid.

125. An electrical music-generating apparatus, comprising, (a) a plurality of switchboards; (b) circuits, connected with said switchboards; (c) a set of alternators, having vibration-frequencies corresponding to the notes of a musical scale and adapted to produce electrical vibrations of different frequencies in circuits corresponding to said set of alternators and belonging to one or more of the switchboards aforesaid; (d) another set of alternators, tuned in unison with the set of alternators first mentioned, and serving to produce, in circuits corresponding respectively to said alternators and belonging to one or more of the switchboards aforesaid, electrical vibrations of frequencies substantially identical with those produced by the corresponding alternators in the set first mentioned, but of a different wave shape, corresponding to a different timbre: (e) vibration-translating apparatus, whereby electrical vibrations are translated into audible aerial vibrations; the switchboards aforesaid serving to afford facility for bringing the different alternators aforesaid into action upon the vibration-translating apparatus, each alternator as required; (f) keyboards, for controlling the switchboards aforesaid; and (g) one or more expression devices, whereby the loudness of the electrically-produced sound is governed.

126. An electrical music-generating apparatus, comprising, (a) a plurality of switchboards; (b) circuits, connected with said switchboards; (c) a set of alternators, having vibration-frequencies corresponding to the notes of a musical scale and adapted to produce electrical vibrations of different frequencies in circuits corresponding to said set of alternators and belonging to one or more of the switchboards aforesaid; (d) another set of alternators, tuned in unison with the set of alternators first mentioned, and serving to produce, in circuits corresponding respectively to said alternators and belonging to one or more of the switchboards aforesaid, electrical vibrations of frequencies substantially identical with those produced by the corresponding alternators in the set first mentioned, but of a different wave shape, corresponding to a different timbre; (e) vibration-translating apparatus, whereby electrical vibrations are translated into audible aerial vibrations; the switchboards aforesaid serving to afford facility for bringing the different alternators aforesaid into action upon the vibration-translating apparatus, each alternator as required; (f) power devices, for operating the switches of one or more of the switchboards aforesaid; and (g) keyboards, controlling said power devices.

127. An electrical music-generating apparatus, comprising, (a) a plurality of switchboards; (b) circuits, connected with said switchboards; (c) a set of alternators, having vibration-frequencies corresponding to the notes of a musical scale and adapted to produce electrical vibrations of different frequencies in circuits corresponding to said set of alternators and belonging to one or more of the switchboards aforesaid; (d) another set of alternators, tuned in unison with the set of alternators first mentioned, and serving to produce, in circuits corresponding respectively to said alternators and belonging to one or more of the switchboards aforesaid, electrical vibrations of frequencies substantially identical with those produced by the corresponding alternators in the set first mentioned; but of a different wave shape corresponding to a different timbre; (e) vibration-translating apparatus, whereby electrical vibrations are translated into audible aerial vibrations; the switchboards aforesaid serving to afford facility for bringing the different alternators aforesaid into action upon the vibration-translating apparatus, each alternator as required; (f) keyboards, for controlling the switchboards aforesaid; and (g) one or more expression devices, whereby the loudness of the electrically-produced tones is governed.

128. In an electrical music-generating system, the combination of (a) vibration-translating apparatus, whereby electrical vibrations are translated into audible aerial vibrations; (b) a plurality of sets of alternators, for producing electrical vibrations of different wave shapes; one of said sets of alternators producing electrical vibrations of one wave shape, corresponding to tones of one timbre, and another set of said alternators producing electrical vibrations of a different wave shape, corresponding to tones of a different timbre; (c) shafts, on which the rotary members of said alternators are mounted and toothed gearing connecting said shafts, whereby correct relations between the vibration frequencies of the several alternators of each set and the unison between the corresponding alternators of the two sets aforesaid are maintained; and (d) a plurality of switchboards, controlling the transmitting of vibrations from the alternators aforesaid, to the vibration-translating apparatus aforesaid.

129. In an electrical music-generating system, the combination of (a) vibration-translating apparatus, whereby electrical vibrations are translated into audible aerial vibrations; (b) a plurality of sets of alternators, for producing electrically vibrations of different wave shapes; one of said sets of alternators producing electrical vibrations of one wave shape, corresponding to tones of one timbre, and another set of said alternators producing electrical vibrations of a different wave shape, corresponding to tones of a different timbre; (c) shafts, on which the rotary members of said alternators are mounted and toothed gearing connecting said shafts, whereby correct relations between the vibration-frequencies of the several alternators of each set and the unison between the corresponding alternators of the two sets aforesaid are maintained; (d) a plurality of switchboards, controlling the transmitting of vibrations from the alternators aforesaid, to the vibration-translating apparatus aforesaid; and (e) keyboards, controlling said switchboards.

130. In an electrical music-generating system, the combination of (a) vibration-translating apparatus, whereby electrical vibrations are translated into audible aerial vibrations; (b) a plurality of sets of alternators, for producing electrical vibrations of different wave shapes; one of said sets of alternators producing electrical vibrations of one wave shape, corresponding to tones of one timbre, and another set of said alternators producing electrical vibrations of a different wave shape, corresponding to tones of a different timbre; (c) shafts, on which the rotary members of said alternators are mounted and toothed-gearing connecting said shafts, whereby correct relations between the vibration-frequencies of the several alternators of each set and the unison between the corresponding alternators of the two sets aforesaid are maintained; (d) a plurality of switchboards, controlling the transmitting of vibrations from the alternators aforesaid to the vibration-translating apparatus aforesaid; (e) keyboards, controlling said switchboards; and (f) one or more expression-devices, whereby the loudness of the electrically-produced tones is governed.

In testimony whereof, I have hereunto set my hand at New York city, New York, this twenty-fifth day of June, 1915, in the presence of the subscribing witnesses, whose signatures are hereto affixed.

THADDEUS CAHILL.

Witnesses:
E. MANTHE,
ARTHUR T. CAHILL.